US012716804B2

(12) United States Patent
Luleci et al.

(10) Patent No.: US 12,716,804 B2
(45) Date of Patent: Aug. 25, 2026

(54) GENERATIVE ADVERSARIAL NETWORKS FOR STRUCTURAL DAMAGE DIAGNOSTICS

(71) Applicants: University of Central Florida Research Foundation, Inc., Orlando, FL (US); Iowa State University Research Foundation, Inc., Ames, IA (US)

(72) Inventors: Furkan Luleci, Orlando, FL (US); F. Necati Catbas, Orlando, FL (US); Onur Avci, Morgantown, WV (US)

(73) Assignees: University of Central Florida Research Foundation, Inc., Orlando, FL (US); Iowa State University Research Foundation, Inc., Ames, IA (US)

( * ) Notice: Subject to any disclaimer, the term of this patent is extended or adjusted under 35 U.S.C. 154(b) by 726 days.

(21) Appl. No.: 18/302,393

(22) Filed: Apr. 18, 2023

(65) Prior Publication Data

US 2023/0332978 A1 Oct. 19, 2023

Related U.S. Application Data

(60) Provisional application No. 63/332,050, filed on Apr. 18, 2022.

(51) Int. Cl.
*G06N 3/08* (2023.01)
*G01M 7/00* (2006.01)
*G06N 3/094* (2023.01)

(52) U.S. Cl.
CPC ............. *G01M 7/00* (2013.01); *G06N 3/094* (2023.01)

(58) Field of Classification Search
CPC .... G01M 7/00; G01M 5/0083; G01M 5/0091; G01M 5/0066; G06N 3/094; G06N 3/048; G06N 3/082; G06N 3/0475; G06N 3/096
See application file for complete search history.

(56) References Cited

U.S. PATENT DOCUMENTS 7,729,035 B2 * 6/2010 Kim ...................... G01H 9/004 359/287
2008/0225376 A1 * 9/2008 Kim .................... G01N 29/348 359/287

(Continued)

FOREIGN PATENT DOCUMENTS

CA 3181091 A1 * 12/2021 ............ A61B 5/318
CN 112215421 A * 1/2021 ............ G06N 3/045

(Continued)

OTHER PUBLICATIONS

Furkan Luleci et al. "A literature review: Generative adversarial networks for civil structural health monitoring" Frontiers in Built Environment. 2022, pp. 1-25.

(Continued)

*Primary Examiner* — Hassan Mrabi
(74) *Attorney, Agent, or Firm* — Molly L. Sauter; Trenam Law

(57) ABSTRACT

Described herein relates to a system and method utilizing a novel Wasserstein Deep Convolutional GAN with Gradient Penalty ("WDCGAN-GP") and Cycle-Consistent Wasserstein Deep Convolutional Generative Adversarial Networks with Gradient Penalty ("CycleWDCGAN-GP) for automatically diagnosing a condition of at least one structure during the life cycle of the at least one structure. In an embodiment, by using WDCGAN-GP and/or CycleWDCGAN-GP architecture, at least one synthetic dataset may be used to support and/or train at least one dataset of Deep-Learning ("DL") architecture, increasing accuracy and/or efficiency of the (Continued)

structure health monitoring system. Additionally, in an embodiment, the structural health monitoring system may be configured to diagnosis at least one condition of at least one alternative structure based on the at least one trained dataset of the at least one structure.

18 Claims, 94 Drawing Sheets

(56) References Cited

U.S. PATENT DOCUMENTS

| | | | | |
|---|---|---|---|---|
| 2019/0171187 | A1* | 6/2019 | Cella | G05B 19/4155 |
| 2019/0259474 | A1* | 8/2019 | Wang | G16B 40/20 |
| 2021/0150826 | A1* | 5/2021 | Baughman | G06N 3/08 |
| 2021/0279596 | A1* | 9/2021 | Zheng | G06N 3/09 |
| 2021/0279597 | A1* | 9/2021 | Zheng | G06N 3/09 |
| 2022/0012815 | A1* | 1/2022 | Kearney | G06N 3/0475 |
| 2022/0187262 | A1* | 6/2022 | Jang | G06N 3/0475 |
| 2022/0398460 | A1* | 12/2022 | Dalli | G06N 5/025 |
| 2023/0104028 | A1* | 4/2023 | Wang | G05B 23/0283 702/183 |

FOREIGN PATENT DOCUMENTS

| | | | | | |
|---|---|---|---|---|---|
| CN | 111326170 | B | * | 12/2022 | G10L 21/007 |
| CN | 112668196 | B | * | 6/2023 | |
| JP | 2020187753 | A | * | 11/2020 | G06N 3/045 |
| KR | 102196719 | B1 | * | 12/2020 | G01N 33/0075 |
| KR | 20210054868 | A | * | 5/2021 | G06N 3/0475 |
| KR | 20220110113 | A | * | 8/2022 | G06N 3/049 |
| KR | 102600548 | B1 | * | 11/2023 | G06N 3/096 |
| KR | 102708974 | B1 | * | 9/2024 | G06N 3/094 |
| KR | 102788703 | B1 | * | 3/2025 | G06N 3/0475 |
| WO | WO-2021089221 | A1 | * | 5/2021 | G06N 3/045 |

OTHER PUBLICATIONS

Chuanzhi Dong et al. "Bridge Load Testing for identifying Live Load Distribution, Load Rating, Serviceability and Dynamic Response" Frontiers in Built Environment. 2020, pp. 1-14. vol. 6 Article 46.
Yizhou Zhuang et al. "Data Loss Reconstruction Method for a Bridge Weigh-in-Motion System Using Generative Adversarial Networks" Sensors. 2022, pp. 1-16. 22, 858.
Osama Abdeljaber et al. "1-D CNNs for structural damage detection: Verification on a structural health monitoring benchmark data" Neurocomputing. 2018, pp. 1308-131, 275.
Martin Arjovsky et al. "Wasserstein GAN" 2017, pp. 1-32.
Avci O. et al. "Strcutural Damage Detection in real time: Implementation of 1D Convolutional Neural Networks for SHM Applications" Structural Health Monitoring & Damage Detection, 2017, vol. 7, pp. 49-54.
Ian J. Goodfellow et al. "Generative Adversarial Nets" 2014, pp. 1-9.
Shuyue Guan et al. "Evaluation of Generative Adversarial Network Performance Based on Direct Analysis of Generated Images" In: 2019 IEEE Applied Imagery Pattern Recognition Workshop (AIPR). IEEE, 2019 pp. 1-5.
Shuyue Guan et al. "A Novel Measure to Evaluate Generative Adversarial Networks Based on Direct Analysis of Generated Images" 2021, pp. 1-16.
Martin Heusel et al."GANs Trained by a Two Time-Scale Update Rule Converge to a Local Nash Equilibrium" 2017, pp. 1-38. 31st Conference on Neural Information Processing Systems.Long Beach, CA, USA.
Weining Hu et al. "Improved CycleGAN for image-to-image Translation" 2021, pp. 1-9. British Colombia.
Alec Radford et al. "Unsupervised Representation Learning With Deep Convolutional Generative Adversarial Networks" 2016, pp. 1-16. ICLR.
Zhou Wang et al. "Image Quality Assessment: From Error Visibility to Structural Similarity" IEEE Transactions on Image Processing. Apr. 2004, pp. 600-612 vol. 13, No. 4.
Jun-Yan Zhu et al. "Unpaired Image-to-Image Translation using Cycle-Consistent Adversarial Networks" 2020, pp. 1-18.
Fikret Necati Catbas et al. "Extended Reality (XR) for Condition Assessment of Civil Engineering Structures: A Literature Review" Sensors. 2022, pp. 1-33. 9560.
J. Gosliga et al. "Foundations of Population-based SHM, Part II: Heterogeneous populations—Graphs, networks, and communities" Mechanical Systems and Signal Processing. 2021, pp. 1-22.148.
Ishaan Gulrajani et al. "Improved Training of Wasserstein GANs" 2017, pp. 1-20.
Karren Dai Yang et al. "Multi-domain translation between single-cell imaging and sequencing data using autoencoders" Nature Communications. 2021, pp. 1-12.
Furkan Luleci et al. "Generative Adversarial Networks for Data Generation in Structural Health Monitoring" Frontiers in Built Environment. 2022, pp. 1-17. vol. 8 Article 816644.
J. Gosliga et al. "On Population-based structural health monitoring for bridges" Mechanical Systems and Signal Processing. 2022, pp. 1-25, 173.
Isabela Albuquerque et al. "Generalizing to Unseen Domains via Distribution Matching" 2019, pp. 1-17.
Emmanuel de Bézenac et al. "Optimal Unsupervised Domain Translation" 2019, pp. 1-16.
G. Delo et al. "When is a Bridge Not an Aeroplane? Part II: A Population of Real Structures" EWSHM 2022, LNCE 254, pp. 965-974.
Aniket Anand Deshmukh et al. "A Generalization Error Bound for Multi-class Domain Generalization" 2019, pp. 1-19.
Gilles Blanchard et al. "Generalizing from Several Related Classification Tasks to a New Unlabeled Sample" 2011, pp. 1-9.
Kaiyang Zhou et al. "Domain Generalization: A Survey" 2022 pp. 1-20.
Krikamol Muandet et al. "Domain Generalization Via Invariant Feature Representation" 2013, pp. 1-20.
Ya Li et al. "Domain Generalization via Conditional Invariant Representations" 2018, pp. 1-9.
Wang Lu et al. "Domain-invariant Feature Exploration for Domain Generalization" Transactions on Machine Learning Research. 2022, pp. 1-20.
F. Luleci et al. "Investigation of comparative analysis of a multi-span prestressed concrete highway bridge" Bridge Safety, Maintenance, Management, Life-Cycle, Resilience and Sustainability. 2022, pp. 1433-1437.
Furkan Luleci et al. "Structural State Translation: Condition Transfer between Civil Structures Using Domain-Generalization for Structural Health Monitoring" Engineering Structures. Dec. 2022, pp. 1-44.
Furkan Luleci et al. "CycleGAN for Undamaged-to-Damaged Domain Translation for Structural Health Monitoring and Damage Detection" 2022, pp. 1-27.
Haotian Ye et al. "Towards a Theoretical Framework of Out-of-Distribution Generalization" 2021, pp. 1-27.
Jingkang Yang et al. "Generalized Out-of-Distribution Detection: A Survey" Submitted to IEEE Transactions on Pattern Analysis and Machine Intelligence. 2022, pp. 1-22.
Shai Ben-David et al. "Analysis of Representations for Domain Adaptation" NIPS 19. 2007, pp. 1-8.
Zheyan Shen et al. "Towards Out-Of-Distribution Generalization: A Survey" Journal of Latex Class Files. Aug. 2015, pp. 1-22. vol. 14, No. 8.
Peter Van Overschee et al. "Subspace Algorithms for the Stochastic Identification Problem" Automatica. 1993, pp. 649-660. vol. 29. No. 3.
Chandula T. Wickramarachchi wt al. "On Aspects of Geometry in SHM and Population-Based SHM" Data Science in Engineering. 2022, pp. 67-77. vol. 9.

(56) References Cited

OTHER PUBLICATIONS

Keith Worden et al.“A Brief Introduction to Recent Developments in Population-Based Structural Health Monitoring” Frontiers in Built Environment. 2020, pp. 1-14. vol. 6.

* cited by examiner

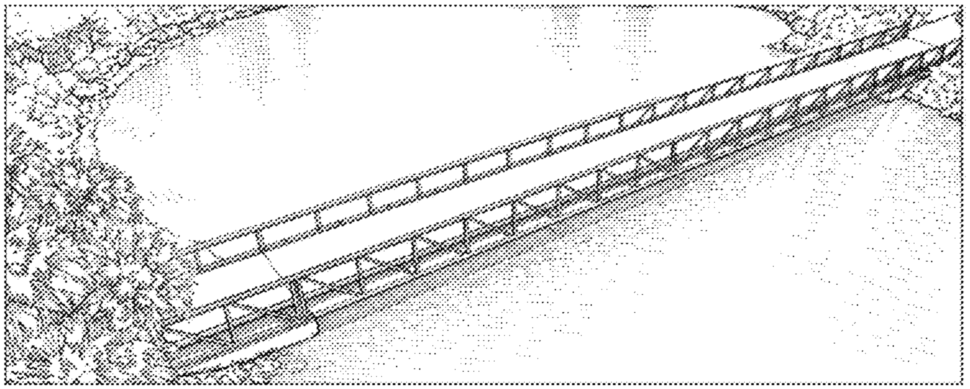
Members used in FEA
| KEY | DESCRIPTION | ELEMENT |
|---|---|---|
| A | HSS 10 x 10 x3/8 | TOP CHORD |
| B | HSS 10 x 10 x3/8 | BOTTOM CHORD |
| C | HSS 6 x 4 x 3/8 | SIDE TRUSS VERTICAL |
| D | HSS 10 x 10 x3/8 | SIDE TRUSS SUPPORT VERTICAL |
| F | HSS 4 x 4 x 1/4 | SIDE TRUSS DIAGONAL BRACE |
| G | HSS 3 x 3 x 1/4 | DECK DIAGONAL BRACE |
| H | W 12 x 22 | DECK CROSS BEAM |
| DK | THICKNESS=5 in | CONCRETE DECK |
| LT | BRIDGE LENGTH=177 ft | - |
NOTE: 4 ksi concrete in the deck and ASTM A615 Grade 60 steel are used
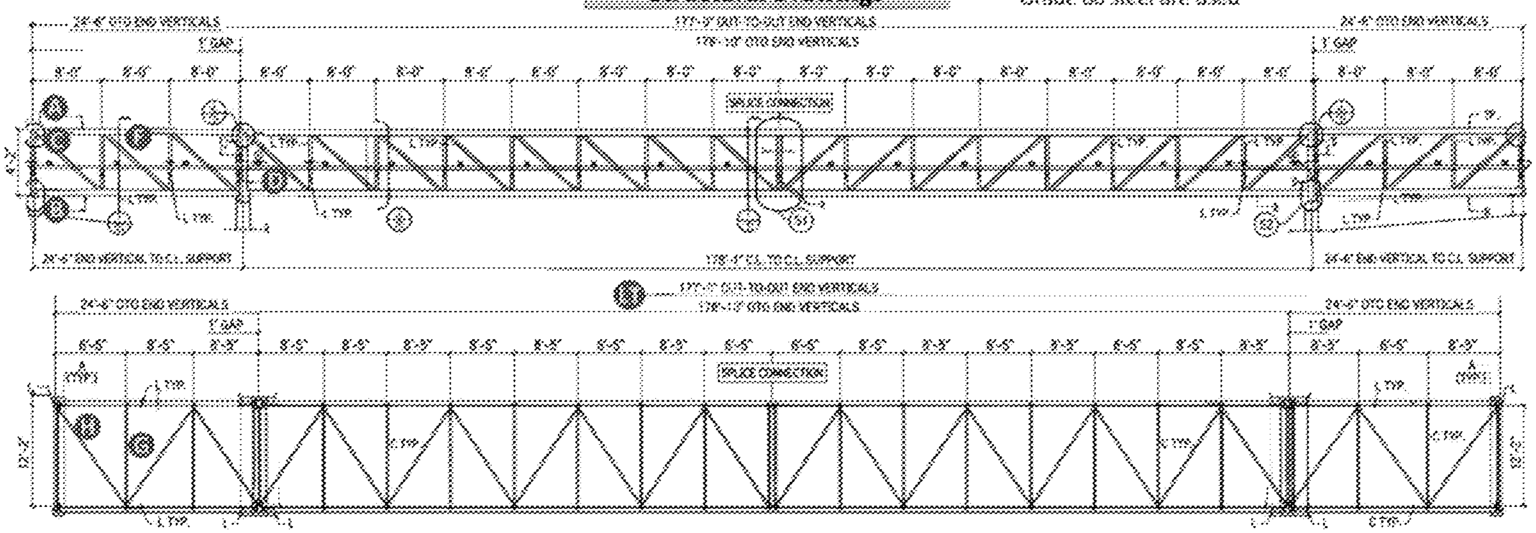
FIG. 46

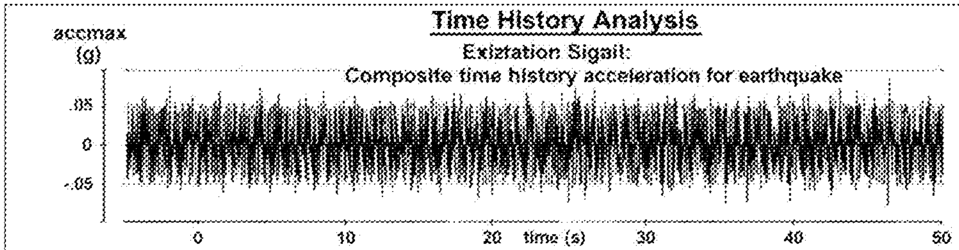
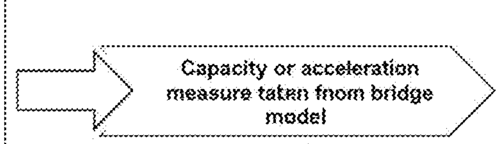
| Mode | Description | Period (s) | Frequency (Hz) | Geericalized Mass ($10^6$ kg) | Participating Mass Ratio (%) |
|---|---|---|---|---|---|
| 1 | Longitudinal | 2.513 | 0.398 | 5.23 | 15.6 |
| 2 | Bending 2 | 1.387 | 0.777 | 3.15 | 9.4 |
| 3 | Bending 3 | 0.948 | 1.055 | 2.76 | 8.2 |
| 4 | Torasimal | 0.742 | 1.348 | 2.21 | 6.6 |
| 5 | Bending 4 | 0.715 | 1.341 | 1.63 | 4.9 |
| 6 | Bending 5 | 0.396 | 2.012 | 1.25 | 3.8 |
| 7 | Bending 6 | 0.322 | 3.012 | 1.03 | 3.0 |
| 8 | Bending 7 | 0.224 | 3.524 | 0.89 | 2.5 |
| 9 | Bending 8 | 0.230 | 4.008 | 0.76 | 2.2 |
| 10 | Bending 9 | 0.221 | 4.525 | 0.63 | 1.8 |
Modal Analysis of the Bridge:
Mode shapes, natural periods, and modal masses
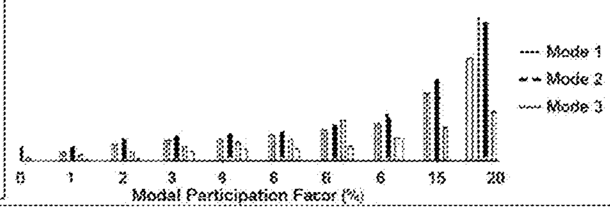
Overall Stiffness: I/F ≤ 25%
Strength: $V_{target} / V_{yield} \leq 25\%$
Overall Flexibility: I/F ≤ 1.5%
FIG. 49

Bridge#2

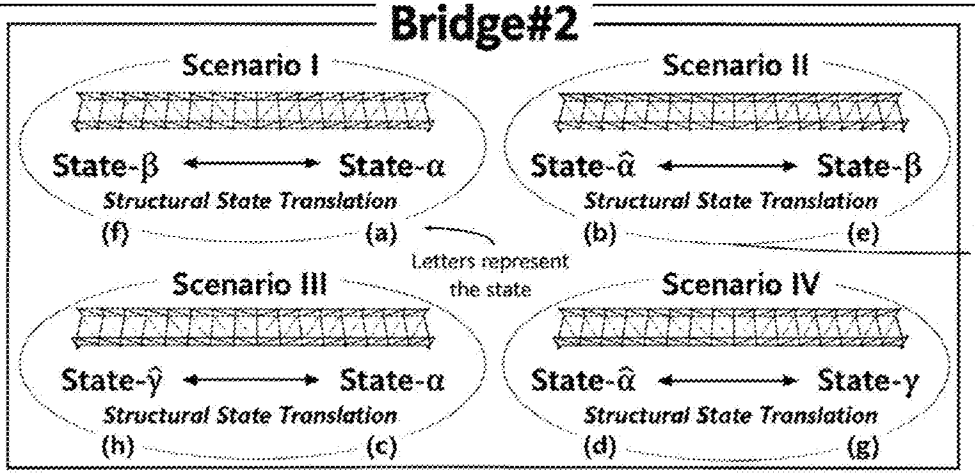

hat "^" denotes that it is the translated state

MMSC values of the signal pairs from each sensor channel of real and synthetic (translated) states (a) ⟷ (b)

(c) ⟷ (d)

(e) ⟷ (f)

(g) ⟷ (h)

MMSC = 1 (complete similarity)
MMSC = 0 (complete dissimilarity)

MMSC values

| Channel# | (a) ⟷ (b) | (c) ⟷ (d) | (e) ⟷ (f) | (g) ⟷ (h) |
|---|---|---|---|---|
| Channel#7 | 0.934 | 0.937 | 0.941 | 0.941 |
| Channel#8 | 0.948 | 0.933 | 0.939 | 0.934 |
| Channel#9 | 0.934 | 0.908 | 0.947 | 0.929 |
| Channel#10 | 0.884 | 0.918 | 0.932 | 0.935 |
| Channel#11 | 0.843 | 0.889 | 0.912 | 0.923 |
| Channel#12 | 0.887 | 0.843 | 0.922 | 0.912 |
| Channel#13 | 0.916 | 0.882 | 0.934 | 0.932 |
| Channel#14 | 0.908 | 0.934 | 0.929 | 0.948 |
| Channel#15 | 0.935 | 0.948 | 0.936 | 0.942 |
| Channel#16 | 0.936 | 0.931 | 0.939 | 0.939 |
| Average MMSC of the whole bridge | 0.912 | 0.912 | 0.933 | 0.933 |

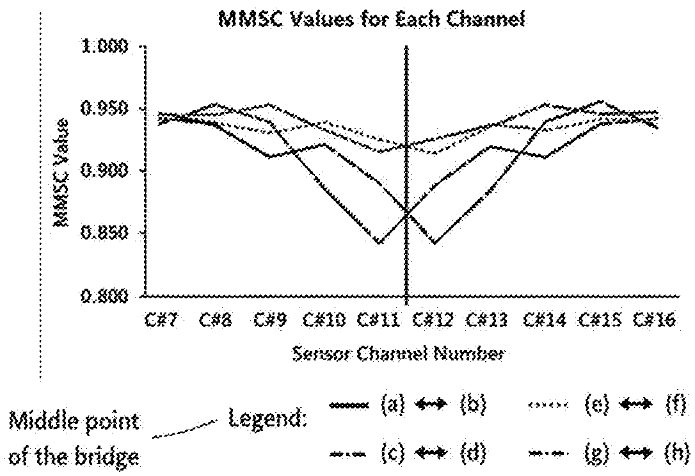

Middle point of the bridge

FIG. 57

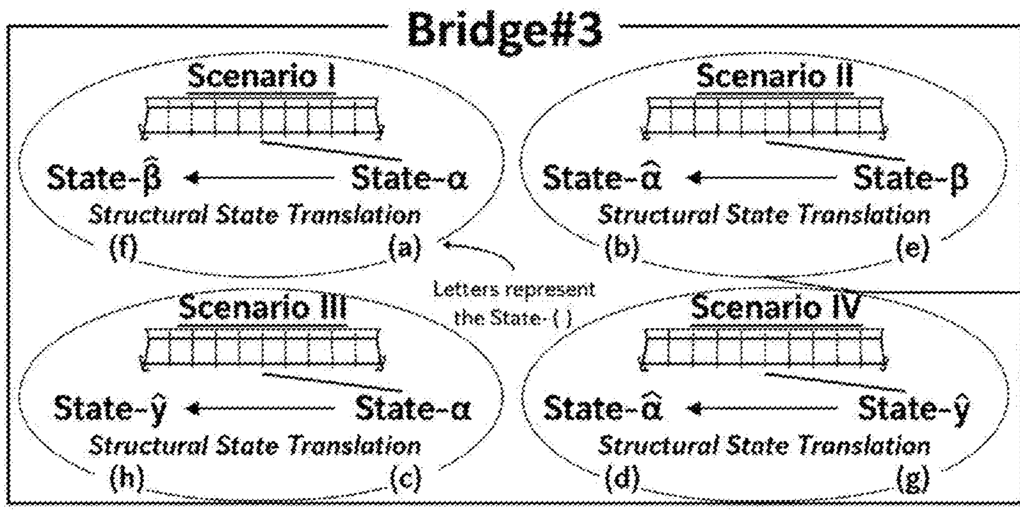

MMSC values of the signal pairs from each sensor channel of real and synthetic (translated) states (a) ⟷ (b)

(c) ⟷ (d)

(e) ⟷ (f)

(g) ⟷ (h)

MMSC = 1 (complete similarity)
MMSC = 0 (complete dissimilarity)

MMSC values

| | (a) ⟷ (b) | (c) ⟷ (d) | (e) ⟷ (f) | (g) ⟷ (h) |
|---|---|---|---|---|
| Channel#7 | 0.938 | 0.937 | 0.943 | 0.942 |
| Channel#8 | 0.957 | 0.957 | 0.979 | 0.979 |
| Channel#9 | 0.962 | 0.963 | 0.980 | 0.981 |
| Channel#10 | 0.966 | 0.967 | 0.979 | 0.979 |
| Channel#11 | 0.960 | 0.961 | 0.970 | 0.972 |
| Channel#12 | 0.959 | 0.959 | 0.970 | 0.969 |
| Channel#13 | 0.967 | 0.967 | 0.979 | 0.979 |
| Channel#14 | 0.963 | 0.962 | 0.981 | 0.980 |
| Channel#15 | 0.957 | 0.957 | 0.979 | 0.979 |
| Channel#16 | 0.940 | 0.941 | 0.948 | 0.949 |
| Average MMSC of the whole bridge | 0.957 | 0.957 | 0.971 | 0.971 |

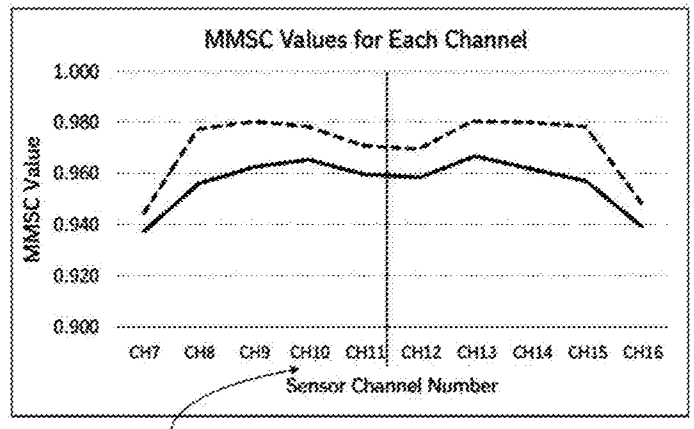

Middle point of the bridge

Legend: —— (a) ⟷ (b) ---- (e) ⟷ (f)
—— (c) ⟷ (d) ---- (g) ⟷ (h)

FIG. 58

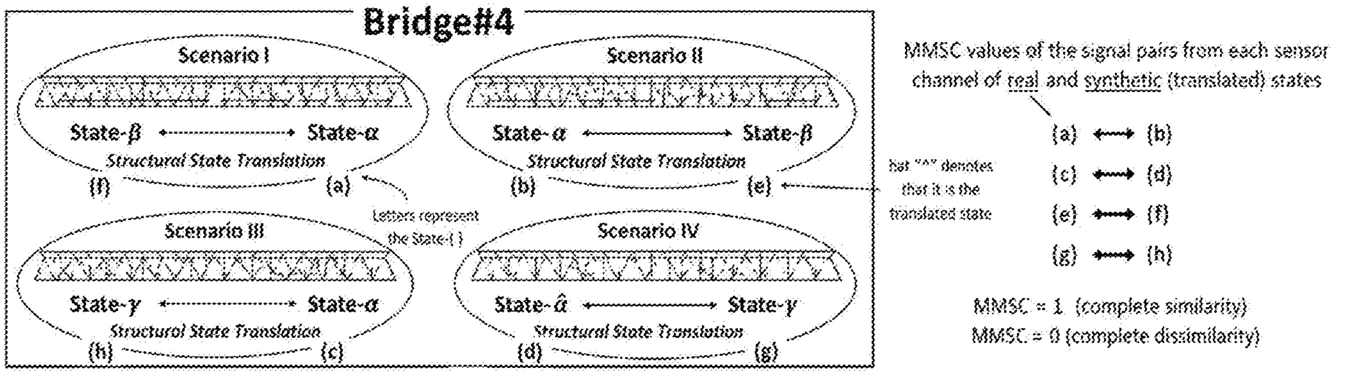
MMSC values
| | (a) ⟷ (b) | (c) ⟷ (d) | (e) ⟷ (f) | (g) ⟷ (h) |
|---|---|---|---|---|
| Channel#1 | 0.938 | 0.936 | 0.942 | 0.942 |
| Channel#2 | 0.960 | 0.961 | 0.961 | 0.961 |
| Channel#3 | 0.966 | 0.967 | 0.958 | 0.958 |
| Channel#4 | 0.959 | 0.970 | 0.972 | 0.959 |
| Channel#5 | 0.972 | 0.971 | 0.955 | 0.955 |
| Channel#6 | 0.968 | 0.968 | 0.947 | 0.946 |
| Channel#7 | 0.965 | 0.964 | 0.948 | 0.947 |
| Channel#8 | 0.958 | 0.958 | 0.963 | 0.963 |
| Channel#9 | 0.953 | 0.954 | 0.966 | 0.966 |
| Channel#10 | 0.943 | 0.943 | 0.967 | 0.966 |
| Channel#11 | 0.933 | 0.933 | 0.964 | 0.964 |
| Channel#12 | 0.931 | 0.932 | 0.963 | 0.963 |
| Channel#13 | 0.942 | 0.942 | 0.966 | 0.966 |
| Channel#14 | 0.955 | 0.954 | 0.967 | 0.967 |
| Channel#15 | 0.960 | 0.960 | 0.964 | 0.964 |
| Channel#16 | 0.965 | 0.965 | 0.946 | 0.947 |
| Channel#17 | 0.969 | 0.969 | 0.947 | 0.947 |
| Channel#18 | 0.972 | 0.972 | 0.955 | 0.955 |
| Channel#19 | 0.971 | 0.971 | 0.957 | 0.956 |
| Channel#20 | 0.968 | 0.966 | 0.960 | 0.960 |
| Channel#21 | 0.961 | 0.960 | 0.962 | 0.962 |
| Channel#22 | 0.937 | 0.941 | 0.941 | 0.938 |
| Average MMSC of the whole bridge | 0.957 | 0.957 | 0.958 | 0.957 |
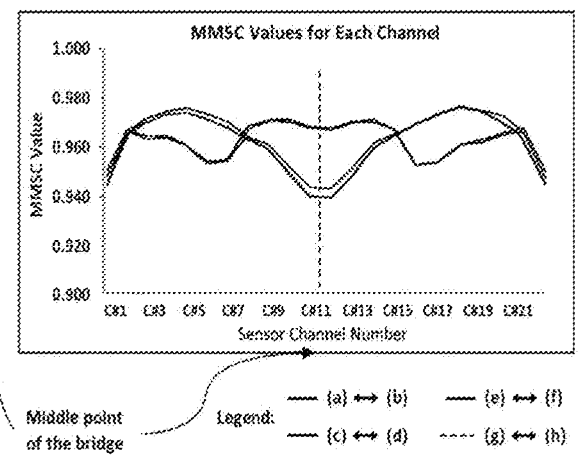
FIG. 59

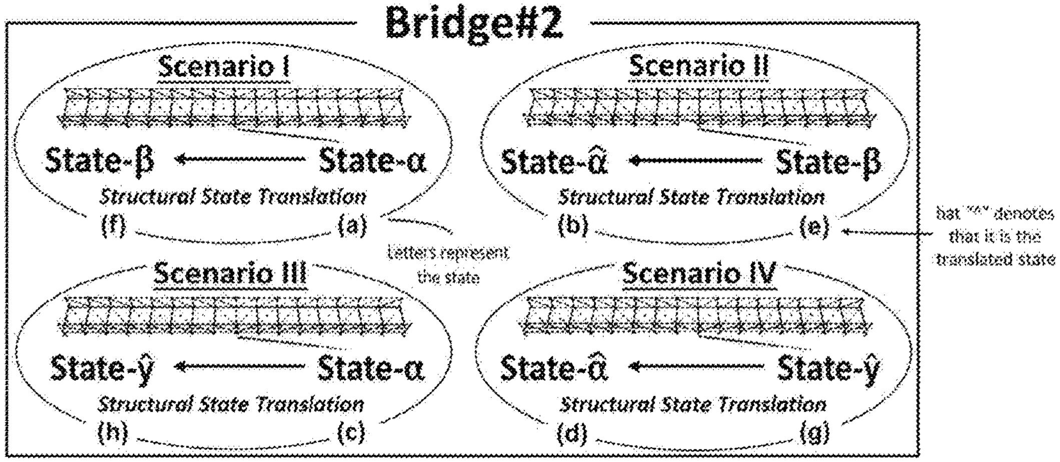

(a) ⟷ (b) Avg. MMSC = 0.912

| Mode | State-α Natural Frequencies (Hz) | State-α̂ Natural Frequencies (Hz) | Change in Natural Frequencies (%) | Modal Assurance Criterion |
|---|---|---|---|---|
| 1 | 7.208 | 7.083 | 1.76 | 0.969 |
| 2 | 12.375 | 12.375 | 0.00 | 0.972 |

(c) ⟷ (d) Avg. MMSC = 0.912

| Mode | State-α Natural Frequencies (Hz) | State-α̂ Natural Frequencies (Hz) | Change in Natural Frequencies (%) | Modal Assurance Criterion |
|---|---|---|---|---|
| 1 | 7.208 | 7.083 | 1.76 | 0.972 |
| 2 | 12.375 | 12.375 | 0.00 | 0.963 |

(e) ⟷ (f) Avg. MMSC = 0.933

| Mode | State-β Natural Frequencies (Hz) | State-β̂ Natural Frequencies (Hz) | Change in Natural Frequencies (%) | Modal Assurance Criterion |
|---|---|---|---|---|
| 1 | 7.083 | 7.208 | 1.73 | 0.990 |
| 2 | 12.375 | 12.375 | 0.00 | 0.956 |

(g) ⟷ (h) Avg. MMSC = 0.933

| Mode | State-ŷ Natural Frequencies (Hz) | State-ŷ Natural Frequencies (Hz) | Change in Natural Frequencies (%) | Modal Assurance Criterion |
|---|---|---|---|---|
| 1 | 7.083 | 7.208 | 1.73 | 0.989 |
| 2 | 12.375 | 12.375 | 0.00 | 0.956 |

FIG. 61

| Mode No | Dataset 1H | | | | Dataset 1D | | | |
|---|---|---|---|---|---|---|---|---|
| | Frequency (Hz) | Damping (%) | Complexity (%) | Mode Shape | Frequency (Hz) | Damping (%) | Complexity (%) | Mode Shape |
| 1 | 9.078 | 4.992 | 0.000 | 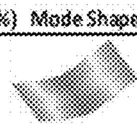 | 7.551 | 5.531 | 0.000 | 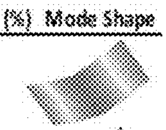 |
| 2 | 31.496 | 5.058 | 0.002 |  | 29.988 | 5.080 | 2.221 |  |
| 3 | 46.011 | 4.988 | 0.013 |  | 45.733 | 5.051 | 1.946 |  |
| 4 | 83.699 | 4.952 | 0.000 |  | 80.738 | 4.995 | 0.021 |  |
| Mode No | Dataset 2H | | | | Dataset 2D | | | |
|---|---|---|---|---|---|---|---|---|
| | Frequency (Hz) | Damping (%) | Complexity (%) | Mode Shape | Frequency (Hz) | Damping (%) | Complexity (%) | Mode Shape |
| 1 | 12.925 | 5.061 | 0.000 | 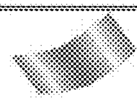 | 11.867 | 4.904 | 0.000 | 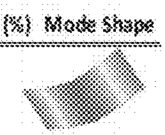 |
| 2 | 41.731 | 5.033 | 0.255 |  | 41.729 | 5.029 | 0.230 |  |
| 3 | 47.806 | 5.093 | 1.849 |  | 47.003 | 5.006 | 0.598 |  |
*FIG. 67*

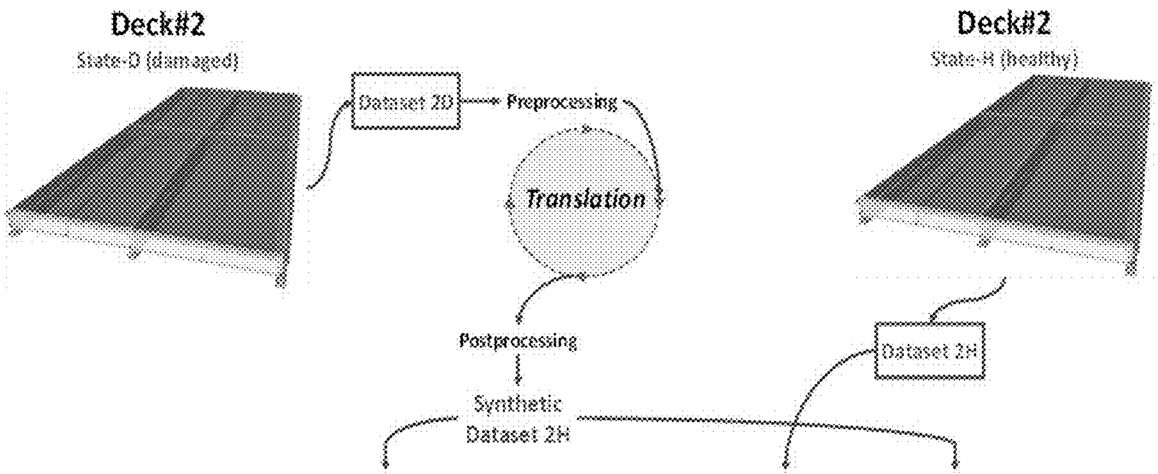
| | Synthetic Dataset 2H | | | | Dataset 2H / Synthetic Dataset 2H | | | |
|---|---|---|---|---|---|---|---|---|
| Mode No | Frequency (Hz) | Damping (%) | Complexity (%) | Mode Shape | Difference in Natural Frequency (%) | Difference in Damping Ratio (%) | Modal Assurance Criterion (MAC) | Average MMSC |
| 1 | 12.950 | 4.882 | 0.095 |  | 0.19 | 3.54 | 1.00 | |
| 2 | 41.688 | 5.019 | 0.114 |  | 0.10 | 0.28 | 0.999 | 0.947 |
| 3 | 47.417 | 6.274 | 0.158 |  | 0.81 | 23.19 | 0.923 | |
*FIG. 72*

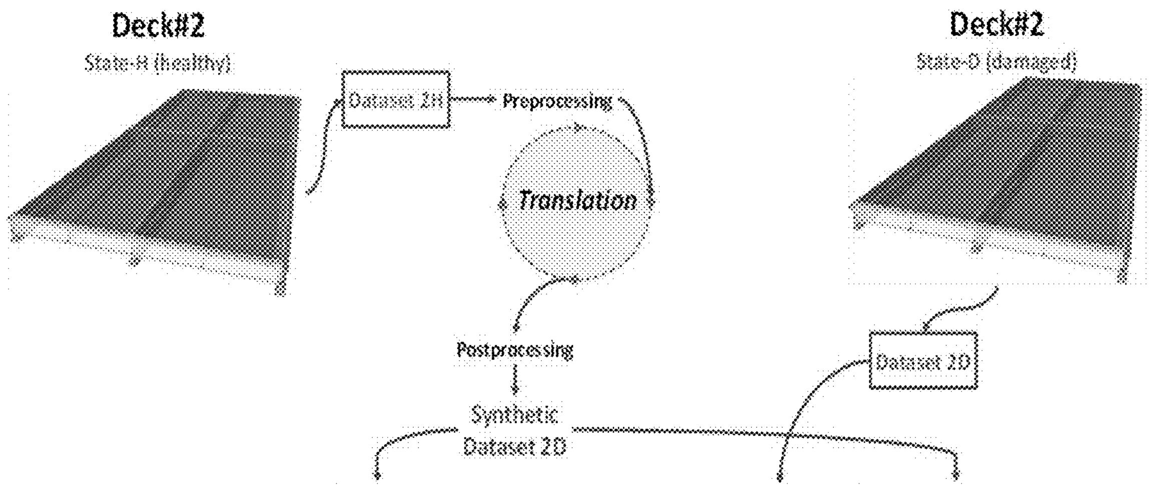
| Synthetic Dataset 2D | | | | | Dataset 2D / Synthetic Dataset 2D | | | |
|---|---|---|---|---|---|---|---|---|
| Mode No | Frequency (Hz) | Damping (%) | Complexity (%) | Mode Shape | Difference in Natural Frequency (%) | Difference in Damping Ratio (%) | Modal Assurance Criterion (MAC) | Average MMSC |
| 1 | 11.831 | 5.114 | 0.001 | 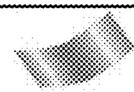 | 0.30 | 4.28 | 1.00 | |
| 2 | 41.759 | 4.996 | 0.221 |  | 0.07 | 0.66 | 0.997 | 0.957 |
| 3 | 46.478 | 5.491 | 9.949 |  | 1.12 | 9.69 | 0.948 | |
*FIG. 73*

GENERATIVE ADVERSARIAL NETWORKS FOR STRUCTURAL DAMAGE DIAGNOSTICS

CROSS-REFERENCE TO RELATED APPLICATIONS

This nonprovisional application claims the benefit of U.S. Provisional Application No. 63/332,050 entitled "GENERATIVE ADVERSARIAL NETWORKS FOR STRUCTURAL DAMAGE DIAGNOSTICS" filed Apr. 18, 2022 by the same inventors, all of which is incorporated herein by reference, in its entirety, for all purposes.

FEDERALLY SPONSORED RESEARCH OR DEVELOPMENT

This invention was made with Government support under Award No. 80NSSC20K0326 awarded by National Aeronautics and Space Administration (NASA) and under Grant No. 1463493 awarded by U.S. National Science Foundation (NSF) Division of Civil, Mechanical and Manufacturing Innovation. The government has certain rights in the invention.

BACKGROUND OF THE INVENTION

1. Field of the Invention

This invention relates, generally, to damage diagnostics for condition assessment of civil structures. More specifically, it relates to a system and method for automatically diagnosing a condition of at least one structure during the life cycle of the at least one structure, utilizing at least one GAN architecture and/or at least one DL-based SDD architecture.

2. Brief Description of the Prior Art

Man-made or environmental stressors tend to decrease the remaining useful lives of civil structures. As the aging infrastructures are getting more vulnerable against such impacts, more comprehensive assessment and effective health management plans are needed to improve the life cycle of structures.

The typical workflow to monitor and assess an existing civil structure (e.g., Structural Health Monitoring (hereinafter "SHM") and Structural Damage Diagnostics (hereinafter "SDD")) starts with collecting sensorial data with at least one sensor. The at least one sensor may comprise but is not limited to accelerometers, strain gauges, potentiometers, fiber optic sensor or load cells. As a following step, the date is pre-processed and analyzed to perform damage identification based on the changes in the structural parameters (e.g., stiffness, mass, damping, etc.) or in the raw data to identify structural defects (e.g., crack, delamination, corrosion, bolt-loosing, spalling, etc.).

With the emergence of artificial intelligence (hereinafter "AI"), the SHM and SDD fields have experienced substantial advancements the last few decades. The use of AI, such as machine learning (hereinafter "ML") and deep learning (hereinafter "DL") with SHM and SDD (e.g., 1-D Deep Convolutional Neural Networks—1-D (hereinafter "DCNN")), have enabled the rapid and increased accuracy in damage diagnostics for civil structures. Through the use of DL methods, vibration-based condition assessments have seen significant improvement in not only current damage diagnostics, but also in the future condition models of civil structures.

The main objective of SHM of civil structures is to diagnose (i.e., identify) the damage(s) in the collected data from the civil structure, and then further analyze and evaluate it to assist in decision-making about the structure's load-carrying capacity whether it is sufficient. The current state-of-the-art method for SDD is using 1-D Convolutional Neural Networks (hereinafter "CNN"), a type of DL model in AI to discern the undamaged and damaged features directly in the collected raw vibration data. Yet, supervised AI algorithms such as the DL models require a substantial amount of data for model training to obtain superior performance in the prediction process. While these models heavily rely on the amount of data from civil structures, it is widely known in the SHM field that data collection is a difficult and expensive task such as obtaining permission from authorities to install costly and laborious SHM systems and requesting traffic closures. Also, obtaining valuable data (data that contains damaged features) is another challenge. Furthermore, considering that only the large-sized civil structures have permanent SHM systems in the world, it is difficult to know about the condition of the remaining structures. Because of this data scarcity problem, DL models suffer from class imbalance during the training such as having more damaged than undamaged class datasets. This is detrimental to the performance of DL models in SDD applications. Additionally, although the DL-based SDD is considered a state-of-the-art method in the literature, applications of them are limited to experimentation on laboratory structures which must be validated in actual civil structures before being employed in practice. Therefore, there is a need to tackle the data scarcity problem for SDD applications to enable more employment of AI algorithms as well as experiments via employing them on the actual civil structures.

Generally, the methodologies in SDD applications are built on either physics-based (numerical models e.g., FE models) or data-driven approaches. Due to the size and complexity of actual civil structures, it is very difficult to build computer-based numerical models. Therefore, data-driven methods are more favored in practice which are based on the collected operational data from the civil structures. However, the AI-based data-driven methods require a substantial amount of data to train AI models which is a challenge to obtain from civil structures. The current AI models that are used for SDD applications are kind of a 'black-box' where a decision boundary is defined in the data domain by discriminating the labelled samples (supervised); then performing its training knowledge on the unseen data to predict the likelihood of damage percentage. It is ambiguous what the model actually learns and knows after the training of the model. Instead of determining a decision boundary, generative models can learn how the data domain is shaped and then accordingly, demonstrate their knowledge by generating the learned data domain. This could be very beneficial for the SDD applications. For instance, a dynamic response generation for different possible states (or conditions) in which the structures could experience throughout their life cycle would improve the implementation of structural dynamic analysis extensively for more effective management of the life cycle of existing civil structures. Currently, being able to observe and analyze the possible dynamic responses of existing structures that represents different states in their life cycle has not been possible in literature.

Accordingly, what is needed is a safe, effective, and efficient a system and method for automatically diagnosing a condition of at least one structure during the life cycle of the at least one structure, utilizing at least one GAN architecture and/or at least one DL-based SDD architecture. However, in view of the art considered as a whole at the time the present invention was made, it was not obvious to those of ordinary skill in the field of this invention how the shortcomings of the prior art could be overcome.

SUMMARY OF THE INVENTION

The long-standing but heretofore unfulfilled need, stated above, is now met by a novel and non-obvious invention disclosed and claimed herein. In an aspect, the present disclosure pertains to an aspect of the present disclosure pertains to a method for automatically diagnosing a condition of at least one structure. In an embodiment, the method may comprise the steps of: (a) receiving, via at least one sensor communicatively coupled to a computing device, at least one actual sensor response from at least one structure, such that the at least one sensor may be in mechanical communication with the at least one structure, such that the at least one actual sensor response may comprise at least one actual damaged scenario and/or at least one actual undamaged scenario; (b) augmenting, via at least one GAN architecture of the processor, the at least one actual sensor response with at least one synthetic sensor response, such that the at least one synthetic sensory response may comprise at least one synthetic damaged scenario and/or at least one synthetic undamaged scenario, such that the at least one actual sensor response and/or at least one synthetic sensor response may be compiled into at least one augmented sensorial dataset; (c) training, via at least one DL-based SDD architecture of the processor, at least one prediction dataset based on the at least one augmented sensorial dataset; (d) comparing, via the processor of the computing device, the at least one trained prediction dataset with at least one unseen sensor response from the at least one structure; and (e) automatically predicting, via the processor of the computing device, the condition of the at least one structure on a display device associated with the computing device by: (i) based on determination that the at least one unseen sensor response from the at least one sensor matches the at least one actual damaged scenario, at least one synthetic damaged scenario, or both of the at least one trained prediction dataset, transmitting a notification indicative of a damaged condition; and (ii) based on determination that the at least one unseen sensor response from the at least one sensor does not match the at least one actual undamaged scenario, at least one synthetic undamaged scenario, or both of the at least one trained prediction dataset, transmitting a notification indicative of an undamaged condition.

In some embodiments, the at least one GAN architecture of the processor may comprise a WDCGAN-GP architecture and/or a CycleWDCGAN-GP architecture. As such, the at least one GAN architecture may be configured to output at least one datapoint within the at least one augmented sensorial dataset in one-dimension (hereinafter "1D"). Additionally, in these other embodiments, the at least one GAN architecture may further comprise an algorithm including but not limited to a GLU, at least one skip-connection, and/or a Mish activation function.

In some embodiments, the at least one DL-based SDD architecture may also comprise at least one DCNN architecture. In this manner, the at least one DL-based SDD architecture may be configured to output at least one datapoint within the at least one trained prediction dataset in 1D.

In some embodiments, the processor of the computing device may further comprise a DGCG architecture. As such, the method may further comprise the step of, after training the at least one prediction dataset, learning, via the DGCG architecture of the processor, at least one domain-invariant representation of at least one domain of the at least one structure, such that the at least one domain may comprise the at least one scenario of the at least one actual sensor response and/or at least one synthetic response of the at least one structure, such that the at least one scenario may comprise at least one actual and/or synthetic damaged scenario and/or at least one actual and/or synthetic undamaged scenario. In addition, in these other embodiments, the method may also comprise the step of, after learning the domain-invariant representation, applying, via the processor of the computing device, the domain-invariant representation to at least one alternative structure. As such, the method may further comprise the step of, after applying the domain-invariant representation to at least one alternative structure, automatically predicting, via the processor, a condition of the at least one alternative structure on a display device associated with the computing device by: (A) based on determination that at least one alternative domain source of the alternative structure matches the at least one domain source comprising at least one damaged scenario of the at least one structure, transmitting a notification indicative of a damaged condition; and (B) based on determination that at least one alternative domain source of the alternative structure does not match the at least one domain source comprising at least one damaged scenario of the at least one structure, transmitting a notification indicative of an undamaged condition.

Moreover, another aspect of the present disclosure pertains to a structure diagnosis optimization system for automatically predicting a condition of at least one structure. In an embodiment, the structure diagnosis optimization system may comprise: (a) a computing device having a processor; and (b) a non-transitory computer-readable medium operably coupled to the processor, the computer-readable medium having computer-readable instructions stored thereon that, when executed by the processor, cause the structure diagnosis optimization system to automatically predict the condition of the at least one civil structure by executing instructions comprising: (i) receiving, via at least one sensor communicatively coupled to a computing device, at least one actual sensor response from at least one structure, such that the at least one sensor may be in mechanical communication with the at least one structure, such that the at least one actual sensor response may comprise at least one actual damaged scenario and/or at least one actual undamaged scenario; (ii) augmenting, via at least one GAN architecture of the processor, the at least one actual sensor response with at least one synthetic sensor response, such that the at least one synthetic sensory response may comprise at least one synthetic damaged scenario and/or at least one synthetic undamaged scenario, such that the at least one actual sensor response and/or at least one synthetic sensor response may be compiled into at least one augmented sensorial dataset; (iii) training, via at least one DL-based SDD architecture of the processor, at least one prediction dataset based on the at least one augmented sensorial dataset; (iv) comparing, via the processor of the computing device, the at least one trained prediction dataset with at least one unseen sensor response from the at least one structure; and (v) automatically predicting, via the processor of the computing device, the condition of the at least one structure on a display device associated with the computing device by: (A) based on determination that the at least one unseen sensor response from the at least one sensor matches the at least one actual damaged scenario, at least one synthetic damaged scenario, or both of the at least one trained prediction dataset, transmitting a notification indicative of a damaged condition; and (B) based on determination that the at least one unseen sensor response from the at least one sensor does not match the at least one actual undamaged scenario, at least one synthetic undamaged scenario, or both of the at least one trained prediction dataset, transmitting a notification indicative of an undamaged condition.

In some embodiments, the at least one GAN architecture of the processor may comprise a WDCGAN-GP architecture and/or a CycleWDCGAN-GP architecture. As such, the at least one GAN architecture may be configured to output at least one datapoint within the at least one augmented sensorial dataset in 1D. Additionally, in these other embodiments, the at least one DL-based SDD architecture comprises at least one DCNN architecture. In some embodiments, the at least one DL-based SDD architecture is configured to output at least one datapoint within the at least one trained prediction dataset in 1D.

In some embodiments, the processor of the computing device further comprises a DGCG architecture. As such, the executed instructions may further comprise the step of, after training the at least one prediction dataset, learning, via the DGCG architecture of the processor, at least one domain-invariant representation of at least one domain of the at least one structure, such that the at least one domain may comprise the at least one scenario of the at least one actual sensor response and/or at least one synthetic response of the at least one structure, such that the at least one scenario may comprise at least one actual and/or synthetic damaged scenario and/or at least one actual and/or synthetic undamaged scenario. In addition, in these other embodiments, the executed instructions may also comprise the step of, after learning the domain-invariant representation, applying, via the processor of the computing device, the domain-invariant representation to at least one alternative structure. As such, the executed instructions may further comprise the step of, after applying the domain-invariant representation to at least one alternative structure, automatically predicting, via the processor, a condition of the at least one alternative structure on a display device associated with the computing device by: (I) based on determination that at least one alternative domain source of the alternative structure matches the at least one domain source comprising at least one damaged scenario of the at least one structure, transmitting a notification indicative of a damaged condition; and (II) based on determination that at least one alternative domain source of the alternative structure does not match the at least one domain source comprising at least one damaged scenario of the at least one structure, transmitting a notification indicative of an undamaged condition.

Furthermore, an additional aspect of the present disclosure pertains to a method for automatically diagnosing a condition of at least one alternative structure. In an embodiment, the method may comprise the steps of: (a) receiving, via at least one sensor communicatively coupled to a computing device, at least one actual sensor response from at least one structure, such that the at least one sensor may be in mechanical communication with the at least one structure, such that the at least one actual sensor response may comprise at least one actual damaged scenario and/or at least one actual undamaged scenario; (b) augmenting, via at least one GAN architecture of the processor, the at least one actual sensor response with at least one synthetic sensor response, such that the at least one synthetic sensory response may comprise at least one synthetic damaged scenario and/or at least one synthetic undamaged scenario, such that the at least one actual sensor response and/or at least one synthetic sensor response may be compiled into at least one augmented sensorial dataset; (c) training, via at least one DL-based SDD architecture of the processor, at least one prediction dataset based on the at least one augmented sensorial dataset; (d) learning, via the DGCG architecture of the processor, at least one domain-invariant representation of at least one domain of the at least one structure, wherein the at least one domain comprises the at least one scenario of the at least one actual sensor response, at least one synthetic response, or both of the at least one structure, whereby the at least one scenario comprises at least one actual, synthetic, or both damaged scenario, at least one actual, synthetic, or both undamaged scenario, or both; (e) applying, via the processor of the computing device, the domain-invariant representation to the at least one alternative structure; and (f) automatically predicting, via the processor, a condition of the at least one alternative structure on a display device associated with the computing device by: (i) based on determination that at least one alternative domain source of the alternative structure matches the at least one domain source comprising at least one damaged scenario of the at least one structure, transmitting a notification indicative of a damaged condition; and (ii) based on determination that at least one alternative domain source of the alternative structure does not match the at least one domain source comprising at least one damaged scenario of the at least one structure, transmitting a notification indicative of an undamaged condition.

Additional aspects and advantages of the present disclosure will become readily apparent to those skilled in this art from the following detailed description, wherein only illustrative embodiments of the present disclosure are shown and described. As will be actualized, the present disclosure is capable of other and different embodiments, and its several details are capable of modifications in various obvious respects, all without departing from the disclosure. Accordingly, the drawings and description are to be regarded as illustrative in nature, and not restrictive.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 46 is a structural drawing and member of a footbridge modelled as Bridge #1, according to an embodiment of the present disclosure.

As shown in FIG. 48, the sensorial data (e.g., acceleration response signals) may be extracted from each virtual sensor channel (denoted as "C"), and then the dataset of acceleration response signals for each bridge state may be formed.

FIG. 49 is a model analysis of FIG. 48 comprising a Gaussian excitation signal applied to the bridge models for a Time History Analysis (hereinafter "THA"), in addition to natural frequency values after the modal analysis of the bridges and their stiffness/flexibility, according to an embodiment of the present disclosure.

FIG. 57 is an exemplary model comprising MMSC values of the signal pairs from each sensor channel of actual and translated states of Bridge #2, according to an embodiment of the present disclosure.

FIG. 58 is an exemplary model comprising MMSC values of the signal pairs from each sensor channel of actual and translated states of Bridge #3, according to an embodiment of the present disclosure.

FIG. 59 is an exemplary model comprising MMSC values of the signal pairs from each sensor channel of actual and translated states of Bridge #4, according to an embodiment of the present disclosure.

FIG. 61 is a plot illustrating a comparison of mode shapes and natural frequencies between each actual and translated states of Bridge #2, according to an embodiment of the present disclosure.

FIG. 67 is an exemplary diagram illustrating model parameters of modal parameters of State-H and State-D of Deck #1 and Deck #2, according to an embodiment of the present disclosure.

FIG. 72 is an exemplary diagram illustrating modal parameters of Synthetic Dataset 2H and comparing them with the modal parameters of Dataset 2H, according to an embodiment of the present disclosure.

FIG. 73 is an exemplary diagram illustrating modal parameters of Synthetic Dataset 2D and comparing them with the modal parameters of Dataset 2D, according to an embodiment of the present disclosure.

DETAILED DESCRIPTION OF THE INVENTION

Figure 1:
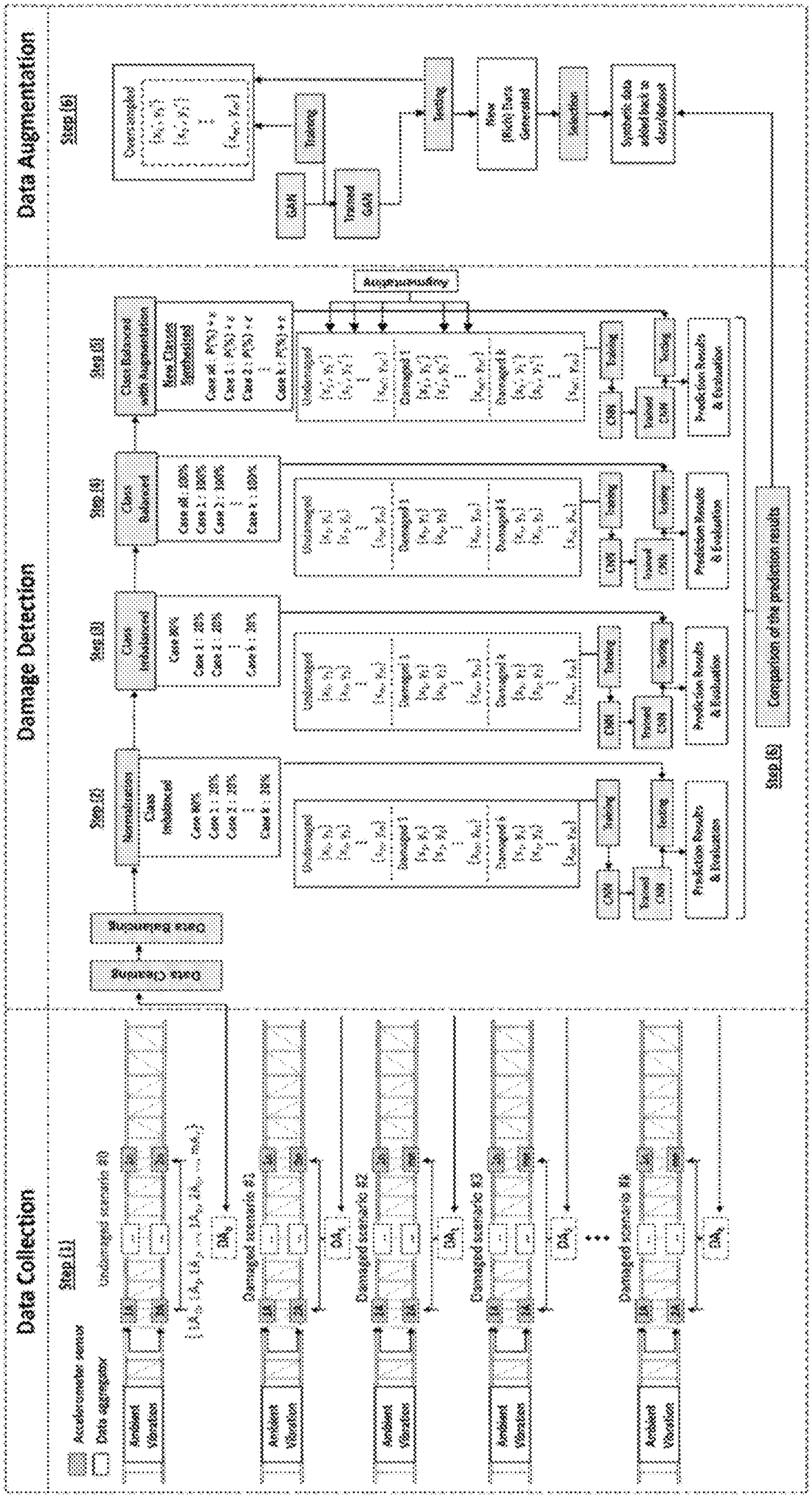
FIG. 1 is a detailed workflow of data collection, damage detection, and data augmentation using Deep Learning, according to an embodiment of the present disclosure.

In the following detailed description of the preferred embodiments, reference is made to the accompanying drawings, which form a part thereof, and within which are shown by way of illustration specific embodiments by which the invention may be practiced. It is to be understood that one skilled in the art will recognize that other embodiments may be utilized, and it will be apparent to one skilled in the art that structural changes may be made without departing from the scope of the invention. Elements/components shown in diagrams are illustrative of exemplary embodiments of the disclosure and are meant to avoid obscuring the disclosure. Any headings, used herein, are for organizational purposes only and shall not be used to limit the scope of the description or the claims. Furthermore, the use of certain terms in various places in the specification, described herein, are for illustration and should not be construed as limiting.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. The appearances of the phrases "in one embodiment," "in an embodiment," "in embodiments," "in alternative embodiments," "in an alternative embodiment," or "in some embodiments" in various places in the specification are not necessarily all referring to the same embodiment or embodiments. The terms "include," "including," "comprise," and "comprising" shall be understood to be open terms and any lists that follow are examples and not meant to be limited to the listed items.

Definitions

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program PIN embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program PIN embodied on a computer readable medium may be transmitted using any appropriate medium, including but not limited to wireless, wire-line, optical fiber cable, radio frequency, etc., or any suitable combination of the foregoing. Computer program PIN for carrying out operations for aspects of the present invention may be written in any combination of one or more programming languages, including an object oriented programming language such as Java, C #, C++, Python, MATLAB, or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computing device, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As used herein, "application" refers to any software program known in the art, such as a software package of instructions to perform one or more functions on an electronic device, such as a computing device, a mobile device, a web browser, a database, or similar software program.

As used herein, the term "scenario" refers to any impact known in the art which may affect the structural health of a civil structure. The scenario may be a hurricane, an earthquake, a detonation, rust, at least one bolt loosening, erosion, and/or an undamaged status, and/or neutral (i.e., healthy) status. For ease of reference, the exemplary embodiment described herein refers to a bolt loosening and/or an undamaged status but this description should not be interpreted as exclusionary of other impacts.

As used herein, "about" means approximately or nearly and in the context of a numerical value or range set forth means±15% of the numerical.

All numerical designations, including ranges, are approximations which are varied up or down by increments of 1.0, 0.1, 0.01 or 0.001 as appropriate. It is to be understood, even if it is not always explicitly stated, that all numerical designations are preceded by the term "about". It is also to be understood, even if it is not always explicitly stated, that the compounds and structures described herein are merely exemplary and that equivalents of such are known in the art and can be substituted for the compounds and structures explicitly stated herein.

Wherever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Wherever the term "no more than," "less than," or "less than or equal to" precedes the first numerical value in a series of two or more numerical values, the term "no more than," "less than" or "less than or equal to" applies to each of the numerical values in that series of numerical values. For example, less than or equal to 1, 2, or 3 is equivalent to less than or equal to 1, less than or equal to 2, or less than or equal to 3.

Structural Health Monitoring System

The present invention pertains to a system and method utilizing a novel Wasserstein Deep Convolutional Generative Adversarial Network (hereinafter "GAN") with Gradient Penalty (hereinafter "WDCGAN-GP") and Cycle-Consistent Wasserstein Deep Convolutional Generative Adversarial Networks with Gradient Penalty (hereinafter "CycleWDCGAN-GP") for the application of structural damage diagnostics. As known in the art, GAN's have been considered as enabling for generative performance in multiple application domains. Furthermore, GAN models have been vital in reducing the amount of data required to be collected from civil structures for damage diagnostics without compromising the statistical performance or margin of error of the model. As such, in embodiments, the present invention may comprise a WDCGAN-GP, such that at least one synthetic data sample may be used to support at least one training dataset of at least one machine learning technique (e.g., a Deep-Learning (hereinafter "DL")). In this manner, the DL may increase the accuracy and/or efficiency of the diagnostic model (i.e., architecture).

As stated above, an aspect of the present invention is that the present invention comprises a structural health monitoring system comprising a computing device, having a processor, configured to implement the WDCGAN-GP and/or the CycleWDCGAN-GP. As such, in an embodiment, the structural health monitoring system may be in electrical communication with at least one accelerometer in mechanical communication with at least on civil structure (e.g., a footbridge), such that at least one dataset may be collected, via the processor, from the at least one civil structure via the at least one accelerometer under any structural excitation known in the art (e.g., impulse excitation, harmonic excitation, and/or ambient excitation), such that the at least one dataset may be transmitted and/or recorded to a memory of the computing device. In this manner, in this embodiment, the processor of the structural health monitoring system may be configured to implement at least one mathematical model to the at least one dataset, such that the WDCGAN-GP may generate at least one synthetic dataset (e.g., parametric damaged dataset, nonparametric damaged dataset, parametric undamaged dataset, and/or nonparametric undamaged dataset). In addition, in this embodiment, the computing device may be configured to implement at least one DL, such that the structural health monitoring system may implement the at least one synthetic dataset on at least one scenario that may be encountered during at least one structural health test of the at least one civil structure.

Figure 2:
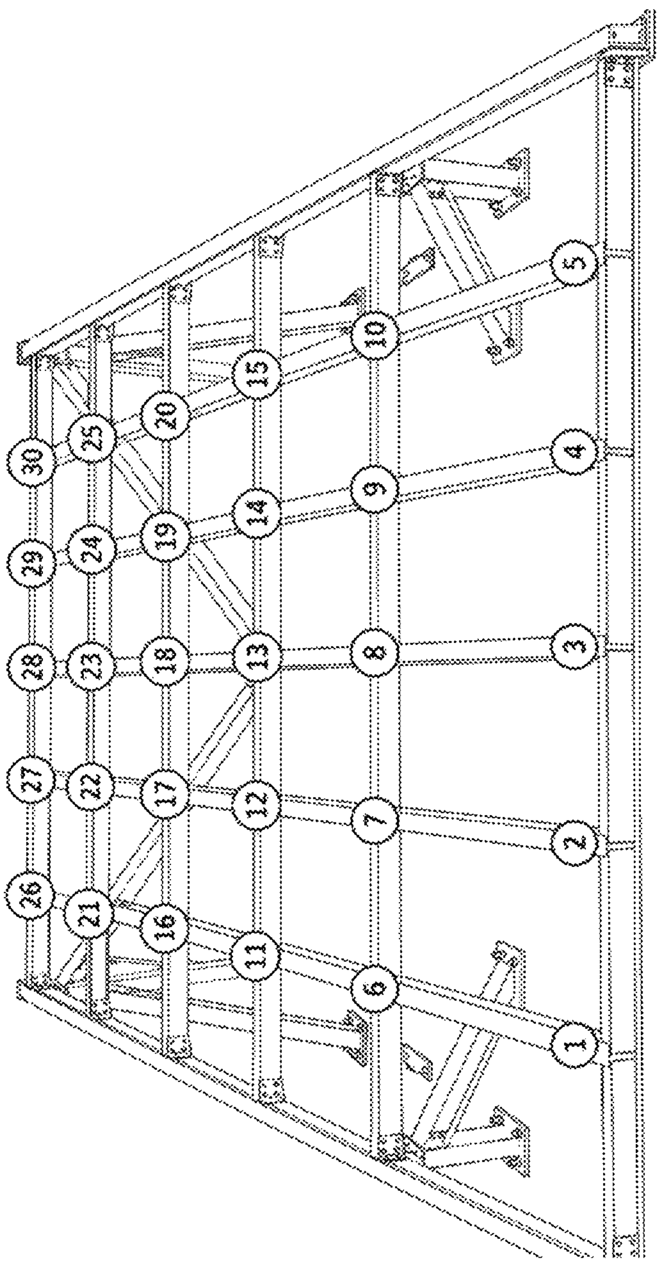
FIG. 2 is a perspective view of a steel frame, according to an embodiment of the present disclosure.

For simplicity, in the following description, WDCGAN-GP and/or DL may be referred to as "$M_1$" and/or "$M_2$", respectively. Additionally, as used within this following description, at least one 1-D vibration array may be identified as "tensors" and/or the notation used in the description may be $n[a_{klf}]_s$ where "k" may represent a condition (e.g., "0") which may refer to data that may be collected in an undamaged and/or damaged scenario. For example, in embodiments, "0" may refer to data that may be collected in an undamaged scenario and/or "1" may be refer to data that may be collected in a damaged scenario, "1" may represent a joint number (e.g., "Joint 1", "Joint 2", "Joint 3", etc.) where the data may be collected, as shown in FIG. 2, and "f" may refer to "fake" if the tensor may be generated by the $M_1$. Furthermore, in these embodiments, "s" may refer to the seconds that the tensor may contain, and "n" may refer to a total number of tensors. Additionally, the "n" may be featured to a specified number (e.g., "1") if there is no number written. Additionally, in these embodiments s may comprise the range of at least 1 second to at most an entire raw signal time document during the SHM data collection. For example, s may comprise at least 1 second to at most 256 seconds. As known in the art, 1 and 256 are commonly used for the s variable where respectively 1 refers to "1-second" (batched from 256 seconds) and 256 refers to "256-seconds" (i.e., the entire raw signal). (Abdeljaber O, Avci O, Kiranyaz M S, Boashash B, Sodano H, Inman D J (2018) 1-*D CNNs for structural damage detection: Verification on a structural health monitoring benchmark data*).

In an embodiment, the computing device may comprise a memory. As such, in this embodiments, the processor of the computing device may be communicatively coupled (e.g., electrical communication and/or wireless communication) with at least one accelerometer in mechanical communication with at least on civil structure (e.g., a footbridge), such that at least one dataset may be collected from the at least one civil structure via the at least one accelerometer under any structural excitation known in the art (e.g., impulse excitation, harmonic excitation, and/or ambient excitation) and may be recorded within the memory of the computing device. Accordingly, as shown in FIG. 1, at Step (1), in these embodiments, at least one damaged scenario and/or at least one undamaged scenario may be used to represent multiple structural scenarios within the at least one dataset. For example, in some embodiments, at least seven (7) different cases may be used, such that the first case (e.g., Scenario #0), may represent an undamaged scenario, and at least one alternative scenario (e.g., Scenario #1-2-3-4-5-6), may represent multiple structurally damaged scenarios.

Next, as shown in FIG. 1, at Step (2), in this embodiment, a processor of the computing device may be configured to transmit and/or integrate the at least one dataset into a DL-based SDD. A 1-D Deep CNN (hereinafter "1-D DCNN") model may be trained with normally balanced undamaged and damaged datasets. Then, the DL model may be tested on the unseen undamaged and damaged datasets. The prediction results may then be evaluated with loss functions, accuracy scores, and error indices.

Further, at Step (3), as shown in FIG. 1, in this embodiment, the 1-D DCNN model may then be trained with varying ratios of imbalanced undamaged and damaged datasets. Next, the DCNN model may be tested on the unseen undamaged and damaged datasets. Finally, the prediction results from the DCNN model may be evaluated with loss functions, accuracy scores, and error indices.

Referring again to FIG. 1, at Step (4), in this embodiment, the 1-D WDCGAN-GP model (i.e., architecture) may be trained for the class that needs to be augmented in amount. Damaged vibration data (i.e., synthetic data) is then generated using the model that learned damage. Next, the model training is evaluated with loss functions. Finally, the generated vibration datasets are evaluated by comparing them to the actual datasets examining their respective time and frequency. Accordingly, the imbalanced datasets are augmented for the needed class with 1-D WDCGAN-GP generated datasets.

$M_1$—Architecture

Figure 6:
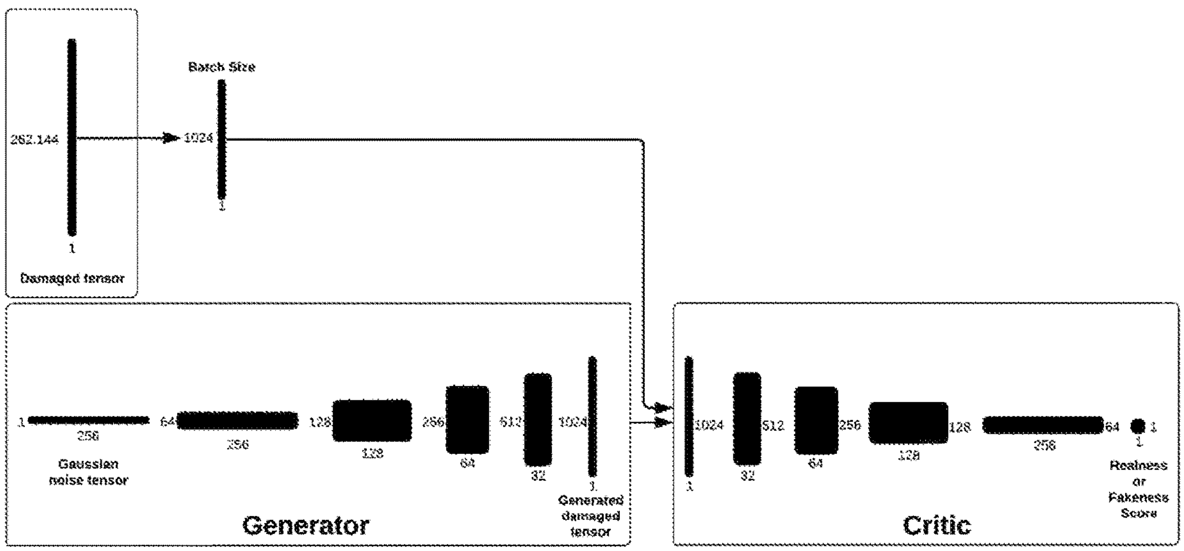
FIG. 6 is a perspective view of an architecture for a 1-D WDCGAN-GP, according to an embodiment of the present disclosure.

In an embodiment, the $M_1$ of the structural health monitoring system may comprise a plurality of layers and/or parameters, such that the processor may be configured to select at least one of the plurality of filter layers and/or parameters in order to optimize the performance and/or efficiency of the $M_1$. As shown in FIG. 6, in this embodiment, the $M_1$ may take the randomly given noise tensor (z) and passes it through the at least one 1-D transpose convolution. For example, in some embodiments, the $M_1$ may comprise at least five 1-D transpose convolutions. In addition, in this example, the $M_1$ may also comprise first layer is filter=64, stride=2, and padding=0, then the remaining layers are filter=4, stride=2, and padding=1. Moreover, in an embodiment, the $M_1$ may implement a batch normalization and/or ReLU after each of the plurality of filter layers and/or parameters. In this manner, after the at least one of the plurality of filter layers and/or parameters is applied to the at least one tensor, the $M_1$ may implement a Tanh activation function and consequently, $[a_{11f}]_b$ is created. Then, $[a_{11}]_b$ and/or $[a_{11f}]_b$ may be passed to a critic (e.g., WGAN critic), such that $[a_{11f}]_b$ and/or $[a_{11f}]_b$ may be scored by the critic as to how accurate or false each passed tensor may be. Furthermore, in some embodiments, the $M_1$ of the structural health monitoring system may also comprise a leaky ReLU and/or a dropout, such that the leak ReLU and/or the dropout may be implanted to the at least one tensor, within at least one of the plurality of filter layers and/or parameters.

$M_1$—Training and Fine-Tuning

As known in the art, the training phase of GANs is the most challenging model to train. Thus, it needs substantial effort during the fine-tuning process. As such, in some embodiments at least one of the plurality of filter layers and/or parameters using dropout, the $M_1$ may comprise at least 70% in the critic, such that overfitting may be avoided and/or the capacity of the critic may be reduced in order to reach the Nash equilibrium. Moreover, in some embodiments a random Gaussian noise may be added that decays over each epoch (e.g., iteration), such that handicap may be given to the critic so that the critic is not to be superior to the generator. Consequently, in these other embodiments, the learning rate may be less than or equal to the generator rate. For example, the learning rate may be $5\times10^{-6}$ while the generator rate may be $2\times10^{-5}$. Additionally, in this example, the critic iterations, lambda parameter for the gradient penalty, and batch size may be 12, 20, and 1024, respectively, while the epoch number may be used as 600. Moreover, in some embodiments, an optimizer may also be used in both the generator and/or critic for the optimization process, such that, as depicted in FIGS. 6A-6D, the generator and/or critic loss functions may converge at a zero axis.

$M_1$—Evaluation and Interpretation

Additionally, in an embodiment, the structural health monitoring system may comprise a Fréchet Inception Distance (hereinafter "FID") score in order to evaluate the GAN of the $M_1$ based on the data provided by the at least one tensor. In this manner, the formula of FID is based on a statistical formulation is provided below:

$$FID(x, g) = \|\mu_x - \mu_g\|_2^2 + Tr\left(C_x + C_g - 2(C_xC_g)^{0.5}\right) \quad (1)$$

Where respectively the $\mu_x$ and $\mu_y$ are the means and $C_x$ and $C_g$ are the covariance matrices of actual and generated signals and Tr is the trace of the matrices e.g., the sum of all the diagonal elements in the matrices. As such, the processor of the structural health monitoring system may then determine an appropriate score for the GAN, such that the lower the FID score, the more similar the at least one data set provided by the tensor and the at least one synthetic dataset created by $M_1$.

Moreover, in an embodiment, the structural health monitoring system may be configured to evaluate the GAN of $M_1$ based on at least three additional metrics with regards to at least one image of the at least one civil structure, Creativity, Inheritance, and Diversity. As known in the art, these aspects are very significant for evaluating the GANs, as they are expected to add creativity and diversity in the outputs as well as to keep the inheritance of the actual input (Guan S, Loew M (2020) *A Novel Measure to Evaluate Generative Adversarial Networks Based on Direct Analysis of Generated Images*).

Additionally, as known in the art, the Inheritance aspect is generally used for images where it shows how the generated images retain the key features of the actual images, such as texture. Therefore, in some embodiments, it is not present. In this manner, as known in the art, the Creativity aspect indicates to what extent the generated outputs are not the exact ones of the actual outputs (or dissimilar to each other) and the Diversity aspect indicates to what extent the generated outputs similar to each other. As such, in an embodiment, the Creativity and Diversity computations may be carried out by using Structural Similarity Index Measure (hereinafter "SSIM") which may be used for image quality assessments by using similarity between the pixels of two images (Wang Z, Bovik A C, Sheikh H R, Simoncelli E P (2004) *Image Quality Assessment: From Error Visibility to Structural Similarity. IEEE Transactions on Image Processing*). Therefore, if the SSIM of two images is 1, they are exactly same, and if the SSIM is 0, then they are entirely different images.

In an embodiment, the $M_1$ of the structural health monitoring system may comprise a threshold value of at least 0.8 to calculate the creativity index. For example, if the SSIM of generated and actual data may be higher than 0.8, they may be concluded as duplicates. In addition, in this embodiment, no threshold may be used for the diversity index, but SSIM may be employed between the generated datasets to compute the index. As such, the structural health monitoring system may determine how creative the outputs are from the inputs based on the calculated SSIM of the generated outputs to actual inputs. Calculating SSIM of the generated outputs to each other in the generated output dataset gives how diverse the outputs from each other in range of 0 between 1. Additionally, in some embodiments, the Creativity and/or Diversity indices may not directly used, but SSIM computation may be carried out to evaluate the extent of creativity and/or diversity of the generated outputs.

As a result, in an embodiment, the structural health monitoring system may determine the creative approach by computing SSIM between the generated and actual tensors. In addition, in this embodiment, the structural health monitoring system may determine the diversity approach by computing SSIM between the generated tensors within the generated dataset from the $M_1$. The SSIM equation is provided below:

$$SSIM(x, g) = \frac{(2\mu_x\mu_g + c_1)(2\sigma_{xg} + c_2)}{\left(\mu_x^2 + \mu_g^2 + c_1\right)\left(\sigma_x^2 + \sigma_g^2 + c_2\right)} \quad (2)$$

In this equation, $\mu_x$ and $\mu_g$ are the means, $\sigma_x$ and $\sigma_g$ are the standard deviations, and $\sigma_{xg}$ is the covariance of actual data (x) and generated data (g). The $c_1$ and $c_2$ are the constants which are multiplication of $k_1$ and L; and $k_2$ and L respectively, to stabilize the division with weak denominator. L is the dynamic range of the signal and $k_1$ and $k_2$ are the constants which are picked as $1\times10^{-2}$ and $3\times10^{-2}$.

As shown in FIGS. 6A-6D, in an embodiment, during the training, the structural health monitoring system may be configured to monitor the critic loss, the generator loss, and/or FID scores, such that the performance of the $M_1$ model may be observed and subsequently optimized, via the processor of the computing device being configured to alter at least one of the plurality of filter layers and/or perimeters of $M_1$.

Figure 7A:
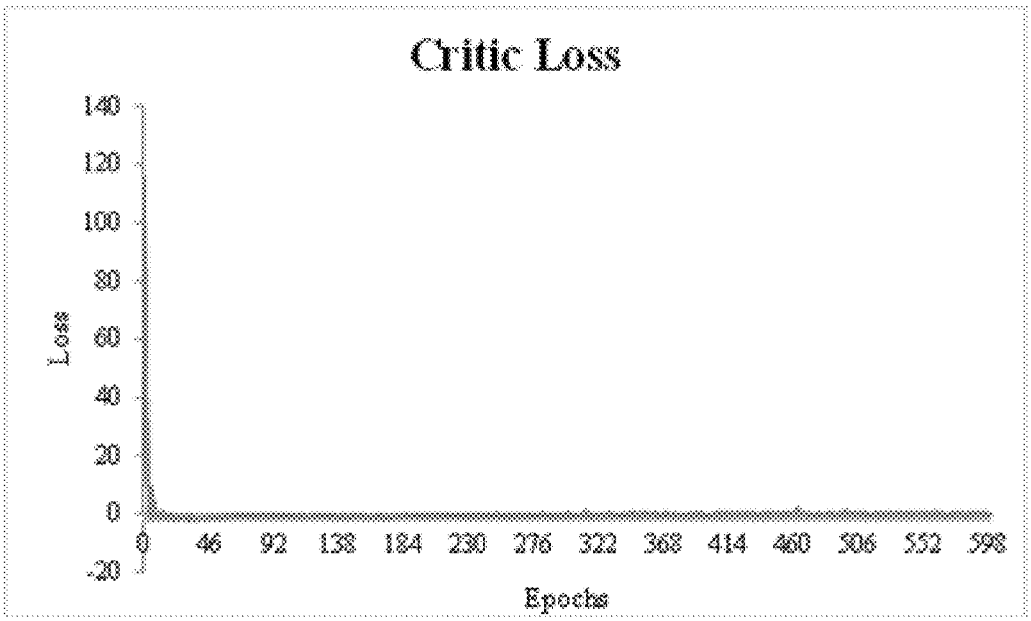
FIG. 7A is a plot illustrating a critical loss for a 1-D WDCGAN-GP, according to an embodiment of the present disclosure.
Figure 7B:
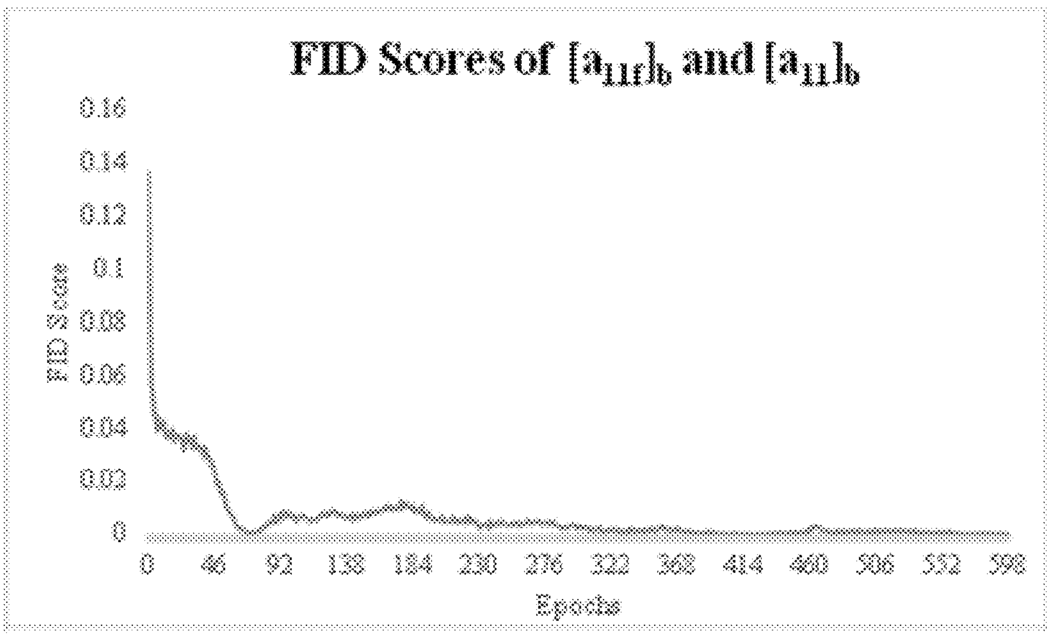
FIG. 7B is a plot illustrating an FID Scores of $[a_{11f}]_1$ and $[a_{11}]_1$ for a 1-D WDCGAN-GP, according to an embodiment of the present disclosure.
Figure 7C:
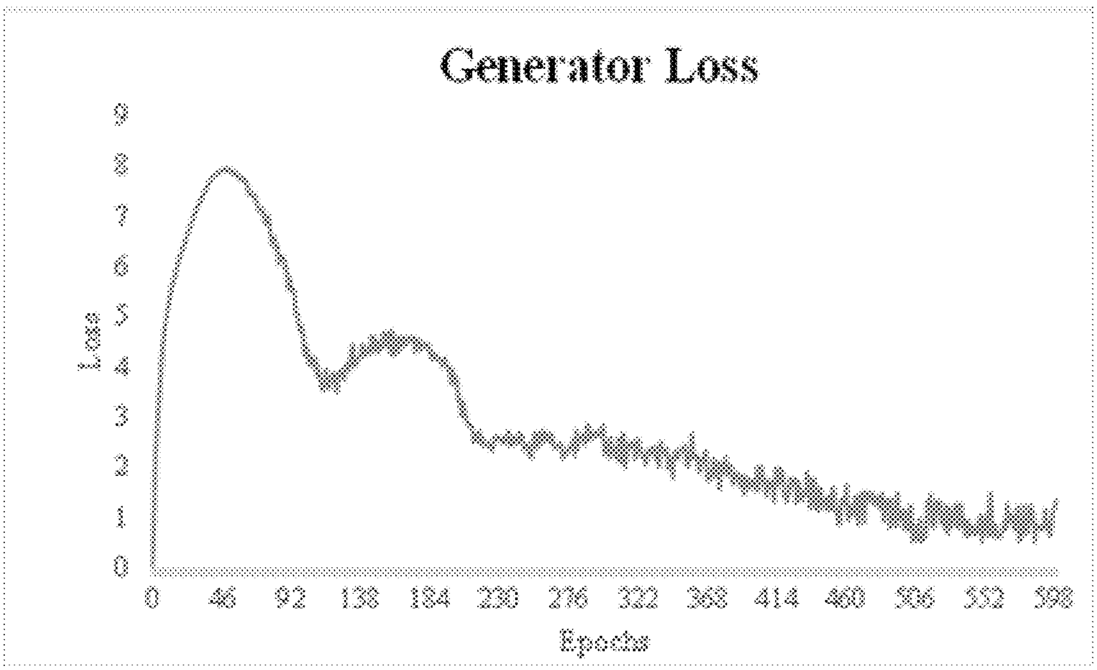
FIG. 7C is a plot illustrating a Generator Loss for a 1-D WDCGAN-GP, according to an embodiment of the present disclosure.
Figure 7D:
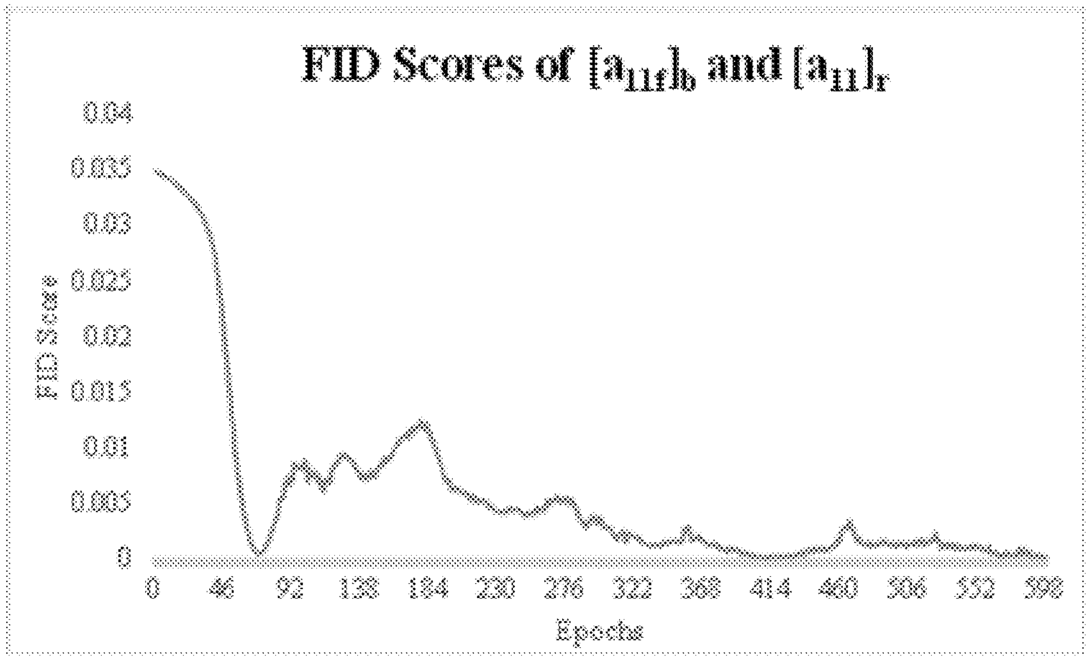
FIG. 7D is a plot illustrating an FID Scores of $[a_{11f}]_{256}$ and $[a_{11}]_{256}$ for a 1-D WDCGAN-GP, according to an embodiment of the present disclosure.
Figure 8:
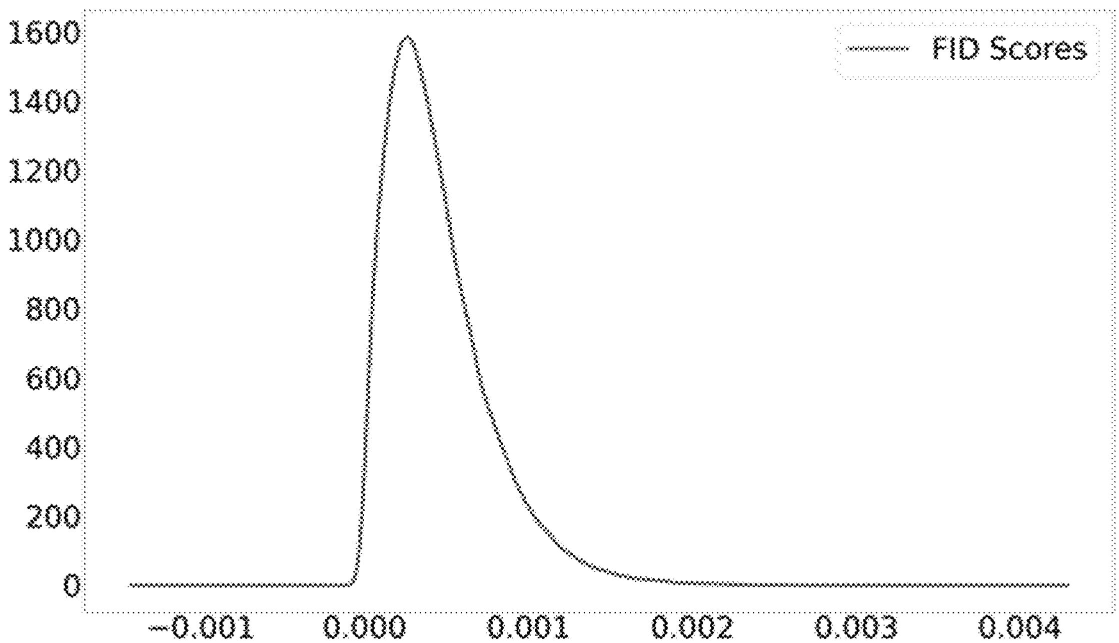
FIG. 8 is a plot illustrating a probability density function of FID scores, according to an embodiment of the present disclosure.

Furthermore, in this embodiment, the structural health monitor system may be configured to monitor the FID scores by computing at least one tensor, such as between $[a_{11f}]_1$ and $[a_{11}]_1$. For example, the calculated FID scores may be computed, such that the FID Scores appear to be converging to zero. As such, as shown in FIG. 7B and FIG. 7D, in this embodiment, the processor may determine that the FID scores are are equalizing based on the ability of at least one FID score to mimic at least one alternative FID score (e.g., mimicking the same pattern). In this manner, in this embodiment, as the epochs increase, the processor may be configured to determine that the at least one FID score more mimics the at least one alternative FID score.

In addition, in some embodiments, the structural health monitoring system may comprise any Batch sampling known in the art (e.g., a Batch sampling in a shuffle mode), such that the processor may be configured to train the at least one synthetic dataset in order to converge the at least one synthetic data set and the at least one dataset faster, preventing bias, and/or preventing learning the order of the at least one dataset. Therefore, in these other embodiments, only the calculations between at least one batch sampled generated (e.g., synthetic dataset) and the at least one actual datasets may be considered. For example, as shown in FIGS. 7A-7D, it is observed that the FID score of $[a_{11f}]_1$ between $[a_{11}]_1$ may be started from 0.136 and decreased to $1.5\times10^{-5}$, which is a reduction of 9060 times. As such, the large reduction, as depicted in FIGS. 7A-7D, provides that the structural health monitoring system may learn the at least one actual dataset thoroughly, such that the structural health monitoring system may optimize and generate at least one synthetic dataset.

In an embodiment, after the $M_1$ is trained, the structural health monitoring system may compute at least on FID score between the actual and generated tensors, (e.g., $[a_{11}]_1$ and $[a_{11f}]_1$). In addition, after the structural health monitoring system calculates the at least one FID score, the processor may plot at least one the Probability Density Function (hereinafter "PDF") based on the calculated FID scores and/or display thee at least one PDF, as shown in FIG. 6, on a display device in electrical communication with the structural health monitoring system. In this manner, by displaying the PDF, the structural health monitoring system may be configured to comprehend and/or analyze the variance of the at least one FID value.

Figure 9:
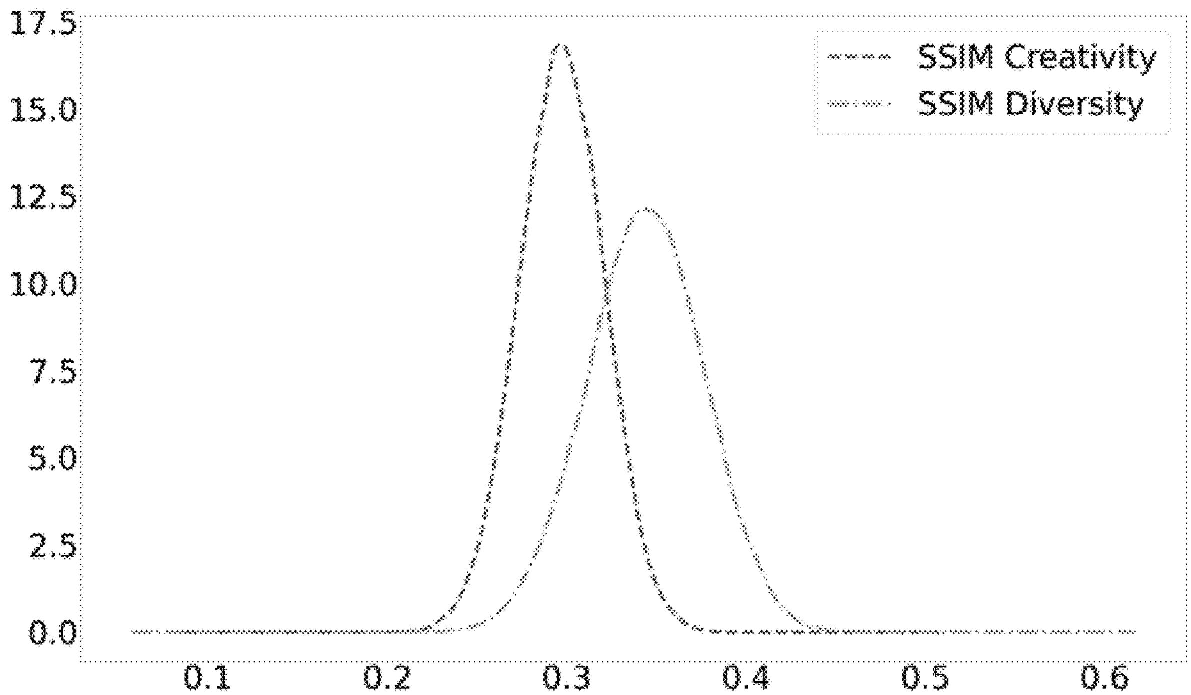
FIG. 9 is a plot illustrating a probability density of creativity and diversity by using SSIM, according to an embodiment of the present disclosure.
Figure 10:
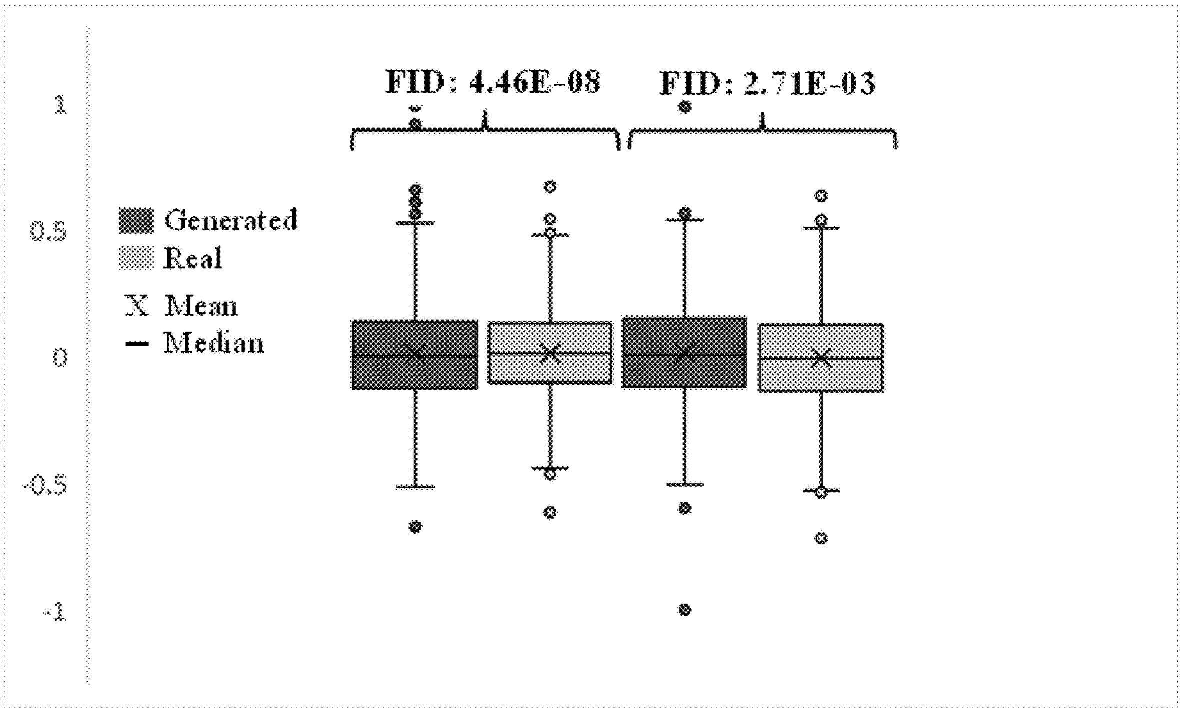
FIG. 10 is a box plot illustrating a tensor with the lowest and highest FID values, according to an embodiment of the present disclosure.
Figure 11A:
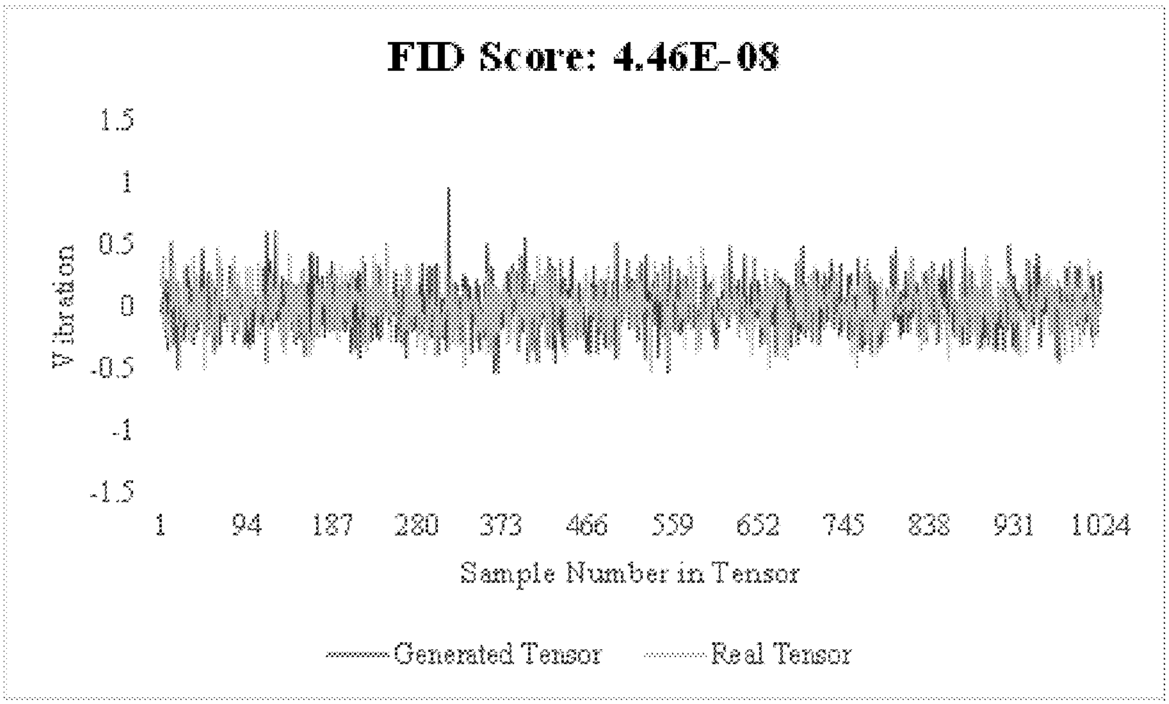
FIG. 11A is a plot illustrating a tensor with an FID Score: 4.46E-08, according to an embodiment of the present disclosure.
Figure 11B:
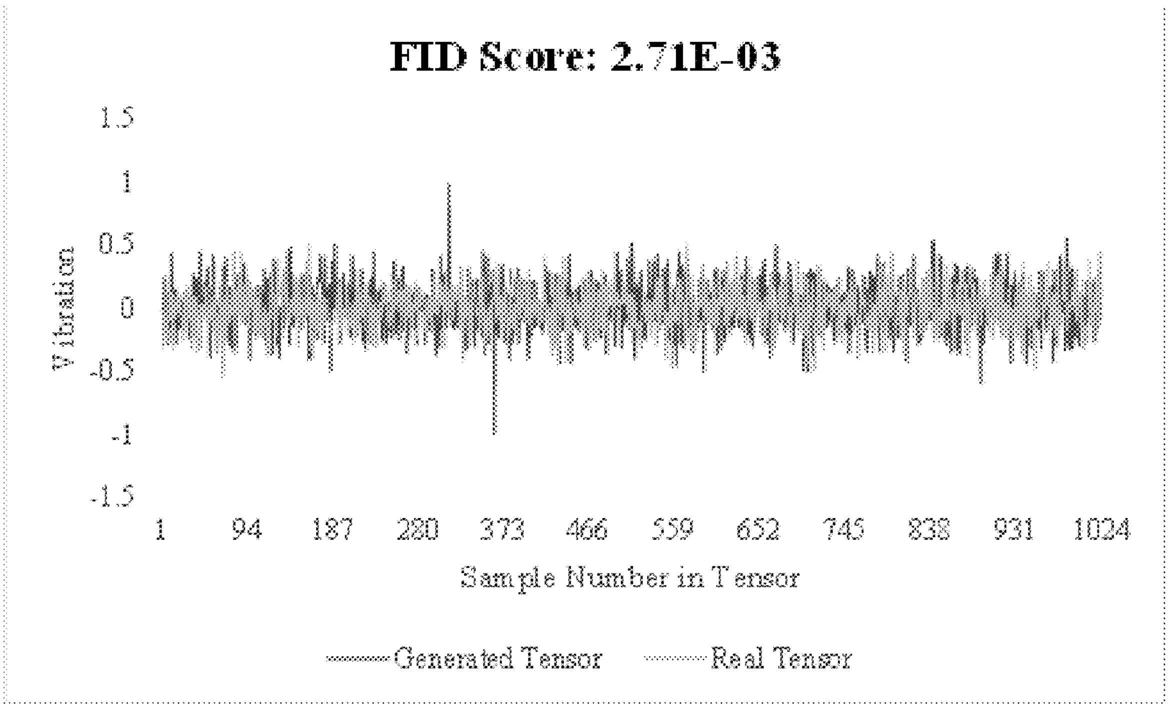
FIG. 11B is a plot illustrating a tensor with an FID Score: 2.71E-03, according to an embodiment of the present disclosure.

Furthermore, in an embodiment, the structural health monitoring system may be configured to calculate the creativity and/or diversity approaches once the at least one FID score is computed and/or the PDF has been plotted. In some embodiments, the structural health monitoring system may be configured to calculate the creativity and/or diversity approaches before the at least one FID score is computed and/or the PDF has been plotted. As such, in an embodiment, as shown in FIG. 9, when the processor of the structural health monitoring system calculates the creativity and/or the diversity results, the processor may then be configured to plot and/or display the PDFs of the creativity and/or diversity results on the display device of the structural health monitoring system. In this embodiment, the $M_1$ may be configured to generate the creative outputs, such that the processor may integrate the creativity measure output in order to determine the overfitting of the model.

In an embodiment, the processor may be configured to determine that at least one portion of the at least one synthetic dataset may not copy and/or mimic at least one portion of the at least one actual dataset based on a diversity value of greater than 0.1. For example, in this embodiment, if the diversity values are dense around the value of 0.36, the processor may determine that at least one generated tensor may not be similar to at least one alternative generated tensor. As such, in this embodiment, based on a value of the creativity and/or diversity aspects of the generated dataset being greater than 0.0, the processor may be configured to determine that the at least one generated tensor and the at least one actual tensors are not exact copies of each other and at least one portion of the generated tensors are not exact copies of each other.

Moreover, in an embodiment, the processor of the structural health monitoring system may comprise a qualitative evaluation, such that the qualitative equation may be implemented on the at least one actual dataset and/or the at least one synthetic dataset of $M_1$. As known in the art, the qualitative evaluation is the most preferred method for image data, 2-D data, yet it has drawbacks for evaluating 1-D data.

Referring again to FIG. 1, in an embodiment, Step (5) may comprise a training a 1-D DCNN model with balanced (augmented with synthetically generated data) undamaged and damaged datasets. The model is tested on the unseen dataset followed by the evaluation of the prediction results with loss functions, accuracy scores, and error indices.

$M_2$—Data Processing

Figure 3:
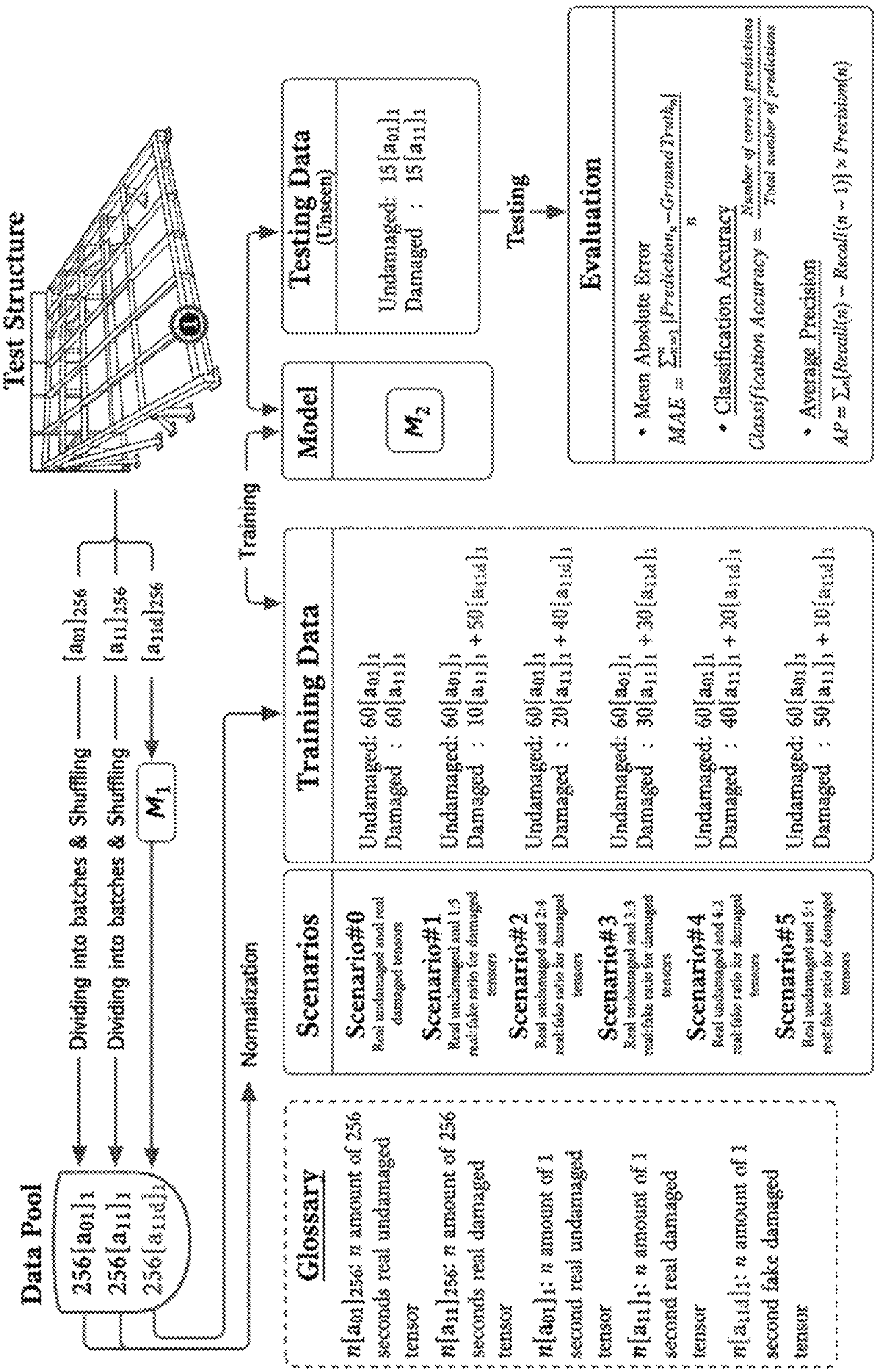
FIG. 3 is an exemplary diagram of determining damage dynamic response for a civil structure, according to an embodiment of the present disclosure.

Before feeding the tensors in the $M_2$ (i.e., at least one DL), in an embodiment, structural health system may be configured to normalize the at least one actual tensor within the range of −1 and to +1. Subsequently, in this embodiment, the at least one generated tensor from $M_1$ and/or the at least one batch sampled tensors may be randomly extracted into the at least one data pool comprising the at least one actual dataset and/or the at least one synthetic dataset. In this manner, as shown in FIG. 3, the processor may be configured to arrange the at least one data pool, such that the at least one data pool may be used for a plurality of scenarios, including but not limited to structural condition testing. As such, in an embodiment, first, the processor of the computing device may be configured to input at least one within the $M_1$ in order to generate the at least one synthetic dataset. Next, the at least one synthetic dataset may then be extracted and/or transmitted to a memory of the computing device within at least one data pool. Subsequently, the at least one tensor may be integrated in $M_2$ as a ratio having a range of at least 1:1 to at most 10:1 for training and testing data for at least one scenario, such as one which includes potential actual-life cases. For example, in an embodiment, the at least one tensor may be integrated into $M_2$ with a ratio of 4:1.

$M_2$—Architecture

The same critic architecture used in $M_1$ is utilized for $M_2$ with the addition of a sigmoid function at the end of the $M_2$ in order to produce a prediction score for each tensor (the critic network in $M_1$ had no activation function at the end of the last layer and only actualness or fakeness scores were processed). Accordingly, the sigmoid function produces prediction scores in rage of 0 to 1 where 0 denotes undamaged and 1 denotes damaged tensor. Moreover, unlike in the critic network of $M_1$, no dropout is used in $M_2$ since it is not considered as necessary for a simple detection process.

$M_2$—Training and Fine Tuning

In an embodiment, the structural health monitoring system may be configured to vary the learning rate, batch size, and/or number of epoch for each scenario under the $M_2$. For example, the learning rate for a scenario may be chosen as $8\times10^{-4}$ and for at least one alternative scenario may be chosen as $3.5\times10^{-3}$. Additionally, in this example, the batch size and number of epoch may be selected by the processor as 30 and 300, respectively.

$M_2$—Evaluation and Interpretation

Regardless of how the model learned the training dataset successfully, the testing phase determines the performance of the model (e.g., testing dataset contains instances that the model did not see before, in other words unseen data instances). Additionally, as known in the art, the success of the model on the unseen data indicates if the model is overfitted to the training data and cannot generalize to other datasets.

In an embodiment, the structural health monitoring system may be configured to implement a regression metric on a classification problem in order to measure the error on faulty predictions within the at least one synthetic dataset as compared to the at least one actual dataset. For example, in some embodiments, in a simple vibration-based damage detection problem in SHM, a prediction score such as 0.77 may be used such that the processor may both interpret the damaged data (e.g., a threshold assumption of 0.5 and converting into label of "1" indicates damage data) and quantify the damage data (e.g., such as loosening a bolt not 100% but about 77%). As such, in this embodiment, the structural health monitoring system may be configured to distinguish between the two (2) potential indications. In this manner, the structural health monitoring system may comprise a Mean Absolute Error ("MAE"), the MAE equation is provided below, as follows:

$$MAE = \frac{\sum_{i=1}^{n} |y_i - x_i|}{n} \tag{3}$$

In the above equation, "n" represents the total number of samples; "i" represents the index of sample, "y" represents the predicted value, and "x" represents the actual value of the sample. Additionally, the MAE metric may also be used for at least one regression and/or classification task in the ML and/or DL. For the classification metrics, in this embodiment, a Classification Accuracy (hereinafter "CA") and/or an Average Precision (hereinafter "AP") score may be utilized. As known in the art, the CA is one of the most used metrics in the ML and/or DL that simply measures the total correct predictions over total predictions. The CA equation is as follows:

$$\text{Classification Accuracy} = \frac{\text{Number of correct predictions}}{\text{Total number of predictions}} \tag{4}$$

In order to use the CA, in an embodiment, the structural health monitoring system may determine a threshold to be assigned in the domain of prediction scores to covert the prediction score into a closest label (e.g., the label may be "0" for undamaged and "1" for damaged). In this embodiment, the processor of the structural health monitoring system may implement a label comprising the range of at least 0.10 to at most 0.90. For example, in some embodiments, a label of 0.50 may be implemented by the structural health monitoring system as the threshold. As such, in these other embodiments, any prediction score made above 0.50 may be converted to 1 and/or any prediction score made below 0.50 may be converted to 0.

Moreover, as known in the art, the AP score is one of the most used metric which gives average precision at all possible thresholds, especially employed for benchmarking different DL models on various datasets. The AP summarizes the precision and recall curve in to a one value which represents the weighted summation of precisions at different threshold. The weight is defined as the increase in recall from each succeeding threshold. The precision is the ratio of true positive over sum of true positive and false positive. This metric implies the frequency of correct predictions at every prediction; thus, it reflects how reliable the model is in predicting the samples as positive. Recall is the ratio of true positive over sum of true positive and false negative which implies the model's ability to classify positive samples and only interests in how the positive samples are classified. The AP equation is as follows:

$$AP = \sum_{n} [\text{Recall}(n) - \text{Recall}(n-1)] \times \text{Precision}(n) \tag{5}$$

As such, as known in the art, the AP is the area under precision-recall curve. For example, in some embodiments, an area of 1.0 means that the classifier is a perfect model and 0.5 means the classifier is a poor model.

Figure 12:
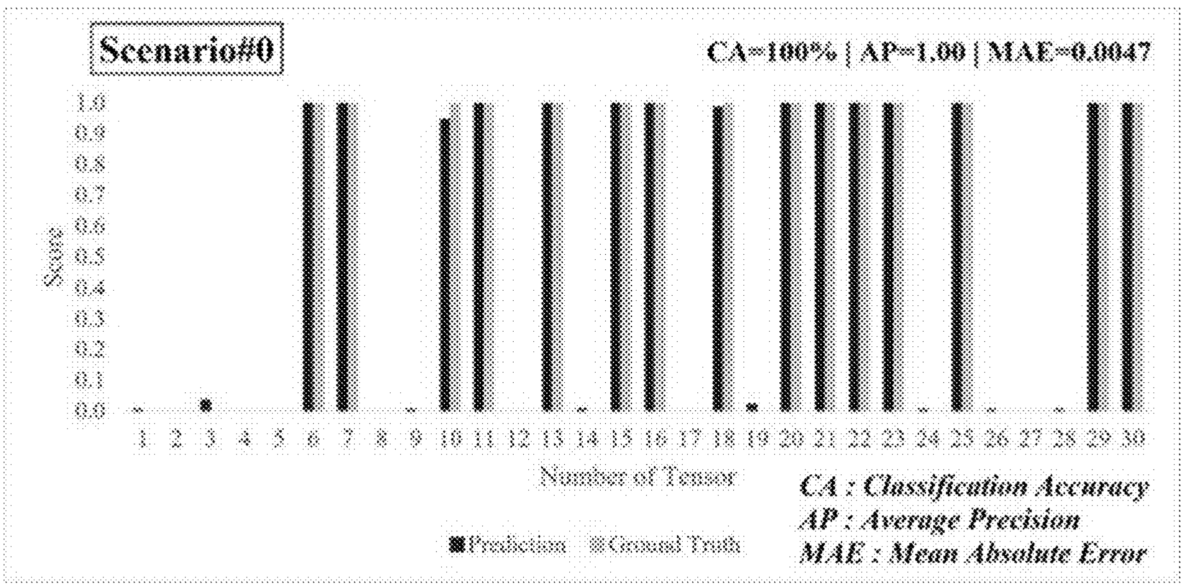
FIG. 12 is a plot illustrating a test result of Scenario #0, according to an embodiment of the present disclosure.
Figure 13:
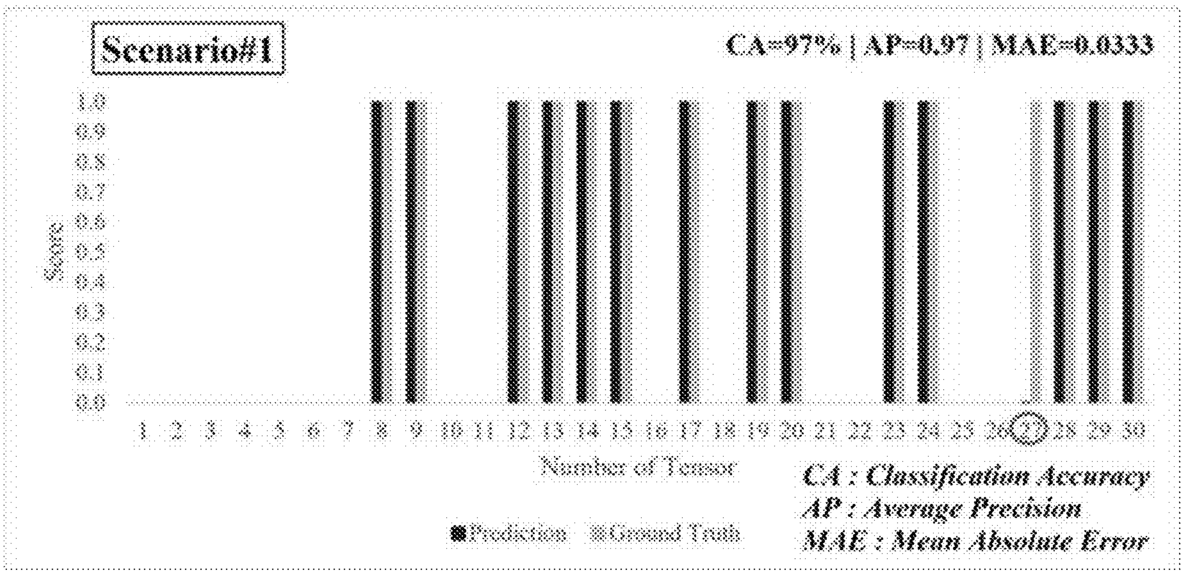
FIG. 13 is a plot illustrating a test result of Scenario #1, according to an embodiment of the present disclosure.
Figure 14:
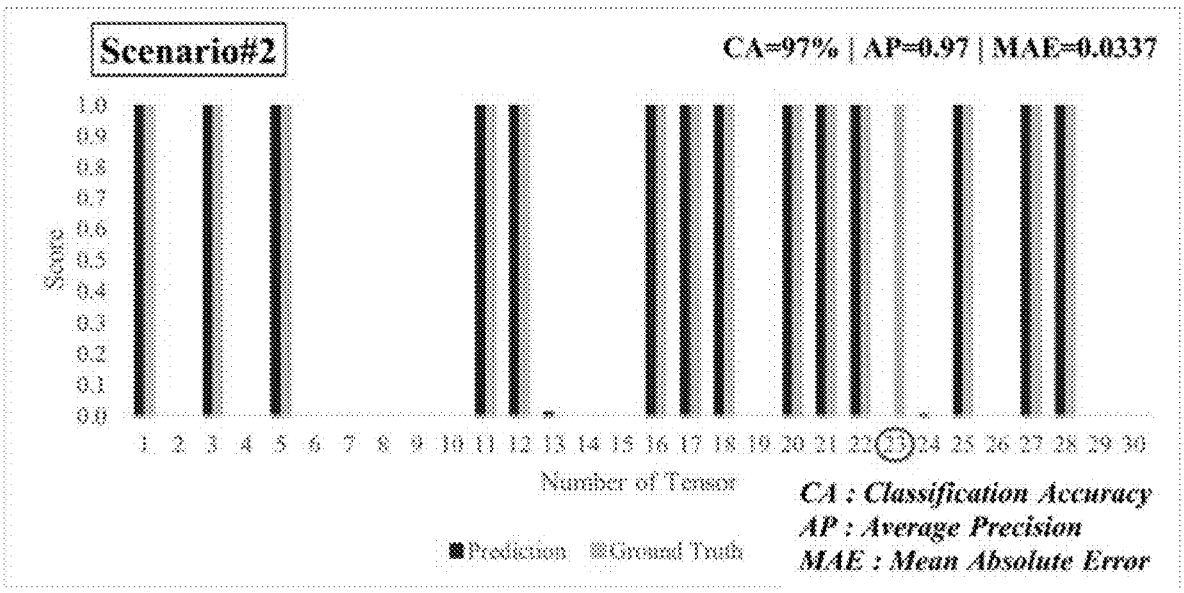
FIG. 14 is a plot illustrating a test result of Scenario #2, according to an embodiment of the present disclosure.
Figure 15:
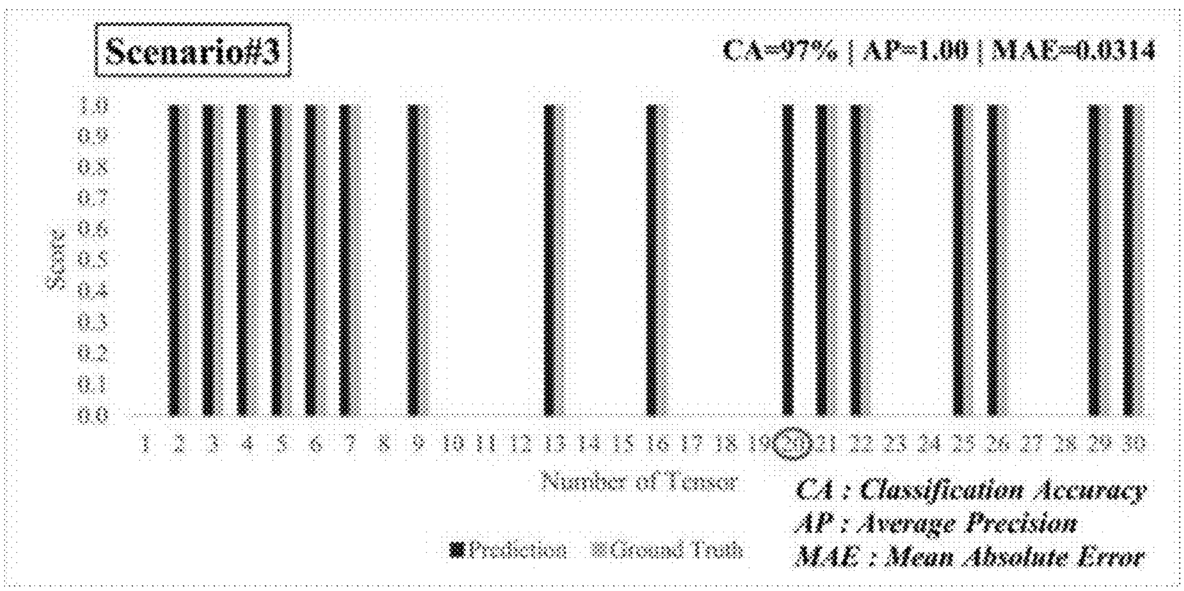
FIG. 15 is a plot illustrating a test result of Scenario #3, according to an embodiment of the present disclosure.
Figure 16:
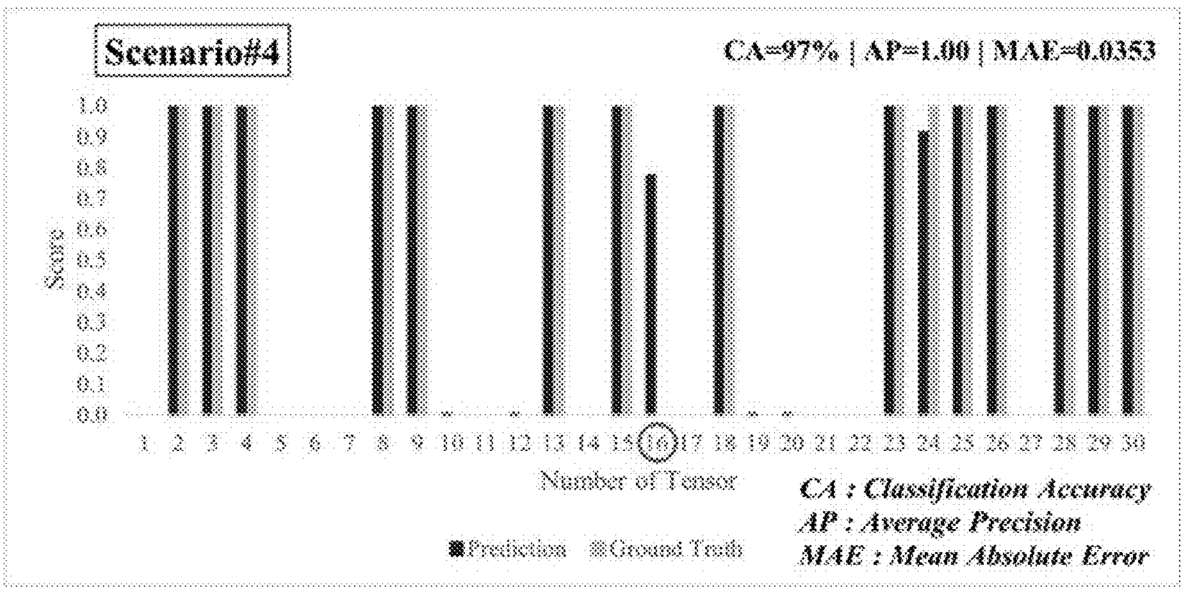
FIG. 16 is a plot illustrating a test result of Scenario #4, according to an embodiment of the present disclosure.
Figure 17:
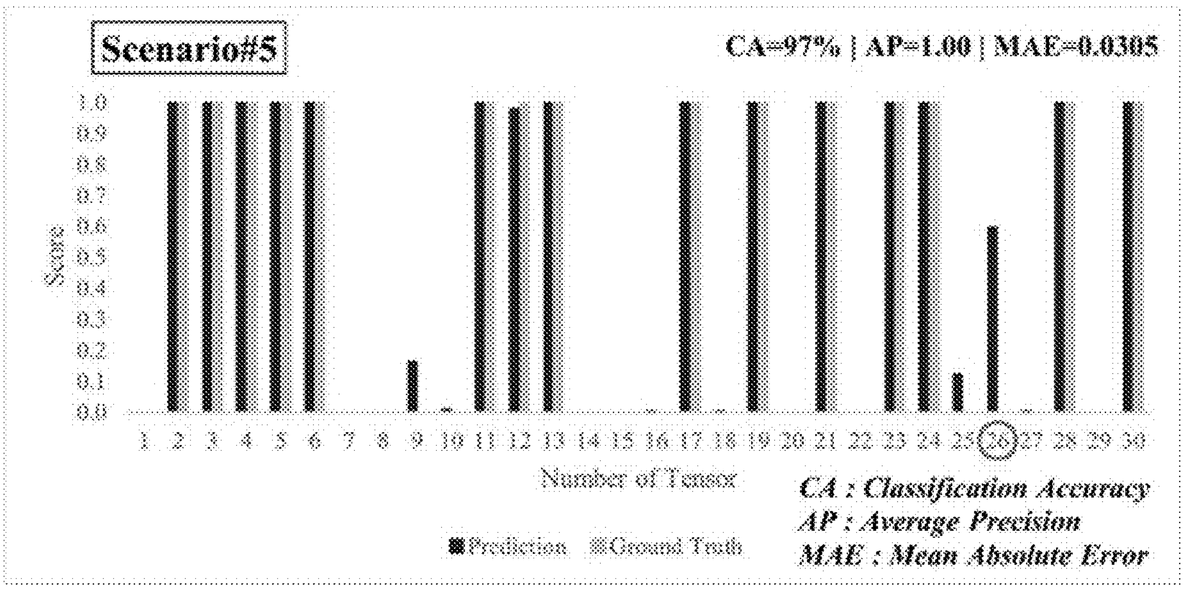
FIG. 17 is a plot illustrating a test result of Scenario #5, according to an embodiment of the present disclosure.

As shown in FIG. 3, in conjunction with FIGS. 12-17, in an embodiment, after $M_2$ makes the predictions on the at least one synthetic (e.g., test) dataset, the processor may plot the results including but not limited to the ground truths and/or prediction scores, as depicted in FIG. 12. Also, in this embodiment, the processor may be configured to compute and/or display the MAE, CA, and/or AP metrics associated with each scenario of the at least one synthetic dataset, as shown in FIGS. 12-17.

Referring again to FIG. 1 at Step (6), in an embodiment, the last step may comprise comparing the prediction results of DL-based SDD of Step (2), Step (3), and Step (5) with the augmented data, such that the prediction results may be interpreted. In some embodiments, the data augmentation may improve the performance of the DL model as higher SDD (in this case damage detection only, level I-SDD) prediction accuracy may be observed in Step (5) than Step (3) and equal to Step (2).

Furthermore, in an embodiment, the processor may be configured to transmit the at least one dataset to at least one CycleWDCGAN-GP model, such that a novel data domain translation may be provided to the at least one user. As such, at least one Cycle-GAN (e.g., CycleWDCGAN-GP) may be utilized to translate the unpaired images from one domain to at least one alternative domain. As such, the same approach may also be taken for vibration datasets. In the following description, the same dataset described above may be utilized.

In this manner, in an embodiment, each of the at least one undamaged dataset and/or damaged dataset (e.g., a 262,144 sample-size at 256 seconds) may be normalized, shuffled, and/or then may be batched into at least one alternative dataset, separately, forming at least one data pool. As a result, each undamaged and/or damaged domain may comprise an unpaired amount of the at least one alternative dataset. As such, the processor of the structural health monitoring system may be configured to transmit the at least one normalized undamaged dataset and/or damages dataset into the memory of the computing device, such that the at least one data pool may be formed. Accordingly, the CycleWDCGAN-GP model may then be employed to learn the mapping of a structural damage (e.g., a bolt-loosening). In this manner, in this embodiment, the model may then be trained with unpaired undamaged and/or damaged domain of the at least one data pool. Furthermore, during the training, the generator and/or critic losses and/or FID scores between actual damaged and synthetic damaged (i.e., translated from actual undamaged domain), and/or between actual undamaged and synthetic undamaged (i.e., translated from damaged domain) are monitored.

Figure 22:
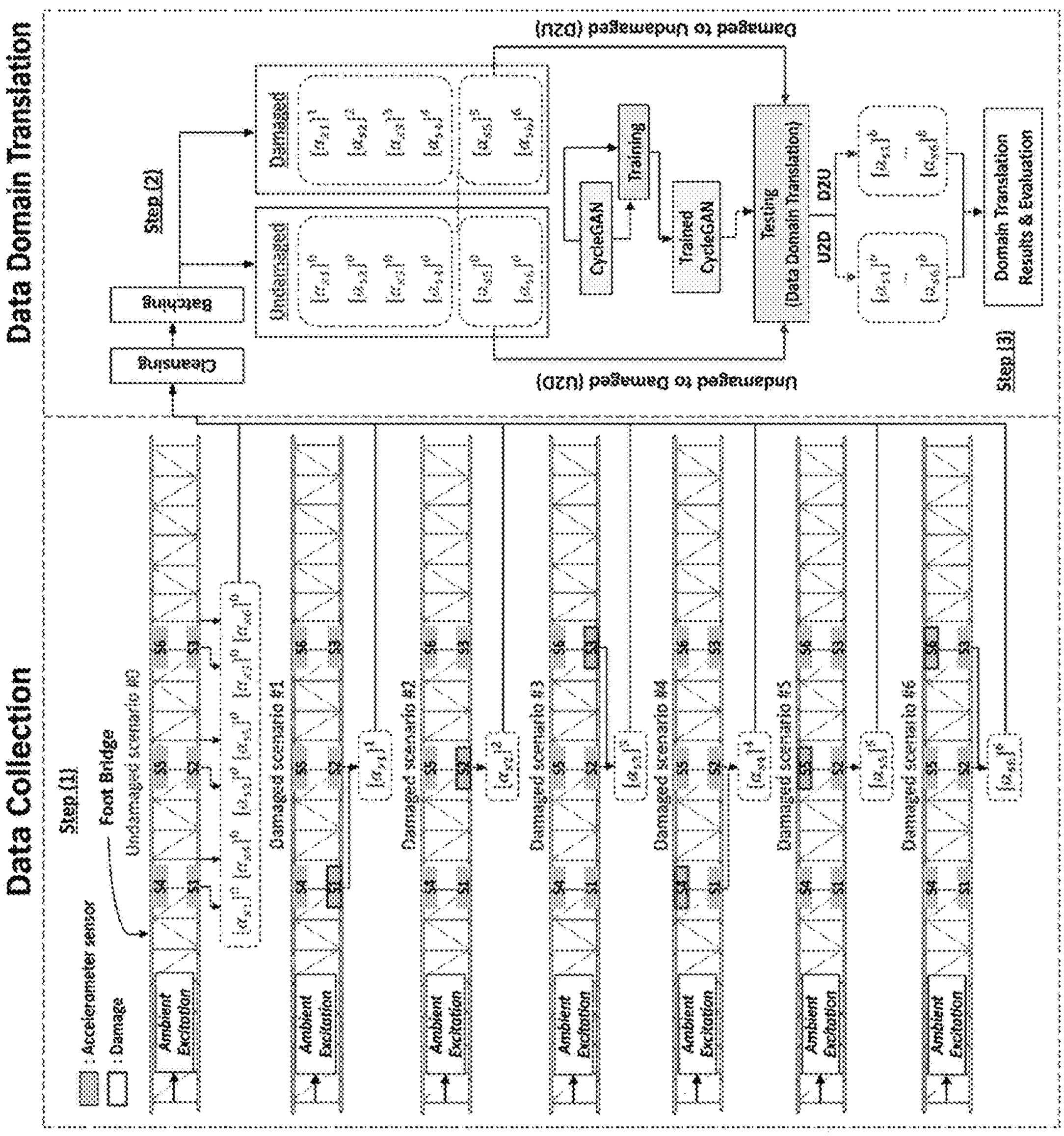
FIG. 22 is a detailed workflow of data collection and domain translation using Deep Learning, according to an embodiment of the present disclosure.

FIG. 22 depicts the workflow of the domain translation, according to an embodiment of the present disclosure. As such, in an embodiment, the structural health monitoring system may first be configured to collect sensorial data from the at least one sensor (e.g., accelerometer) in mechanical communication with the at least one civil structure. Next, at Step (2) of FIG. 22, the processor may be configured to train the CycleWDCGAN-GP model to learn the mapping between undamaged and damaged vibration data domains within the at least one actual dataset. Accordingly, once the CycleWDCGAN-GP model has been trained, the processor may generate at least one synthetic damaged domain and/or undamaged domain dataset, via translating the (unseen) undamaged domain to the damaged domain and/or the undamaged domain to the (unseen) damaged domain, respectively. Further, at Step (3) of FIG. 22, in this embodiment, the structural health monitoring system, via the processor, may be configured to evaluate the CycleWDCGAN-GP model with loss functions. As such, model may be evaluated by comparing the generated vibration datasets to the actual datasets by examining their respective time and frequency domains, mode shapes, and/or damping ratios. Accordingly, in this embodiment, the structural health monitoring system may determine the successful translation of the vibration domain from undamaged dataset to damaged dataset demonstrates that the unhealthy (damaged) condition of the actually existing healthy (undamaged) structure under a particular damage state. In some embodiments, the model may be used to translate the damaged dataset to the undamaged vibration domain translation.

Since data collection from civil structures (e.g., bridges and skyscrapers) is difficult and challenging especially for damage-associated data samples, in an embodiment, the structural health monitoring system may be configured to implement the WDCGAN-GP model to generate similar data samples to the at least one damaged domains dataset to augment the training dataset of the ML and/or DL model. As such, by augmenting and/or increasing the amount of damaged-associated dataset with synthetic data samples from WDCGAN-GP, the structural health monitoring system may optimize the performance of the DL model. Thus, the model may provide a higher accuracy rate for the vibration-based SDD. In this manner, in this embodiment, the structural health monitoring system may be configured to utilize the WDCGAN-GP model to generate similar response data, as the actual sensorial data collected by the at least one sensor, to be used in the training dataset of the ML or DL model for more effective SDD of civil structures.

Additionally, in an embodiment, the structural health monitoring system may be configured to implement the WDCGAN-GP model, such that the structural health monitoring system may continuously monitor the at least one civil structure, as needed. For example, on occasion the continuously monitored civil structures may suffer from missing sensorial data (e.g., response data) from the at least one sensor due to networking issues. As such, in this embodiment, the WDCGAN-GP model may be configured to complement the missing data by learning the response dataset and/or generating at least one similar sensorial dataset (e.g., response dataset).

Additionally, in an embodiment, the WDCGAN-GP model may be used in present damage diagnostics, such that the structural health monitoring system, via the WDCGAN-GP model, may be configured to generate data for at least one AI model to be used for SHM and/or SDD applications. As such, the structural health monitoring system resolves the class imbalance problem, such that the at least one AI model may be optimized due to the increase in accuracy of the at least one AI model. Moreover, in this embodiment, the structural health monitoring system may complement any missing sensorial data of the at least one civil structure (e.g., missing data reconstruction) for modern sensor networks deployed on the at least one civil structure, such that continuous monitoring of the health and/or condition of the at least one civil structure may be maintained.

As such, in this embodiment, the generation of additional similar data by the structural health monitoring system, in turn, may provide a significant advantage for the data scarcity problem SHM and/or SDD applications. Accordingly, with the use of WDCGAN-GP, the structural health monitoring system may provide accurate, efficient, and/or optimized vibration-based damage diagnostics via the ML and/or DL methods based on the raw sensorial data (e.g., vibrational data) collected by the at least one sensor in electrical communication with the structural health monitoring system.

Furthermore, in an embodiment, the structural health monitoring system may be configured to predict the future and/or past conditions of the at least one civil structure, via the CycleWDCGAN-GP model of the structural health monitoring system. In this manner, the CycleWDCGAN-GP model may be configured to output synthetic response data (e.g., synthetic vibrational data) which then may be collected at any time in the life cycle of the at least one civil structure. As such, in this embodiment, the generated synthetic response data may also be damaged-associated data as a result of potential damage and/or defects on the at least one civil structure after a significant stressor (e.g., an earthquake) has been applied to the at least one civil structure, and/or the generated synthetic response data may be an undamaged-associated data which shows the original undamaged and/or repaired condition of the at least one civil structure.

CycleWDCGAN-GP+Gated Linear Unit Framework

Additionally, in an embodiment, the structural health monitoring system may be configured to utilize a CycleWDCGAN-GP model, such that the structural health monitoring system may predict a condition assessment of the at least one civil structure. In in embodiment, a CycleWDCGAN-GP model may be taught to learn the data mapping of the at least one civil structure by inputting the response data which was collected from at least one healthy civil structure into the learned model, such that the CycleWDCGAN-GP model may generate a response data of an unhealthy bridge which suffers from delamination in girders. As such, based on the CycleWDCGAN-GP model, the structural health monitoring system may optimize an analysis of the generated response data for at least one potential future conditions of the at least one civil structure parametrically and/or nonparametrically, since the structural health monitoring system is configured to generate the dynamic response data of that structure. In that manner, in this embodiment, the response data which may be collected from at least one unhealthy civil structure may also be inputted into the learned model to generate response data that belongs to the at least one healthy civil structure. Thus, the processor of the structural health monitoring system, via the CycleWDCGAN-GP model, may evaluate the adequacy of an implemented repair on the at least one unhealthy and/or healthy civil structure as to it is sufficient to carry the operational loading on the at least one unhealthy and/or healthy civil structure.

Figure 23:
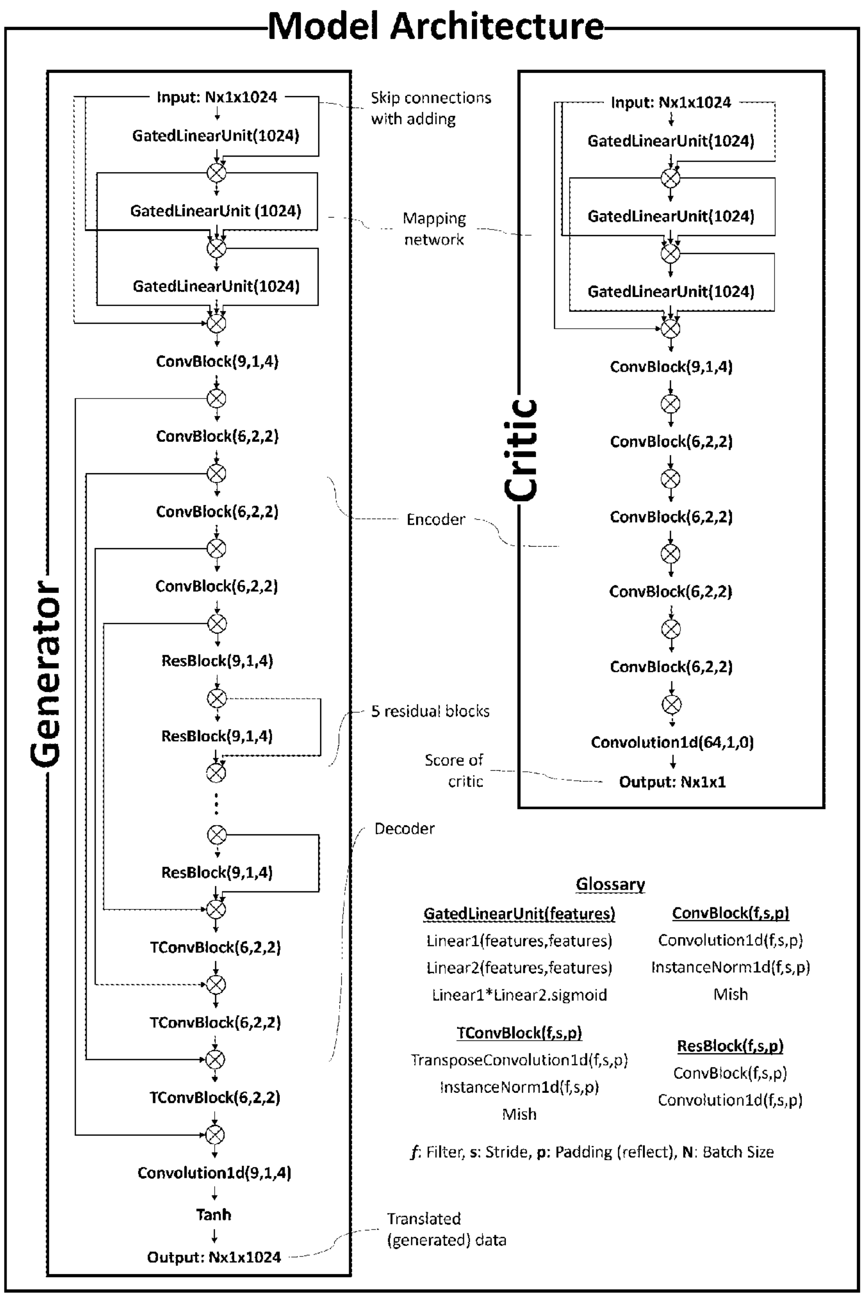
FIG. 23 is an exemplary diagram of a CycleWDCGAN-GP model architecture, according to an embodiment of the present disclosure.
Figure 24:
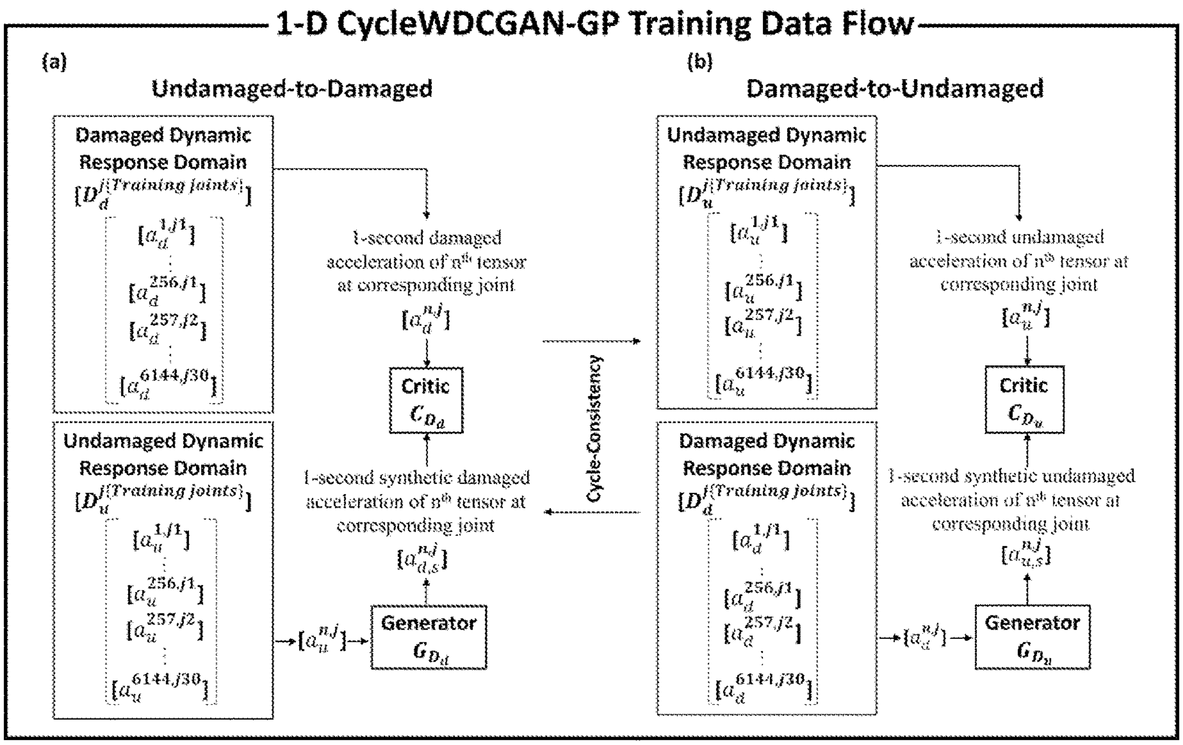
FIG. 24 is an exemplary diagram of a CycleWDCGAN-GP training data flow for undamaged-to-damaged domain translation and damaged-to-undamaged data translation, according to an embodiment of the present disclosure.

FIG. 23 depicts an example of the structural health monitoring system further comprising the CycleWDCGAN-GP architecture with a Gated Linear Unit (hereinafter "GLU"), in addition to skip-connections with adding in a generator and/or a critic, according to an embodiment of the present disclosure. As such, as stated above, in an embodiment, the system may comprise the CycleWDCGAN-GP model framework which further comprises the GLU with skip-connections with addition in at least one generator and/or at least one critic of the system. Moreover, in this embodiment, at least one residual layer in the at least one generator may be placed in the bottleneck for the generator. Furthermore, the system may comprise at least one novel activation function (e.g., Mish). Accordingly, in this embodiment, the system, via implementing GLU, skip-connections, and/or the Mish activation function in the model may optimize a diminishing of a vanishing gradient problem. Therefore, information loss during the training may be minimized. In addition, by implementing GLU, the system may also be configured to learn the broader features of data instead of nearby features (e.g., convolution operation) since the GLU includes linear operation.

Figure 26:
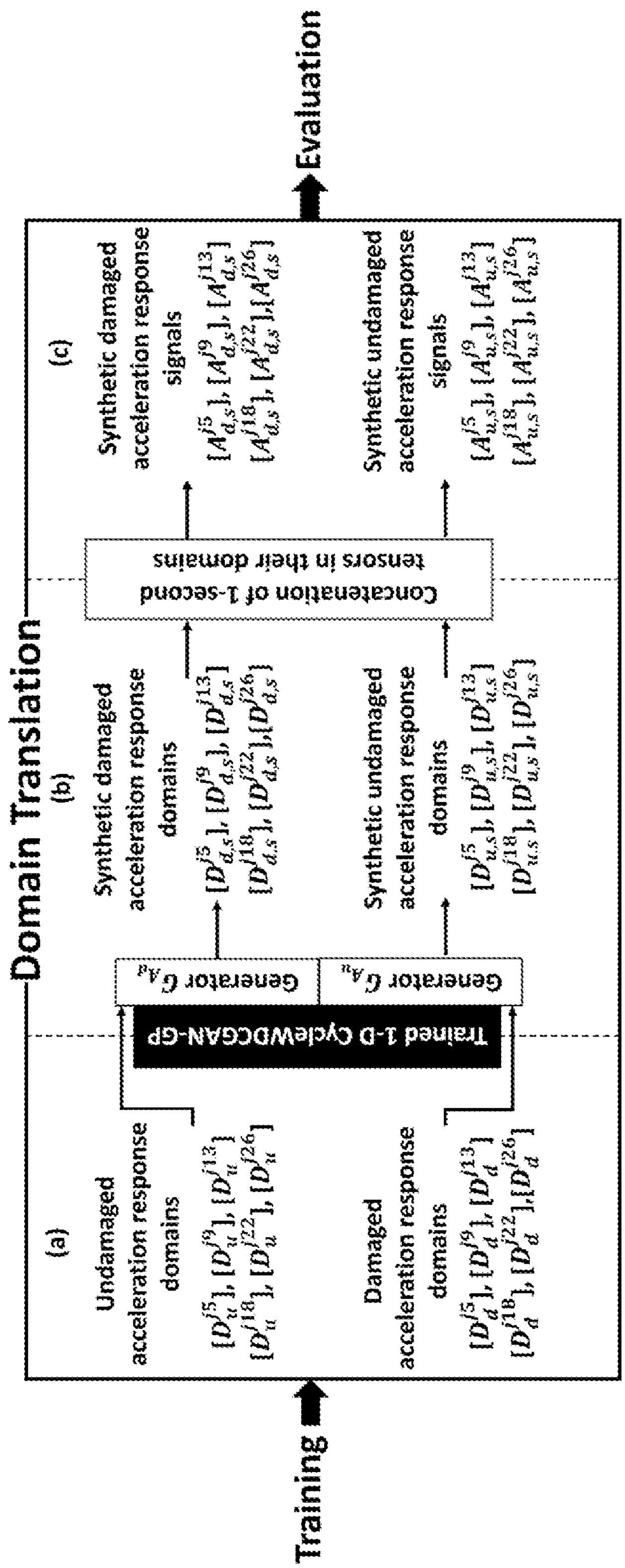
FIG. 26 is an exemplary diagram of a domain translation workflow for at least one test joint's: (1) acceleration response domain; (2) synthetic (e.g., translated) acceleration response domain; and (3) at least one concatenated synthetic acceleration response signal, according to an embodiment of the present disclosure.

As such, in an embodiment, the CycleWDCGAN-GP architecture of the structural health monitoring system may integrate at least one of Equations (6)-(14), as presented below (hereinafter "Eq."). Additionally, FIG. 26 depicts training data flow for both the undamaged-to-damaged domain translation and the damaged-to-undamaged domain translation, while utilizing Eqs. (6)-(14), according to an embodiment of the present disclosure. In this manner, Eq. (6) is an adversarial critic loss function to train the critic ($C_{D_d}$) where may receive a damaged tensor $$(a_d^{n,j})$$

together with a synthetic damaged tensor $$(a_{d,s}^{n,j})$$

generated by the $G_{D_d}$, which may be responsible for undamaged to damaged translations. Then, a Wasserstein distance of the outputs of $C_{D_d}$ may be calculated with an additional gradient penalty function where the mean squared distance (L2 norm) of the multiplication of the respective gradient value of $$a_{d,s}^{n,j}$$

and the output from $C_{D_d}$ on $$a_{d,s}^{n,j}$$

may be calculated. The same function may then be used in Eq. (7) to train another critic ($C_{D_u}$) where it may receive an undamaged tensor $$(a_u^{n,j})$$

together with a synthetic undamaged tensor $$(a_{u,s}^{n,j})$$

generated by the $G_{D_u}$, which may be responsible for damaged to undamaged translation. Eq. (8) and/or Eq. (9) may also be used for training the generators, $G_{D_d}$ and/or $G_{D_u}$, based on the minimization of the outputs from corresponding critics, $C_{D_d}$ and $C_{D_u}$. Eq. (10) represents the cycle consistency when $$a_{d,s}^{n,j}$$

(output of $G_{D_d}$) may translate to $$a_{u,s}^{n,j}$$

by $G_{D_u}$, it should be the same as the original undamaged tensor $$a_u^{n,j}.$$

Similarly, but the other way around, the same equation may also consider when $$a_{u,s}^{n,j}$$

(output of $G_{D_u}$) may translate to $$a_{d,s}^{n,j}$$

it should be the same as the original damaged tensor $$a_d^{n,j}.$$

Eq. (6) defines the identity loss function. Essentially, this function states that when the generator that is responsible for undamaged to damaged translation ($G_{D_d}$) may receive a damaged tensor $$(a_d^{n,j}),$$

the generator may output the same damaged tensor, and/or the subtraction (mean absolute differences) between the output and the damaged tensor may be zero. The equations also hold true for damaged to undamaged translation. Note that mean absolute differences may be used (e.g., L1 loss) as the distance metric for Eq. (10) and Eq. (11) for the subtraction.

Furthermore, in an embodiment, the system may also utilize a frequency-based loss function, Eq. (12), which may account for the phase and/or magnitude values of the complex time series. Several model trainings were first implemented without employing Eq. (12). Fundamentally, in Eq. (12), the differences in magnitude values of the frequency domain (where $\mathcal{F}$ denotes Fourier transform) between the at least one original tensor (for undamaged or damaged) and the at least one synthetic tensor (for undamaged or damaged) and the differences in phase values of the frequency domain between the at least one original tensor (for undamaged or damaged) and the at least one synthetic tensor (for undamaged or damaged) may be calculated and/or summed. Also, note that mean absolute differences may be used (e.g., L1 loss) as the distance metric for the subtraction. In addition, by adding a frequency-based loss function to the model, the system may be configured to capture the frequency content of the data further. As such, the CycleWDCGAN-GP model may then be trained using an AdamW optimizer based on the total critic losses and total generator losses as given in Eq. (13) and Eq. (14), respectively. Additionally, in some embodiments, the lambda parameters (A) used in the equations below may be utilized and are provided in TABLE 1. Moreover, in some embodiments, the model may further be trained using Pytorch libraries on a PC equipped with GeForce RTX 3070 GPU, i7-9700K CPU.

$$\text{Adversarial Critic Loss}_{C_{D_d}} = \mathcal{L}^{C_{D_d}}_{WDCGAN-GP}(G_{D_d}, C_{D_d}) = \mathbb{E}_{a_d^n \sim \mathbb{P}(D_d^j)}\left[C_{D_d}(a_d^{n,j})\right] - \mathbb{E}_{a_u^{n,j} \sim \mathbb{P}(D_u^j)}\left[C_{D_d}(G_{D_d}(a_u^{n,j}))\right] + (\lambda_{GP})\mathbb{E}_{a_{d,s}^{n,j} \sim \mathbb{P}(D_{d,s}^j)}\left[\left(\left\|\nabla_{a_{d,s}^{n,j}} C_{D_d}(a_{d,s}^{n,j})\right\|_2 - 1\right)^2\right] \quad (6)$$

$$\text{Adversarial Critic Loss}_{C_{D_u}} = \mathcal{L}^{C_{D_u}}_{WDCGAN-GP}(G_{D_u}, C_{D_u}) = \mathbb{E}_{a_u^{n,j} \sim \mathbb{P}(D_u^j)}\left[C_{D_u}(a_u^{n,j})\right] - \mathbb{E}_{a_d^{n,j} \sim \mathbb{P}(D_d^j)}\left[C_{D_u}(G_{D_u}(a_d^{n,j}))\right] + (\lambda_{GP})\mathbb{E}_{a_{u,s}^{n,j} \sim \mathbb{P}(D_{u,s}^j)}\left[\left(\left\|\nabla_{a_{u,s}^{n,j}} C_{D_u}(a_{u,s}^{n,j})\right\|_2 - 1\right)^2\right] \quad (7)$$

$$\text{Adversarial Generator Loss}_{G_{D_d}} = \mathcal{L}^{G_{D_d}}_{WDCGAN-GP}(G_{D_d}, C_{D_d}) = -\mathbb{E}_{a_u^{n,j} \sim \mathbb{P}(D_u^j)}\left[C_{D_d}(G_{D_d}(a_u^{n,j}))\right] \quad (8)$$

$$\text{Adversarial Generator Loss}_{G_{A_u}} = \mathcal{L}^{G_{A_u}}_{WDCGAN-GP}(G_{D_u}, C_{D_u}) = -\mathbb{E}_{a_d^{n,j} \sim \mathbb{P}(D_d^j)}\left[C_{D_u}(G_{D_u}(a_d^{n,j}))\right] \quad (9)$$

$$\text{Cycle Consistency Loss} = \mathcal{L}_{Cyc}(G_{D_d}, G_{D_u}) = \mathbb{E}_{a_u^{n,j} \sim \mathbb{P}(D_u^j)}\left[\left|G_{D_u}(G_{D_d}(a_u^{n,j})) - a_u^{n,j}\right|_1\right] + \mathbb{E}_{a_d^{n,j} \sim \mathbb{P}(D_d^j)}\left[\left|G_{D_d}(G_{D_u}(a_d^{n})) - a_d^{n,j}\right|_1\right] \quad (10)$$

$$\text{Identity Loss} = \mathcal{L}_{Id}(G_{D_d}, G_{D_u}) = \mathbb{E}_{a_u^{n,j} \sim \mathbb{P}(D_u^j)}\left[\left|G_{D_u}(a_u^{n,j}) - a_u^{n,j}\right|_1\right] + \mathbb{E}_{a_d^{n,j} \sim \mathbb{P}(D_d^j)}\left[\left|G_{D_d}(a_d^{n,j}) - a_u^{n,j}\right|_1\right] \quad (11)$$

$$\text{Frequency Loss} = \mathcal{L}_{Freq}(G_{D_d}, G_{D_u}) = \left| mag\left[\mathcal{F}\left\{\mathbb{E}_{a_u^{n,j} \sim \mathbb{P}(D_u^j)}(a_u^{n,j})\right\}\right] - mag\left[\mathcal{F}\left\{\mathbb{E}_{a_d^{n,j} \sim \mathbb{P}(D_d^j)} G_{D_u}(a_d^{n,j})\right\}\right]\right|_1 + \left|\text{phase}\left[\mathcal{F}\left\{\mathbb{E}_{a_u^{n,j} \sim \mathbb{P}(D_u^j)}(a_u^{n,j})\right\}\right] - \text{phase}\left[\mathcal{F}\left\{\mathbb{E}_{a_d^{n,j} \sim \mathbb{P}(D_d^j)} G_{D_u}(a_d^{n,j})\right\}\right]\right|_1 + \left| mag\left[\mathcal{F}\left\{\mathbb{E}_{a_d^{n,j} \sim \mathbb{P}(D_d^j)}(a_d^{n,j})\right\}\right] - mag\left[\mathcal{F}\left\{\mathbb{E}_{a_u^{n,j} \sim \mathbb{P}(D_u^j)} G_{D_d}(a_u^{n,j})\right\}\right]\right|_1 + \left|\text{phase}\left[\mathcal{F}\left\{\mathbb{E}_{a_d^{n,j} \sim \mathbb{P}(D_d^j)}(a_d^{n,j})\right\}\right] - \text{phase}\left[\mathcal{F}\left\{\mathbb{E}_{a_u^{n,j} \sim \mathbb{P}(D_u^j)} G_{D_d}(a_u^{n,j})\right\}\right]\right|_1 \quad (12)$$

-continued $$\text{Total Critic Losses} = \mathcal{L}^{C_{D_d}}_{WDCGAN-GP}(G_{D_d}, C_{D_d}) + \mathcal{L}^{C_{D_u}}_{WDCGAN-GP}(G_{D_u}, C_{D_u}) \quad (13)$$

$$\text{Total Generator Losses} = \mathcal{L}^{G_{D_d}}_{WDCGAN-GP}(G_{D_d}, C_{D_d}) + \mathcal{L}^{G_{D_u}}_{WDCGAN-GP}(G_{D_u}, C_{D_u}) + \mathcal{L}_{Cyc}(G_{D_d}, G_{D_u})\lambda_{Cyc} + \mathcal{L}_{Freq}(G_{D_d}, G_{D_u})\lambda_{Freq} + \mathcal{L}_{Id}(G_{D_d}, G_{D_u})\lambda_{Id} \quad (14)$$

TABLE 1

| Symbol | Description |
|---|---|
| Batch Size (N) | 16 |
| Number of Epochs | 240 |
| Learning Rate for Generators ($G_{D_d}$ and $G_{D_u}$) | $1 \times 10^{-4}$ |
| Learning Rate for Critics ($C_{D_d}$ and $C_{D_u}$) | $1 \times 10^{-4}$ |
| Critic Iterations | 10 |
| $\lambda_{Id}$ (Identity Loss) | 10 |
| $\lambda_{Cyc}$ (Cycle Loss) | 10 |
| $\lambda_{GP}$ (Gradient Penalty) | 10 |
| $\lambda_{Freq}$ (Frequency Loss) | 10 |
| Optimizer (Generator, Critic) | AdamW |

Furthermore, in an embodiment, the training process of the system may be monitored by using some indicators including but not limited to at least one total critic and/or at least one generator losses, Fréchet Inception Distance (FID), and/or Eq. (15). In addition, in this embodiment, the CycleWDCGAN-GP architecture of the structural health monitoring system may comprise a Mean Magnitude-Squared Coherence (hereinafter "MMSC") in Eq. (12) as an extension of the Magnitude Squared Coherence (Eq. 16).

As known in the art, the FID is one of the most used indices for evaluating GANs for image-based applications; however, for 1-D-based inputs especially for acceleration responses, the FID may not be a helpful indicator. The main reason is that FID accounts for the mean values of the data; however, the mean of acceleration data is zero. Also, although FID catches some similarities between the original and synthetic (generated) domains, it is not consistent in capturing the frequency domain similarities. Additionally, a big disadvantage of FID is that it is intuitively difficult to grasp the meaning of high or low FID scores, as there are no upper or lower boundaries. Therefore, in this embodiment, the processor of the structural health monitoring system, via the new indicator, may be configured to track the frequency domain similarities between the at least one original domain and/or the at least one synthetic domain, MMSC, Eq. (17). In Eq. (15), Eq. (16), and Eq. (17), the x and g may represent the original and the generated (i.e., synthetic) data respectively, e.g., x being an undamaged tensor $$(a_u^{n,j})$$

and g being a synthetic undamaged tensor $$(a_{u,s}^{n,j}).$$

In Eq. (16), $S_{xg}$ may represent the cross-spectral density estimate, and $S_{xx}$ and $S_{gg}$ may represent the power spectral density estimates of the original and the generated datasets.

After the calculation of Magnitude-Squared Coherence (MSC) of the at least one original tensor and the at least one synthetic tensor in Eq. (16), the resulted n amount of MSC values of original and synthetic tensors may then be averaged to give a single representative mean value in Eq. (17). As such, the mean value may represent the similarity of two tensors to each other in the frequency domain. As a result, when the generated data may be similar to the original data in the frequency domain, the MMSC may trend toward the designated value of similarity (e.g., "1"), and likewise when the generated data may be dissimilar to the original data in the frequency domain, the MMSC may trend toward the designated value of dissimilarity (e.g., "0"). As for the FID values, in this embodiment, the lower the value, the more similar the tensor pairs may be to each other. Lastly, during the training, in some embodiments, a decaying Gaussian noise may be added to the inputs to increase the generalization capacity of the model in the unseen data.

$$FID(x, g) - \|\mu_x - \mu_g\|_2^2 + Tr\left(C_x + C_g - 2(C_x C_g)^{0.5}\right) \tag{15}$$

$$MSC(x, g) = \left[\frac{|S_{xg}|^2}{S_{xx} \times S_{gg}}\right] \tag{16}$$

$$MMSC(x, g) = \frac{\sum_{i=1}^{n} MSC(x, g)_i}{n} \tag{17}$$

Figure 25A:
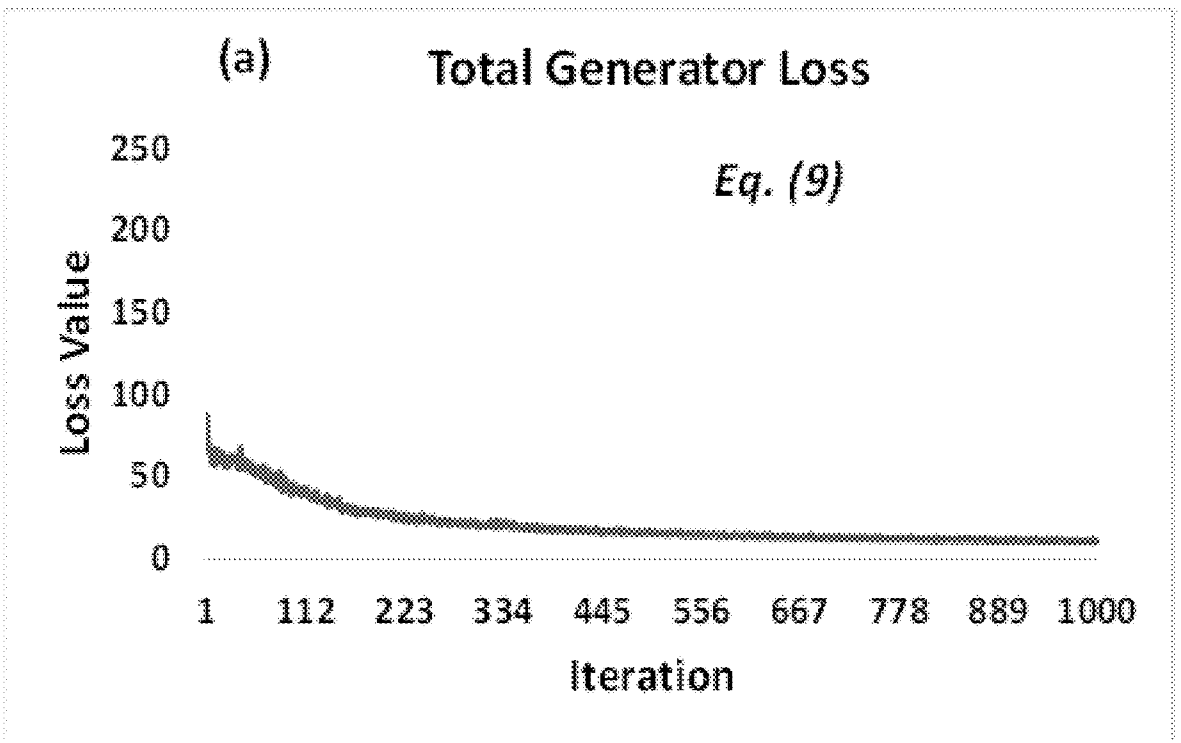
FIG. 25A is a plot illustrating a total generator loss of CycleWDCGAN-GP training, according to an embodiment of the present disclosure.
Figure 25B:
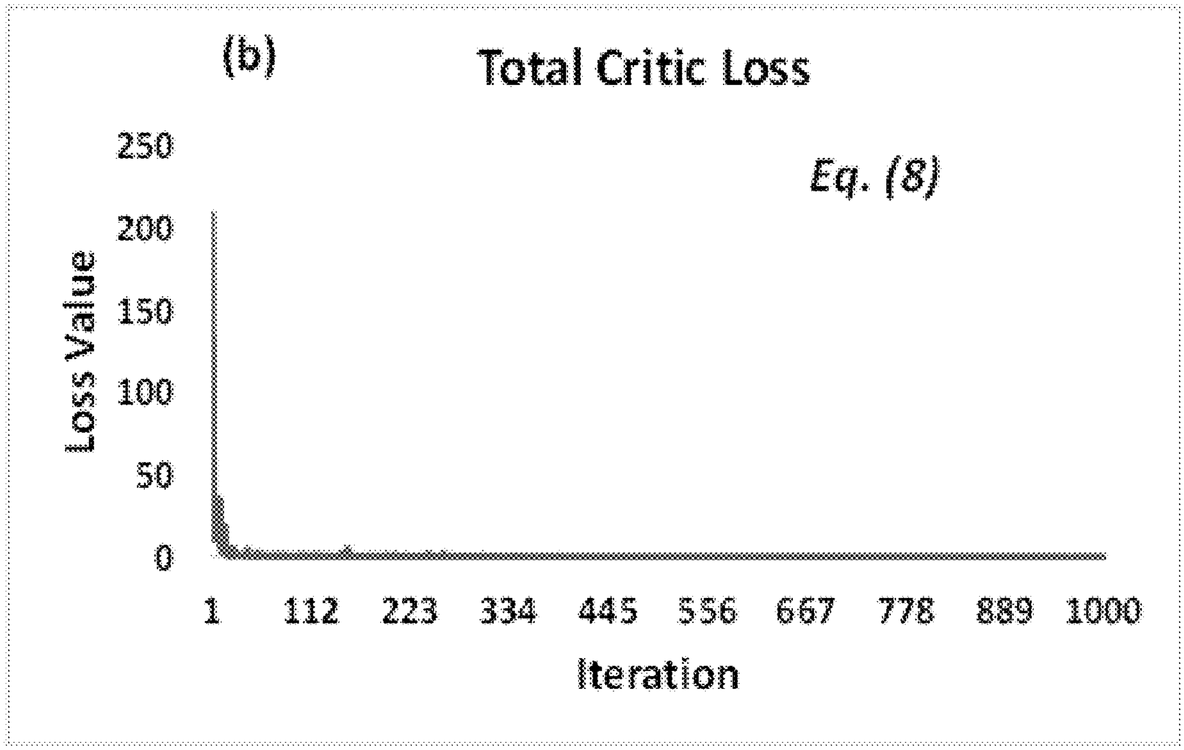
FIG. 25B is a plot illustrating a total critic loss of a CycleWDCGAN-GP training, according to an embodiment of the present disclosure.
Figure 25C:
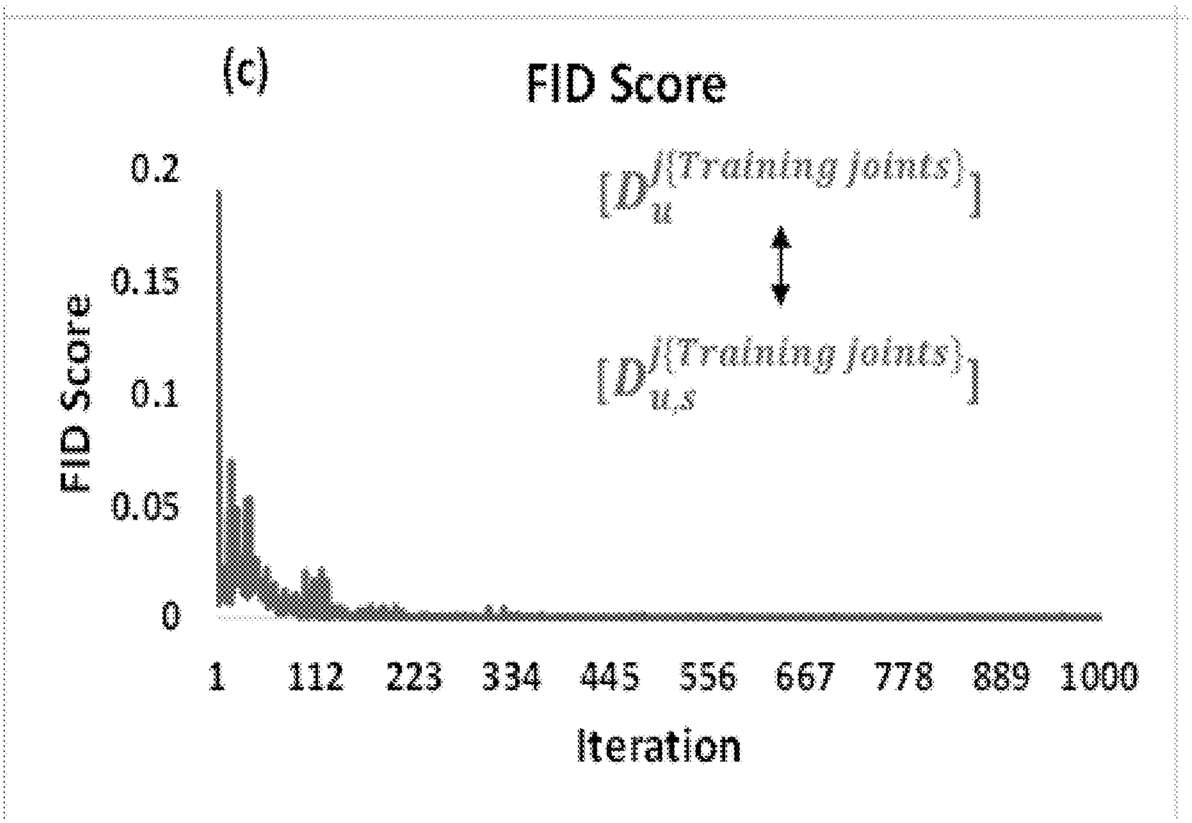
FIG. 25C is a plot illustrating an FID score between an undamaged acceleration response domain and a synthetic undamaged acceleration response domain of a CycleWDC-GAN-GP training, according to an embodiment of the present disclosure.
Figure 25D:
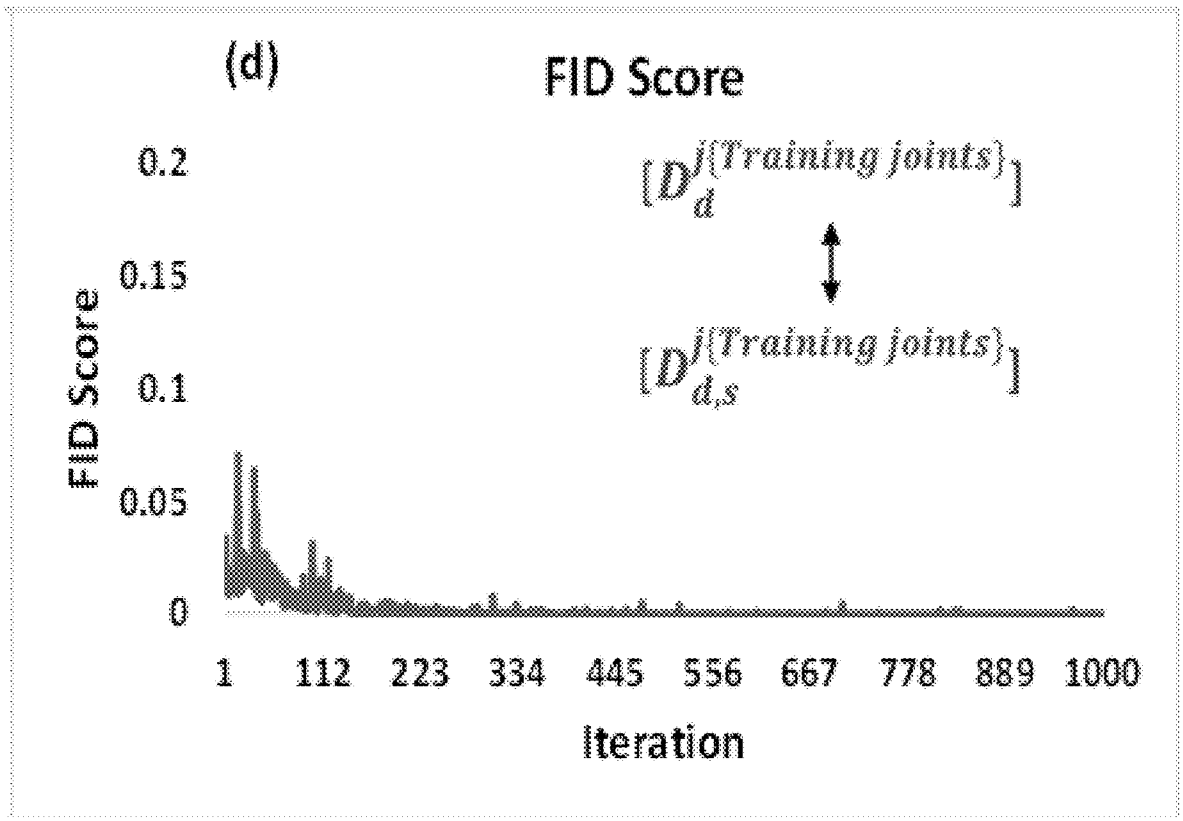
FIG. 25D is a plot illustrating an FID score between a damaged acceleration response domain and a synthetic damaged acceleration response domain of a CycleWDC-GAN-GP training, according to an embodiment of the present disclosure.
Figure 25E:
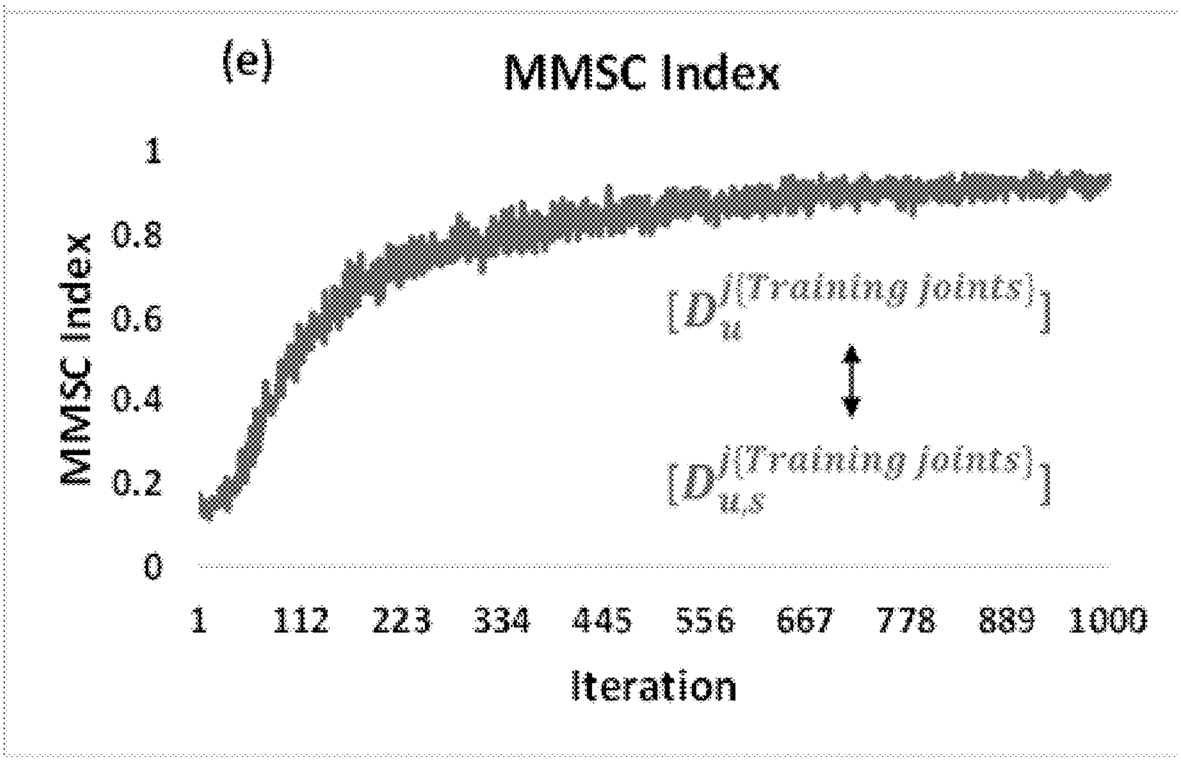
FIG. 25E is a plot illustrating a MMSC index between an undamaged acceleration response domain and a synthetic undamaged acceleration response domain of a CycleWDC-GAN-GP training, according to an embodiment of the present disclosure.
Figure 25F:
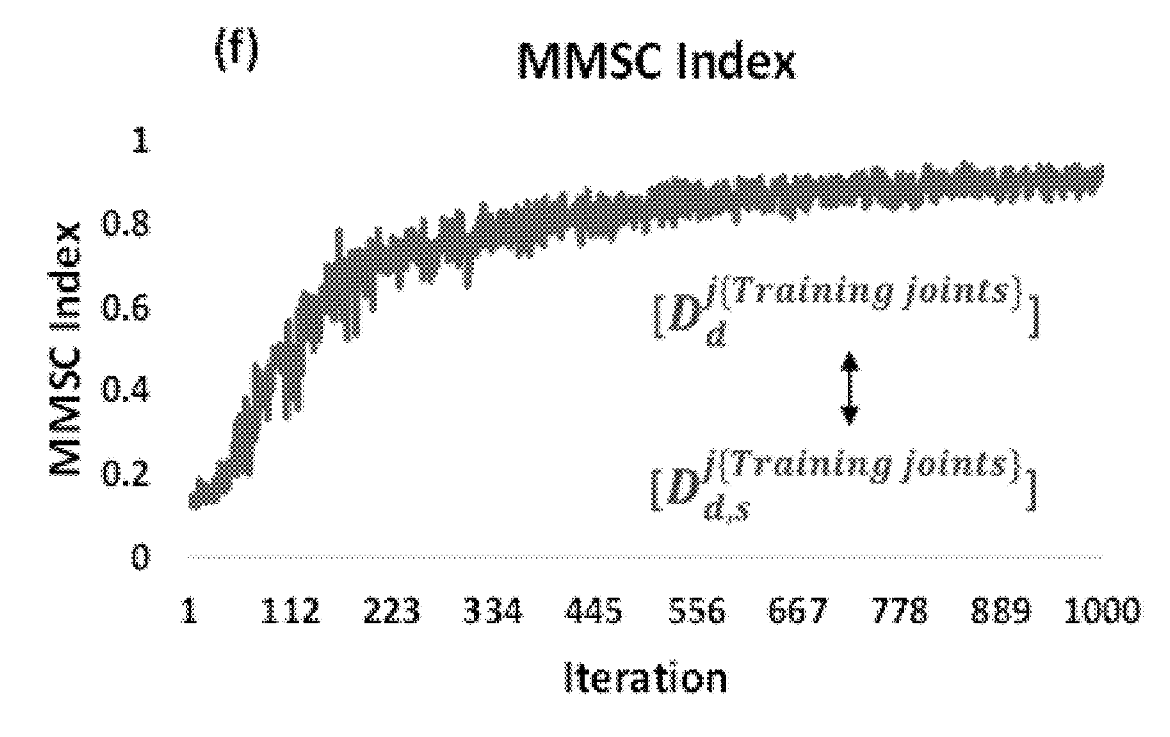
FIG. 25F is a plot illustrating a MMSC index between a damaged acceleration response domain and a synthetic damaged acceleration response domain of a CycleWDC-GAN-GP training, according to an embodiment of the present disclosure.

Next, as shown in FIGS. 25A-25F, in an embodiment, the processor of the structural health monitoring system may be configured to plot the training monitoring indicators onto the display device in electrical communication with the computing device of the structural health monitoring system. As such, as shown in FIG. 25A and FIG. 25B, critic and/or generator losses may converge to a zero value. In other words, in this embodiment, the structural health monitoring system is configured to learn the data structure with information updating at each iteration and consequently may be configured to minimize losses. Furthermore, as mentioned previously, FID may not be a consistent index for capturing the frequency similarities between two domains based on the prior art. However, as shown in FIG. 25C, FIG. 25D, FIG. 25E, and FIG. 25F, it is interesting to note that FID scores between $$D_d^{j(Training\ joints)} \text{ and } D_{d,s}^{j(Training\ joints)},$$

and FID scores between $$D_u^{j(Training\ joints)} \text{ and } D_{u,s}^{j(Training\ joints)}$$

may follow a very similar trend to what the MMSC index may follow throughout the training. In addition, in an embodiment, the MMSC between $$D_d^{j(Training\ joints)} \text{ and } D_{d,s}^{j(Training\ joints)},$$

and the MMSC index between $$D_u^{j(Training\ joints)} \text{ and } D_{u,s}^{j(Training\ joints)}$$

may converge to 1, which suggests that as the training continues, the structural health monitoring system may be configured to mimic the at least one frequency actual domain, via the at least one translated (i.e., synthetic) domain, such that the at least one frequency actual domain and the at least one translated domain become similar.

In this manner, in an embodiment, following the training of CycleWDCGAN-GP of the structural health monitoring system, the processor may be configured to translate the domains of at least one joint (e.g., a contraction joint, a construction joint, and/or an isolation joint). As such, FIG. 26 depicts the domain translation process, according to an embodiment of the present disclosure. For example, in an embodiment, the processor may be configured to feed at least one undamaged acceleration response domain of the at least one joint into the model to translate it to the at least one synthetic damaged acceleration response domain. Similarly, in this embodiment, the processor may be configured to feed the damaged acceleration response domain of the at least one joint into the model to translate it to the at least one synthetic undamaged acceleration response domain. In addition, the process above may be implemented for at least one alternative joint of the at least one civil structure. Then, in this embodiment, the at least one synthetic damaged and/or undamaged acceleration response domains, which consist of the at least one tensor of at least one (1) second, are passed to the concatenation process, via the processor of the structural health monitoring system. In this step, the at least one generated tensors may be concatenated randomly, such that the processor of the structural health monitoring system may be configured to form at least one synthetic acceleration response signal. For example, in an embodiment, the at least one synthetic damaged acceleration response domain of the at least one joint may be processed to concatenate it's at least one synthetic tensor to produce the at least one final signal (e.g., a 256-second signal), which may be the at least one synthetic damaged acceleration response signal of the at least one joint. Accordingly, the same procedure may be implemented for the at least one alternative acceleration response domains.

As such, in an embodiment, the structural health monitoring system may comprise the following, including but not limited to i) a more extensive training procedure to increase the domain knowledge of the model; ii) a novel signal coherence-based training monitoring index, Mean Magnitude-Squared Coherence (MMSC), which may account for the similarity of frequency domains of the original and the translated data for more efficient training monitoring; iii) a frequency-based loss in the objective function to further capture the frequency content of the data; iv) a better activation function (Mish), Gated Linear Units (GLU), and skip-connections throughout the model to minimize the gradient (information) loss and to learn the broader features in the data; v) a decaying Gaussian noise to the inputs for better generalization of the data; and vi) an extensive evaluation of the translated domains together with their original counterparts using structural modal parameters for further validation of the presented methodology.

In summary, in this embodiment, the structural health monitoring system comprising the CycleWDCGAN-GP architecture, described above, may be configured to obtain the unhealthy (e.g., damaged) acceleration response of a civil structure while it is in a healthy (e.g., pristine) condition and/or a healthy acceleration response while it is in an unhealthy condition. In this manner, the structural health monitoring system may provide certain benefits in monitoring the at least one civil structure and/or at least one damage detection application, with respect to the at least one civil structure. For example, having access to the acceleration response of deck delamination of a bridge while the bridge is in pristine condition may assist the bridge experts in taking proactive action items before the delamination occurs. In parallel, in this same example, having access to the acceleration response of a strand splice repaired pre-stressed concrete bridge while the bridge is in unhealthy condition can help the bridge experts to figure out the degree of need for the splice repair for re-serviceability of the bridge.

Structural State Translation (Hereinafter "SST") Architecture

Furthermore, in an embodiment, in addition to monitoring and/or determining a condition of at least one structure, via at least one sensor in electrical communication with the structural health monitoring system, the structural health monitoring system may be configured to translate at least one state of the at least one structure to at least one alternative state of at least one alternative structure after discovering and learning the domain-invariant representation in the source domains of at least one alternative structure. As such, in this embodiment, in addition to the WDC-GAN-GP and/or the CycleWDCGAN-GP architecture, the structural health monitoring system may comprise a Domain-Generalized Cycle-Generative (hereinafter "DGCG") architecture (i.e., the SST architecture), such that the structural health monitoring system may learn the domain-invariant representation in the at least one source domain $$\left(\text{e.g., } D_{State-\alpha}^{Structure\ K} \text{ and } D_{State-\beta}^{Structure\ K}\right)$$

of the at least one civil structure, where the structure may have at least two different structural states (i.e., conditions) (e.g., State-α and State-β). In this manner, when the domain-invariant feature space is invariant to the different domains, the knowledge that the system learned after the training may be generalizable and/or transferable to other domains.

Figure 44:
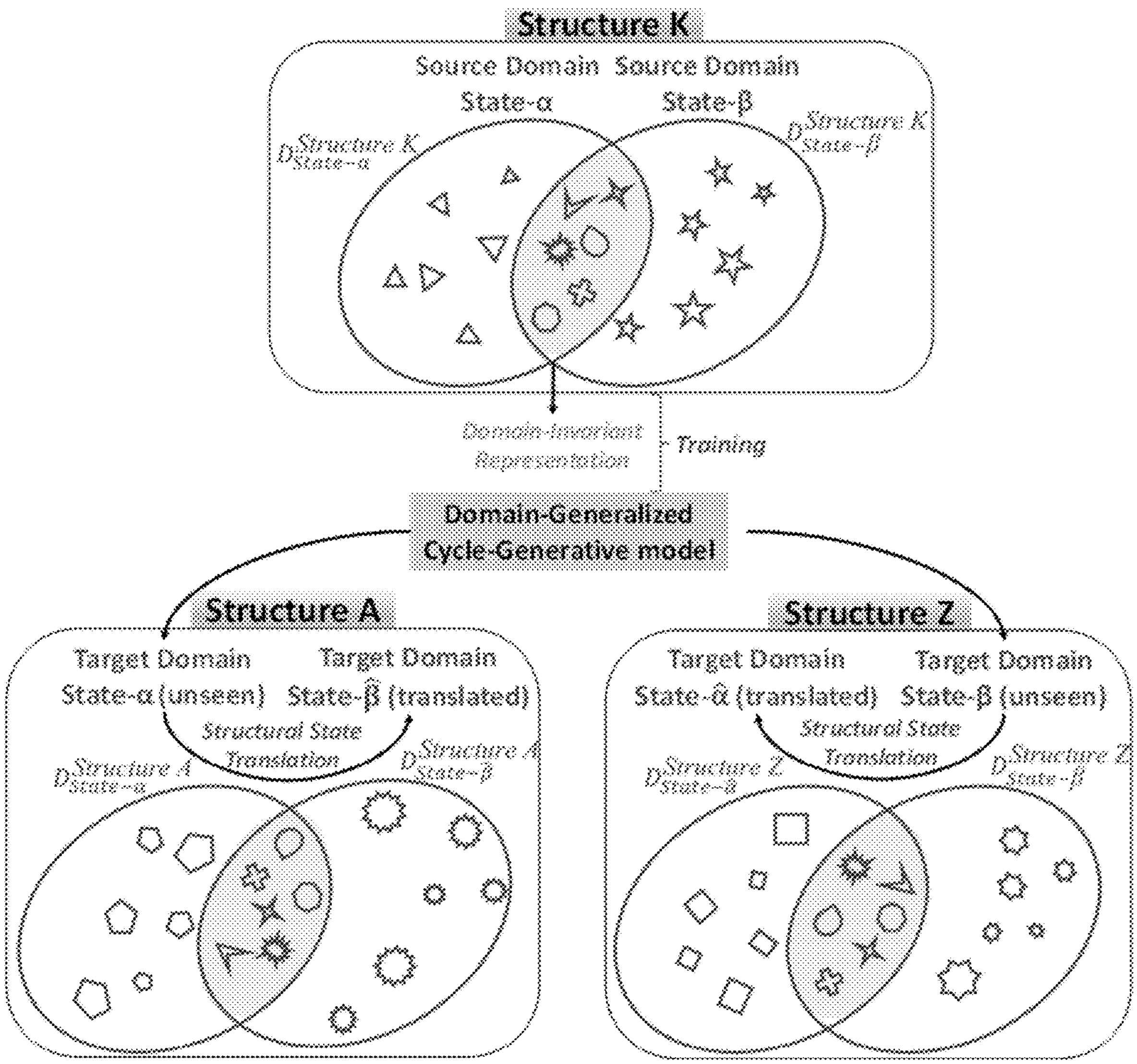
FIG. 44 is an exemplary diagram of a Structural State Translation (hereinafter "SST") process, according to an embodiment of the present disclosure.

In addition, by taking advantage of this approach, the DGCG architecture of the structural health monitoring system which learned the domain-invariant representation in the at least one domain $$\left(\text{e.g., } D_{State-\alpha}^{Structure\ K} \text{ and/or } D_{State-\beta}^{Structure\ K}\right)$$

may then be used to generalize and/or transfer its knowledge to other domains. As such, the processor of the structural health monitoring system may test the target domain (e.g., unseen) of Structure A where $$D_{State-\alpha}^{Structure\ A}$$

is translated (e.g., generated) to $$D_{State-\hat{\beta}}^{Structure\ A},$$

where the hat "^" above β denotes that it is the translated state. Similarly, as shown in FIG. 44, the processor of the structural health monitoring system may test the target domain (e.g., unseen) of Structure Z where $$D_{State-\beta}^{Structure\ Z}$$

is translated (e.g.,) to $$D_{State-\hat{\alpha}}^{Structure\ Z}.$$

Moreover, in an embodiment, the structural health monitoring system may similarly be utilized the other way around, depending on the availability of the states of structures, for example, Structure A could only have State-β and Structure Z could only have State-α available and/or at least one alternative combination could be created. Intrinsically, in some embodiments, at least one additional state and/or structure may be available in the source or the target domain. In this manner, FIG. 44 depicts a representative illustration of the SST process, according to an embodiment of the present disclosure.

Accordingly, in an embodiment, the structural health monitoring system may comprise the following SST architecture, including but not limited to: (1) Preprocessing; (2) Training; (3) Translation; and (4) Postprocessing. In the Preprocessing phase, in an embodiment, the processor of the structural health monitoring system may be configured to extract at least one signal response (i.e., sensorial data) from the at least one sensor in mechanical communication with the at least one civil structure, such that the processor may be configured to divide the at least one extracted signal response for each corresponding state into at least one predetermined timed tensor (e.g., a 16-second tensor). Additionally, in the Training phase, in this embodiment, the DGCG architecture may be trained on at least one source domain (e.g., State-α and/or State-β) of the at least one civil structure. Moreover, in the Translation phase, the DGCG architecture may then be used to translate the at least one target domains (e.g., unseen) (e.g., State-α, State-β, and/or State-γ) of the at least one alternative civil structure to other corresponding domains (e.g., State-α, State-β, and/or State-γ).

Figure 51:
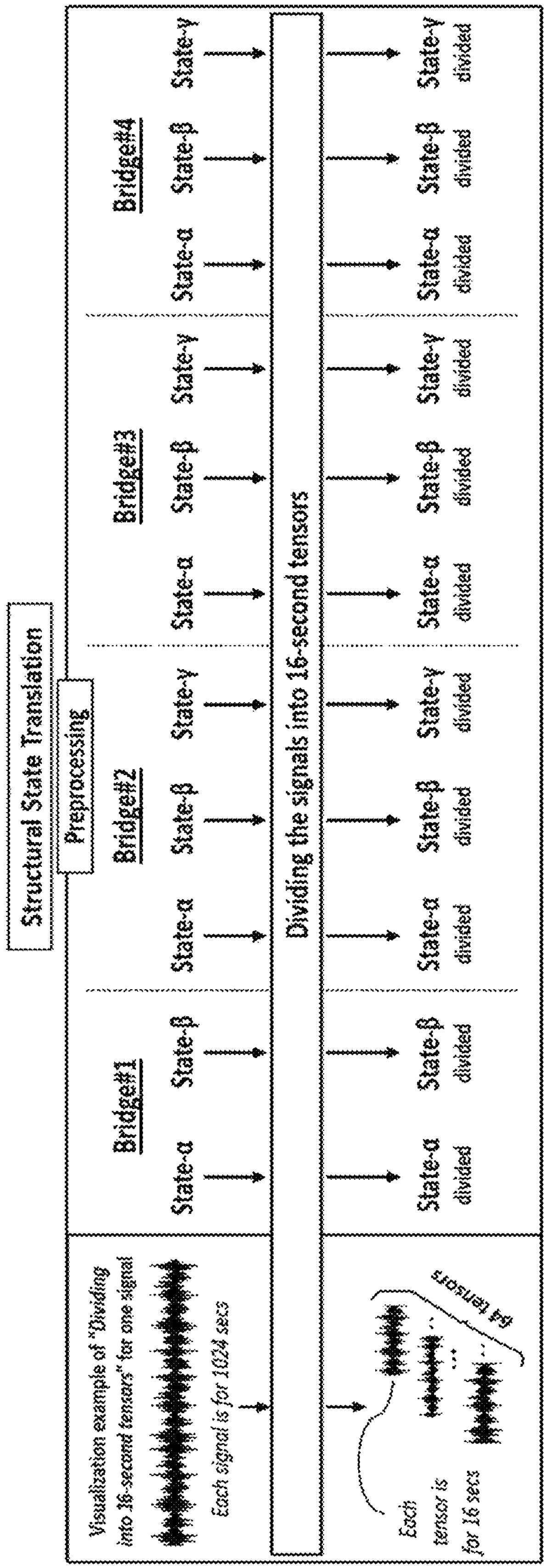
FIG. 51 is an exemplary diagram illustrating a preprocessing stage of a SST framework, according to an embodiment of the present disclosure.

In the Preprocessing phase, as shown in FIG. 51, in this embodiment, as stated above, the at least one extracted signal response (i.e., sensorial data) from the at least one sensor may be divided into the at least one predetermined timed tensor (e.g., the 16-second tensor), via the processor of the structural health monitoring system, such that a plurality of tensors may be generated for the at least one sensor. For example, State-α and State-β of the at least one civil structure (e.g., a Bridge #1) may each have 19 acceleration response signals (i.e., sensorial data) from sensor channels, each comprising the at least one sensor, divided into 16-second tensors, resulting in State-α divided and State-β divided. In this same example, the same procedure may also be applied to the at least one alternative civil structure (e.g., a Bridge #2, a Bridge #3, a Bridge #4, etc.). As such, by dividing the at least one signal response (i.e., sensorial data) from the at least one sensor, the structural health monitoring system may optimize the performance of the DGCG architecture. In addition, in some embodiments, the processor may be configured to transmit and/or record the at least one extracted signal response of the at least one signal in the memory of the computing device prior to any integration within the DGCG architecture. Additionally, in some embodiments, the structural health monitoring system may be configured to normalize the at least one extracted signal response before feeding the data samples in the DGCG architecture is not implemented. Likewise, in some embodiments, the structural health monitoring system may be configured to prevent and/or skip normalizing the at least one extracted signal response before feeding the data samples in the DGCG architecture is not implemented. In this manner, in these other embodiments, normalization may be required if the data consists of large spikes.

Note, in some embodiments, since the at least one excitation signal applied to the at least one civil structure may be a constant Gaussian noise, the at least one response signal extracted from the at least one civil structure may be periodic, meaning the at least one signal response may be repetitive at some intervals.

Figure 52:
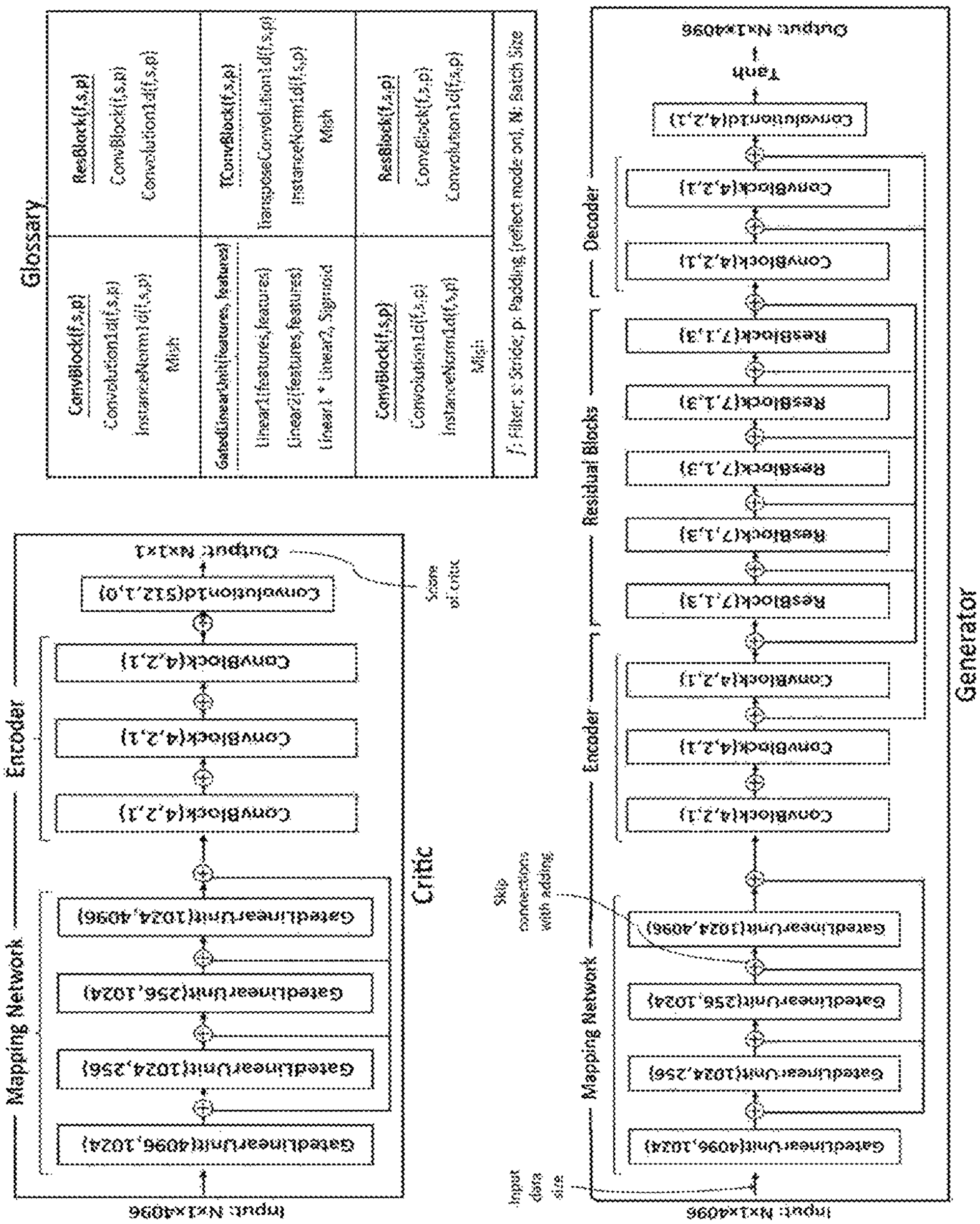
FIG. 52 is an exemplary diagram illustrating a single model architecture of a Domain-Generalized Cycle-Generative (DGCG) model (e.g., a generator and a critic, each including mapping networks consisting of gated linear units), according to an embodiment of the present disclosure.
Figure 53:
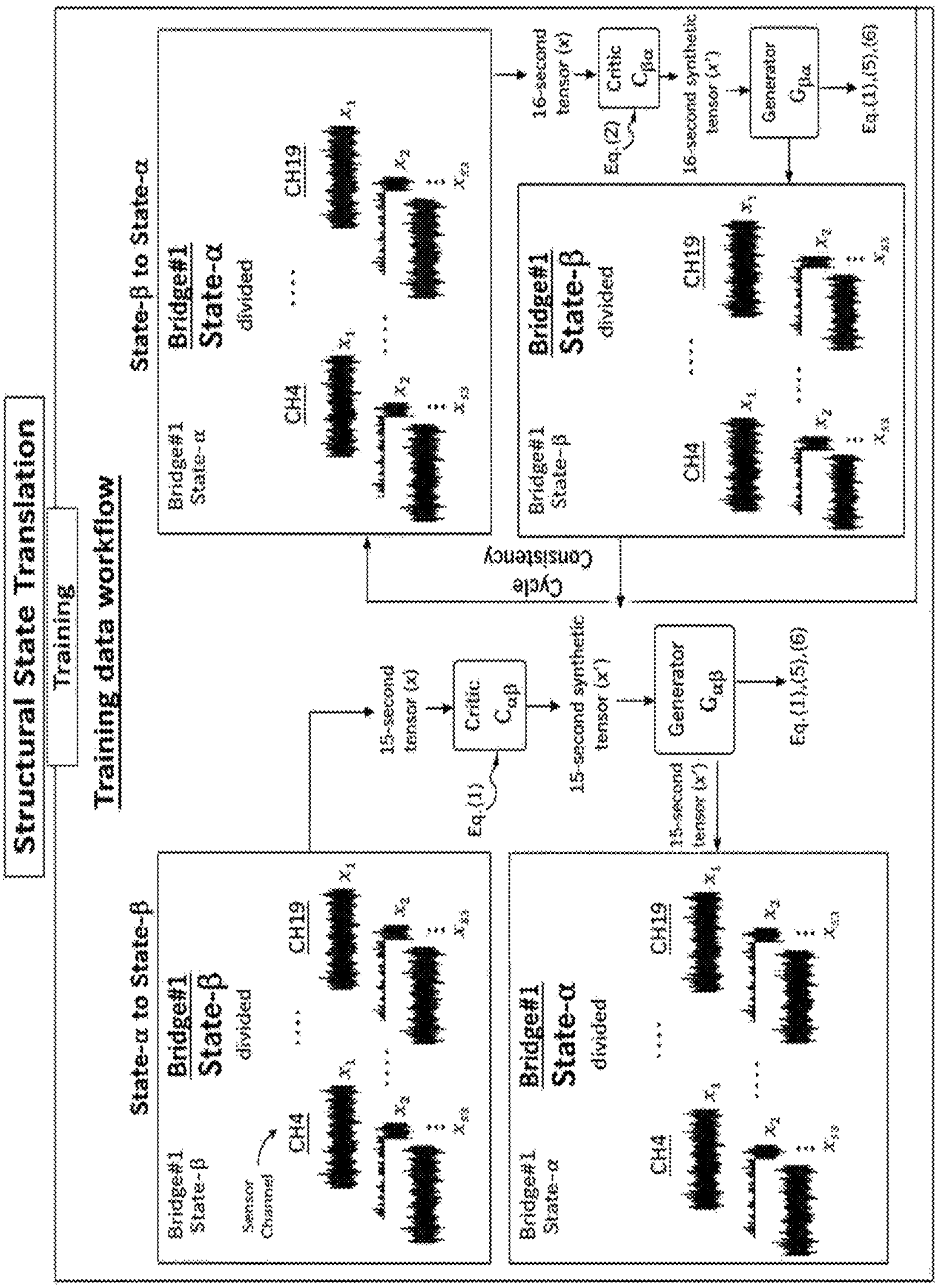
FIG. 53 is an exemplary diagram illustrating a training data workflow of a DGCG model, according to an embodiment of the present disclosure.

As shown in FIG. 52, the DGCG architecture of the structural health monitoring system may comprise at least one generator and/or at least one critic network (e.g., critic may be a discriminator in the vanilla Generative Adversarial Networks—GAN), where the at least one generator and/or critic may consist of mapping networks. In addition, in an embodiment, the DGCG architecture may also be built on the CycleGAN architecture, where at least one GAN network may train iteratively in a cycle-consistent fashion. FIG. 53, depicts a training of the DGCG architecture, according to an embodiment of the present disclosure. Furthermore, in this embodiment, the DGCG architecture of the structural health monitoring system may also comprise a Wasserstein distance with gradient penalty in the objective function of the at least one critic (e.g., a discriminator). For instance, as known in the art, a comparative analysis was conducted which revealed the success of implementing Wasserstein distance in CycleGAN (CycleWGAN) and additionally using gradient penalty (CycleWGAN-GP), compared to regular CycleGAN. Additionally, in some embodiments, the DGCG architecture may be configured to remove at least one residual block from the latent space. Moreover, in some embodiments, the DGCG architecture may be configured to separate the mapping networks and/or position them within the encoders and/or decoders to optimize the SST of the structural health monitoring system.

Additionally, as shown in FIG. 52, in an embodiment, the structural health monitoring system may comprise at least one mapping network, which may consist of a GLU, such that the structural health monitoring system may be configured to learn the broader features via linear operation in the data as compared to nearby features (i.e., convolution operation) of the at least one civil structure. When working on image-based applications, the convolution operations of the structural health monitoring system may be more advantageous as they inform the model about the vicinity of the interested pixel. In addition, in this embodiment, the structural health monitoring system may also comprise at least one linear transformation operation which may be integrated in to the DGCG architecture. As such, using linear transformation operations may be more beneficial for learning the signal-based data structures as the linear transformation operations may provide information about the broader features of the data. Furthermore, the DGCG architecture of the structural health monitoring system may comprise at least one skip connection (with adding), such that the at least one skip connection may be employed in at least one mapping network and/or at least one generator. In addition, a Mish activation function may also be integrated within the at least one generator and/or critic. However, in GLUs used within the at least one mapping network, a sigmoid may be employed as the activation function. Moreover, as shown in FIG. 52, and for example in TABLE 8 (as provided below in Example 3), in this embodiment, at the end of the generator, the Tanh function may be used by the structural health monitoring system. In this manner, it may be observed that using mapping networks, including at least one GLU, skip connection, and/or Mish activation function, optimized the DGCG model significantly during the training, where the vanishing gradient problem was significantly diminished, which is a significant challenge in the DL field. As a result, information that could be learned from the data during the training of DGCG is maximized.

As mentioned previously, in an embodiment, the DGCG architecture of the structural health monitoring system may be built based on CycleGAN, using Wasserstein distance and gradient penalty, such that the structural health monitoring system may be configured to learn the domain invariant representation between at least two source domains $$\left(\text{e.g., } D_{State-\alpha}^{Bridge\#1} \text{ and } D_{State-\beta}^{Bridge\#1}\right).$$

As such, the learning may be carried out in a cycle-consistent manner, where the architecture may be iteratively trained on multi-domains to decrease the discrepancy in the representations between domains in a particular feature space to be domain-invariant. In this manner, in this embodiment, by utilizing iterative training, the structural health monitoring system may be enabled to generalize and/or transfer its knowledge to the other unseen domains.

FIG. 53 depicts the DGCG architecture's training data workflow according to an embodiment of the present disclosure, which may be followed along with the equations presented below. As such, in an embodiment, each loss function used during the training is presented in Eq. (18) to Eq. (23). For example, for the State-α to State-β training flow, Eq. (18) may be configured enforced to train the critic $C_{\alpha\beta}$, where $C_{\alpha\beta}$ receives the at least one actual predetermined timed tensor x from $$D_{State-\beta}^{Bridge\#1}$$

and at least one synthetic predetermined timed tensor x' generated by $G_{\alpha\beta}$. The Wasserstein distance of the outputs of $C_{\alpha\beta}$ may then computed with a gradient penalty function, where the mean squared distance via the L2 norm of the multiplication of the respective gradients of x' and the output from $C_{\alpha\beta}$ on x' may be calculated. Eq. (20) may be configured to enforce the training of the generator $G_{\alpha\beta}$, which may be based on the minimization of the output received from the corresponding critic $C_{\alpha\beta}$. Eq. (22) may enforce the cycle-consistency between two different state domains. For example, when the at least one actual predetermined timed tensor x from $$D_{State-\alpha}^{Bridge\#1}$$

is translated by $G_{\alpha\beta}$ to the at least one synthetic predetermined timed tensor x', the at least one translated tensor x' should be the same as the original tensor after it is translated back by $G_{\beta\alpha}$ to the at least one actual predetermined timed tensor x, which is belonging to $$D^{Bridge\#1}_{State-\alpha}.$$

Similarly, in this example, for the other way around, when the at least one actual predetermined timed tensor x from $$D^{Bridge\#1}_{State-\beta}$$

is translated by $G_{\beta\alpha}$ to the at least one synthetic predetermined timed tensor x the at least one translated tensor x' should be the same as the original tensor after it is translated back by $G_{\alpha\beta}$ to at least one predetermined timed tensor x, which is belonging to $$D^{Bridge\#1}_{State-\beta}.$$

Eq. (23) may be used to enforce the identity loss function. This function defines that when $G_{\alpha\beta}$ receives the at least one actual predetermined timed tensor x from the at least one domain $$\left(e.g., D^{Bridge\#1}_{State-\beta}\right),$$

it should output the same tensor x since $G_{\alpha\beta}$ already knows how to generate at least one tensor belonging the at least one domain $$\left(e.g., D^{Bridge\#1}_{State-\beta}\right).$$

In this embodiment, the same statement may also be true the other way around, for example, for the State-β to State-α process. Note that in Eq. (23), L1 distance may be used. Additionally, for example, the procedure executed in Eq. (18) and Eq. (20) for State-α to State-β may also be implemented the other way around by enforcing Eq. (19) and Eq. (21) to achieve State-β to State-α. The lambda parameters (λ) used in the Eq. (18), Eq. (19) and Eq. (25), for optional weight adjustments are given in TABLE 8 (as provided below in Example 3). Finally, in this embodiment the DGCG model may be trained iteratively based on the minimization of total critic losses Eq. (24) and total generator losses Eq. (25) using the AdamW optimizer.

$$\text{Adversarial Critic Loss} = \mathcal{L}^{C_{\alpha\beta}}_{DGCG}(G_{\alpha\beta}, C_{\alpha\beta}) = \mathbb{E}_{x\sim\mathbb{P}(X)}[C_{\alpha\beta}(x)] - \mathbb{E}_{x\sim\mathbb{P}(X)}[C_{\alpha\beta}(G_{\alpha\beta}(x)] + (\lambda_{GP})\mathbb{E}_{x'\sim\mathbb{P}(X')}\left[(\|\nabla_{x'}C_{\alpha\beta}(x')\|_2 - 1)^2\right] \quad (18)$$

$$\text{Adversarial Critic Loss} = \mathcal{L}^{C_{\beta\alpha}}_{DGCG}(G_{\beta\alpha}, C_{\beta\alpha}) = \mathbb{E}_{x\sim\mathbb{P}(X)}[C_{\beta\alpha}(x)] - \mathbb{E}_{x\sim\mathbb{P}(X)}[C_{\beta\alpha}(G_{\beta\alpha}(x))] + (\lambda_{GP})\mathbb{E}_{x'\sim\mathbb{P}(X')}\left[(\|\nabla_{x'}C_{\beta\alpha}(x')\|_2 - 1)^2\right] \quad (19)$$

$$\text{Adversarial Generator Loss} = \mathcal{L}^{G_{\alpha\beta}}_{DGCG}(G_{\alpha\beta}, C_{\alpha\beta}) = -\mathbb{E}_{x\sim\mathbb{P}(X)}[C_{\alpha\beta}(G_{\alpha\beta}(x))] \quad (20)$$

-continued $$\text{Adversarial Generator Loss} = \mathcal{L}^{G_{\beta\alpha}}_{DGCG}(G_{\beta\alpha}, C_{\beta\alpha}) = -\mathbb{E}_{x\sim\mathbb{P}(X)}[C_{\beta\alpha}(G_{\beta\alpha}(x))] \quad (21)$$

$$\text{Cycle Consistency Loss} = \mathcal{L}^{Cyc}_{DGCG}(G_{\alpha\beta}, G_{\beta\alpha}) = \mathbb{E}_{x\sim\mathbb{P}(X)}[|G_{\beta\alpha}(G_{\alpha\beta}(x)) - x|_1] + \mathbb{E}_{x\sim\mathbb{P}(X)}[|G_{\alpha\beta}(G_{\beta\alpha}(x)) - x|_1] \quad (22)$$

$$\text{Identity Loss} = \mathcal{L}^{Id}_{DGCG}(G_{\alpha\beta}, G_{\beta\alpha}) = \mathbb{E}_{x\sim\mathbb{P}(X)}[|G_{\alpha\beta}(x) - x|_1] + \mathbb{E}_{x\sim\mathbb{P}(X)}[|G_{\beta\alpha}(x) - x|_1] \quad (23)$$

$$\text{Total Critic Losses} = \mathcal{L}^{C_{\alpha\beta}}_{DGCG}(G_{\alpha\beta}, C_{\alpha\beta}) + \mathcal{L}^{C_{\beta\alpha}}_{DGCG}(G_{\beta\alpha}, C_{\beta\alpha}) \quad (24)$$

$$\text{Total Generator Losses} = \mathcal{L}^{G_{\alpha\beta}}_{DGCG}(G_{\alpha\beta}, C_{\alpha\beta}) + \mathcal{L}^{G_{\beta\alpha}}_{DGCG}(G_{\beta\alpha}, C_{\beta\alpha}) + \mathcal{L}^{Cyc}_{DGCG}(G_{\alpha\beta}, G_{\beta\alpha})\lambda_{Cyc} + \mathcal{L}^{Id}_{DGCG}(G_{\alpha\beta}, G_{\beta\alpha})\lambda_{Id} \quad (25)$$

As known in the art, Fréchet Inception Distance (hereinafter "FID") is one of the most used indices for evaluating GANs for image-based applications. Nevertheless, it is found that the FID is not quite sufficient for evaluating GAN for civil SHM applications since FID essentially considers the mean and variance values of the input data as shown in Eq. (26), where μ is the mean, C is the covariance, and subscript x denotes the original and subscript x' denotes the generated data (or translated—synthetic) (e.g., Eq. 26). Moreover, the acceleration response signals collected from civil structures, on the other hand, mean values of them are zero, and the variance remains mainly similar. Additionally, as known in the art, a significant disadvantage of FID for similarity comparison is that it is intuitively challenging to understand the high or low FID value, as there are no upper or lower boundaries. On the other hand, analyzing the similarity between original and generated data in the frequency domain is more valuable as data analysis practices for SHM damage diagnosis and prognosis applications are critical and prevalent in the frequency domain. Therefore, in an embodiment, the DGCG architecture of the structural health monitoring system may comprise a new indicator, Mean Magnitude-Squared Coherence (hereinafter MMSC), which is presented below in Eq. (28)

$$FID(x, x') = \|\mu_x - \mu_{x'}\|_2^2 + Tr\left(C_x + C_{x'} - 2(C_x C_{x'})^{1/2}\right) \quad (26)$$

In an embodiment, the MMSC may be used to track the similarities of the original data x and generated data x' in their corresponding frequency domains. As such, in Eq. (27), $S_{xx'}$ represents the cross-spectral density estimate, and $S_{xx}$ and $S_{x'x'}$ represent the power spectral density estimates of the original and the synthetic data, respectively. Following the computation of Magnitude-Squared Coherence (MSC) values of original and generated data in Eq. (27), the resulting n amount of MSC values may then be averaged to give a single representative mean score as shown in Eq. (28). In this manner, the processor of the structural health monitoring system may be configured to denote the mean score as the similarity of two data to each other in the frequency domain. Consequently, in this embodiment, when the generated data is exactly the same as the original data in the frequency domain, the MMSC value may be a predetermined value for similarity (e.g., "1"), and when they are exactly dissimilar, the MMSC value may be a predetermined value for dissimilarity (e.g., "0"). The MSC and MMSC equations are provided below:

$$MSC(x, x') = \left[\frac{|S_{xx'}|^2}{S_{xx} \times S_{x'x'}}\right] \tag{27}$$

$$MMSC(x, x') = \frac{\sum_{i=1}^{n} MSC(x, x')_i}{n} \tag{28}$$

Figure 54:
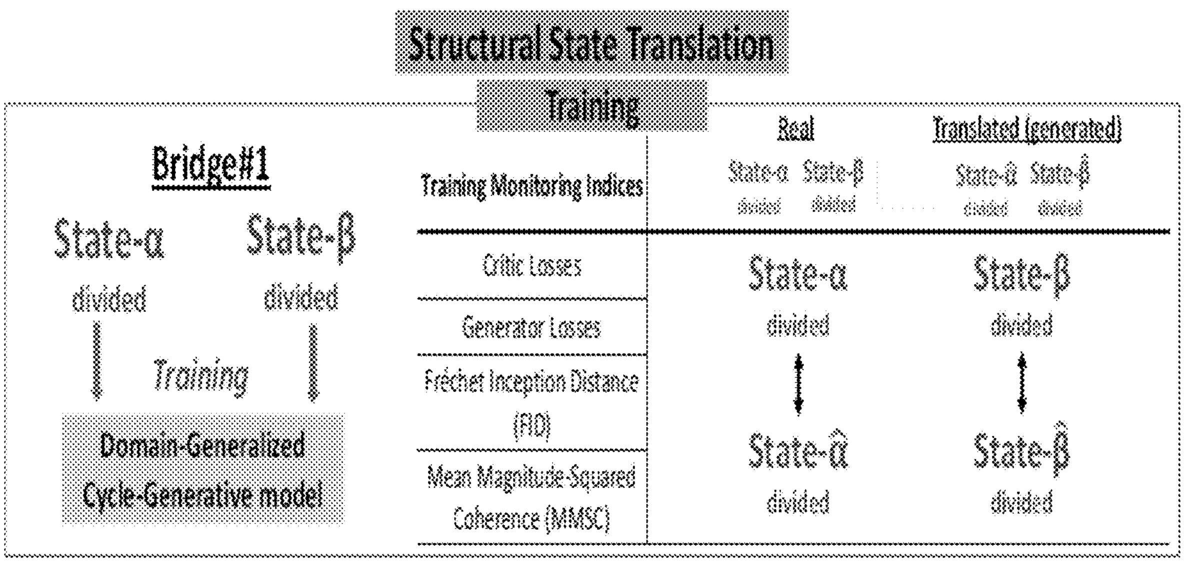
FIG. 54 is an exemplary diagram illustrating a training procedure of a SST framework, according to an embodiment of the present disclosure.

In addition, in an embodiment, the total critic and generator losses, FID, and/or MMSC values may be monitored, via the processor of the structural health monitoring system, to track the learning of the DGCG model. In other words, as shown in FIG. 54, in this embodiment, the critic losses and/or the generator losses and FID and MMSC values of the at least one predetermined timed tensor (e.g., actual and/or synthetic) in State-α divided $$\left(D_{State-\alpha}^{Bridge\#1}\right)$$

between State-$\hat{\alpha}$ divided $$\left(D_{State-\hat{\alpha}}^{Bridge\#1}\right)$$

and State-β divided $$\left(D_{State-\beta}^{Bridge\#1}\right)$$

between State-$\hat{\beta}$ divided $$\left(D_{State-\hat{\beta}}^{Bridge\#1}\right)$$

may be calculated.

Figure 56:
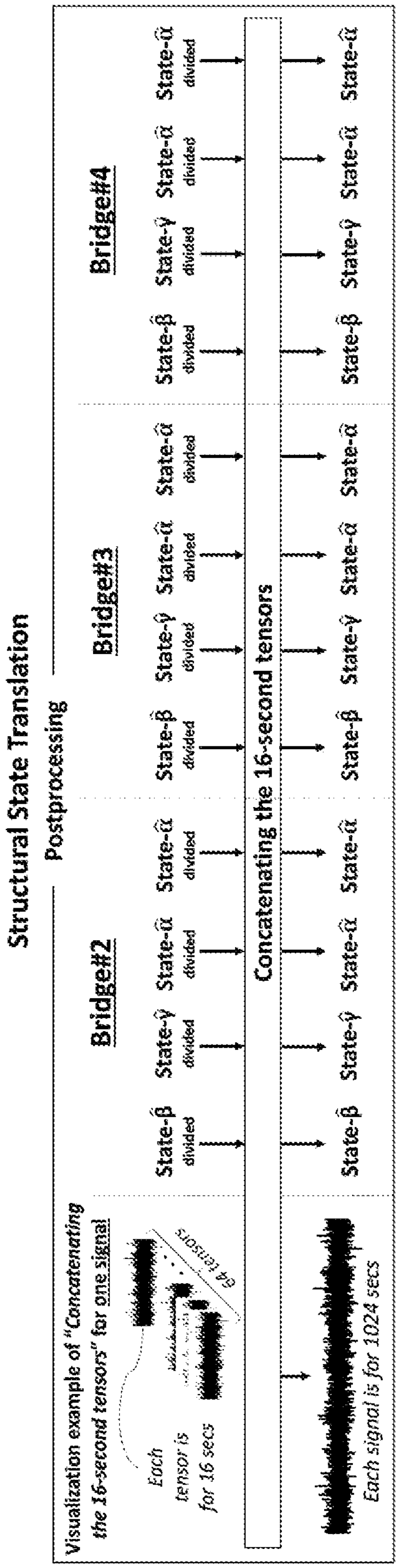
FIG. 56 is an exemplary diagram illustrating a postprocessing phase of a SST framework, according to an embodiment of the present disclosure.

After the Translation phase, in an embodiment, the structural health monitoring system may activate the Postprocessing phase. As such, in this embodiment, the Postprocessing phase may comprise the reverse process of Preprocessing phase, such that the structural health monitoring system may implement the Postprocessing phase. Essentially, the at least one translated predetermined time tensor (e.g., actual and/or synthetic) in the at least one domain of each structural state (e.g., State-$\hat{\alpha}$ divided, State-$\hat{\beta}$ divided, and State-$\hat{\gamma}$ divided), are concatenated to generate the at least one signal response (i.e., sensorial data) per the at least one sensor for each state (i.e., connection) of each bridge. FIG. 56 depicts the preprocessing phase, according to an embodiment of the present disclosure.

Accordingly, as known in the art, the implementation of SHM practices in every civil structure can be costly and impractical. Population-based SHM (PBSHM), a newly emerging research area, aims to increase the availability of physics and data-driven information on one set of civil structures based on the knowledge of other similar populations of civil structures.

In this manner, the structural health monitoring system, as described herein aims to estimate the response data of different civil structures based on the information obtained from a dissimilar structure. As such, in an embodiment, first, the Domain-Generalized Cycle-Generative (hereinafter DGCG) architecture may be trained to learn the domain-invariant representation in the acceleration datasets obtained from a at least one civil structure (e.g., Bridge #1) that may be in at least one two different structural states (e.g., State-α and State-β). Then, the model may be tested on at least one alternative civil structure to translate the at least one alternative civil structure that may be in at least one structural state (e.g., State-α to State-β, State-β to State-α, State-α to State-γ, and State-γ to State-α where State-α is the pristine condition, State-β and State-γ are the removal of bottom chords from symmetric locations of the bridge, respectively). Since State-β and State-γ are structurally symmetrical, in this embodiment, the translated State-$\hat{\beta}$ from State-α and/or the translated State-$\hat{\gamma}$ from State-α or vice versa may be expected to be the same in terms of their structural parameters. Essentially, after the training of the DGCG model with at least one source domain (e.g. State-α and/or State-β) of the at least one civil structure, the structural health monitoring system, via the DGCG architecture, may be configured to generalize and transfer its knowledge (the "domain-invariant representation") to the at least one alternative civil structure (e.g., Bridge #2, Bridge #3, Bridge #4) (e.g. unseen target data), which may be structurally dissimilar.

Next, in this embodiment, the SST process for each translation scenario may then be evaluated using MMSC, a measure of similarity between signal pairs in the frequency domain, and/or modal identifiers of each actual and translated state of the at least one alternative bridge (e.g., Bridge #2, Bridge #3, and Bridge #4). As such, the MMSC values may be configured to reveal that the translated bridge states are extremely similar to the at least one actual domain state or are not extremely similar to the at least one actual domain state. For example, the lowest and highest average MMSC values obtained from the bridge states comparison may be 91.2% and 97.1%, respectively, showing that the MMSC value and the at least one actual domain state are very similar. Additionally, the structural health monitoring system may be configured to determine significant similarity via observing between the natural frequencies and mode shapes of each actual and translated domain state of the at least one civil structure and the at least one alternative civil structure. Hence, for example, the highest and the lowest difference in natural frequencies among the modes of the at least one civil structure domain state and the at least one alternative civil structure domain states may be, respectively, 5.71% and 0%, while the highest and lowest MAC values are 0.998 and 0.870.

The structural health monitoring system may allow for the proactive management of the life cycle of structures. Thus, the implementation of this system may facilitate an extensive condition assessment by analyzing the future dynamic response data parametrically or nonparametrically to make more accurate predictions on the remaining useful life of structures.

The following examples are provided for the purpose of exemplification and are not intended to be limiting.

EXAMPLES

Example 1

Undamaged-to-Damaged Acceleration Response Translation for SMH

FIG. 3 depicts the vibration dataset used in this work obtained from a steel frame. In an embodiment, a steel frame comprises thirty (30) accelerometers at thirty (30) joints. In addition, a modal shaker excitation is applied to the structure and consequently, creating 1 undamaged and 30 damaged scenarios. Each joint is separated by loosening the bolts at the steel connections between filler beams and girders. Accordingly, in this embodiment, a 1024 Hz sampling rate is applied, and 256 seconds of vibration data is collected with a total sample of 256×1024=262,144 from each accelerometer channel dedicated to a joint.

As such, in this embodiment, two sample sizes are used 1024 and 262,144. The $M_1$ generates data that has 1024 samples which is also the used batch size in the $M_1$. In order for $M_2$ to use the training tensors and generated tensors together, 1024 sizes of tensors are created by batching randomly from the one single 262,144 vibration dataset which is $[a_{11}]_{256}$. Moreover, the produced tensors from the $M_1$ are generated randomly because the input, $[a_{11}]_{256}$ of $M_1$ is batched sampled in shuffle mode during the training.

Additionally, as shown in FIG. 3, in conjunction with FIGS. 12-17, in an embodiment, the processor of the computing device may be configured to generate datasets for nonparametric damaged diagnostics for civil structures via the $M_1$ model. In this manner, in this embodiment, first, the processor of the computing device may be configured to input the tensor $[a_{11}]_1$ in the $M_1$ in order to generate the synthetic datasets of $[a_{11f}]_1$. Next, the $[a_{01}]_1$ and $[a_{11}]_1$ may be extracted and/or transmitted to a memory of the computing device within at least one data pool. Subsequently, the tensors may be integrated in $M_2$ as 4:1 ratio for training and testing data for six different scenarios, five of which include potential actual-life cases. For example, Scenario #0 may be used for benchmarking purposes, no synthetic data may be incorporated into Scenario #0, while only actual tensors are used. To represent Scenario #0, $60[a_{01}]_1$ and 60 $[a_{11}]_1$ for training and $15[a_{01}]_1$ and $15[a_{11}]_1$ tensors may be used for testing. In Scenario #1-Scenario #5, actual undamaged tensors may be used for both training and testing. Furthermore, a different amount of synthetic tensor augmentations is implemented for damaged datasets along with the actual ones for training and testing, for each specific scenario (e.g., Scenario #1-Scenario #5). To represent the $60[a_{01}]_1$ and gradually changing dataset sizes of $[a_{11}]_1$ from 10 to 50 and along with gradually changing dataset sizes of $[a_{11f}]_1$ from 50 to 10 for training, as depicted in FIG. 3.

Each scenario presented in FIG. 3, from Scenario #1 to Scenario #5, depicts that the sample in the damaged dataset is very scarce for a particular damage case. This could be associated to a delamination in the girder of a multi-span bridge. For instance, single channel vibration datasets were previously collected on the first 6 spans (among 18 spans) of a bridge. It is known that the first 5 spans contain undamaged features, and the $6^{th}$ span contains damage features in the dataset. The dataset suffers from class imbalance due to data scarcity (5 undamaged and 1 damaged datasets among a total of 6 datasets corresponding to 6 spans).

Figure 4:
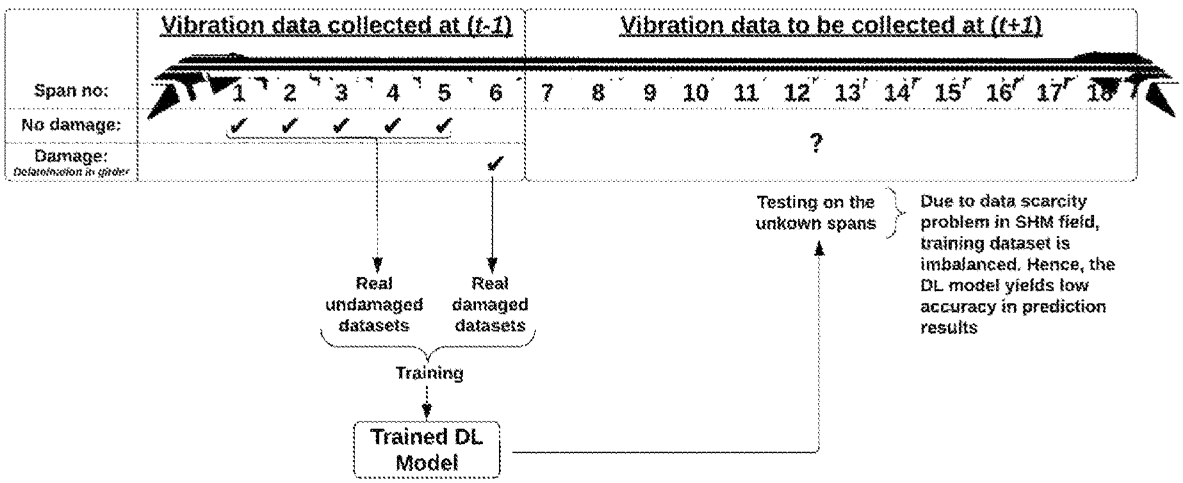
FIG. 4 is a perspective view of a vibration-based damage diagnostic, according to an embodiment of the present disclosure.
Figure 5:
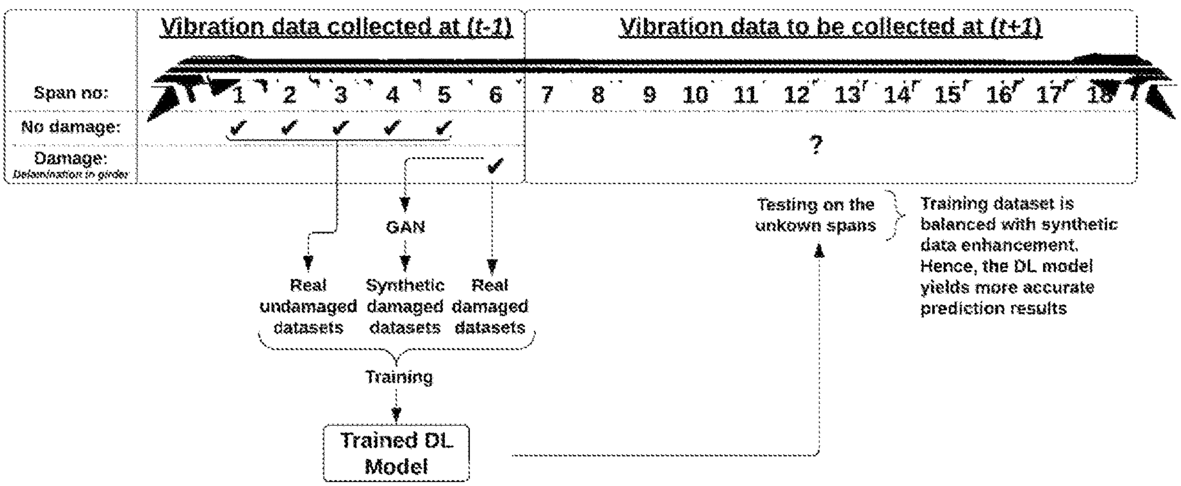
FIG. 5 is a perspective view of a GAN augmented vibration-based damage diagnostic, according to an embodiment of the present disclosure.

FIG. 4 illustrates the vibration-based damage diagnostics via DL model, according to an embodiment of the present disclosure, and FIG. 5 illustrates the GAN augmented vibration-based damage diagnostics via DL model, according to an embodiment of the present disclosure. In fact, Scenario #1-Scenario #5, as shown in FIG. 3, describe augmenting the actual damaged data with different ratios of synthetic damaged data. The introduction of the various scenarios demonstrates the effect of the augmentation in the training dataset and the subsequent impact on the prediction results by the $M_2$.

Moreover, in an embodiment, as shown in FIGS. 12-17, starting with a first scenario, the regression and classification metrics show that model predicts with 100% CA, 1.00 AP, and $4.7\times10^{-3}$ MAE. The model yields consistent results on every tensor with no inaccurate classification. In these embodiments, Scenario #0 (no synthetic tensor is involved in) was created as a "reference" scenario for benchmarking purposes. For the rest of the scenarios, from Scenario #1 to Scenario #5, the inclusion ratio of number of synthetic tensors in the damage test dataset gradually decreased. This change slightly impacted the classification results.

Firstly, the corresponding scenarios in FIGS. 13-17 includes one incorrect prediction on different tensors that are circled in red color. While the $M_2$ is more confident on its predictions in Scenario #1, Scenario #2, and Scenario #3, for the Scenario #4 and Scenario #5 it remains uncertain on few tensors. In some embodiments, the incorrect predictions caused the MAE metric to increase about 6.5 times from $4.7\times10^{-3}$ to $0.3\times10^{-1}$ ranges when comparing the Scenario #0 to other scenarios. The predictions of $M_2$ include more errors for the other scenarios than the reference scenario. Having one incorrect prediction caused the CA score to decrease from 100% to 97%, while the AP score decreased from 1.00 to 0.97 only for Scenario #1 and Scenario #2.

Additionally, the change in AP score is essentially the result of high confidence of the model on the data for Scenario #1 and Scenario #2. Since the model is very sure of its predictions, the AP score always contains one incorrect prediction at every threshold value unless threshold is selected very close to 0 or 1. Furthermore, the inclusion of synthetic tensors slightly changed the MAE metric, while the CA and AP metrics experienced negligible amount of decreases which is critical for the vibration-based damage detection. The classification metric is more used for the level-1 damage diagnostics (damage detection) and the error metrics can be more beneficial for the level-2 damage diagnostics (damage quantification) since the damage quantification is carried out based on the errors. Hence, considering one incorrect prediction out of 30 predictions for the Scenario #1-Scenario #5, the prediction results on the test dataset can be concluded as excellent.

Damage diagnostics on civil structures can be very expensive and time consuming because obtaining vibration dataset that has damage features is challenging. Scarcity of data hinders the use of state-of-the-art data science methods. Particularly, the DL methods perform exceptionally well, however, it requires a large amount of data to operate. Accordingly, while the prediction scores for the synthetically augmented dataset scenarios yielded 97% classification accuracy, for the actual dataset yielded 100% classification accuracy.

Figure 18:
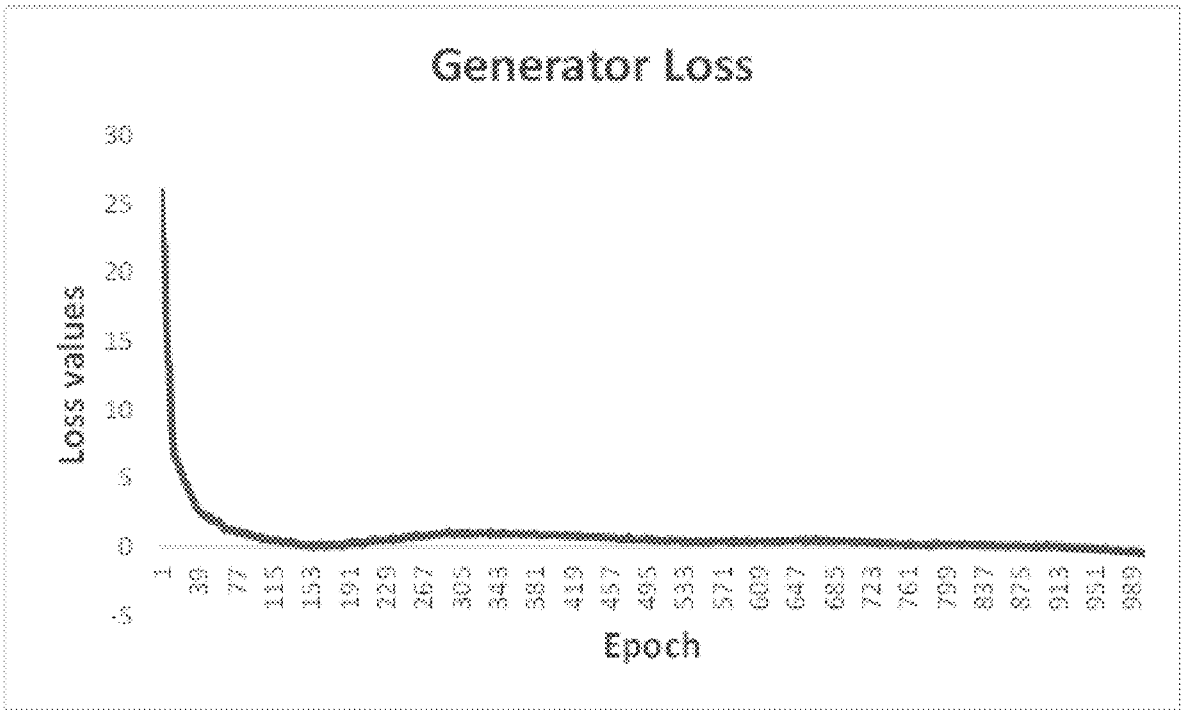
FIG. 18 is a plot illustrating a generator loss of WDC-$C_{YCLE}$GAN-GP, according to an embodiment of the present disclosure.
Figure 19:
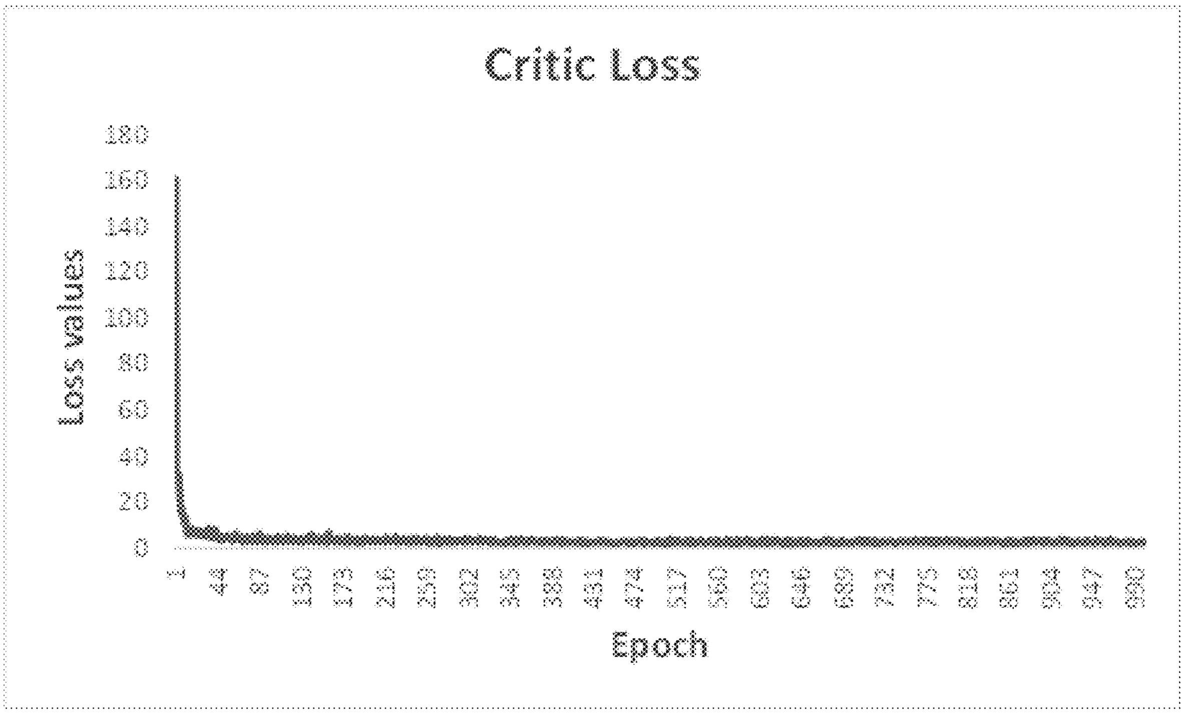
FIG. 19 is a plot illustrating a critic loss of WDC$C_{YCLE}$-GAN-GP, according to an embodiment of the present disclosure.
Figure 20:
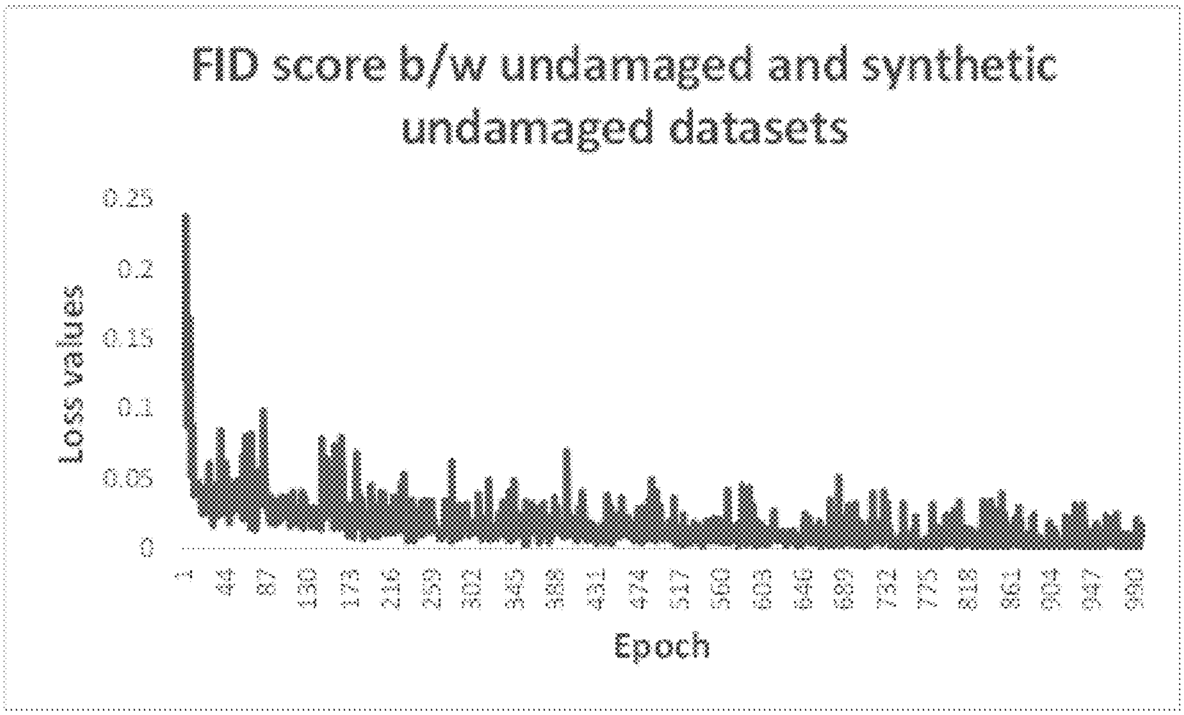
FIG. 20 is a plot of an FID score between an undamaged dataset and a synthetic undamaged dataset, according to an embodiment of the present disclosure.
Figure 21A:
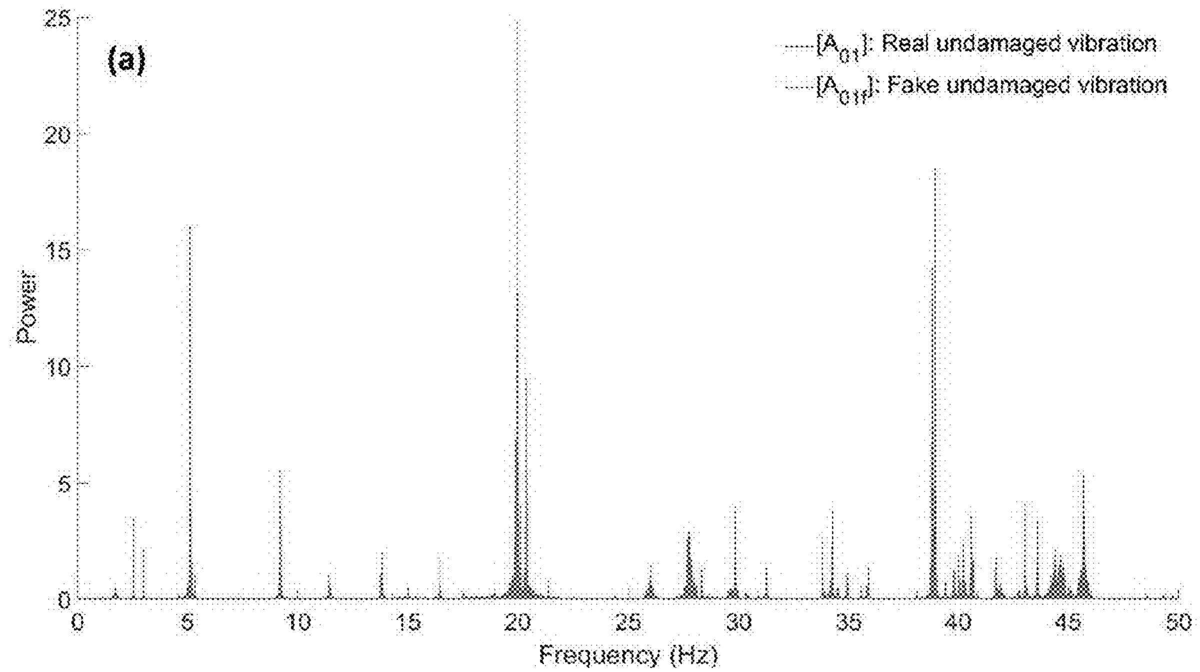
FIG. 21A is a frequency domains of actual vibration tensor in the undamaged domain, $[A_{01}]$, and synthetic (fake) vibration tensor in undamaged domain $[A_{01f}]$, according to an embodiment of the present disclosure.
Figure 21B:
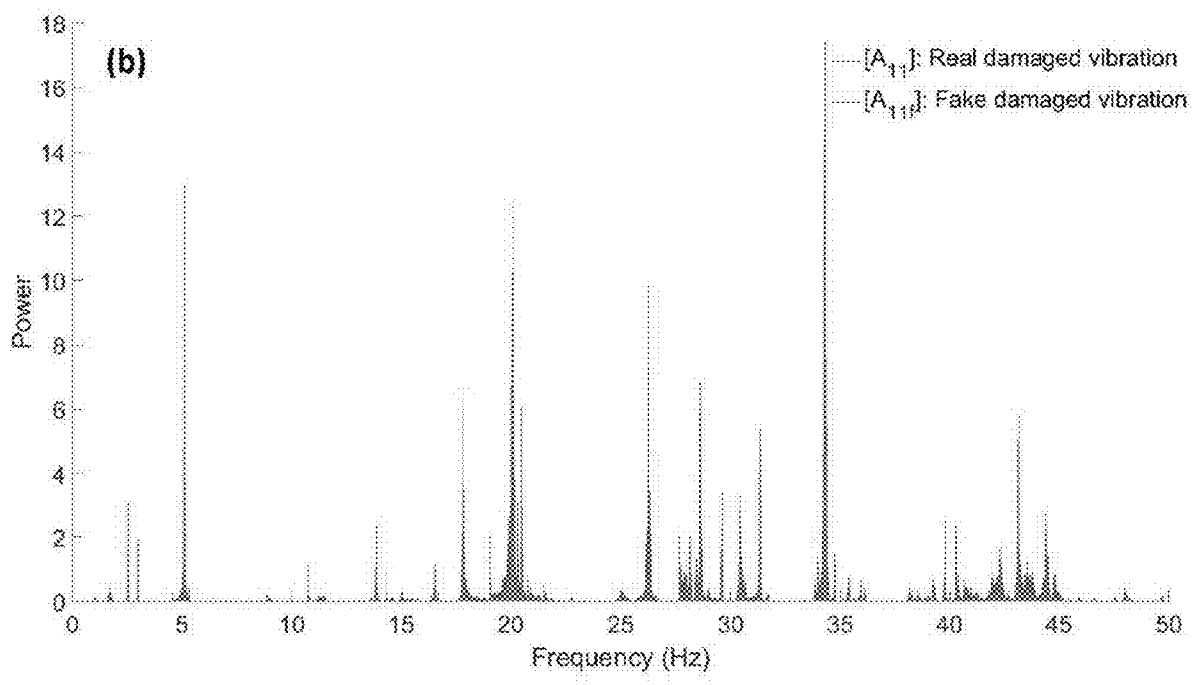
FIG. 21B is a frequency domain of actual vibration tensor in the damaged domain, $[A_{11}]$, and synthetic (fake) vibration tensor in damaged domain $[A_{11f}]$, according to an embodiment of the present disclosure.

In an embodiment, the loss and FID plots may decrease toward zero. Therefore, it can be stated the CycleWDCGAN-GP model is "learning" the mapping between two domains, as depicted in FIGS. 18-20. For instance, a CycleWDCGAN-GP model may be trained for the undamaged and damaged datasets of Joint #1 of the structure, as shown in FIG. 2. In some embodiments, when the model's training is completed, and tested, it may translate the Joint #1's undamaged dynamic response data to damage response data and similarly, damaged dynamic response data to undamaged response data as shown in FIGS. 21A-21B. FIG. 21A depicts the translated (synthetic or fake) undamaged domain ($[A_{01f}]$) from damaged domain has shown very similar properties in frequency domain to the actual undamaged domain ($[A_{01}]$). In this manner, FIG. 21B depicts the translated damaged domain ($[A_{11f}]$) from undamaged domain has shown very similar properties in frequency domain to the actual damaged domain ($[A_{11}]$).

Example 2

Figure 27A:
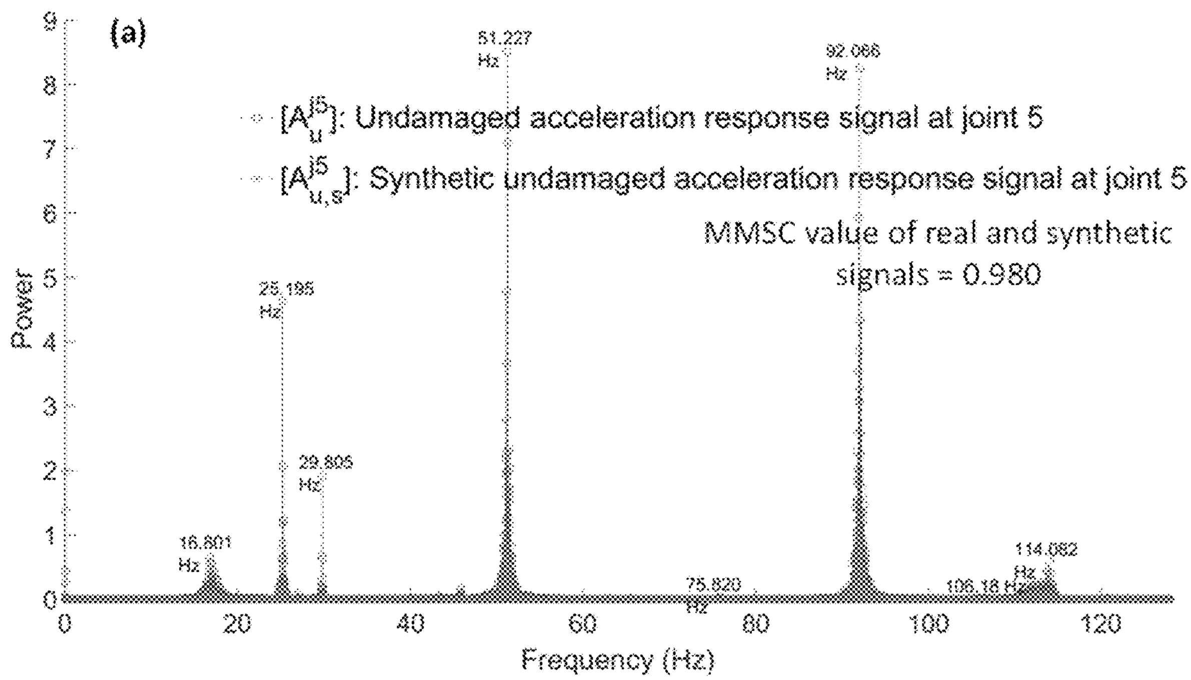
FIG. 27A is a plot illustrating a frequency domain of undamaged and synthetic undamaged acceleration response signals at Joint 5, according to an embodiment of the present disclosure.
Figure 27B:
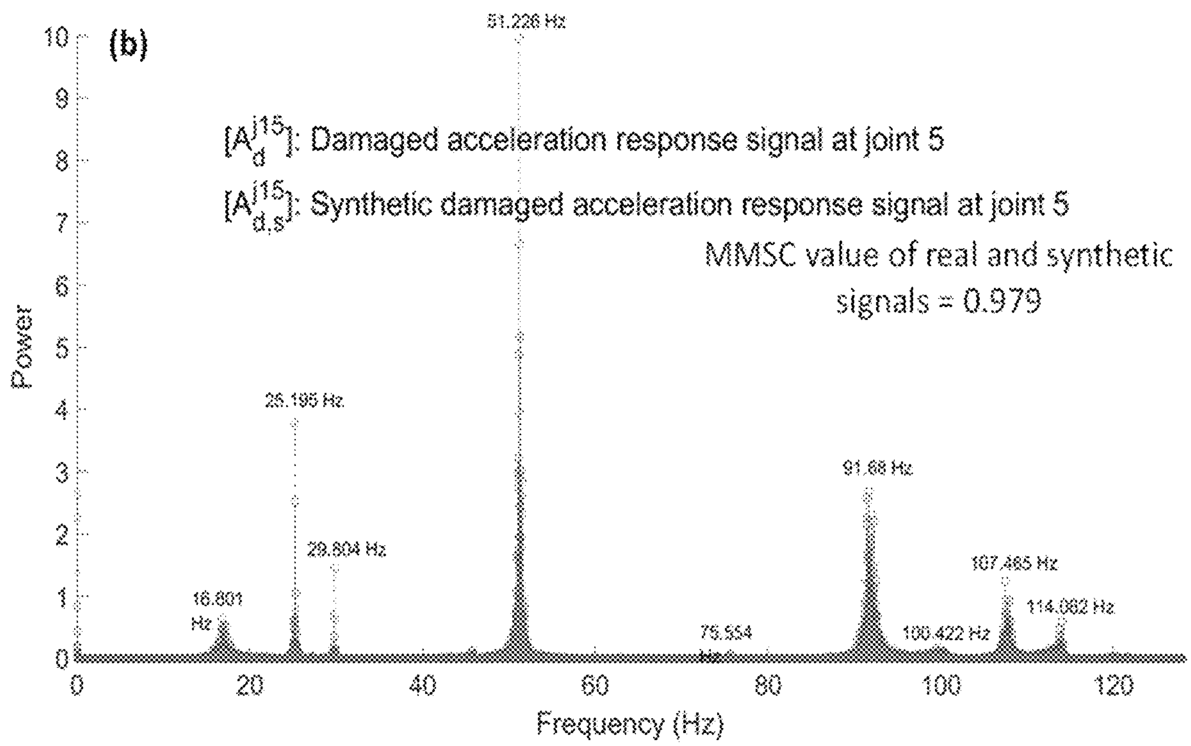
FIG. 27B is a plot illustrating a frequency domain of damaged and synthetic damaged acceleration response signals at Joint 5, according to an embodiment of the present disclosure.
Figure 28A:
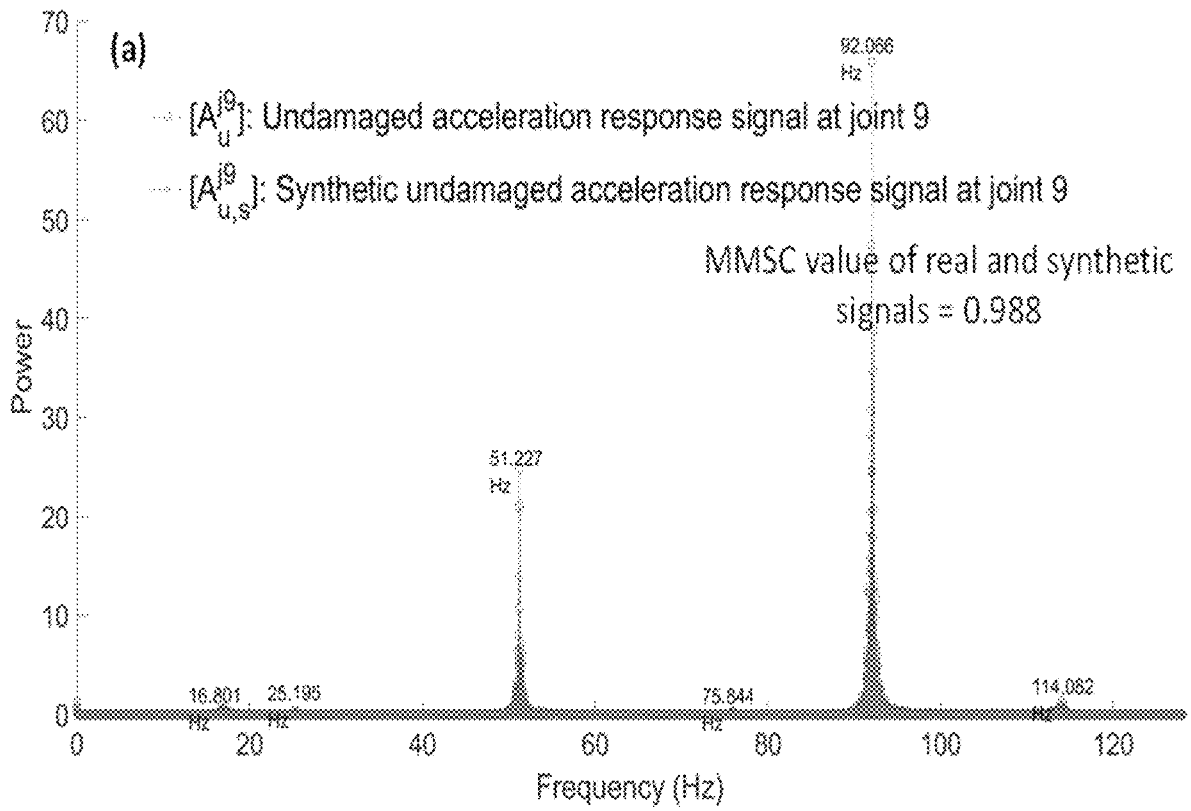
FIG. 28A is a plot illustrating a frequency domain of undamaged and synthetic undamaged acceleration response signals at Joint 9, according to an embodiment of the present disclosure.
Figure 28B:
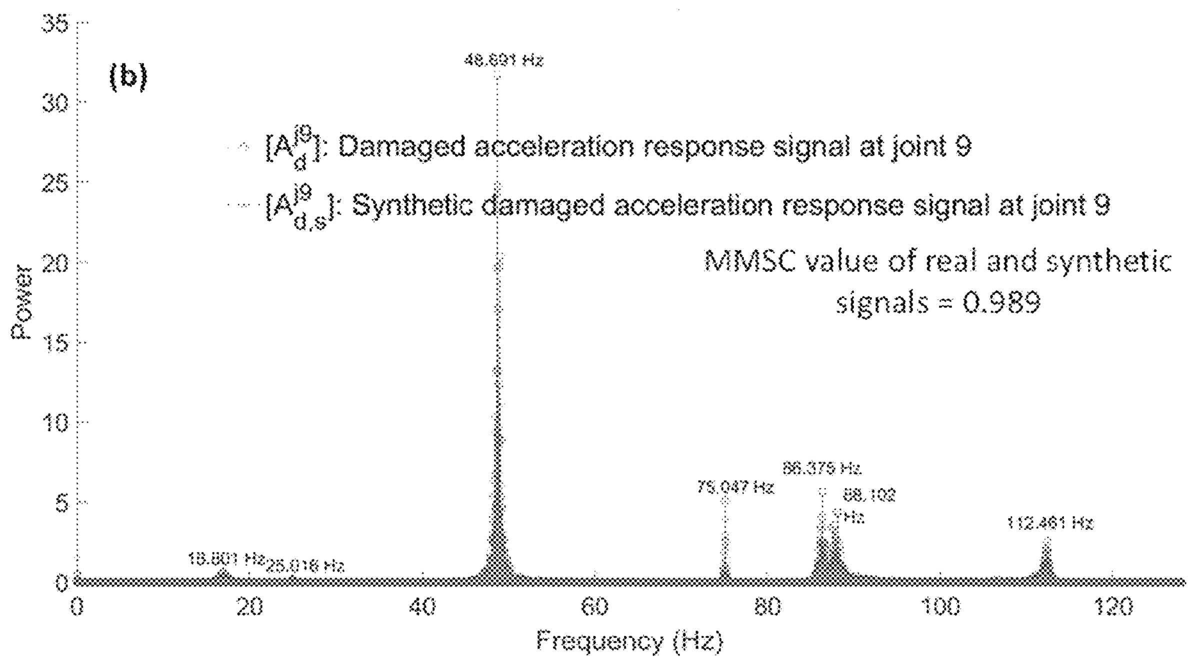
FIG. 28B is a plot illustrating a frequency domain of damaged and synthetic damaged acceleration response signals at Joint 9, according to an embodiment of the present disclosure.
Figure 29A:
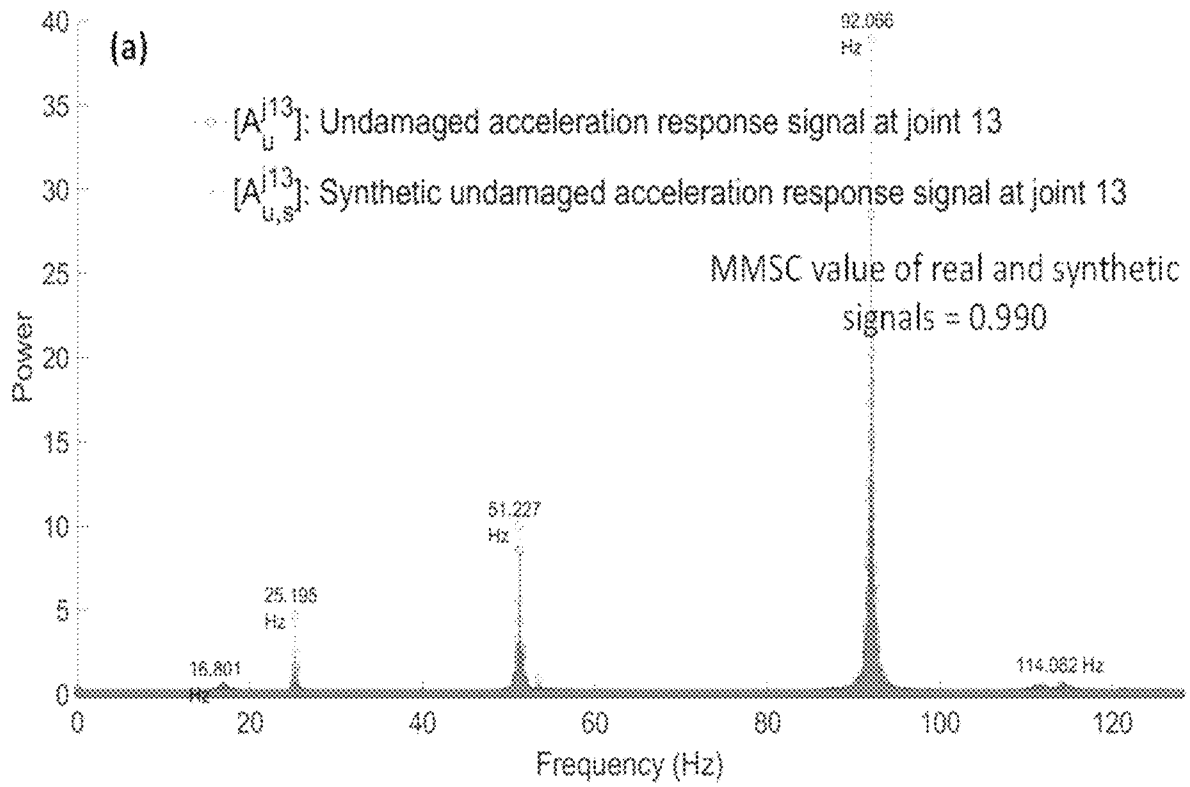
FIG. 29A is a plot illustrating a frequency domain of undamaged and synthetic undamaged acceleration response signals at Joint 13, according to an embodiment of the present disclosure.
Figure 29B:
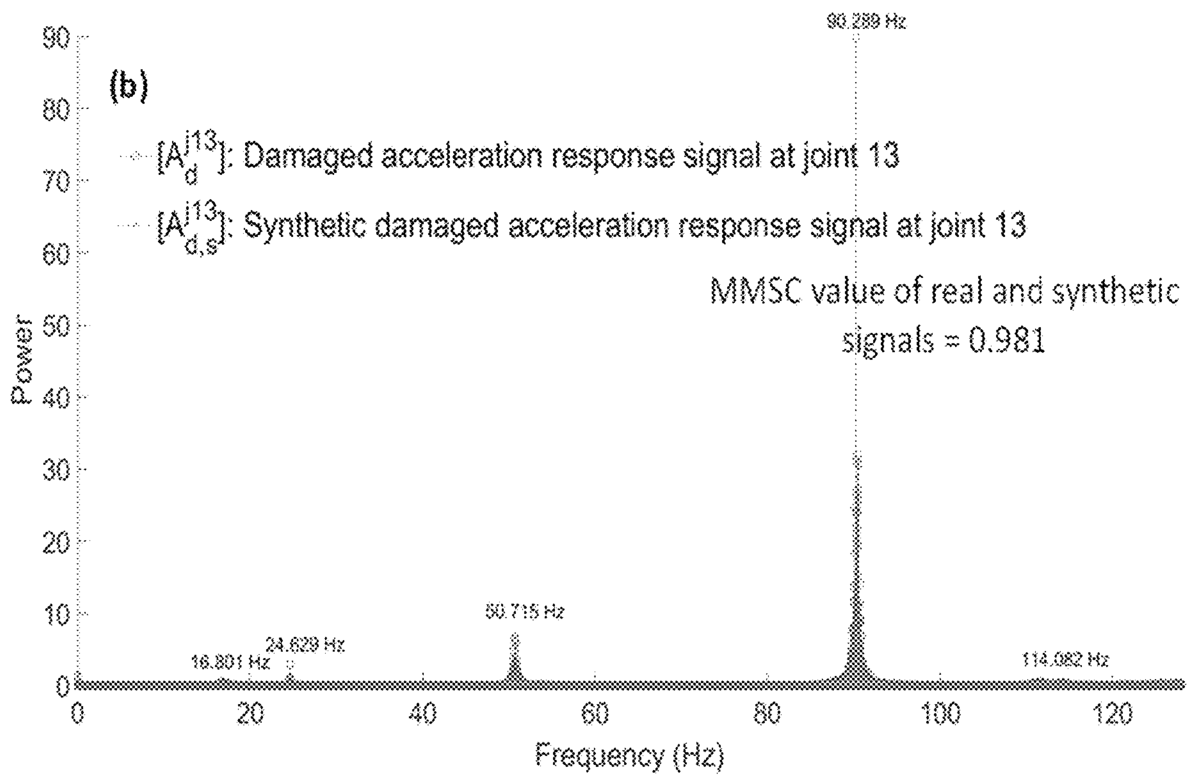
FIG. 29B is a plot illustrating a frequency domain of damaged and synthetic damaged acceleration response signals at Joint 13, according to an embodiment of the present disclosure.
Figure 30A:
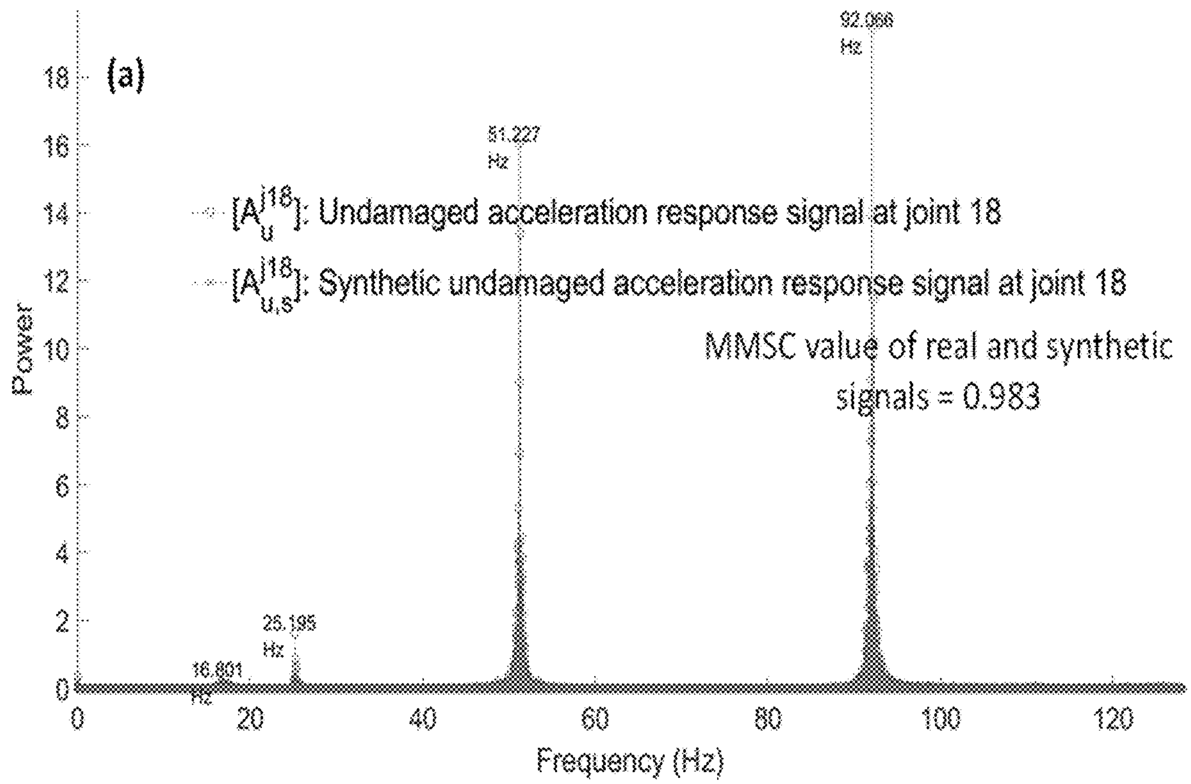
FIG. 30A is a plot illustrating a frequency domain of undamaged and synthetic undamaged acceleration response signals at Joint 18, according to an embodiment of the present disclosure.
Figure 30B:
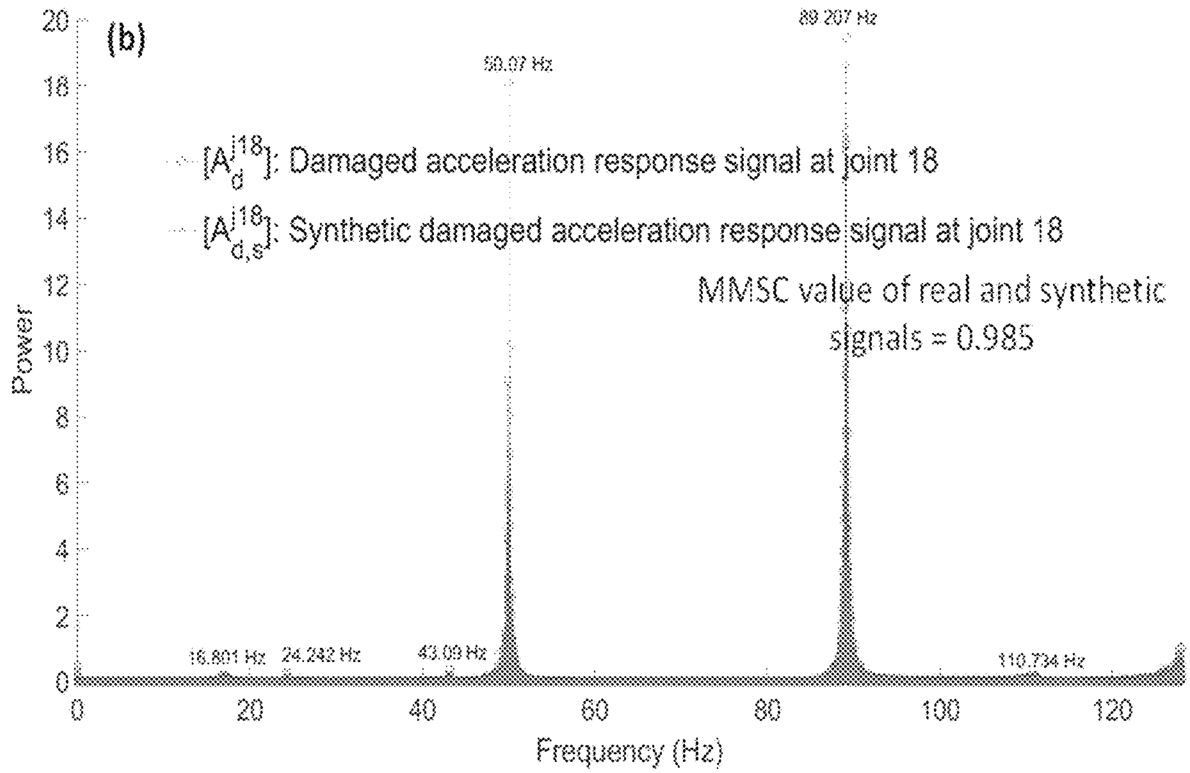
FIG. 30B is a plot illustrating a frequency domain of damaged and synthetic damaged acceleration response signals at Joint 13, according to an embodiment of the present disclosure.
Figure 31A:
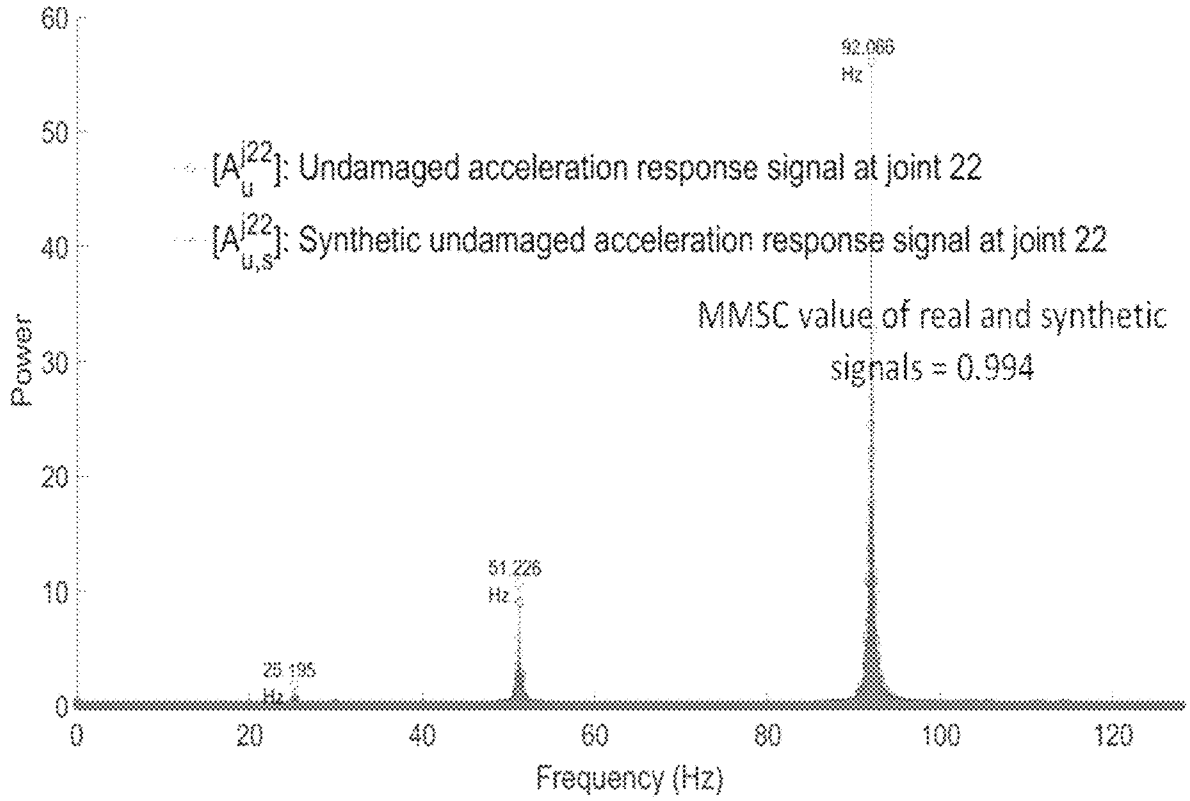
FIG. 31A is a plot illustrating a frequency domain of undamaged and synthetic undamaged acceleration response signals at Joint 22, according to an embodiment of the present disclosure.
Figure 31B:
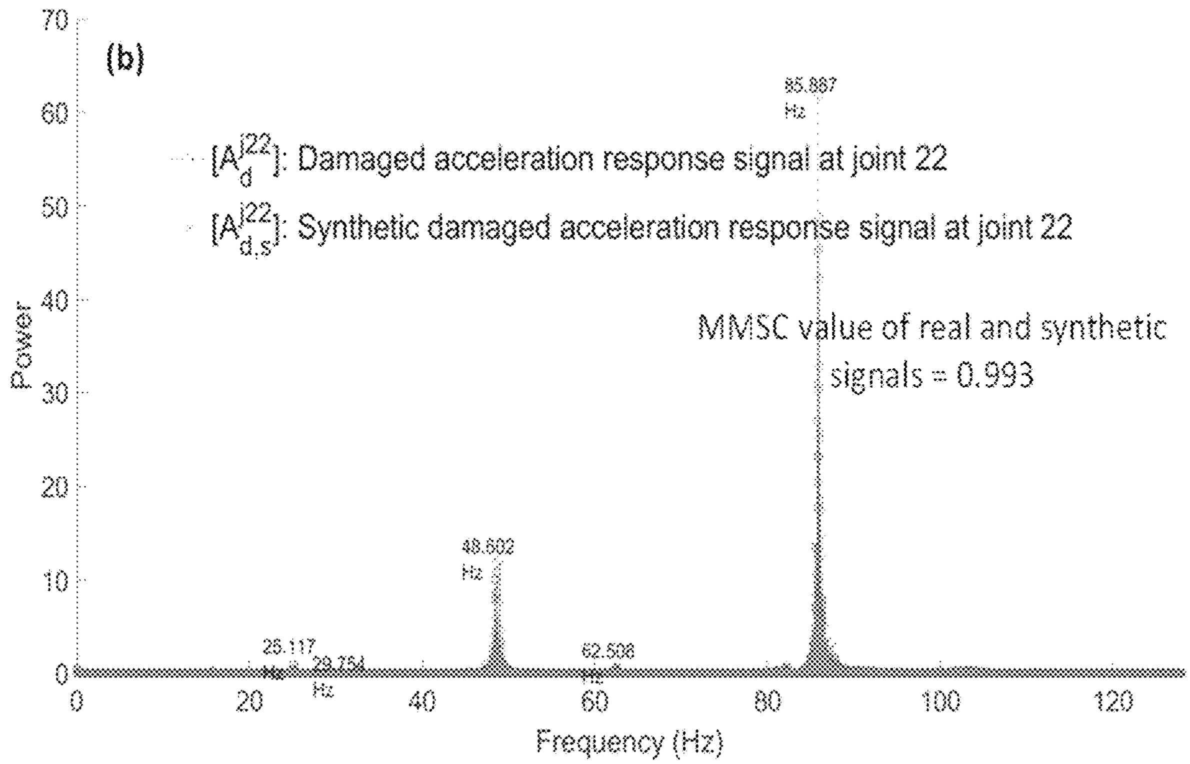
FIG. 31B is a plot illustrating a frequency domain of damaged and synthetic damaged acceleration response signals at Joint 22, according to an embodiment of the present disclosure.
Figure 32A:
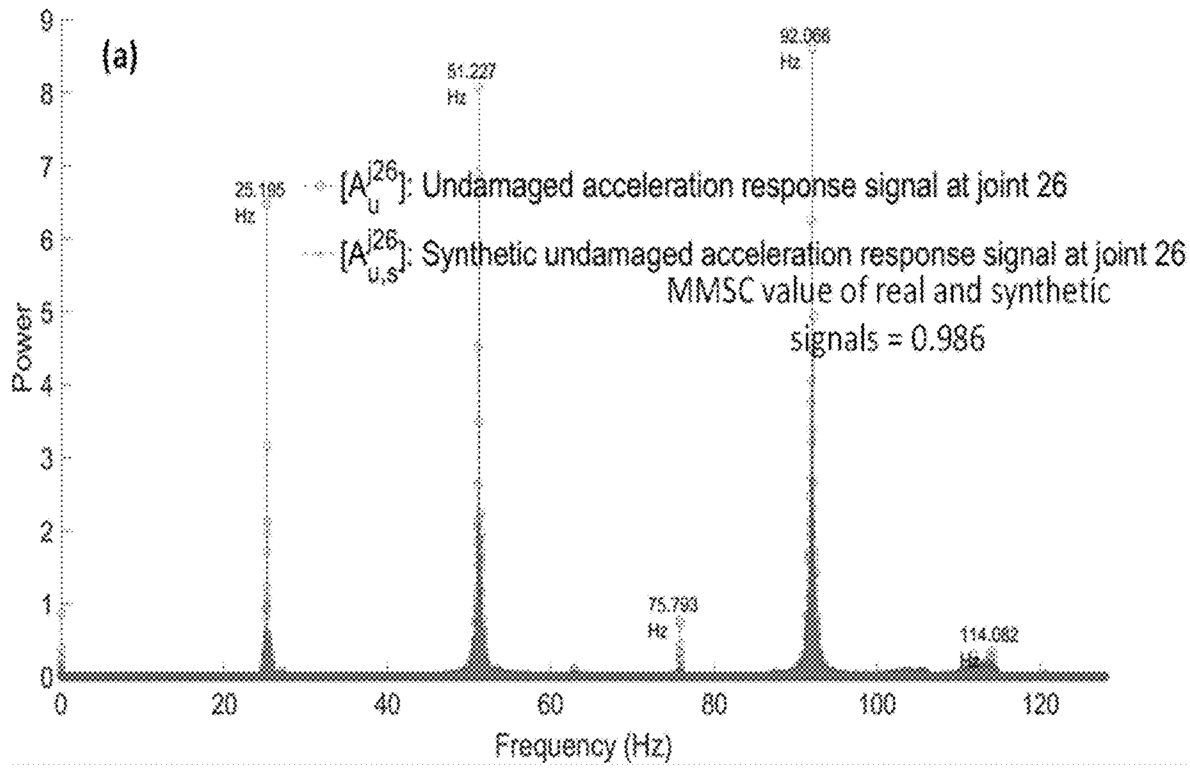
FIG. 32A is a plot illustrating a frequency domain of undamaged and synthetic undamaged acceleration response signals at Joint 26, according to an embodiment of the present disclosure.
Figure 32B:
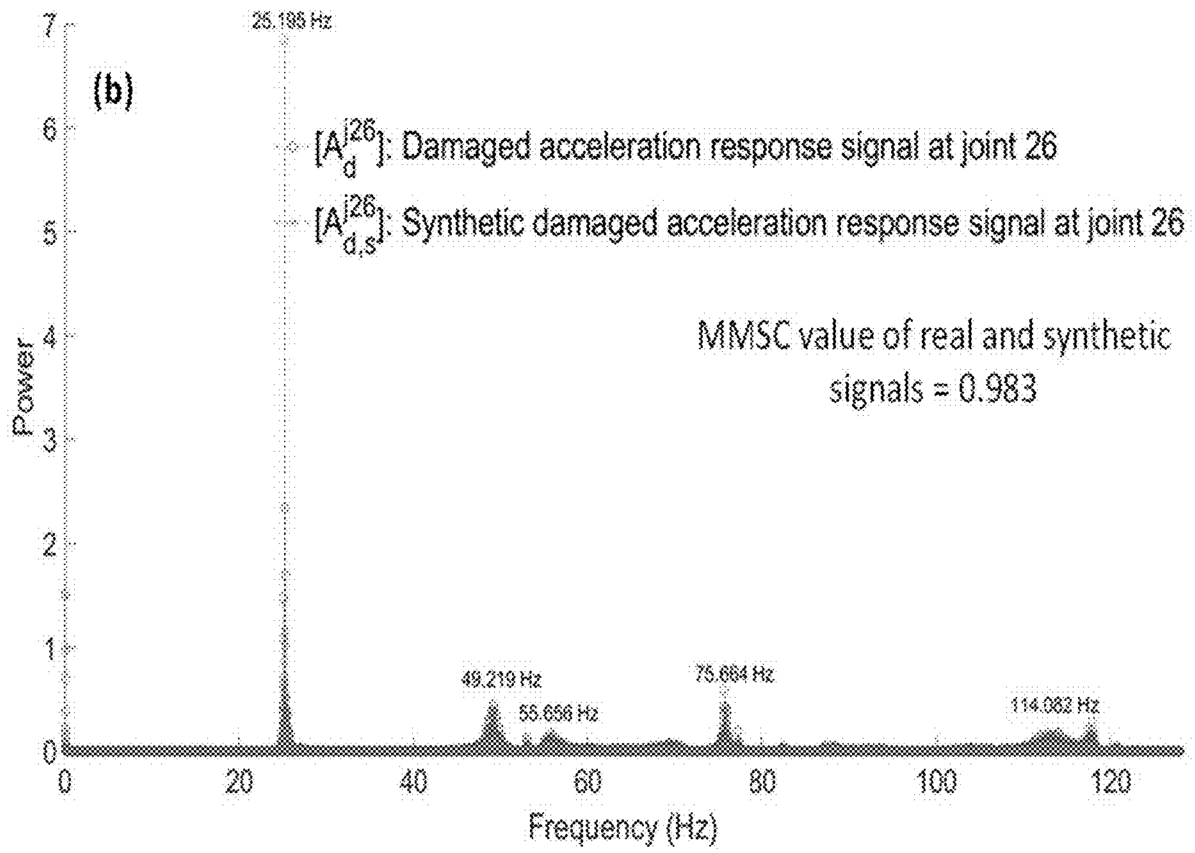
FIG. 32B is a plot illustrating a frequency domain of damaged and synthetic damaged acceleration response signals at Joint 26, according to an embodiment of the present disclosure.

Improved Undamaged-to-Damaged Acceleration Response Translation for the Structural Health Monitoring System As shown in FIGS. 27A-32B, the MMSC index suggests that there is a significant degree of similarity between the original and the translated (synthetic) domains. For instance, FIG. 27A shows the frequency domain plotting of undamaged and synthetic undamaged acceleration response signals at Joint 5, while FIG. 27B shows the frequency domain plotting of damaged and synthetic damaged acceleration response signals at Joint 5. It is observed that the frequency domains of the undamaged and synthetic undamaged acceleration response signals are very similar to each other. Additionally, the frequency domains of the damaged and synthetic damaged acceleration response signals at Joint 5 are significantly similar to each other. The same similarity exists in FIGS. 28A-32B, where the figures represent the frequency domains of the original and translated (synthetic) signals at other test joints. The MMSC values of the signals are also shown on the plots, where the values are very close to 1 (e.g., the MMSC being 1 indicates that the signals show full similarity). The high similarity in the frequency domains also verifies the usage of the index during the training (e.g., which converged near 1), where the index indicated a high correlation between the original and synthetic domains. In addition, the index demonstrates that CycleWDCGAN-GP learned bolt-loosening damage at the joints. As such, when there is no access to the damaged acceleration response signal in the test joints, the model is able to translate the existing undamaged signal to a damaged signal. Similarly, when there is no access to an undamaged acceleration response signal (in the test joints), the model is able to translate the existing damaged signal to an undamaged signal. Lastly, while a significant level of similarity between the original and the translated signals exists, the power values are not exactly the same. The reasoning behind this is unknown and should be investigated. The minor differences in the damping ratios in the last modes might be related to these slight differences in the power values (the modal parameters are explained in the following paragraphs).

The fact that the power values do not exactly match may indicate that the model did not overfit the training data and generalizes well to the other joints (e.g., Joint 5, 9, 13, 18, 22, 26). This may indeed be true since the modal parameters are significantly close to each other (i.e., as shown in FIGS. 35-43 and TABLES 2-5). As such, there is a tradeoff between the overfitting in the training data and the generalization performance of the model. The model generalizes well to the other joints, and if they were to overfit in training data, the generalization would not have been good, which would deteriorate the model's fidelity.

Figure 33:
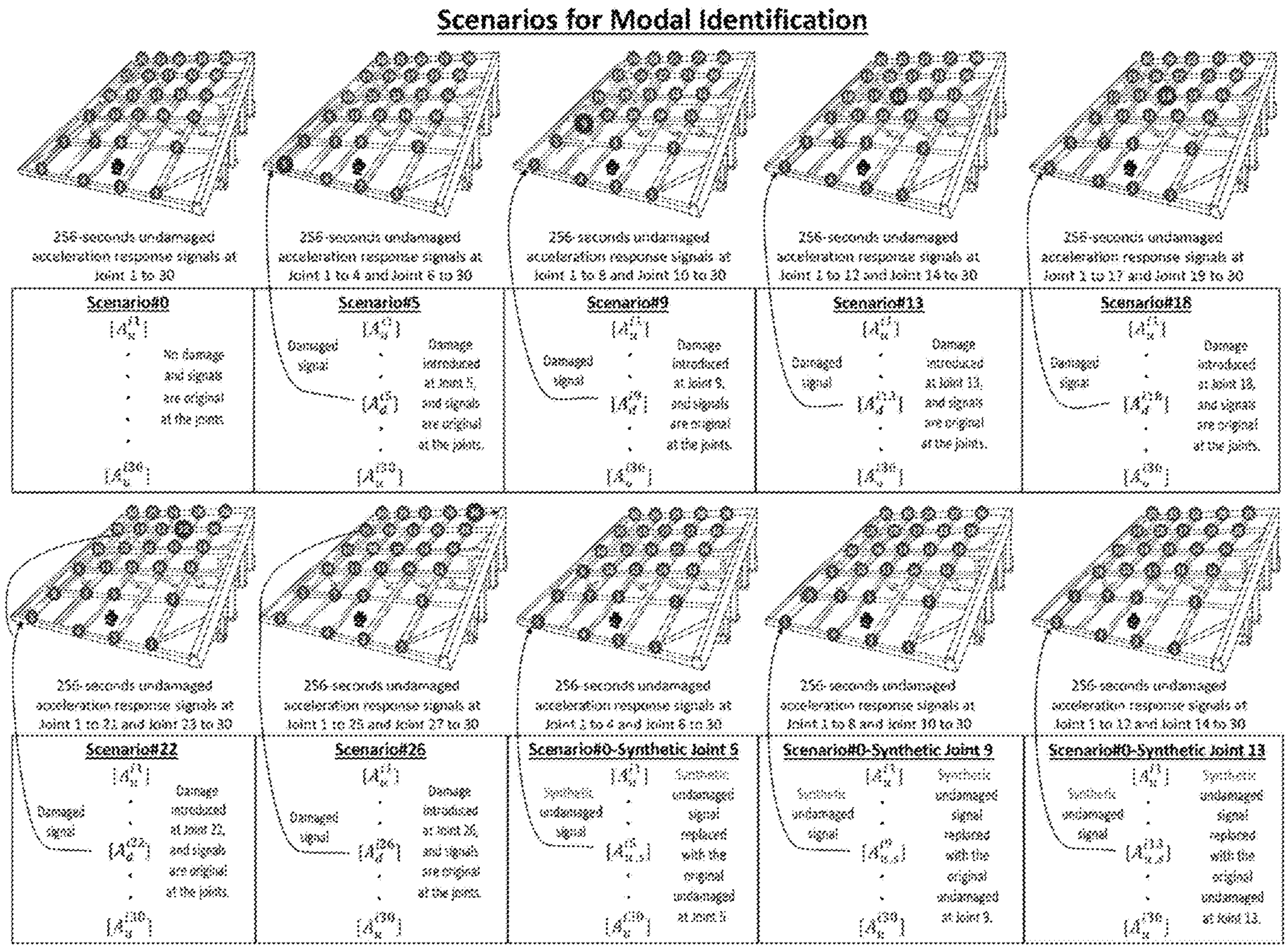
FIG. 33 is an exemplary diagram of at least one scenario used for a model identification process, according to an embodiment of the present disclosure.
Figure 34:
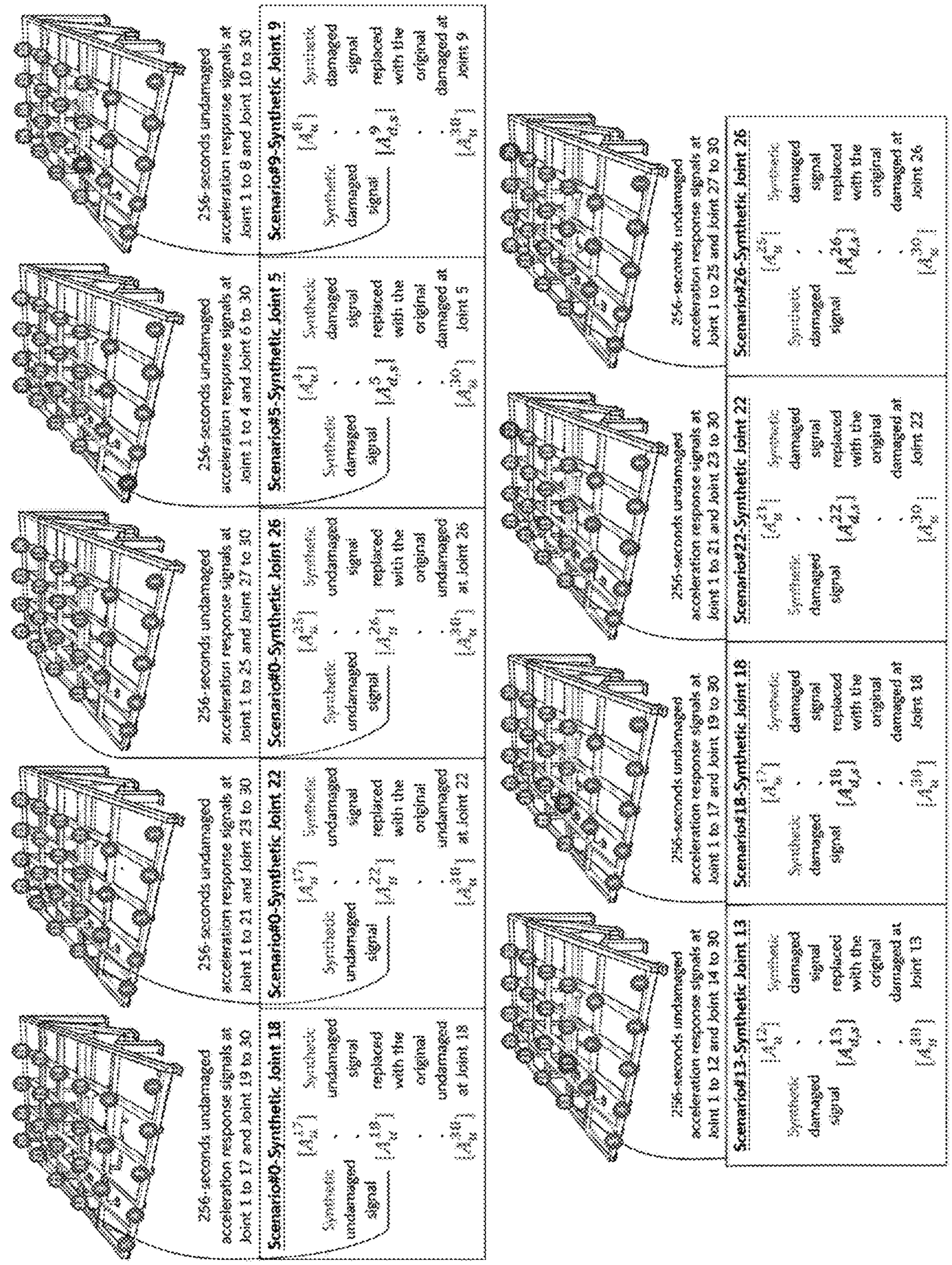
FIG. 34 is an exemplary diagram of at least one additional scenario used for a model identification process, according to an embodiment of the present disclosure.
Figure 35:
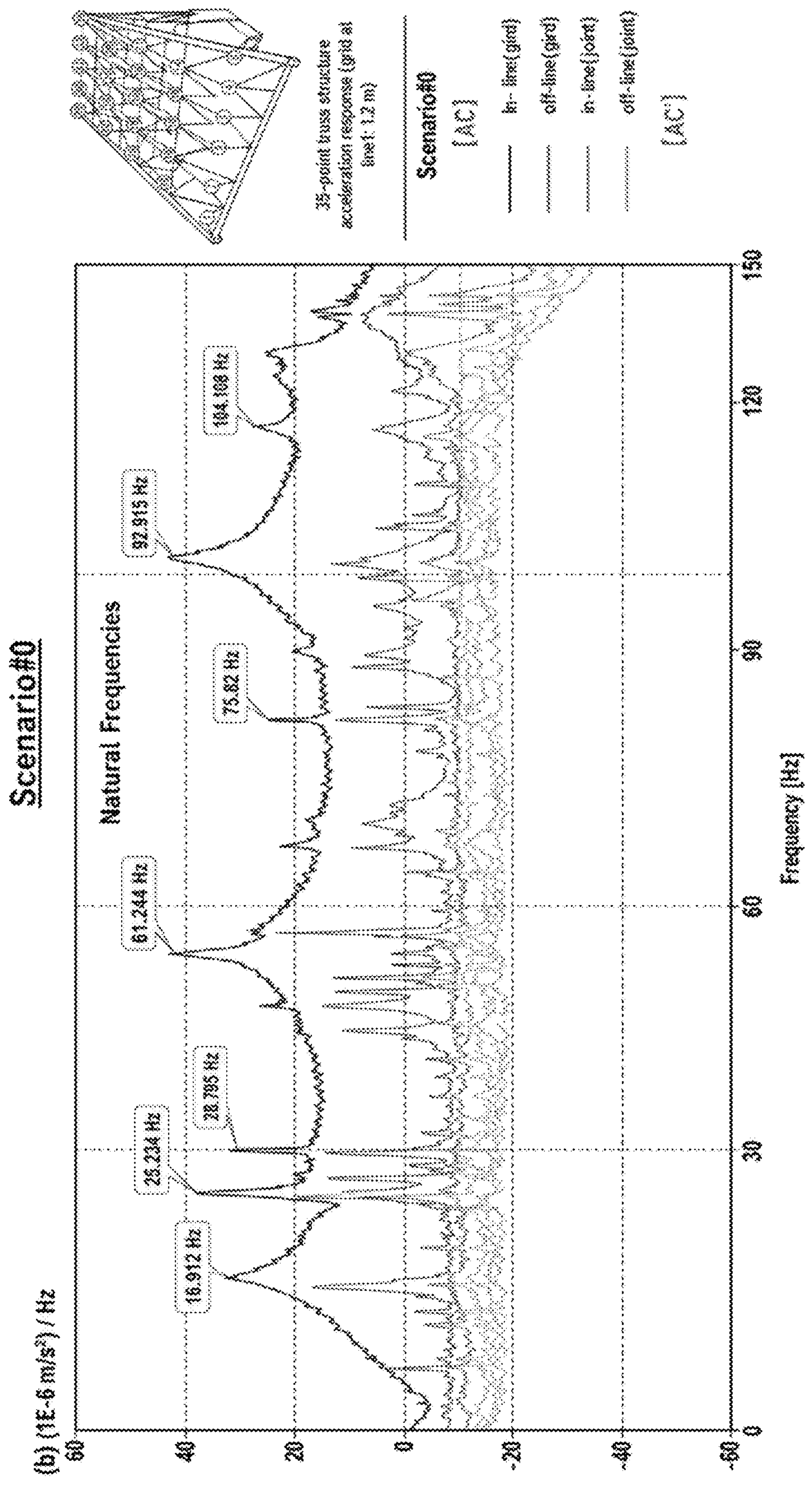
FIG. 35 is a plot illustrating singular values of spectral density of Scenario #0 (e.g., no damaged introduced), according to an embodiment of the present disclosure.
Figure 36:
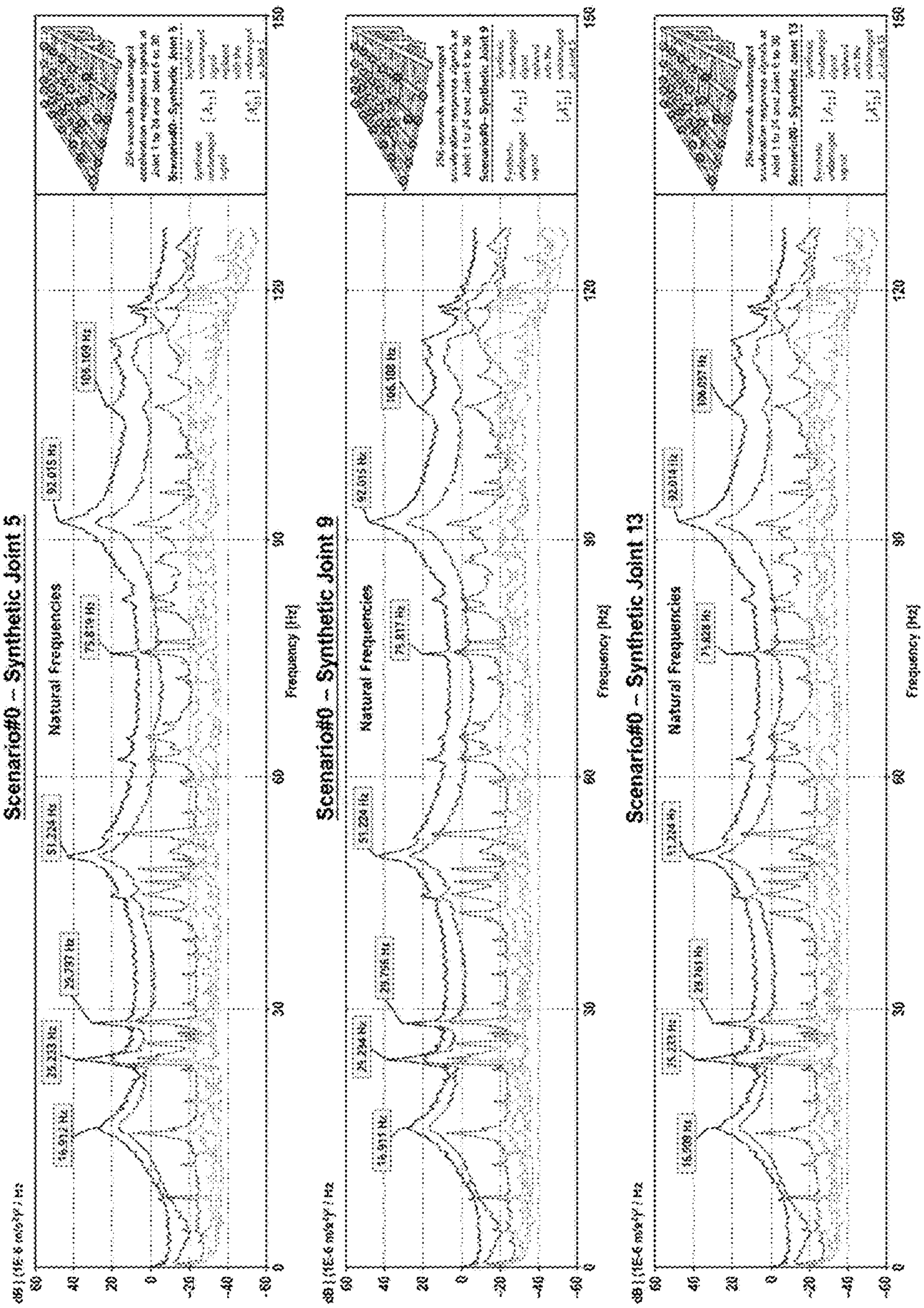
FIG. 36 is a plot illustrating singular values of spectral density of Scenario #0-Synthetic Joint 5 (e.g., synthetic/generated undamaged signal replaced with the original undamaged signal at Joint 5), Scenario #0-Synthetic Joint 9 (e.g., synthetic/generated undamaged signal replaced with the original undamaged signal at Joint 9), and Scenario #0-Synthetic Joint 13 (e.g., synthetic/generated undamaged signal replaced with the original undamaged signal at Joint 13), according to an embodiment of the present disclosure.
Figure 37:
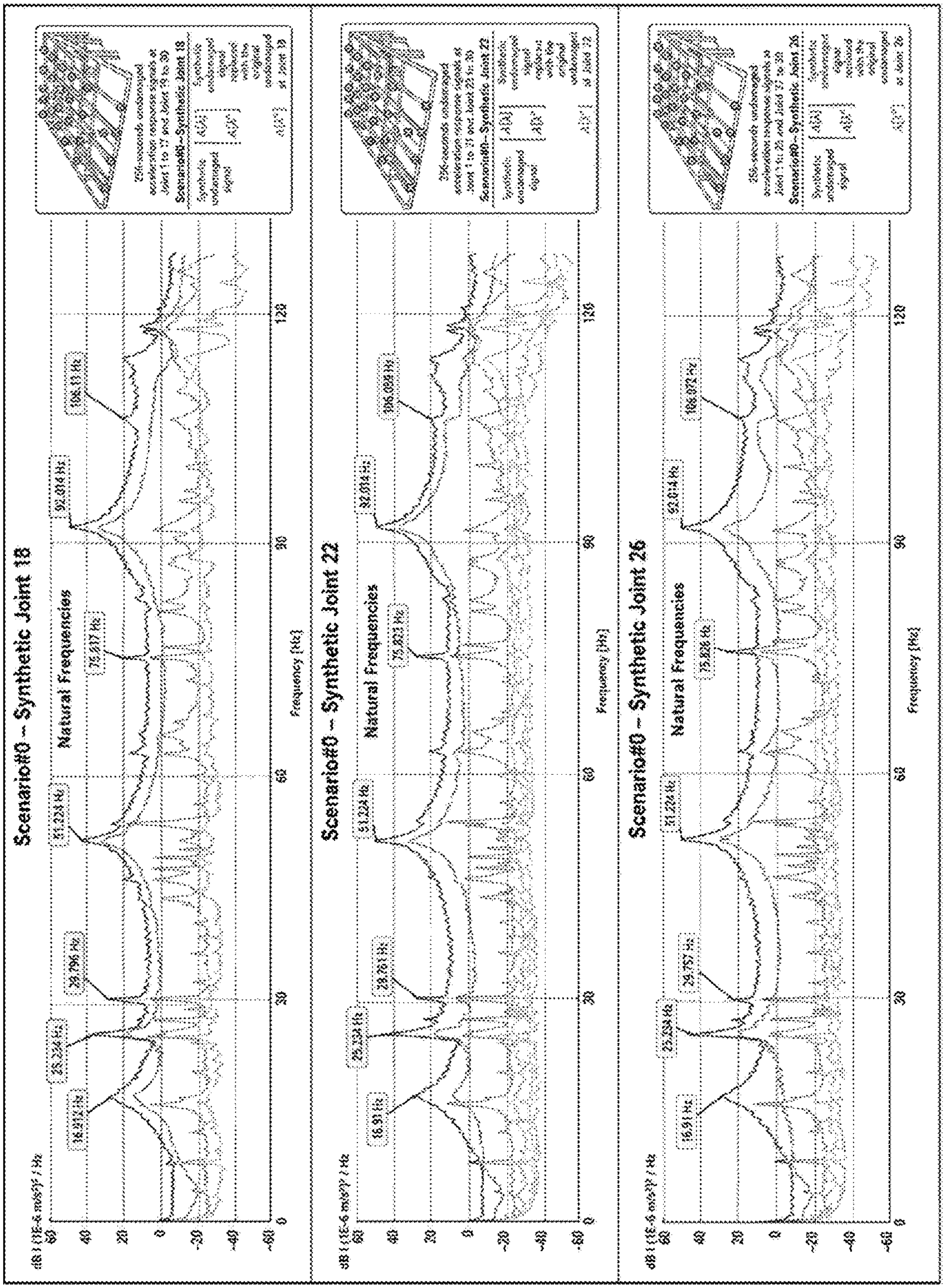
FIG. 37 is a plot illustrating singular values of spectral density of Scenario #0-Synthetic Joint 18 (e.g., synthetic/generated undamaged signal replaced with the original undamaged signal at Joint 18), Scenario #0-Synthetic Joint 22 (e.g., synthetic/generated undamaged signal replaced with the original undamaged signal at Joint 22), and Scenario #0-Synthetic Joint 26 (e.g., synthetic/generated undamaged signal replaced with the original undamaged signal at Joint 26), according to an embodiment of the present disclosure.
Figure 38:
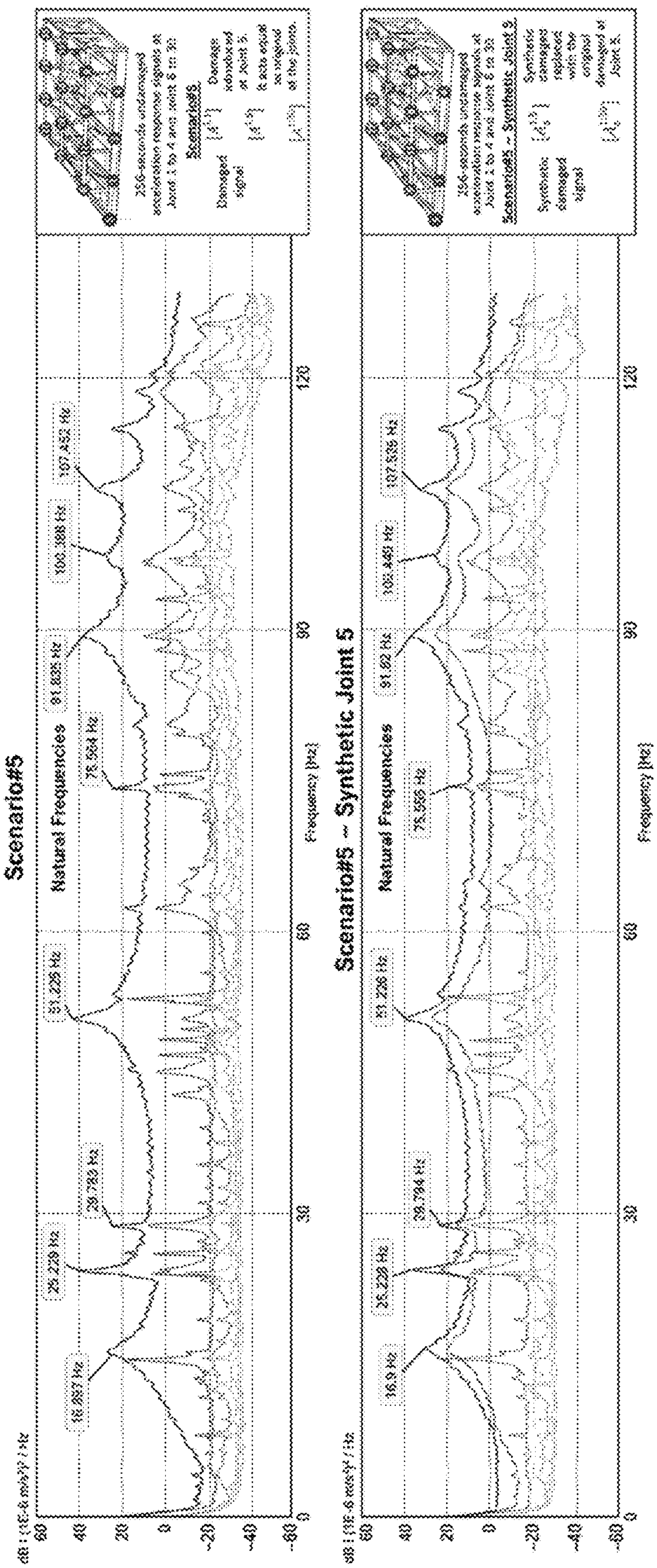
FIG. 38 is a plot illustrating singular values of spectral density of Scenario #5 (e.g., damage introduced at Joint 5 and signals are original at the joints) and Scenario #5-Synthetic Joint 5 (e.g., synthetic/generated damaged signal replaced with the original damaged signal at Joint 5), according to an embodiment of the present disclosure.
Figure 39:
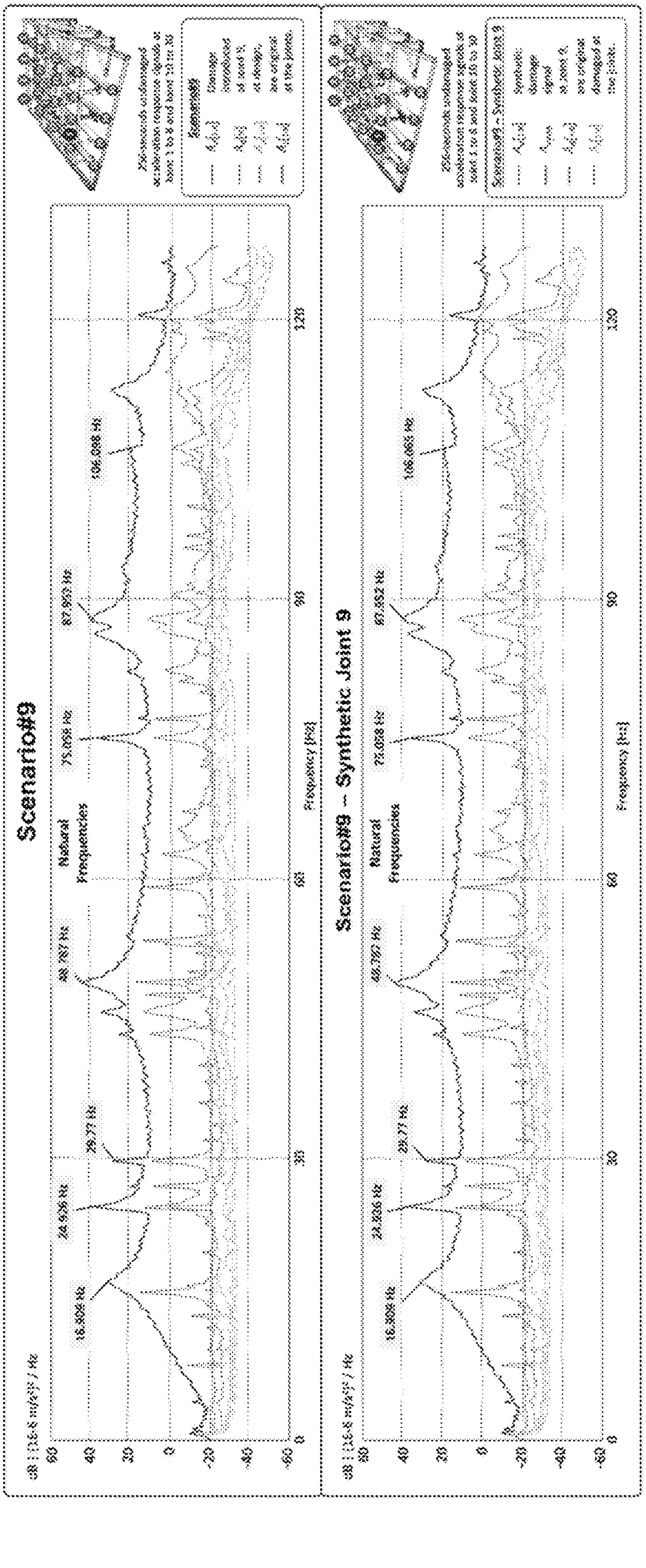
FIG. 39 is a plot illustrating singular values of spectral density of Scenario #9 (e.g., damage introduced at Joint 9 and signals are original at the joints) and Scenario #9-Synthetic Joint 9 (e.g., synthetic/generated damaged signal replaced with the original damaged signal at Joint 9), according to an embodiment of the present disclosure.
Figure 40:
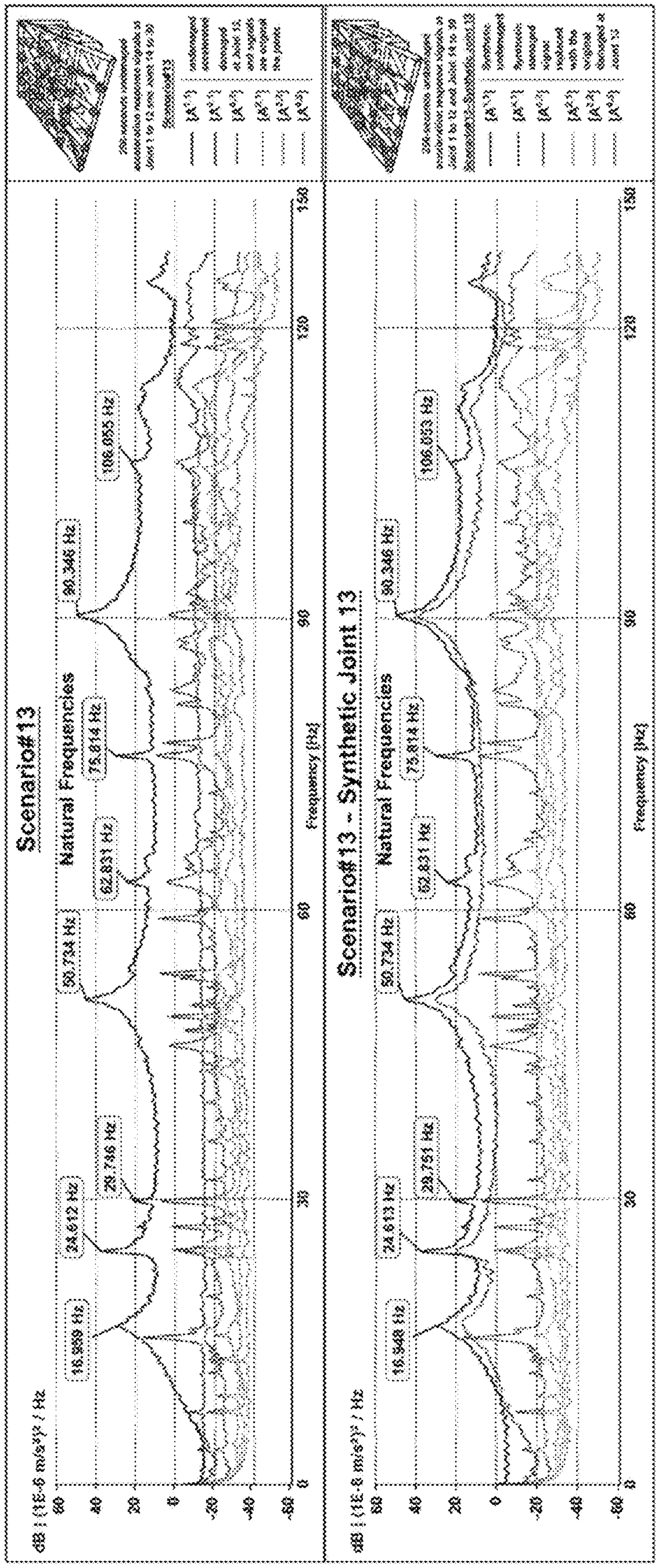
FIG. 40 is a plot illustrating singular values of spectral density of Scenario #13 (e.g., damage introduced at Joint 13 and signals are original at the joints) and Scenario #13-Synthetic Joint 13 (e.g., synthetic/generated damaged signal replaced with the original damaged signal at Joint 13), according to an embodiment of the present disclosure.
Figure 41:
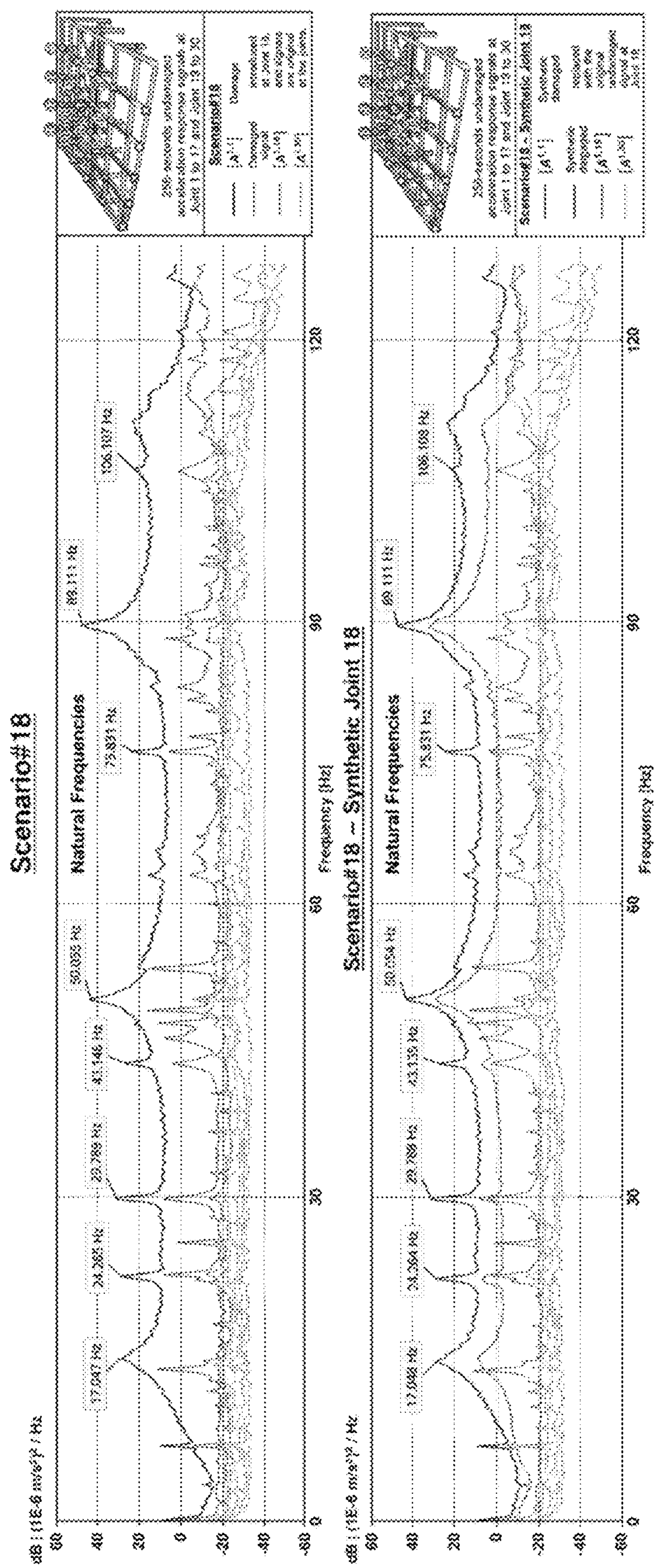
FIG. 41 is a plot illustrating singular values of spectral density of Scenario #18 (e.g., damage introduced at Joint 18 and signals are original at the joints) and Scenario #18-Synthetic Joint 18 (e.g., synthetic/generated damaged signal replaced with the original damaged signal at Joint 18), according to an embodiment of the present disclosure.
Figure 42:
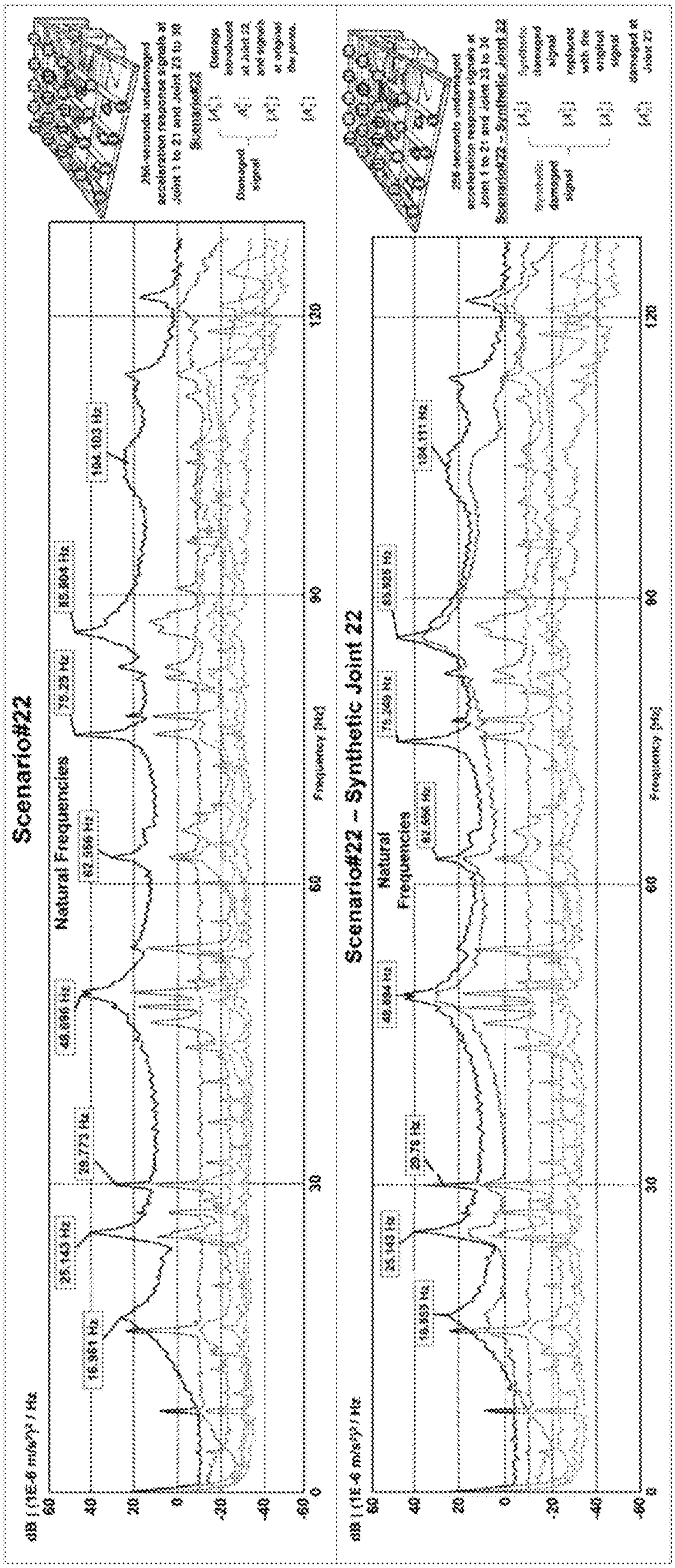
FIG. 42 is a plot illustrating singular values of spectral density of Scenario #22 (e.g., damage introduced at Joint 22 and signals are original at the joints) and Scenario #22-Synthetic Joint 22 (e.g., synthetic/generated damaged signal replaced with the original damaged signal at Joint 22), according to an embodiment of the present disclosure.
Figure 43:
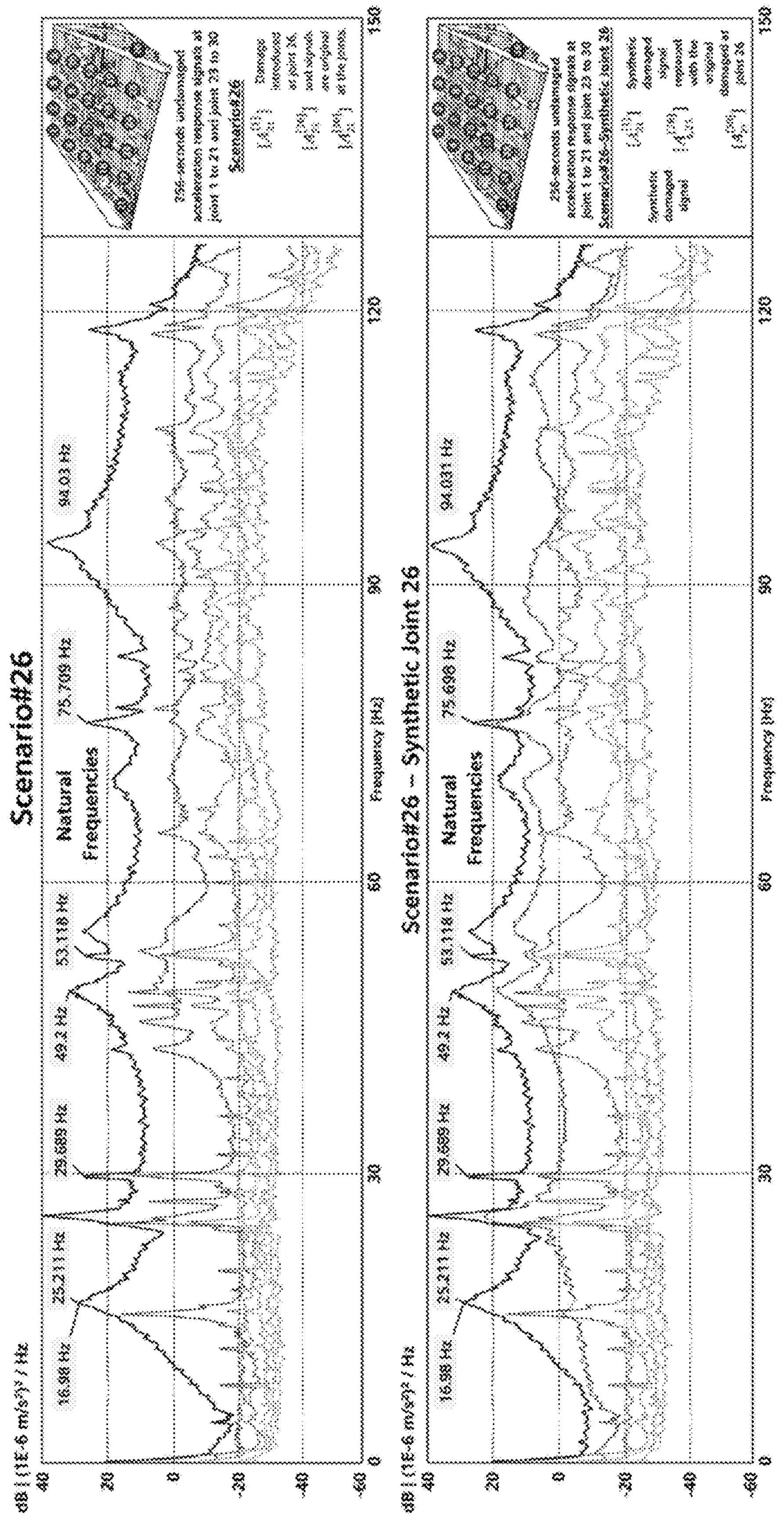
FIG. 43 is a plot illustrating singular values of spectral density of Scenario #26 (e.g., damage introduced at Joint 26 and signals are original at the joints) and Scenario #26-Synthetic Joint 26 (e.g., synthetic/generated damaged signal replaced with the original damaged signal at Joint 26), according to an embodiment of the present disclosure.

To further evaluate the methodology further, in an embodiment, the translated (e.g., synthetic) response signals are processed in Artemis software (e.g., a modal identification program) to extract the structural modal parameters. For that, the acceleration datasets (e.g., which include 31 different scenarios) obtained from the grandstand steel structure are organized for the modal identification analysis procedure, which the workflow is shown in FIGS. 33-34. The scenarios, Scenario #0, Scenario #5, Scenario #9, Scenario #13, Scenario #18, Scenario #22, and Scenario #26 remain the same, where Scenario #0 represents the undamaged case for all the joints. Additionally, Scenario #5, Scenario #9, Scenario #13, Scenario #18, Scenario #22, and Scenario #26 include the damage case (e.g., bolt-loosening) introduced at Joint 5, Joint 9, Joint 13, Joint 18, Joint 22, and Joint 26, respectively. On the other hand, the newly created scenarios represent the synthetic scenarios, which consist of synthetic signals. For instance, the synthetic undamaged acceleration response signals at Joint 5, Joint 9, Joint 13, Joint 18, Joint 22, and Joint 26

$$([A_{u,s}^{j5}], [A_{u,s}^{j9}], [A_{u,s}^{j13}], [A_{u,s}^{j18}], [A_{u,s}^{j22}], \text{ and } [A_{u,s}^{j26}])$$

are replaced with their original counterparts in Scenario #0 to create the following separate scenarios, respectively: Scenario #0-Synthetic Joint 5, Scenario #0-Synthetic Joint 9, Scenario #0-Synthetic Joint 13, Scenario #0-Synthetic Joint 18, Scenario #0-Synthetic Joint 22, and Scenario #0-Synthetic Joint 26. Similarly, the synthetic damaged acceleration response signals at Joint 5, Joint 9, Joint 13, Joint 18, Joint 22, and Joint 26

$$([A_{d,s}^{j5}], [A_{d,s}^{j9}], [A_{d,s}^{j13}], [A_{d,s}^{j18}], [A_{d,s}^{j22}], \text{ and } [A_{d,s}^{j26}])$$

are replaced with their original pairs in Scenario #5, Scenario #9, Scenario #13, Scenario #18, Scenario #22, and Scenario #26 to create the following scenarios, respectively: Scenario #5-Synthetic Joint 5, Scenario #9-Synthetic Joint 9, Scenario #13-Synthetic Joint 13, Scenario #18-Synthetic Joint 18, Scenario #22-Synthetic Joint 22, and Scenario #26-Synthetic Joint 26. This scenario modification procedure is illustrated in FIGS. 33-34 in detail. Subsequently, the datasets of each scenario shown in FIGS. 33-34 are processed in Artemis for the modal identification process.

For the modal identification process, in this embodiment, the Enhanced Frequency Decomposition (hereinafter "EFDD") method is used with 66% of Hann window overlapping and a resolution of 1024 frequency lines. Then, the modes are identified by the peak picking method from the obtained singular values of spectral density plots in FIGS. 35-43 (e.g., the blue, red, and green lines denote the first three lines of singular values of spectral densities). Accordingly, natural frequencies and damping ratios are extracted and provided below in TABLES 2-5. It is observed that there is a significant similarity between the singular values of spectral density plots presented in FIG. 35 (e.g., Scenario #0) and FIG. 36 (e.g., Scenario #0-Synthetic Joint 5, Scenario #0-Synthetic Joint 9 and Scenario #0-Synthetic Joint 13). Also, the same high similarity exists between the singular values of spectral density plots in FIG. 35 (e.g., Scenario #0) and FIG. 37 (e.g., Scenario #0-Synthetic Joint 18, Scenario #0-Synthetic Joint 22, and Scenario #0-Synthetic Joint 26). Furthermore, it is also observed in FIGS. 38-43 that the singular values of spectral density plots of the original scenarios and their counterpart synthetic scenarios are also very similar to each other. For instance, the singular values of spectral density plots of Scenario #5 and Scenario #5-Synthetic Joint 5 (i.e., FIG. 38) are nearly identical. The same high similarity can also be observed in FIGS. 39-43, where the singular values of spectral density plots of Scenario #9 and Scenario #9-Synthetic Joint 9 (i.e., FIG. 39), Scenario #13 and Scenario #13-Synthetic Joint 13 (FIG. 40), Scenario #18 and Scenario #18-Synthetic Joint 18 (FIG. 41), Scenario #22 and Scenario #22-Synthetic Joint 22 (i.e., FIG.

42), and Scenario #26 and Scenario #26-Synthetic Joint 26 (i.e., FIG. 43) are shown. The analogy between the plots can be further seen in the extracted natural frequencies and damping ratios in the provided TABLES 2-5. Accordingly, in TABLES 2-3, the extracted natural frequencies and damping ratios of Scenario #0, Scenario #0-Synthetic Joint 5, Scenario #0-Synthetic Joint 9, Scenario #0-Synthetic Joint 13, Scenario #0-Synthetic Joint 18, Scenario #0-Synthetic Joint 22, and Scenario #0-Synthetic Joint 26 are presented. Also, the percentage differences of natural frequencies and damping ratios between the original scenario (Scenario #0) and synthetic scenarios (Scenario #0-Synthetic Joint . . . ) are given, respectively. Similarly, in TABLES 4-5, the extracted natural frequencies and damping ratios of Scenario #5, Scenario #5-Synthetic Joint 5, Scenario #9-Synthetic Joint 9, Scenario #13-Synthetic Joint 13, Scenario #18-Synthetic Joint 18, Scenario #22-Synthetic Joint 22, and Scenario #26-Synthetic Joint 26 are presented. In addition, the percentage differences of natural frequencies and damping ratios between the original scenario (Scenario # . . . ) and synthetic scenario (Scenario # . . . -Synthetic Joint . . . ) are given, respectively.

It is observed that the differences in natural frequency values between each original (e.g., Scenario #5) and synthetic scenario (e.g., Scenario #5-Synthetic Joint 5) are extremely minimal. Among all the original and synthetic scenario comparisons, the differences in natural frequencies change between 0% to 0.13%, with a mode of 0%, a median of 0.004, and a standard deviation of 0.02. However, the percentage difference in damping ratios is observed to be slightly different in some modes for some scenario comparisons. For instance, while the percentage differences in the damping ratio compared to Scenario #9 and Scenario #9-Synthetic Joint 9 are zero for the first 6 modes, in the $7^{th}$ mode, there is a 32.22% change. In general, the differences in damping ratios change between 0% to 40.74%, with a mode of 0%, a median of 1.02, and a standard deviation of 6.69.

Although the reasoning behind these slight deviations in damping ratios remains unclear, some comments can be made regarding these differences. It is generally accepted that damping ratio identification is a challenging task, making it a more complicated parameter than other modal identifiers as it is difficult to formulate the damping realistically, requiring complex mathematics. In the literature, there is a strong consensus that damping is affected by environmental effects (temperature, humidity etc.). However, it is less commonly deemed for damage detection problems due to its complex nature as it cannot be modelled easily, like mass and stiffness. As such, there is no clear consensus in the literature about the damping parameter being rather sensitive to damage characteristics in the structure. Thus, damping ratios are not often included as damage-sensitive parameters nor regarded in SHM applications, and proportional damping ratios are generally preferred.

As known in the art, the damping ratio is nonlinear, time-varying, and, based on the vibration level, which may be caused by the energy dissipation mechanisms in the structure between different materials, anisotropic, and non-uniform geometric shapes. It is difficult to think that the CycleWDCGAN-GP model suffered to catch this nonlinearity in the data domains as neural networks are built to see this purpose. This requires further investigation. The minor differences in power values in FIGS. 27A-32B may also be related to the slight differences in the damping ratios, as discussed previously.

It is important to note that while the damping ratios remain largely similar in the first six modes, these slight deviations in the damping ratios mainly exist in the last modes (7th and 8th). It can be assumed that the higher modes are mainly local modes with less mass participation. Additionally, the natural frequencies are very similar, with an error margin of 0.13%. Given the circumstances, it is concluded that the CycleWDCGAN-GP model showed success for undamaged-to-damaged acceleration response domain translation.

In summary, the CycleWDCGAN-GP model was trained with the undamaged and damaged response data of Joint 1. Then, it was tested to translate the undamaged and damaged response data of Joint 2, 16, and 30. Additionally, an improved model is tested successfully to implement the same domain translation procedure on Joint 5, 9, 13, 18, 22, and 26 after the model is trained with the undamaged and damaged responses of the rest of the joints in the laboratory structure.

TABLE 2

| Mode | Scenario#0 Frequency [Hz] | Scenario#0 Damping [%] | Scenario#0 - Synthetic Joint 5 Frequency [Hz] | Scenario#0 - Synthetic Joint 5 Damping [%] | Percentage differences Scenario#0/Scenario#0 - Synthetic Joint 5 Frequency [%] | Percentage differences Scenario#0/Scenario#0 - Synthetic Joint 5 Damping [%] |
|---|---|---|---|---|---|---|
| 1 | 16.91 | 3.35 | 16.91 | 3.35 | 0.00 | 0.00 |
| 2 | 25.23 | 0.36 | 25.23 | 0.39 | 0.00 | 8.96 |
| 3 | 29.80 | 0.27 | 29.80 | 0.27 | 0.01 | 1.47 |
| 4 | 51.22 | 0.34 | 51.22 | 0.34 | 0.00 | 0.29 |
| 5 | 75.82 | 0.10 | 75.82 | 0.10 | 0.00 | 0.00 |
| 6 | 92.02 | 0.23 | 92.02 | 0.23 | 0.00 | 0.44 |
| 7 | 106.11 | 0.09 | 106.11 | 0.09 | 0.00 | 0.00 |

| Mode | Scenario#0 Frequency [Hz] | Scenario#0 Damping [%] | Scenario#0 - Synthetic Joint 9 Frequency [Hz] | Scenario#0 - Synthetic Joint 9 Damping [%] | Percentage differences Scenario#0/Scenario#0 - Synthetic Joint 9 Frequency [%] | Percentage differences Scenario#0/Scenario#0 - Synthetic Joint 9 Damping [%] |
|---|---|---|---|---|---|---|
| 1 | 16.91 | 3.35 | 16.91 | 3.44 | 0.01 | 2.73 |
| 2 | 25.23 | 0.36 | 25.23 | 0.36 | 0.00 | 0.28 |

TABLE 2-continued

| | | | | | | |
|---|---|---|---|---|---|---|
| 3 | 29.80 | 0.27 | 29.80 | 0.27 | 0.00 | 1.11 |
| 4 | 51.22 | 0.34 | 51.22 | 0.35 | 0.00 | 1.45 |
| 5 | 75.82 | 0.10 | 75.82 | 0.09 | 0.00 | 1.06 |
| 6 | 92.02 | 0.23 | 92.02 | 0.23 | 0.00 | 2.15 |
| 7 | 106.11 | 0.09 | 106.11 | 0.09 | 0.00 | 1.10 |

| | Scenario#0 | | Scenario#0 - Synthetic Joint 13 | | Percentage differences Scenario#0/Scenario#0 - Synthetic Joint 13 | |
|---|---|---|---|---|---|---|
| Mode | Frequency [Hz] | Damping [%] | Frequency [Hz] | Damping [%] | Frequency [%] | Damping [%] |
| 1 | 16.91 | 3.35 | 16.91 | 3.36 | 0.02 | 0.45 |
| 2 | 25.23 | 0.36 | 25.23 | 0.36 | 0.00 | 0.28 |
| 3 | 29.80 | 0.27 | 29.76 | 0.32 | 0.11 | 14.69 |
| 4 | 51.22 | 0.34 | 51.22 | 0.34 | 0.00 | 0.29 |
| 5 | 75.82 | 0.10 | 75.83 | 0.10 | 0.01 | 7.77 |
| 6 | 92.02 | 0.23 | 92.01 | 0.23 | 0.00 | 1.30 |
| 7 | 106.11 | 0.09 | 106.06 | 0.11 | 0.05 | 19.64 |

TABLE 3

| | Scenario#0 | | Scenario#0 - Synthetic Joint 18 | | Percentage differences Scenario#0/Scenario#0 - Synthetic Joint 18 | |
|---|---|---|---|---|---|---|
| Mode | Frequency [Hz] | Damping [%] | Frequency [Hz] | Damping [%] | Frequency [%] | Damping [%] |
| 1 | 16.91 | 3.35 | 16.91 | 3.37 | 0.00 | 0.59 |
| 2 | 25.23 | 0.36 | 25.23 | 0.39 | 0.00 | 8.46 |
| 3 | 29.80 | 0.27 | 29.80 | 0.27 | 0.00 | 1.11 |
| 4 | 51.22 | 0.34 | 51.22 | 0.34 | 0.00 | 0.29 |
| 5 | 75.82 | 0.10 | 75.82 | 0.09 | 0.00 | 2.15 |
| 6 | 92.02 | 0.23 | 92.01 | 0.23 | 0.00 | 1.72 |
| 7 | 106.11 | 0.09 | 106.11 | 0.09 | 0.00 | 0.00 |

| | Scenario#0 | | Scenario#0 - Synthetic Joint 22 | | Percentage differences Scenario#0/Scenario#0 - Synthetic Joint 22 | |
|---|---|---|---|---|---|---|
| Mode | Frequency [Hz] | Damping [%] | Frequency [Hz] | Damping [%] | Frequency [%] | Damping [%] |
| 1 | 16.91 | 3.35 | 16.91 | 3.32 | 0.01 | 1.00 |
| 2 | 25.23 | 0.36 | 25.23 | 0.36 | 0.00 | 0.56 |
| 3 | 29.80 | 0.27 | 29.76 | 0.32 | 0.11 | 14.42 |
| 4 | 51.22 | 0.34 | 51.22 | 0.34 | 0.00 | 0.29 |
| 5 | 75.82 | 0.10 | 75.82 | 0.10 | 0.00 | 2.06 |
| 6 | 92.02 | 0.23 | 92.01 | 0.23 | 0.00 | 1.30 |
| 7 | 106.11 | 0.09 | 106.06 | 0.11 | 0.05 | 19.64 |

| | Scenario#0 | | Scenario#0 - Synthetic Joint 26 | | Percentage differences Scenario#0/Scenario#0 - Synthetic Joint 26 | |
|---|---|---|---|---|---|---|
| Mode | Frequency [Hz] | Damping [%] | Frequency [Hz] | Damping [%] | Frequency [%] | Damping [ %] |
| 1 | 16.91 | 3.35 | 16.91 | 3.33 | 0.01 | 0.60 |
| 2 | 25.23 | 0.36 | 25.23 | 0.36 | 0.00 | 0.56 |
| 3 | 29.80 | 0.27 | 29.76 | 0.32 | 0.13 | 13.61 |
| 4 | 51.22 | 0.34 | 51.22 | 0.34 | 0.00 | 0.29 |
| 5 | 75.82 | 0.10 | 75.83 | 0.10 | 0.01 | 2.06 |
| 6 | 92.02 | 0.23 | 92.01 | 0.23 | 0.00 | 1.30 |
| 7 | 106.11 | 0.09 | 106.07 | 0.11 | 0.03 | 20.35 |

TABLE 4

| Mode | Scenario#5 Frequency [Hz] | Scenario#5 Damping [%] | Scenario#5 - Synthetic Joint 5 Frequency [Hz] | Scenario#5 - Synthetic Joint 5 Damping [%] | Percentage differences Scenario#5/Scenario#5 - Synthetic Joint 5 Frequency [%] | Percentage differences Scenario#5/Scenario#5 - Synthetic Joint 5 Damping [%] |
|---|---|---|---|---|---|---|
| 1 | 16.90 | 2.74 | 16.90 | 3.03 | 0.02 | 10.64 |
| 2 | 25.23 | 0.36 | 25.23 | 0.39 | 0.00 | 8.71 |
| 3 | 29.78 | 0.28 | 29.79 | 0.27 | 0.04 | 3.96 |
| 4 | 51.23 | 0.37 | 51.23 | 0.36 | 0.00 | 0.55 |
| 5 | 75.56 | 0.10 | 75.56 | 0.10 | 0.01 | 6.32 |
| 6 | 91.84 | 0.56 | 91.82 | 0.56 | 0.02 | 1.42 |
| 7 | 100.39 | 0.33 | 100.45 | 0.37 | 0.06 | 11.48 |
| 8 | 107.45 | 0.16 | 107.53 | 0.23 | 0.07 | 40.74 |

| Mode | Scenario#9 Frequency [Hz] | Scenario#9 Damping [%] | Scenario#9 - Synthetic Joint 9 Frequency [Hz] | Scenario#9 - Synthetic Joint 9 Damping [%] | Percentage differences Scenario#9/Scenario#9 - Synthetic Joint 9 Frequency [%] | Percentage differences Scenario#9/Scenario#9 - Synthetic Joint 9 Damping [%] |
|---|---|---|---|---|---|---|
| 1 | 16.91 | 3.12 | 16.91 | 3.12 | 0.00 | 0.00 |
| 2 | 24.93 | 0.40 | 24.93 | 0.40 | 0.00 | 0.00 |
| 3 | 29.77 | 0.28 | 29.77 | 0.28 | 0.00 | 0.00 |
| 4 | 48.79 | 0.52 | 48.79 | 0.52 | 0.00 | 0.00 |
| 5 | 75.06 | 0.11 | 75.06 | 0.11 | 0.00 | 0.00 |
| 6 | 87.95 | 0.39 | 87.95 | 0.39 | 0.00 | 0.00 |
| 7 | 106.10 | 0.09 | 106.07 | 0.12 | 0.03 | 32.22 |

| Mode | Scenario#13 Frequency [Hz] | Scenario#13 Damping [%] | Scenario#13 - Synthetic Joint 13 Frequency [Hz] | Scenario#13 - Synthetic Joint 13 Damping [%] | Percentage differences Scenario#13/Scenario#13 - Synthetic Joint 13 Frequency [%] | Percentage differences Scenario#13/Scenario#13 - Synthetic Joint 13 Damping [%] |
|---|---|---|---|---|---|---|
| 1 | 16.96 | 2.87 | 16.95 | 3.05 | 0.06 | 5.99 |
| 2 | 24.61 | 0.28 | 24.61 | 0.33 | 0.00 | 14.79 |
| 3 | 29.75 | 0.31 | 29.75 | 0.31 | 0.02 | 0.96 |
| 4 | 50.73 | 0.34 | 50.73 | 0.34 | 0.00 | 0.29 |
| 5 | 62.83 | 0.21 | 62.83 | 0.21 | 0.00 | 0.96 |
| 6 | 75.81 | 0.11 | 75.81 | 0.11 | 0.00 | 0.00 |
| 7 | 90.35 | 0.23 | 90.35 | 0.23 | 0.00 | 0.88 |
| 8 | 106.06 | 0.11 | 106.05 | 0.11 | 0.00 | 0.00 |

TABLE 5

| Mode | Scenario#18 Frequency [Hz] | Scenario#18 Damping [%] | Scenario#18 - Synthetic Joint 18 Frequency [Hz] | Scenario#18 - Synthetic Joint 18 Damping [%] | Percentage differences Scenario#18/Scenario#18 - Synthetic Joint 18 Frequency [%] | Percentage differences Scenario#18/Scenario#18 - Synthetic Joint 18 Damping [%] |
|---|---|---|---|---|---|---|
| 1 | 17.05 | 3.14 | 17.05 | 3.14 | 0.01 | 0.00 |
| 2 | 24.27 | 0.29 | 24.26 | 0.29 | 0.00 | 0.00 |
| 3 | 29.79 | 0.27 | 29.79 | 0.27 | 0.00 | 0.00 |
| 4 | 43.15 | 0.26 | 43.14 | 0.22 | 0.03 | 16.79 |
| 5 | 50.06 | 0.36 | 50.05 | 0.36 | 0.00 | 0.28 |
| 6 | 75.83 | 0.11 | 75.83 | 0.11 | 0.00 | 0.93 |
| 7 | 89.11 | 0.19 | 89.11 | 0.19 | 0.00 | 0.52 |
| 8 | 106.11 | 0.09 | 106.11 | 0.09 | 0.00 | 8.05 |

| Mode | Scenario#22 Frequency [Hz] | Scenario#22 Damping [%] | Scenario#22 - Synthetic Joint 22 Frequency [Hz] | Scenario#22 - Synthetic Joint 22 Damping [%] | Percentage differences Scenario#22/Scenario#22 - Synthetic Joint 22 Frequency [%] | Percentage differences Scenario#22/Scenario#22 - Synthetic Joint 22 Damping [%] |
|---|---|---|---|---|---|---|
| 1 | 16.96 | 2.91 | 16.96 | 2.94 | 0.01 | 0.93 |
| 2 | 25.14 | 0.42 | 25.14 | 0.42 | 0.00 | 0.00 |
| 3 | 29.77 | 0.28 | 29.76 | 0.28 | 0.04 | 2.16 |
| 4 | 48.70 | 0.59 | 48.69 | 0.58 | 0.00 | 0.34 |

TABLE 5-continued

| | | | | | | |
|---|---|---|---|---|---|---|
| 5 | 62.56 | 0.28 | 62.56 | 0.28 | 0.00 | 0.36 |
| 6 | 75.25 | 0.10 | 75.25 | 0.10 | 0.00 | 0.00 |
| 7 | 85.90 | 0.18 | 85.93 | 0.18 | 0.02 | 2.79 |
| 8 | 104.10 | 0.56 | 104.11 | 0.45 | 0.01 | 18.78 |

| | Scenario#26 | | Scenario#26 - Synthetic Joint 26 | | Percentage differences Scenario#26/Scenario#26 - Synthetic Joint 26 | |
|---|---|---|---|---|---|---|
| Mode | Frequency [Hz] | Damping [%] | Frequency [Hz] | Damping [%] | Frequency [%] | Damping [%] |
| 1 | 16.98 | 3.32 | 16.98 | 3.32 | 0.00 | 0.00 |
| 2 | 25.21 | 0.39 | 25.21 | 0.39 | 0.00 | 0.00 |
| 3 | 29.69 | 0.31 | 29.69 | 0.31 | 0.00 | 0.00 |
| 4 | 49.20 | 1.27 | 49.20 | 1.27 | 0.00 | 0.08 |
| 5 | 53.12 | 0.23 | 53.12 | 0.23 | 0.00 | 0.88 |
| 6 | 75.71 | 0.34 | 75.70 | 0.29 | 0.01 | 14.84 |
| 7 | 94.03 | 0.47 | 94.03 | 0.47 | 0.00 | 0.00 |

Example 3

Structural State Translation Performance for the Structural Health Monitoring System In an embodiment, the SST framework of the structural health monitoring system is applied to four dissimilar numeric bridge models (which may belong to a heterogenous population). A numeric bridge model, Bridge #1, is adapted from an actual bridge structure and is used for training (source domain). The other three bridges, Bridge #2, Bridge #3, and Bridge #4, each modified significantly, are used for the test (unseen target domains). Each bridge dataset includes acceleration responses (i.e., sensorial data) extracted from virtual sensor channels from the bridge models after applying the gaussian noise excitation signal to the models. Nevertheless, briefly, the training dataset is created from a bridge model, Bridge #1, where it has two different structural states (conditions), State-α and State-β. State-α is the pristine condition, and State-β is the removal of the bottom steel chords from the sides close to the middle of the bridge (starting from the left—Section #11). A visual representation of the bridge states can be seen in FIG. 48. As a result, Bridge #1 yields two different but related domains $$D_{State-\alpha}^{Bridge\#1} \text{ and } D_{State-\beta}^{Bridge\#1}.$$

Second, the test (or target) datasets, which are the datasets of Bridge #2, Bridge #3, and Bridge #4, are formed following the same approach as done for Bridge #1 dataset.

Furthermore, in this embodiment, another state is created, State-γ, where it is again the removal of the bottom steel chords from the sides close to the middle of the bridge but in a symmetrical position (starting from the left—Section #12) of State-β. The purpose of creating State-γ is to demonstrate that SST can be employed for geometrically symmetrical locations at the structures. As State-β and State-γ of the bridges are geometrically and materially symmetrical, it is expected that the translated State-$\hat{\beta}$ from State-α and the translated State-$\hat{\gamma}$ from State-α are the same in terms of their structural parameters. In other words, the translated State-$\hat{\alpha}$ from State-β and the translated State-$\hat{\alpha}$ from State-γ are expected to be the same. This phenomenon of symmetry is observed later in TABLE 6 and TABLE 7 as the frequencies, and the mode shapes of the bridges for State-β and State-γ are identical. As a result, Bridge #2, Bridge #3, and Bridge #4 yield respectively domains $$D_{State-\alpha}^{Bridge\#2}, D_{State-\beta}^{Bridge\#2}, D_{State-\gamma}^{Bridge\#2}, \text{ and } D_{State-\alpha}^{Bridge\#3}, D_{State-\beta}^{Bridge\#3}, D_{State-\gamma}^{Bridge\#3} \text{ and } D_{State-\alpha}^{Bridge\#4}, D_{State-\beta}^{Bridge\#4}, D_{State-\gamma}^{Bridge\#4}.$$

Figure 45:
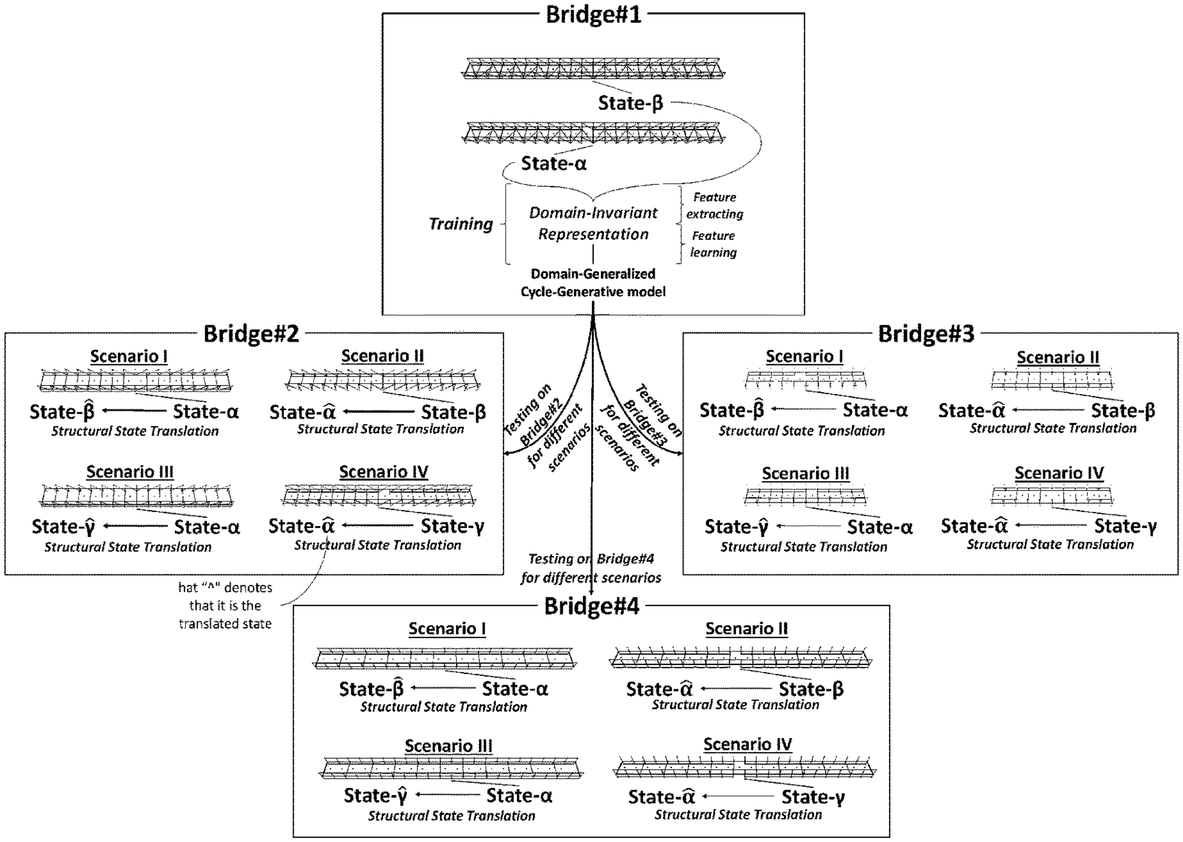
FIG. 45 is an exemplary workflow diagram of an SST process implemented on at least on bridge model, according to an embodiment of the present disclosure.

Third, the DGCG model is trained in an unsupervised manner on the source domains $$D_{State-\alpha}^{Bridge\#1} \text{ and } D_{State-\beta}^{Bridge\#1}$$

to learn the domain invariant representation between State-α and State-β. Then, the model is tested on the target bridge models for different state translation "scenarios", respectively. As such, for Bridge #2, in Scenario I, the DGCG model is used to translate State-α to State-$\hat{\beta}$ (which is the synthetic State-β); in Scenario II, DGCG is used to translate State-α to State-$\hat{\gamma}$ (which is the synthetic State-γ); in Scenario III, DGCG is used to translate State-β to State-$\hat{\alpha}$ (which is the synthetic State-α); in Scenario IV, DGCG is used to translate State-γ to State-$\hat{\alpha}$. This process is also carried out for other scenarios for Bridge #3 and Bridge #4. The SST process implemented for the bridge models is illustrated in FIG. 45. The bridge models and the dataset are explained in the next section.

As mentioned above, the bridge models used are numeric, modelled and analyzed in the Finite Element Analysis (FEA) program. Subsequently, the acceleration responses are extracted from each bridge model. After the bridges are modelled, the models are analyzed in two ways: Modal Analysis and Time History Analysis (THA). Modal Analysis is done for a general intuitive bridge similarity comparison between each model, and THA is carried out to extract the acceleration response signals from the bridge models. Subsequently, the sensorial data (e.g., acceleration response signals) from the virtual sensor channels on the bridge models are extracted.

The Bridge #1 model is adapted from an actual steel truss footbridge structure located on the University of Central Florida campus. The footbridge comprises 177 ft long vertical truss frames connected in the middle span with a splice connection, spans 128 ft over a pond, and is 12 ft in width. The vertical truss members on the left and right sides are HSS10×10×3/8 for both top and bottom chords, and they are supported with HSS6×4×3/8 type vertical, HSS10×10×3/8 type vertical at the support and HSS4×4×1/4 type diagonal steel sections. Another truss system is used for lateral stability with HSS3×3×1/4 type diagonal cross braces and W12×22 type lateral beam elements. The bridge is separated into two spans, spliced at the middle with a plate connection, and carrying a 5 in thick layered aluminum-concrete composite deck. The bridge experiences light pedestrian traffic loads and small vehicles, e.g., golf carts. The structural drawings and the members used in the FEA program are given in FIG. 46, where the elements are shown in the drawings with key letters.

Figure 47:
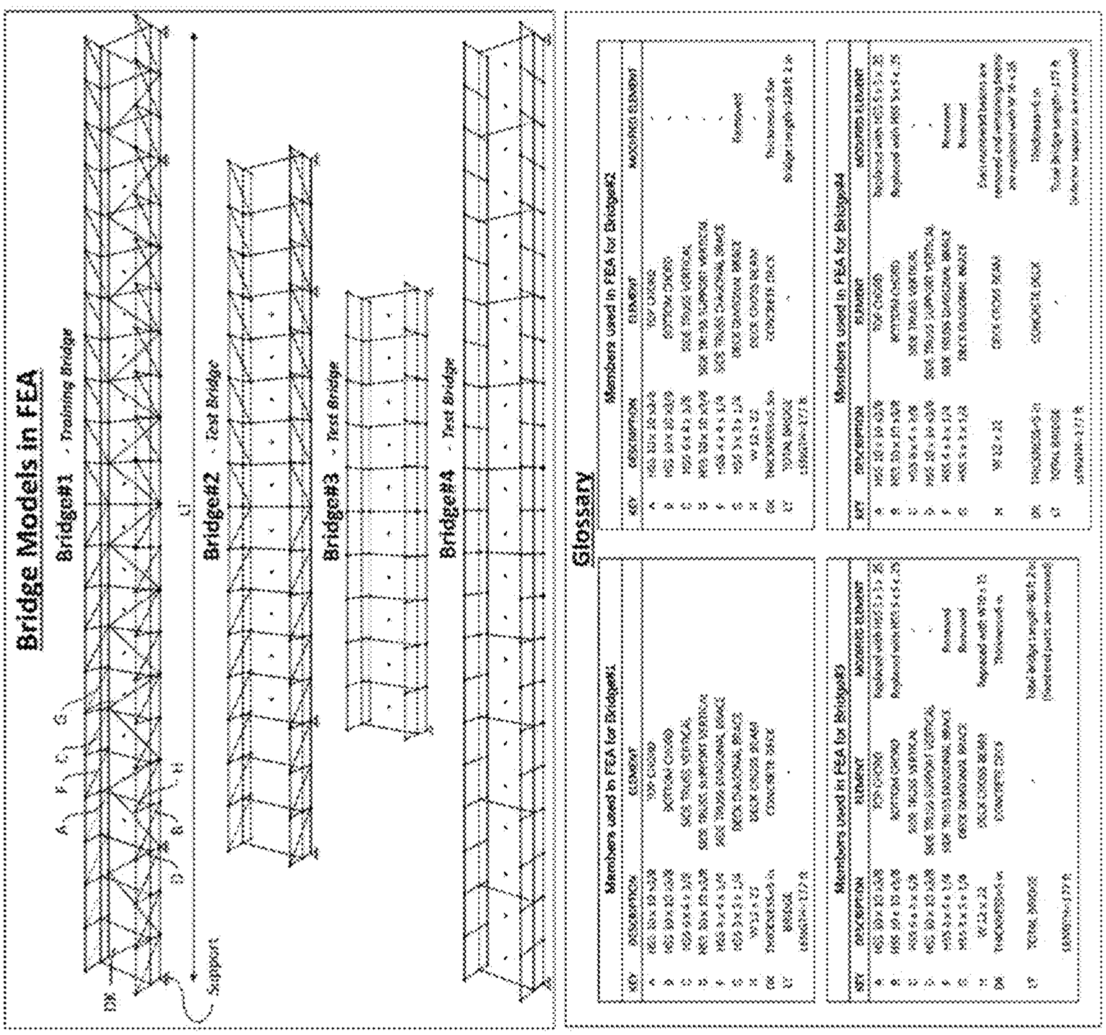
FIG. 47 is an exemplary bridge model comprising modifications made to at least one bridge model (e.g., Bridge #2, Bridge #3, and Bridge #4, based on Bridge #1 model), according to an embodiment of the present disclosure.

The other bridge models, Bridge #2, Bridge #3, and Bridge #4, on the other hand, were modelled in the FEA program with several structural adjustments. For instance, the removal of the deck-diagonal brace, reducing the thickness of the bridge deck to 2.5 in, and shortening the total bridge length by 48 ft and 10 in are the changes made in Bridge #2. In Bridge #3, the number of changes was increased: top and bottom chords were replaced with HSS5×5×0.25; side truss diagonal and deck diagonal braces were removed; deck crossbeam was replaced with W10×15; the concrete deck thickness was increased to 6 in; lastly, total bridge length was reduced to 80 ft 2 in while fixed end parts were also removed. While keeping the changes made in key letters A, B, F, G, and DK (FIG. 47) in Bridge #3, some modifications were made to H, DK, and LT in Bridge #4. As such, even-numbered deck crossbeams were removed (except the first and the last beams), and the remaining odd-numbered beams were replaced with W16×26; while keeping the bridge length the same as Bridge #1, and the interior supports were removed. As a result, the amount of modifications made to bridges goes from low to high as Bridge #2, Bridge #3, and Bridge #4. The modelled bridges can be seen in FIG. 47.

Figure 48:
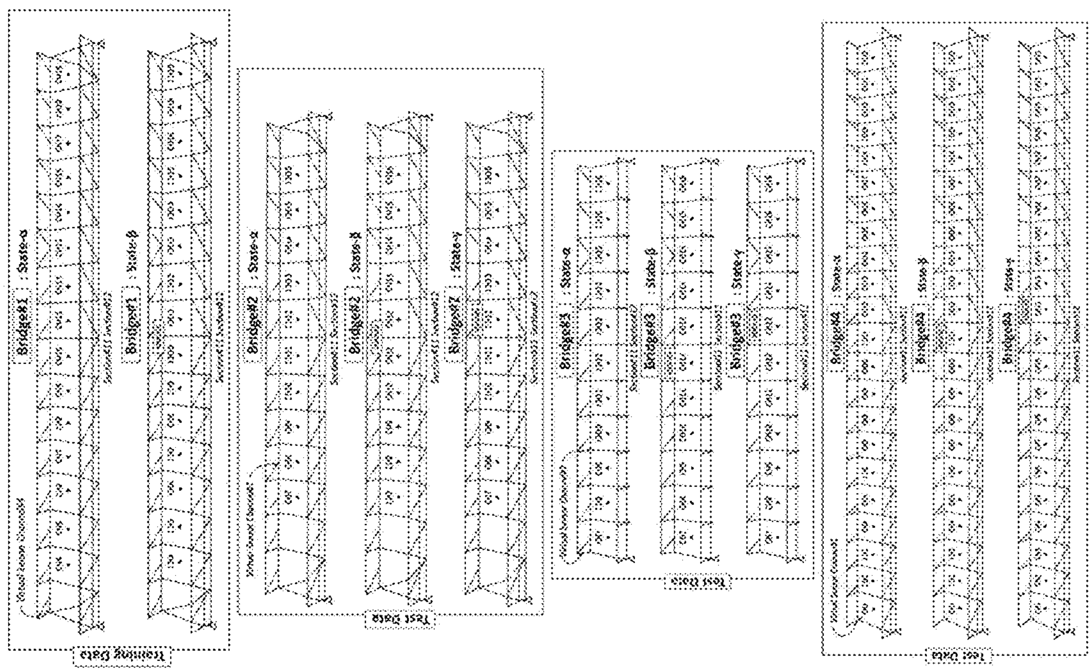
FIG. 48 is an exemplary diagram of the bridge models and their states (e.g., pristine state: State-α, and removal of bottom chords from Section #11 and Section #12: State-β and State-γ), according to an embodiment of the present disclosure.

First, in this embodiment, modal analysis is performed using Ritz vectors as it provides a better participation factor, which is important for the speed of analysis. Then, the natural frequencies and mode shapes of each state of the bridge models are identified. New mode appearances/mode switches are shown with different colors when the state of the bridge is changed from State-α to State-β or State-γ. TABLES 6-7 show the mode shapes and natural frequencies identified for each state of the bridge models. Also, the bridge models are sorted according to their overall stiffness (based on State-α). Generally, it is observed that Bridge #2 is the stiffest and Bridge #4 is the most flexible. On the other hand, the stiffness/flexibility of Bridge #1 and Bridge #3 are roughly similar, as shown in FIG. 49. After identifying the modal parameters for each bridge model, the THA is performed. For THA, a time history function is defined as an excitation signal to apply to the bridge models in the FEA program, which is a Gaussian noise with mean $\mu=0$ and standard deviation $\sigma=0.3$. The excitation signal is applied to the bridge models for 1024 seconds (t), and its sampled frequency (fs) is 256 Hz, as shown in FIG. 49. Correspondingly, the acceleration response signals were collected for t=1024 seconds and fs=256 Hz from the virtual sensor channels on each bridge model, as illustrated in FIG. 48.

As seen in TABLES 6-7, the natural frequencies of the bridges are significantly different. The type of mode shapes, however, show more similarity to each other while having considerable differences in some other modes. Additionally, some differences in mode shapes (new mode appearance/mode switch) can be observed when the bridge's state is changed from State-α to State-β or State-γ. On the other hand, there is no new mode appearance/mode switch in Bridge #2 after the state changes from State-α to State-β or State-γ, given that the bridge itself is the stiffest among other bridges. The Modal Analysis results indicate that the bridges are structurally and topologically dissimilar. Though some degree of similarity between bridges should exist, this remains an open question. A degree of similarity of the bridge structures in metric space could reveal an intuition about the similarity between the bridge models, which is an active research area in PBSHM, as mentioned previously [16].

Figure 55A:
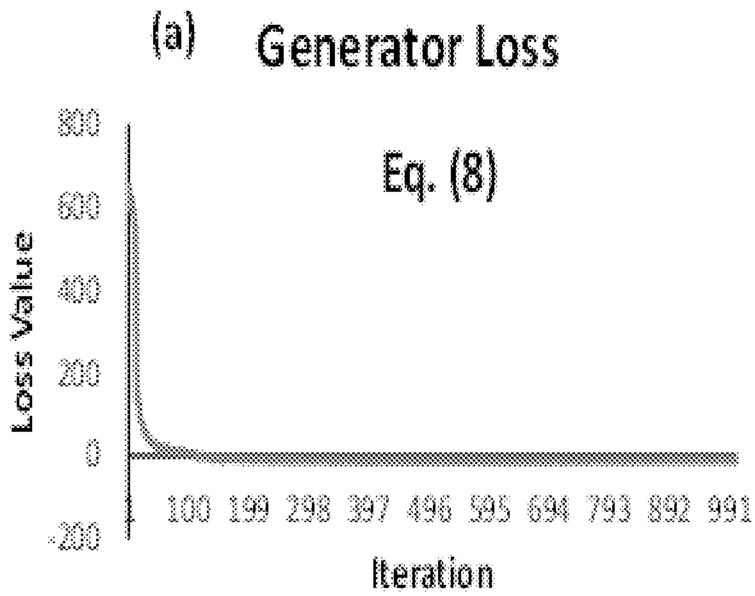
FIG. 55A is a plot illustrating a generator loss of a SST bridge training monitoring, according to an embodiment of the present disclosure.
Figure 55B:
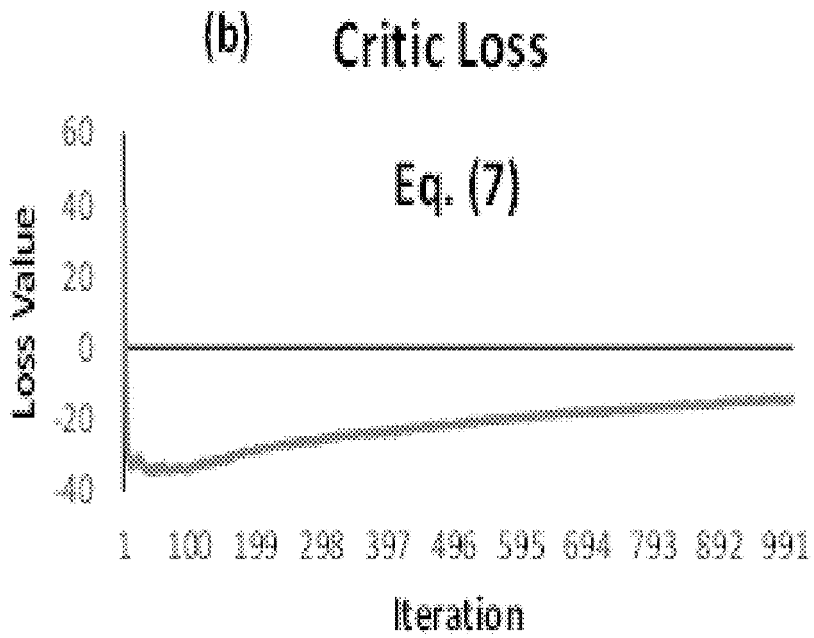
FIG. 55B is a plot illustrating a critic loss of a SST bridge training monitoring, according to an embodiment of the present disclosure.
Figure 55C:
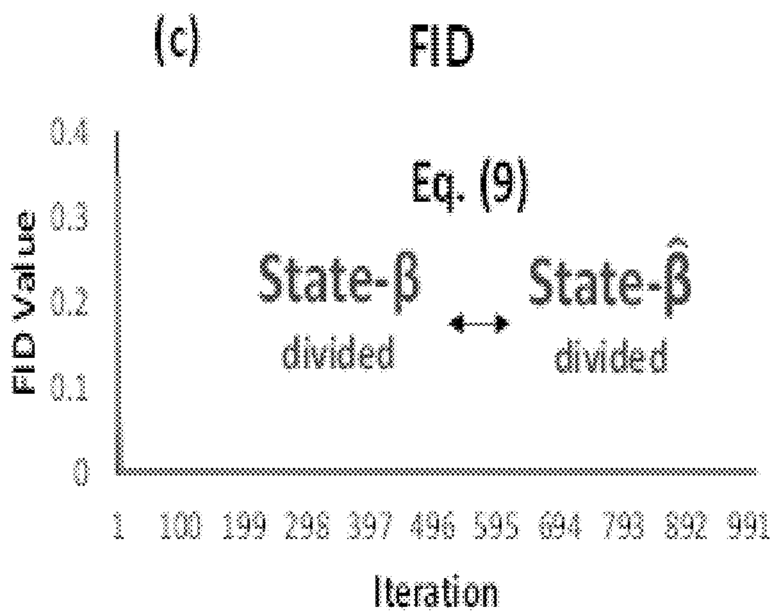
FIG. 55C is a plot illustrating an FID value of State-$\beta$ divided and State-$\hat{\beta}$ divided of a SST bridge training monitoring, according to an embodiment of the present disclosure.
Figure 55D:
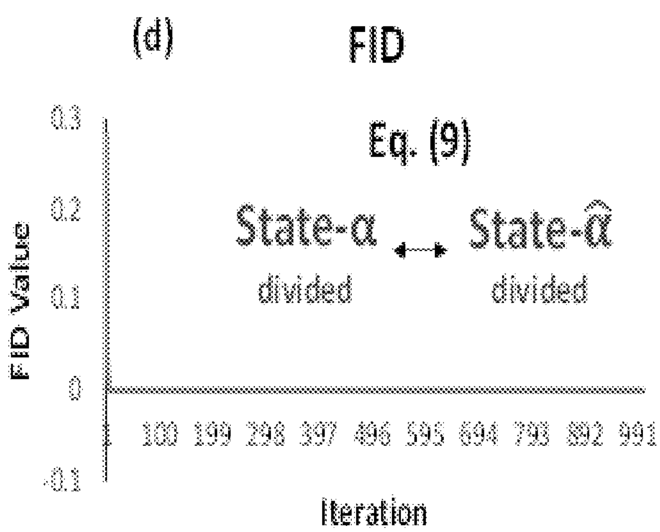
FIG. 55D is a plot illustrating an FID values of State-$\alpha$ divided and State-$\hat{\alpha}$ divided of a SST bridge training monitoring, according to an embodiment of the present disclosure.

Next, as shown in FIGS. 55A-55F, in this embodiment, the training monitoring indices are plotted over each iteration made in an epoch. As such, as shown in FIG. 55A, in this embodiment, it is observed that the total generator losses, which is the monitored loss function of Eq. (23), converged to zero. On the other hand, as shown in FIG. 55B, the total critic losses, Eq. (24), did not completely converge to zero. With fine-tuning, better learning/training results could be achieved. Additionally, as shown in FIG. 55C and FIG. 55D, the FID, Eq. (26), is also seen to converge to zero for both domains.

Figure 55E:
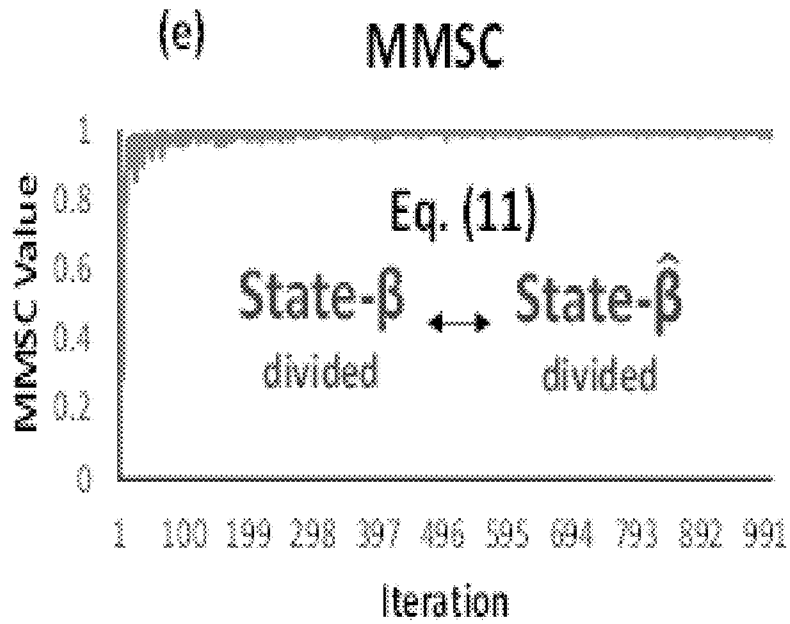
FIG. 55E is a plot illustrating an MMSC value of State-$\beta$ divided and State-$\hat{\beta}$ divided of a SST bridge training monitoring, according to an embodiment of the present disclosure.
Figure 55F:
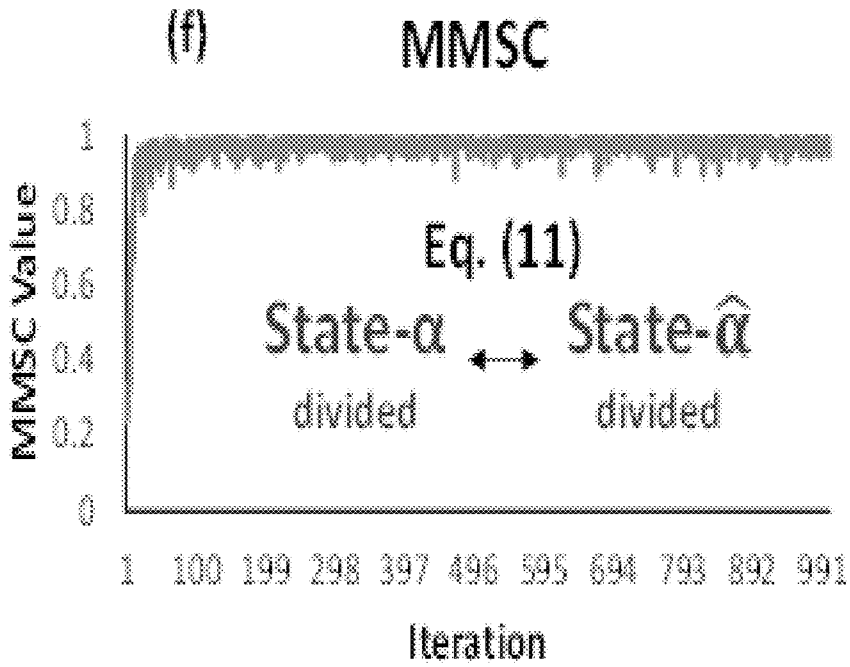
FIG. 55F is a plot illustrating a MMSC value of State-$\alpha$ divided and State-$\hat{\alpha}$ divided of a SST bridge training monitoring, according to an embodiment of the present disclosure.

However, several cases were tested in the previous experiments where the FID values followed similar trends, but the MMSC values were low, and the modal identification results of the generated datasets were not similar to the original datasets. The MMSC (Eq. (16)) values seem to be converged to 1 for both domains (FIGS. 55E-55F). Yet, the MMSC values in FIG. 55F look noisier than in FIG. 55E. This phenomenon reveals that the translated (generated or synthetic) states of State-$\hat{\beta}$ and State-$\hat{\gamma}$ are more similar to State-β and State-γ than State-$\hat{\alpha}$ being similar to State-α. This fact indicates that the SST executed in State-α to State-$\hat{\beta}$ and State-α to State-$\hat{\gamma}$ are performed slightly better than the SST executed in State-β to State-$\hat{\alpha}$ and State-γ to State-$\hat{\alpha}$. Overall, the training results show that the DGCG model has achieved a satisfactory learning process, particularly MMSC results indicating there is an almost one-to-one similarity between the generated and original data.

In essence, what is translated in the Translation phase is the domain of each bridge state, a data domain translation. The Translation phase simply consists of having the DGCG model translate the divided states to other states, as shown in Phase 3 of FIG. 50. After the DGCG model has trained on the domains $$D^{Bridge\#1}_{State-\alpha}\ (\text{State}-\alpha\ \text{divided})\ \text{and}\ D^{Bridge\#1}_{State-\beta}$$

(State-β divided), the model is used to translate State-α divided to State-$\hat{\beta}$ divided, State-α divided to State-$\hat{\gamma}$ divided, State-β divided to State-$\hat{\alpha}$ divided, and lastly, State-γ divided to State-$\hat{\alpha}$ divided for each Bridge #2, Bridge #3, and Bridge #4, as illustrated in FIG. 45. Note that "^" denotes the state is the synthetic (generated/translated) data, as mentioned previously. Additionally, as aforementioned, State-β and State-γ are structurally symmetrical. Thus, the translated State-$\hat{\beta}$ from State-α and the translated State-$\hat{\gamma}$ from State-α should be the same in terms of their structural (modal) parameters. Conversely, the translated State-$\hat{\alpha}$ from State-β and the translated State-$\hat{\alpha}$ from State-γ should be the same.

Figure 50:
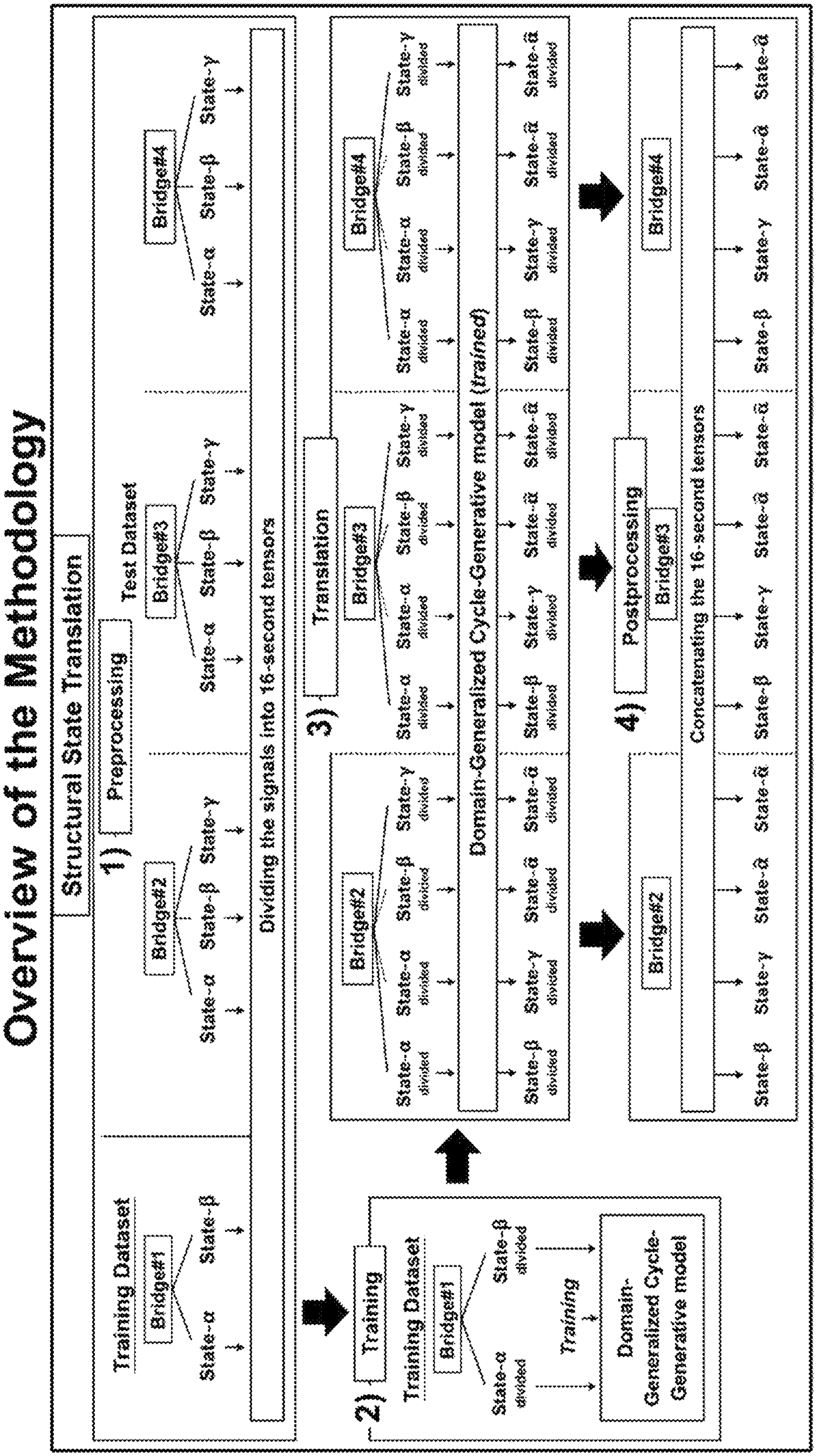
FIG. 50 is an exemplary framework of a SST methodology, according to an embodiment of the present disclosure.

Moreover, in this embodiment, each SST procedure for each bridge is carried out under separate scenarios. For instance, in Scenario I, Bridge #2 is assumed to only have data for the State-α condition, and the aim is to make the data available for another condition, State-β, which is the removal of the bottom chord of the bridge. Similarly, in Scenario II, Bridge #2 is assumed to only have data for the State-β condition, and the aim is to make the data available for another condition, State-α, which is the pristine condition of the bridge. The other scenarios are produced in a similar fashion, as shown in FIG. 45 and FIG. 50.

After concatenating the 16-second synthetic tensors to form the full signals in the states of each bridge, the evaluation of each target bridge's translated states is investigated. First, the evaluation is done using the MMSC index for each state of each target bridge. For that, the MMSC values are computed between the signal pairs from each sensor channel of actual and synthetic states of each target bridge. Note that there are two State-$\hat{\alpha}$, which were translated from State-β and State-γ. Thus, to avoid confusion, the states are represented with alphabetic letters, as shown in FIG. 57 for Bridge #2. In FIG. 57, the MMSC values are computed between the signal pairs from each channel of State-α and State-$\hat{\alpha}$ ((a)-(b)), State-α and State-$\hat{\alpha}$ ((c)-(d)), State-β and State-$\hat{\beta}$ ((e)-(f)), and State-γ and State-$\hat{\gamma}$ ((g)-(h)). In addition, the MMSC values are plotted, showing the values throughout the sensor channels on Bridge #2. The same evaluation approach is implemented for Bridge #3 and Bridge #4, which are shown in FIGS. 58-59, respectively. As can be seen from the figures, while the MMSC values are generally above 0.90 s, some values go down to 0.84 s for Bridge #2, meaning that the minimum similarity between actual and synthetic signals from each sensor channel starts from 84%. Whereas for the other bridges, the MMSC values are much higher. Additionally, the plots of MMSC values through the channels reveal that the MMSC values are roughly the same between one-half of the bridge and the other half, which is understandable because the bridges are structurally symmetrical. A more detailed discussion of the evaluation is made after the modal identification process of the actual and synthetic (translated) states in the following paragraphs.

Figure 60:
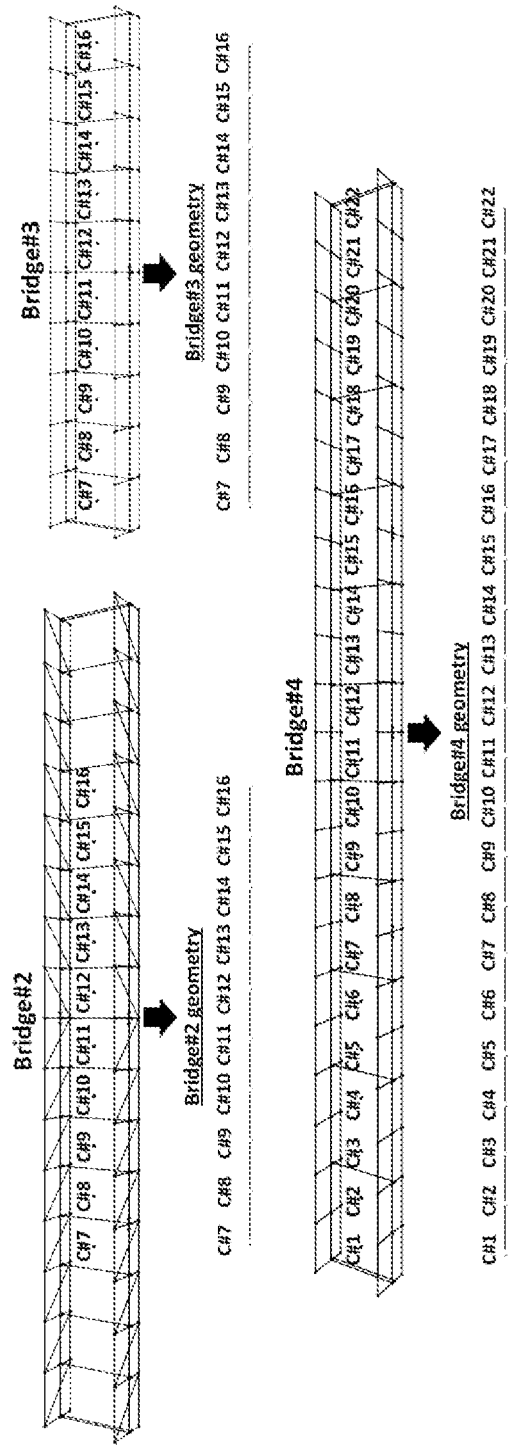
FIG. 60 is an exemplary diagram of a bridge geometry used for a modal identification procedure on an extracted signal from a bridge, according to an embodiment of the present disclosure.
Figure 62:
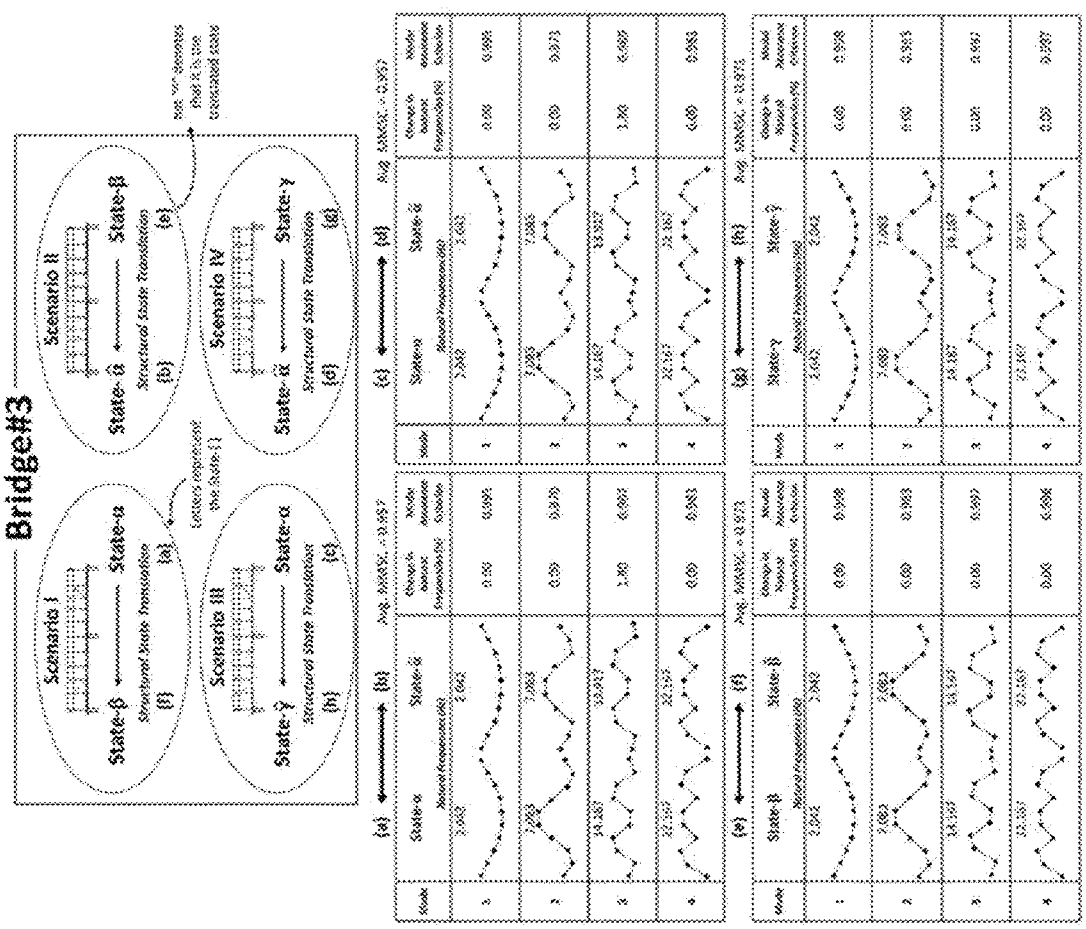
FIG. 62 is a plot illustrating a comparison of mode shapes and natural frequencies between each actual and translated states of Bridge #3, according to an embodiment of the present disclosure.
Figure 63:
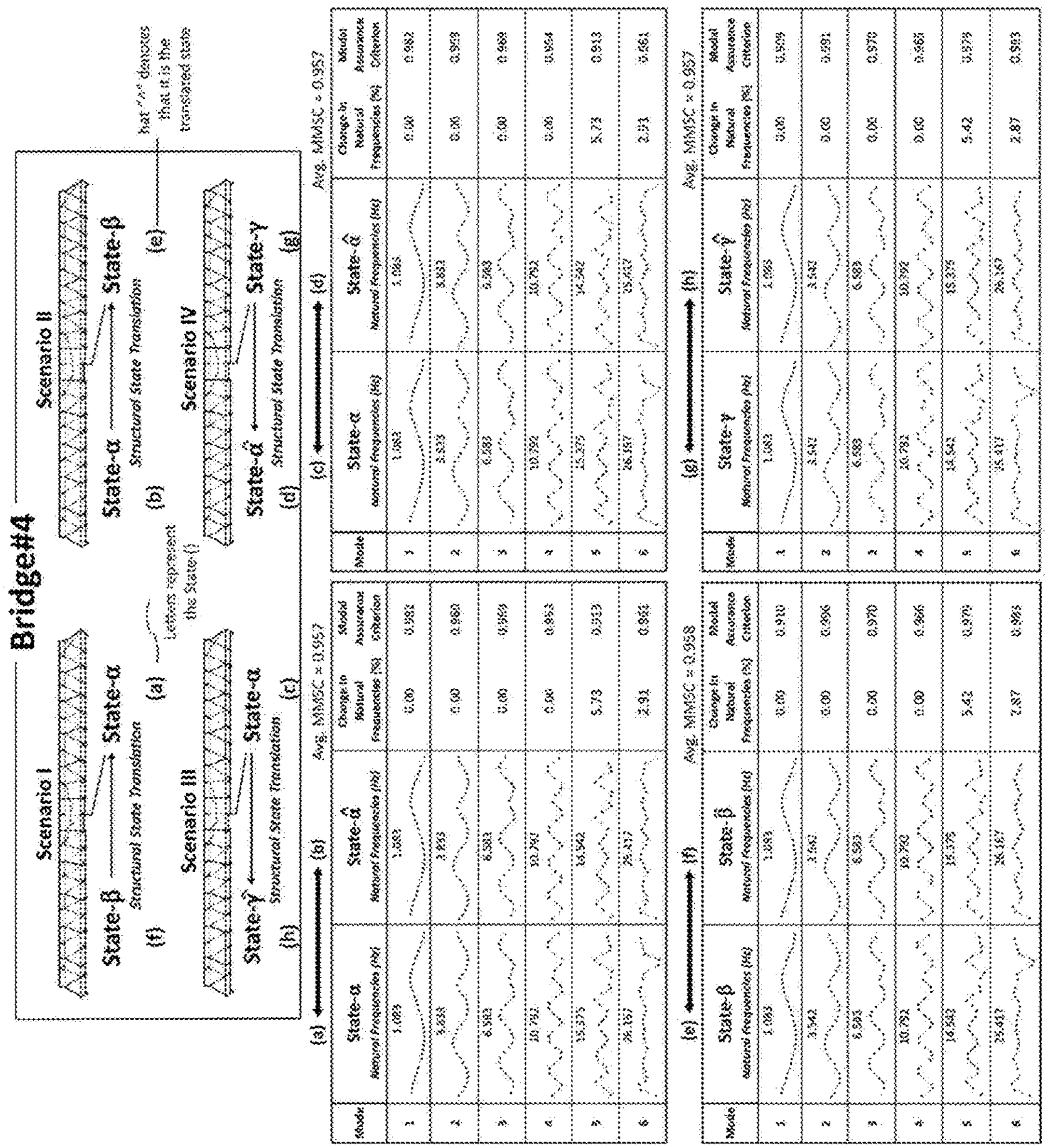
FIG. 63 is a plot illustrating a comparison of mode shapes and natural frequencies between each actual and translated states of Bridge #4, according to an embodiment of the present disclosure.

While comparing the actual and translated states via MMSC may give intuition about the signals' similarities, understanding each bridge state's physical meaning is critical in the SHM context. Therefore, a modal identification process is implemented for the state of each bridge. First, the geometry of the bridges used for the modal identification is modelled, as shown in FIG. 60. Then, the Frequency Domain Decomposition (FDD) method [75] is used with 66% Hann window overlapping and a resolution of 1024 frequency lines for each bridge state. Subsequently, the modes are identified by the peak picking technique from the obtained singular values of power spectral densities and accordingly, mode shapes and natural frequencies are extracted. In FIGS. 61-63, the modal information of the bridge states is given in a similar fashion to FIGS. 57-59. Additionally, for each state comparison of each bridge, the Change in Natural Frequencies % (CNF) and Modal Assurance Criterion (MAC) for the dominating modes that were picked are calculated and compared, as well as the illustrations of the mode shapes provided. Lastly, the average MMSC values of each state comparison are shown as they are related to the modal identification results, which is discussed in the following paragraphs.

Overall, it can be observed from FIGS. 56-58 and FIGS. 61-63 that the DGCG model achieved successful SST performance in each scenario. The MMSC values demonstrated that the translated bridge states are extremely similar to the actual states. As such, from the comparison of each bridge state, the lowest and the highest average MMSC values are observed to be 91.2% and 97.1%, respectively. Moreover, the natural frequencies and the mode shapes between each bridge state are also observed to be significantly similar. Hence, the highest and the lowest difference in natural frequencies among the modes of the bridge states are, respectively, 5.71% and 0%, while the highest and lowest MAC values are 0.998 and 0.87. Accordingly, some observations and interpretations are made, which are presented in the following paragraphs.

The modes of each bridge state using Modal Analysis in the FEA program account for torsional, lateral, and longitudinal modes. However, the modal identification process implemented via FDD on the extracted signals from bridges accounts for bending modes due to the layout of virtual sensors on the models (single-line layout). Therefore, the torsional, lateral, and longitudinal modes were not visible in the identified modes. Some other bending modes were also not detected in the singular values of power spectral densities, particularly for Bridge #2 due to being the stiffest bridge among other bridges. In addition, considering the typical numerical errors and possible noise interruption during the data extraction in the FEA programs, the number of dominating modes identified on the extracted data from the bridges was lower than the modes obtained numerically in FEA. As a result, 2 modes for Bridge #2, 4 modes for Bridge #3, and 6 modes for Bridge #4 could be identified. This makes sense as the overall stiffness of the bridges could be ranked in ascending order as Bridge #2, Bridge #3, and Bridge #4 (i.e., FIG. 49), which is a similar order to the number of dominating modes that could be identified. Nonetheless, the identified modes after FDD show that the generated modes are significantly similar to the actual modes (i.e., FIGS. 61-63).

Observation 1: Generally, in this embodiment, the SSTs executed in Scenario I and Scenario III in FIGS. 61-63 are slightly better. As such, the values in Percent Change in Natural Frequency (CNF) between State-β and State-$\hat{\beta}$, and State-γ and State-$\hat{\gamma}$, are slightly lower than the comparisons of both State-α and State-$\hat{\alpha}$, which the SSTs for them were carried out in Scenario II and Scenario IV. Similarly, the Modal Assurance Criteria (MAC) and average MMSC values between State-β and State-$\hat{\beta}$, and State-γ and State-$\hat{\gamma}$, are slightly higher than the comparisons of both State-α and State-$\check{\alpha}$. This observation indicates that the SST process was slightly more successful in generating unhealthy (damaged) states, which was initially observed during the training of the DGCG model, where the MMSC values in FIG. 55F looked noisier than in FIG. 55E.

Observation 2: In this embodiment, the SST evaluation results for Bridge #3 (FIG. 57 and FIG. 61) are slightly better than those of other bridges. As such, the CNF values are lower, and MAC and average MMSC values are higher for Bridge #3. This is understandable as the stiffness/flexibility of Bridge #1, which the model DGCG was trained with, is most similar to the stiffness/flexibility of Bridge #3. In other words, since Bridge #1 and Bridge #3 are most similar to each other in terms of their structural parameters, it makes sense when DGCG performs better in the scenarios of Bridge #3 than the scenarios of other target bridges.

Observation 3: In this embodiment, when there is a new mode appearance/mode switch in the states of Bridge #2, Bridge #3, and Bridge #4, as shown in TABLES 6-7, those particular modes in the translated states are slightly off than the ones in actual states, which are confirmed with small values in CNF and slightly lower MAC values. This is because the new mode appearance/mode switch in the target/test domain (the states of Bridge #2, Bridge #3, and Bridge #4) is different from what the DGCG model already knows from the source/training domain (the states of Bridge #1). As mentioned, the new mode appearance/mode switch is observed when the states of the bridges are changed from State-α to State-β or to State-γ. In this regard, the DGCG model knows the mode shape changes that occurred in the states of source domains where the "bending" mode shape becomes "lateral-torsional", and the "lateral" mode becomes only "torsional". Yet, the mode shape changes are different in the target domains. For instance, the bending mode shape ($6^{th}$ mode) in State-α of Bridge #3 becomes "bending-longitudinal" or solely "longitudinal" in mode 7. In summary, if the types of new mode appearance/mode switch are different in the source domains than the target domains, this generally cause small values in CNF and occasionally a little lower MAC values.

Observation 4: The values in CNF in FIG. 62 (i.e., Bridge #3) are attributed to Observation 3, in which a different mode shape change occurs in mode five and mode 6, as shown in TABLE 7, in the target domain than in the source domain (i.e., Bridge #1). However, CNF is zero in the comparison of State-β and State-$\hat{\beta}$, and State-γ and State-$\hat{\gamma}$, which is attributed to Observation 1. The low MAC values in mode 2 when comparing State-α and State-$\hat{\alpha}$ (e.g., for both cases) might also be attributed to Observation 1; however, the reasoning behind it is not fully clear. Additionally, MAC and average MMSC values are generally a little higher when comparing State-β and State-$\hat{\beta}$, and State-γ and State-γ, than comparing State-α and State-$\hat{\alpha}$ (for both cases), which supports Observation 1.

Observation 5: The values in CNF in FIG. 63 (i.e., Bridge #4) are attributed to Observation 3 as different mode shape changes occur in modes 9 and 10, as shown in TABLE 7, in the target domain than in the source domain (i.e., Bridge #1). The values in CNF are higher when comparing State-α and State-$\hat{\alpha}$ (e.g., for both cases) than the values in CNF for State-β and State-$\hat{\beta}$, and State-γ and State-$\hat{\gamma}$, which is attributed to Observation 1. Additionally, MAC and average MMSC values are generally a little higher when comparing State-β and State-$\hat{\beta}$, and State-γ and State-$\hat{\gamma}$, than comparing State-α and State-$\hat{\alpha}$ (for both cases), which also supports Observation 1.

Observation 6: Bridge #2 is the most dissimilar to Bridge #1, which the DGCG model was trained on, as shown in FIG. 61. The values in CNF are likely due to this very reason, supporting Observation 2. The values in CNF are slightly higher when comparing the State-α and State-$\hat{\alpha}$ (e.g., for both cases) than the values in CNF for State-β and State-$\hat{\beta}$, and State-γ and State-$\hat{\gamma}$, which is attributed to Observation 1. Similarly, the average MMSC values are higher when comparing State-β and State-$\hat{\beta}$, and State-γ and State-$\hat{\gamma}$, than the average MMSC values for State-α and State-$\hat{\alpha}$ (e.g., for both cases), which is also attributed to Observation 1. Additionally, Bridge #2 is the stiffest among other bridges in which only two peaks in the singular values of spectral densities were identified. Thus, it was challenging to analyze Bridge #2 due to the less identified modes.

Observation 7: The MMSC index is found to be a good index for SST for monitoring the training and testing of the model. As such, it shows great consistency with the natural frequencies, mode shapes, and MACs. For example, the average MMSC values are higher for the SSTs executed in Scenario I and Scenario III and lower in Scenario II, and Scenario IV, which was also the case concluded after checking the frequencies, mode shapes, and MACs (i.e., Observation 1). The MMSC values also show symmetry throughout the bridges from one half to the other half of the bridges, which makes sense as the bridges are geometrically and materially symmetrical, as well as the State-β and State-γ. Lastly, as shown in FIG. 62, having an average MMSC value of 0.97 (i.e., 97%) or higher for comparing the states suggests that the modes of the bridge states are the same or extremely similar. This simplifies the SST evaluation process as it could optimize the effort spent for exhaustive modal identification procedures to check their natural frequencies, mode shapes and so on.

TABLE 6

| | | State-α | | State-β | | State-γ | | | | State-α | | State-β | | State-γ | |
|---|---|---|---|---|---|---|---|---|---|---|---|---|---|---|---|
| | Mode No | f (Hz) | Mode Shape | f (Hz) | Mode Shape | f (Hz) | Mode Shape | | Mode No | f (Hz) | Mode Shape | f (Hz) | Mode Shape | f (Hz) | Mode Shape |
| Bridge#1 | 1 | 3.17 | 1st bending | 2.89 | 1st bending | 2.89 | 1st bending | Bridge#2 | 1 | 7.29 | 1st bending | 6.90 | 1st bending | 6.90 | 1st bending |
| | 2 | 5.30 | 1st tor-sional | 5.31 | 1st tor-sional | 5.31 | 1st tor-sional | | 2 | 8.96 | 1st tor-sional | 8.61 | 1st tor-sional | 8.61 | 1st tor-sional |
| | 3 | 7.39 | 2nd bending | 7.26 | 2nd bending | 7.26 | 2nd bending | | 3 | 11.14 | 2nd bending | 11.14 | 2nd bending | 11.14 | 2nd bending |
| | 4 | 11.58 | 3rd bending | 10.83 | 1st lateral & torsional | 10.83 | 1st lateral & torsional | | 4 | 12.28 | 3rd bending | 12.20 | 3rd bending | 12.19 | 3rd bending |
| | 5 | 12.12 | 1st lateral | 11.15 | 2nd torsional | 11.15 | 2nd torsional | | 5 | 13.45 | 4th bending | 13.40 | 4th bending | 13.38 | 4th bending |
| | 6 | 14.29 | 4th bending | 13.92 | 4th bending | 13.92 | 4th bending | | 6 | 15.58 | 5th bending | 14.59 | 5th bending | 14.45 | 5th bending |
| | 7 | 16.88 | 5th bending | 16.15 | 5th bending | 16.15 | 5th bending | | 7 | 19.29 | 6th bending | 17.71 | 6th bending | 17.60 | 6th bending |
| | 8 | 19.25 | 6th bending | 19.04 | 6th bending | 19.04 | 6th bending | | 8 | 24.53 | 7th bending | 21.73 | 7th bending | 21.63 | 7th bending |
| | 9 | 34.87 | 7th bending | 31.73 | 7th bending | 31.74 | 7th bending | | 9 | 42.08 | 8th bending | 41.41 | 8th bending | 41.40 | 8th bending |
| | 10 | 54.02 | 8th bending | 52.51 | 8th bending | 52.52 | 8th bending | | 10 | 80.98 | 9th bending | 74.83 | 9th bending | 74.67 | 9th bending |

TABLE 7

| | Mode No | State-α f (Hz) | State-α Mode Shape | State-β f (Hz) | State-β Mode Shape | State-γ f (Hz) | State-γ Mode Shape |
|---|---|---|---|---|---|---|---|
| Bridge#3 | 1 | 2.09 | 1st bending | 2.03 | 1st bending | 2.03 | 1st bending |
| | 2 | 4.15 | 1st torsional | 4.12 | 1st torsional | 4.12 | 1st torsional |
| | 3 | 4.45 | 2nd bending | 4.35 | 2nd bending | 4.35 | 2nd bending |
| | 4 | 7.23 | 3rd bending | 7.07 | 3rd bending | 7.07 | 3rd bending |
| | 5 | 8.56 | 2nd torsional | 10.18 | 4th bending | 10.18 | 4th bending |
| | 6 | 13.83 | 4th bending | 13.69 | 1st bending & longitudinal | 13.69 | 1st bending & longitudinal |
| | 7 | 21.48 | 5th bending | 13.97 | 1st longitudinal | 13.98 | 1st longitudinal |
| | 8 | 26.02 | 6th bending | 21.46 | 5th bending | 21.46 | 5th bending |
| | 9 | 33.94 | 7th bending | 31.20 | 6th bending | 31.21 | 6th bending |
| | 10 | 77.90 | 8th bending | 65.06 | 7th bending | 65.11 | 7th bending |
| Bridge#4 | 1 | 1.10 | 1st bending | 1.06 | 1st bending | 1.06 | 1st bending |
| | 2 | 2.09 | 1st torsional | 2.08 | 1st torsional | 2.08 | 1st torsional |
| | 3 | 2.35 | 2nd bending | 2.33 | 2nd bending | 2.33 | 2nd bending |
| | 4 | 3.67 | 3rd bending | 3.52 | 3rd bending | 3.52 | 3rd bending |
| | 5 | 4.44 | 2nd torsional | 4.51 | 2nd torsional | 4.51 | 2nd torsional |
| | 6 | 5.81 | 3rd torsional | 5.13 | 1st bending & torsional | 5.13 | 1st bending & torsional |
| | 7 | 6.67 | 4th bending | 6.57 | 4th bending | 6.57 | 4th bending |
| | 8 | 10.30 | 5th bending | 10.14 | 2nd bending & torsional | 10.14 | 2nd bending & torsional |
| | 9 | 14.89 | 6th bending | 14.36 | 3rd bending & torsional | 14.36 | 3rd bending & torsional |
| | 10 | 25.52 | 7th bending | 24.47 | 4th bending & torsional | 24.47 | 4th bending & torsional |

TABLE 8

| Parameter | Description |
|---|---|
| Batch Size (N) | 4 |
| Epoch | 160 |
| Learning Rate | $1 \times 10^{-5}$ |
| Critic Iteration per Epoch | 10 |
| $\lambda_{Id}$ (Identity Loss) | 10 |
| $\lambda_{Cyc}$ (Cycle Loss) | 10 |
| $\lambda_{GP}$ (Gradient Penalty) | 30 |
| Optimizer | AdamW |

Example 4

Improved Structural State Translation for the Structural Health Monitoring System In an embodiment, the dataset used in the SST methodology is created from numeric bridge deck models as they are modelled and analyzed in the Finite Element Analysis (hereinafter "FEA") program. First, the decks are modelled in the FEA program. Then, they are analyzed through Time History Analysis (hereinafter "THA") after applying a Gaussian noise. Subsequently, the acceleration response signals are extracted from the virtual sensor channels on each deck model, forming the respective dataset of each deck state to be later employed in the SST methodology. Finally, a modal identification process is performed using the datasets extracted from the models to identify the physical meaning of each deck model.

Accordingly, in this embodiment, Model Deck #1 is adapted from the NASA Causeway bridge, a major connection between J.F. Kennedy Space Center and inland Florida. The bridge consists of two separate bridges, Eastbound and Westbound. Each bridge has a total length of 2993 ft and consists of 53 prestressed AASHTO Type II Girders spans with 52 ft each, two flanking spans, and a steel double-leaf bascule main span. The decks are structurally identical based on their geometric and material properties and positions. Thus, the structural parameters of the as-built condition decks are the same. Model Deck #2, on the other hand, is adapted from Bennett Causeway bridge, located about 9 miles south of NASA Causeway bridge, where both bridges cross the same Indian River. The modelling of the Bennett Causeway bridge is mostly assumed from Google Earth views and based on engineering sense as the structural plans of the bridge are not available, unlike the NASA Causeway bridge.

Figure 64:
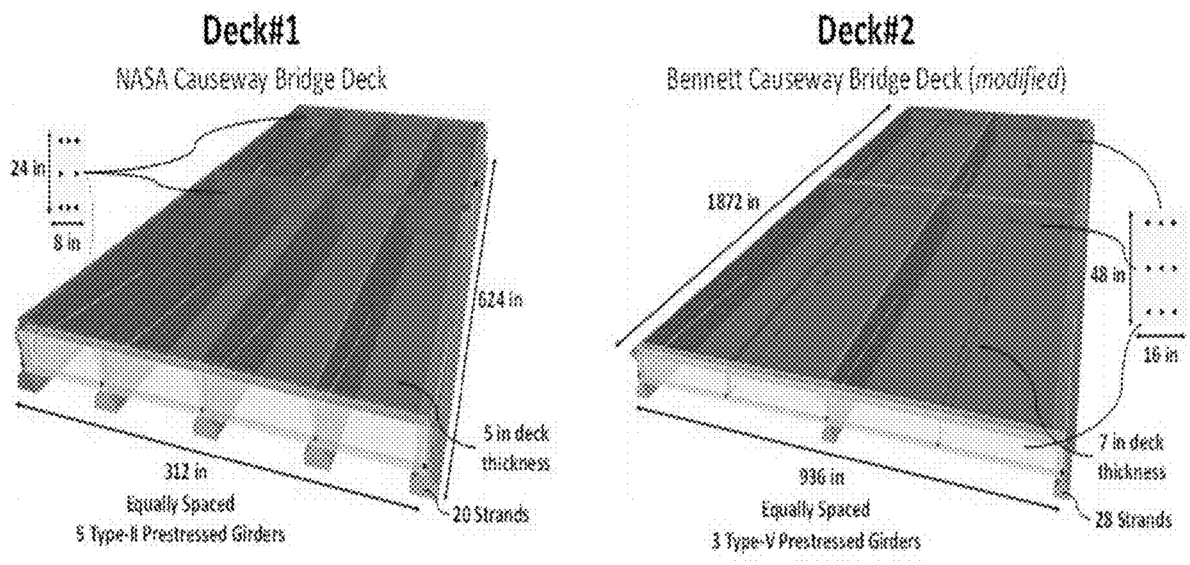
FIG. 64 is a Finite Element model of at least one decks: Deck #1 is adapted from the NASA Causeway bridge, and Deck #2 is adapted from the Bennett Causeway bridge, according to an embodiment of the present disclosure.

The Bennett Causeway bridge is structurally relatively similar to the NASA Causeway bridge, except for having 6 AASHTO Type II girders in each deck, whereas the NASA Causeway bridge has 5 AASHTO Type II girders. Additionally, the NASA Causeway bridge is composed of a steel double-leaf bascule in the middle. As both bridges are somewhat similar, some modifications are made to Model Deck #2 to make the SST methodology more challenging in order to demonstrate its potential further. As such, the 6 AASHTO Type II girders are replaced with 3 AASHTO Type V girders in Model Deck #2. Additional structural details of the deck models can be seen in FIG. 64.

Figure 65:
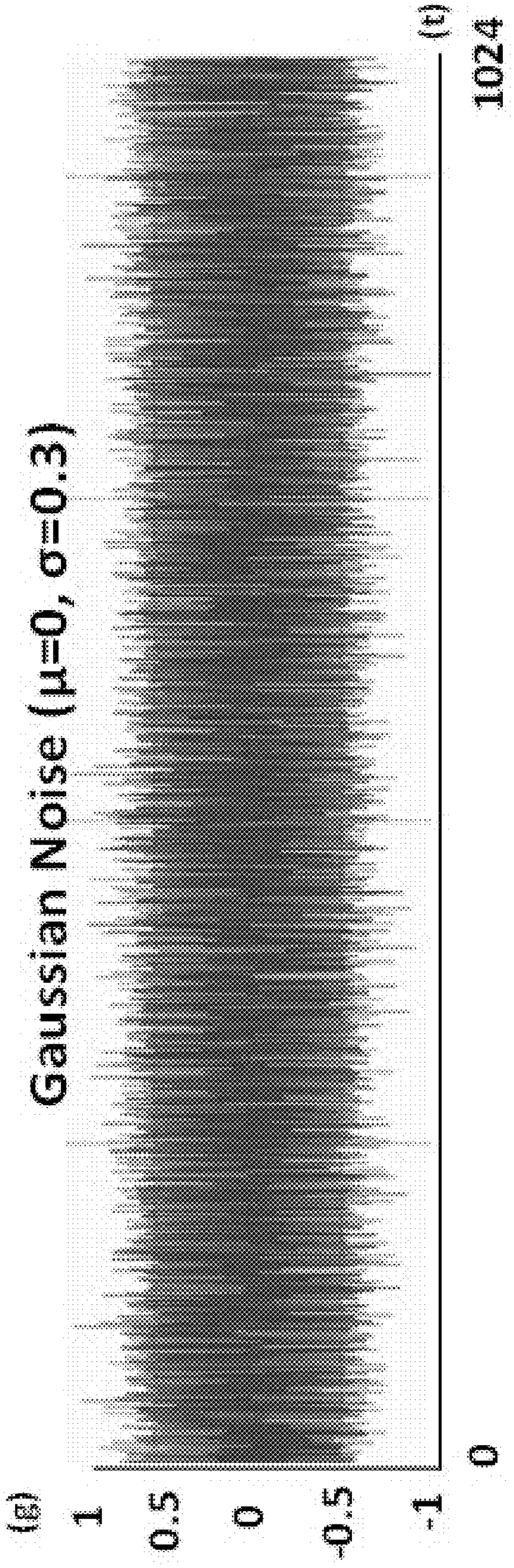
FIG. 65 is a plot illustrating an excitation signal to the deck models of FIG. 64 in the form of Gaussian noise with mean $\mu=0$ and standard deviation $\sigma=0.3$, according to an embodiment of the present disclosure.
Figure 66:
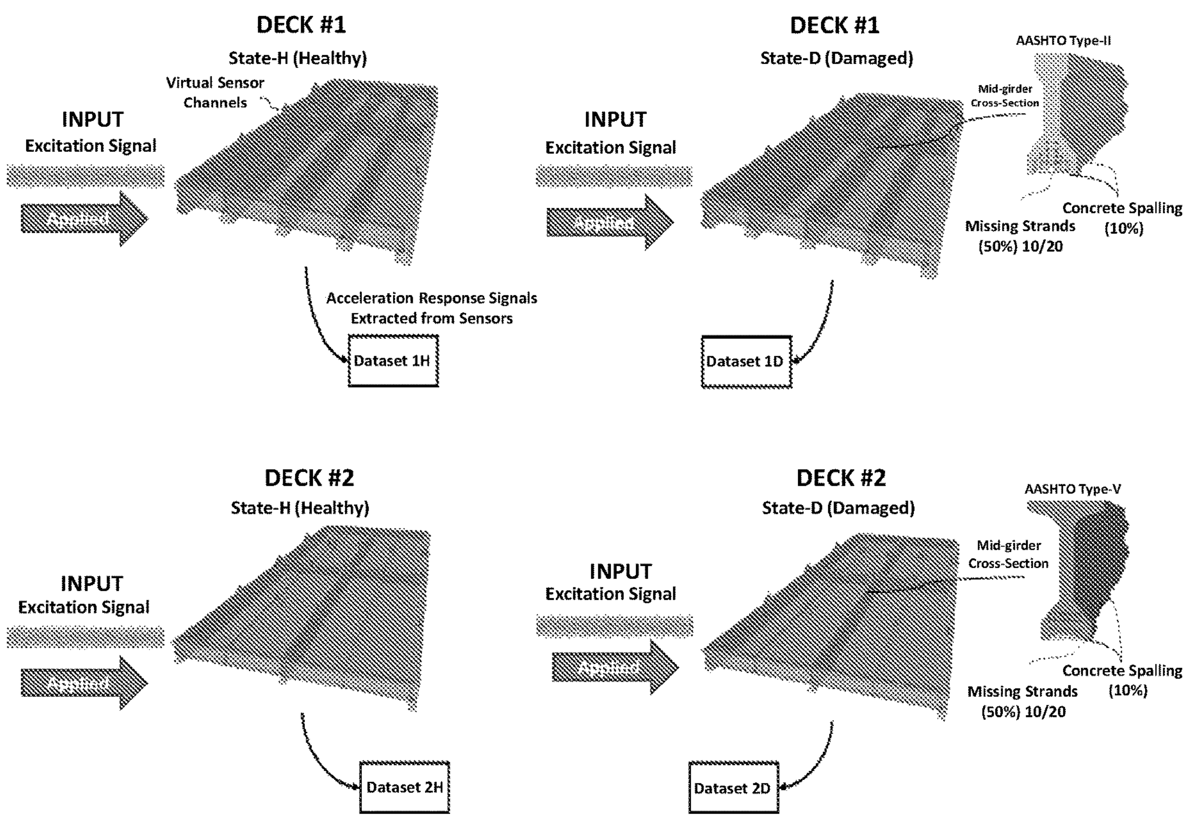
FIG. 66 is an exemplary diagram illustrating a THA for each deck of FIG. 64 after the excitation signal has been applied to each deck model, according to an embodiment of the present disclosure.

Four different deck models are created: State-H and State-D of Deck #1 and Deck #2. State-H is the healthy condition, and State-D is the damaged condition of the deck, where the damage case is assumed to be 50% of the strands missing in addition to 10% cross-section loss in the area of the middle girder as the concrete spalling has to occur before the corrosion reaches to the strands in actual-world conditions. Then, to conduct the THA of each deck model, a time history function is defined in the FEA program as an excitation signal to apply to each model. The signal is a Gaussian noise with mean μ=0, standard deviation σ=0.3, for 1024 seconds ("t"), and its sampled frequency ("fs") is 256 Hz, shown in FIG. 65. After applying the excitation signal to the deck models, the THA for each model is carried out under the defined history function. Then, the acceleration response signals are collected from the virtual sensor channels for the same (t) and (fs) from each model to form the respective dataset of each state, as illustrated in FIG. 66. Each dataset consists of a 15-channel acceleration response signal in a matrix format. The datasets are represented as Dataset 1H, Dataset 1D, Dataset 2H, and Dataset 2D, where the numbers (e.g., 1 and 2) denote the deck numbers, and the letters (e.g. H and D) denote the state of the decks, H being healthy, D being damaged.

Understanding the physical meanings of the bridge decks is important in the SHM context. Hence, a modal identification process is performed on the datasets extracted from each deck model in the Artemis®. The modal parameters are identified using the Stochastic Subspace Identification technique with an Extended Unweighted Principal Component (e.g., SSI-UPCX), which makes use of the additional covariance information to make a better prediction of the final set of modes than typically averaging the stable modes of different model orders to find the final prediction. The SSI-UPCX method is used with 66% Hann window overlapping and a resolution of 4096 frequency lines for the dataset of each deck model.

The modal parameters of State-H and State-D of Deck #1 and Deck #2 obtained using the SSI-UPCX method are given in FIG. 67. A total of four modes are identified for Dataset 1H and Dataset 1D (e.g., datasets of Deck #1); on the other hand, three modes are obtained for Dataset 2H and Dataset 2D (e.g., datasets of Deck #2). No clear modes were observed after Mode 3 in the datasets of Deck #2. As seen in the figure, the modal parameters of Deck #1 and Deck #2 are significantly different, as well as the modes between Mode 2-4, which allows us to assume that the deck structures are dissimilar. It is also observed that the Complexity (%) values are low, indicating that the mode shapes' minimum and maximum values are occurring simultaneously. Having the Complexity (%) of the mode shapes minimal is preferable. The mode shapes may be complex due to inconsistent data/bad measurements, poor modal estimation, or non-proportional damping.

Figure 68:
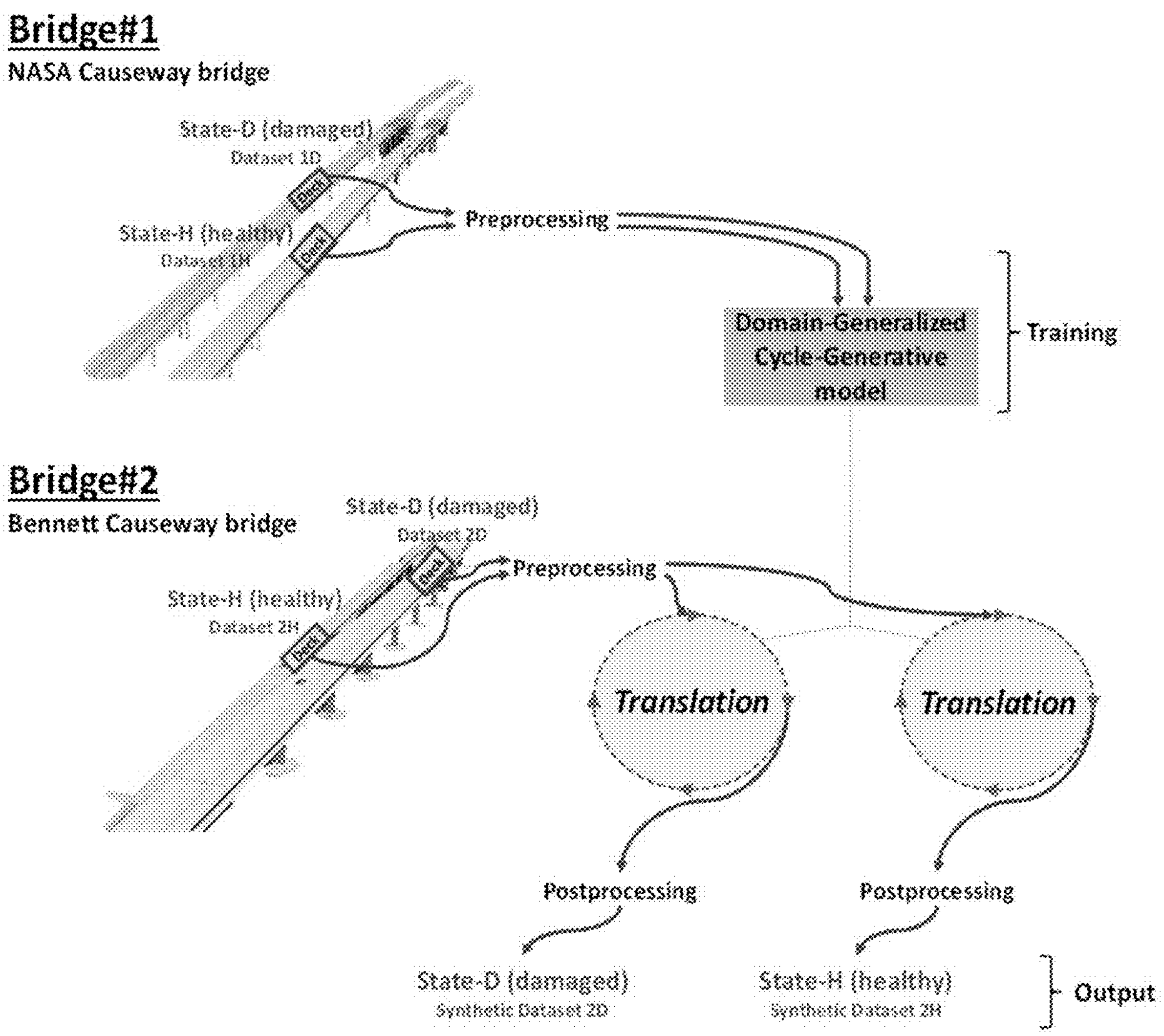
FIG. 68 is an exemplary diagram illustrating an SST implemented on two decks from different bridge structures, according to an embodiment of the present disclosure.

The SST methodology implemented can be conceptually illustrated, as in FIG. 68. As mentioned earlier, the decks of the NASA Causeway bridge are structurally identical in terms of their geometric and material properties and positions. Thus, the structural parameters of the as-built condition decks are the same, allowing us to use two distinct data domains (e.g., undamaged and damaged) from different decks in the DGCG model.

Figure 69:
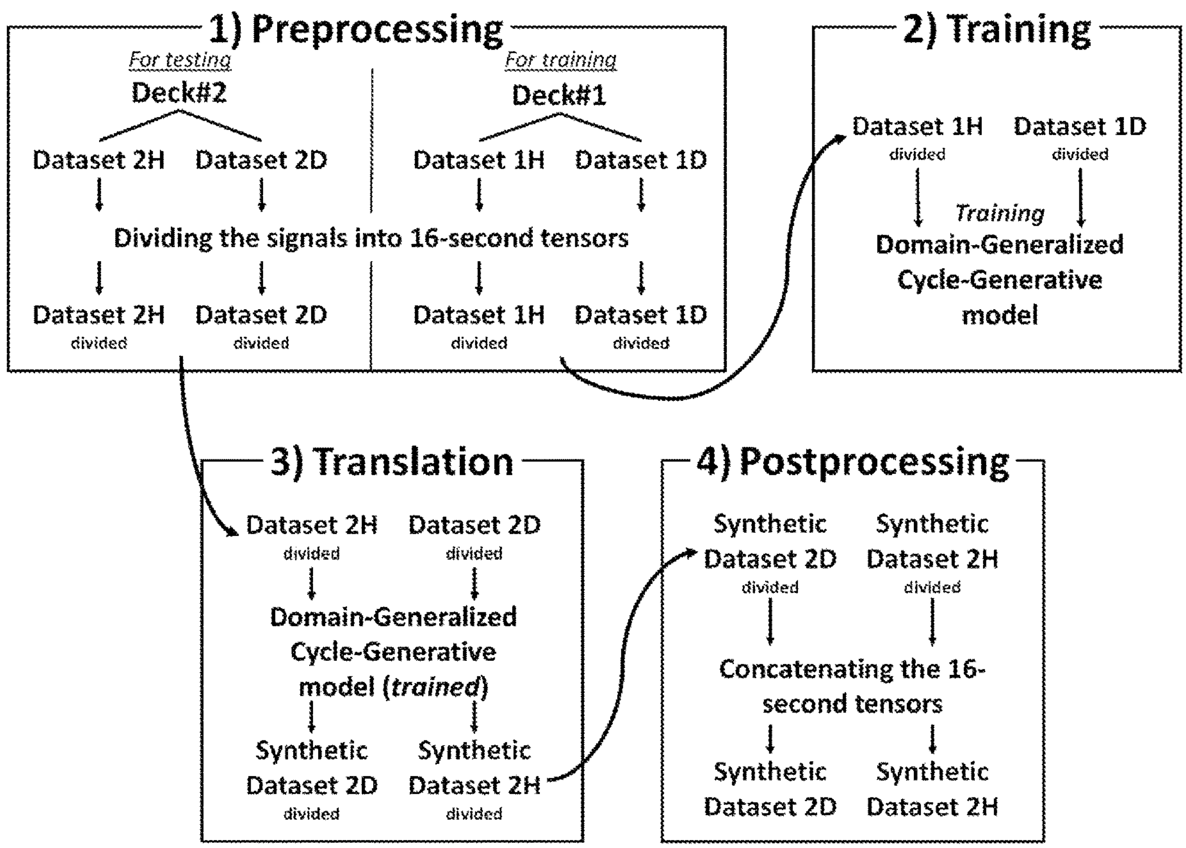
FIG. 69 is an exemplary diagram illustrating an SST methodology comprising Preprocessing, Training, Translation, and/or Postprocessing, according to an embodiment of the present disclosure.

This section presents SST in a more condensed, straightforward, and simple format. The SST framework consists of four steps: (1) Preprocessing, (2) Training, (3) Translation, and (4) Postprocessing. These steps are visualized in FIG. 69.

In the Preprocessing step, the 1024-second response signal in each sensor channel in the datasets (e.g., Dataset 1H, Dataset 1D, Dataset 2H, Dataset 2D) are divided into 16-second tensors, resulting in 64 amount of 16-second tensors per sensor channel. As known in the prior art, this approach is implemented for a more efficient training procedure. After dividing the signals into tensors, the datasets, consisting of 16-second tensors per sensor channel, are named Dataset divided 1H, Dataset divided 1D, Dataset divided 2H, and Dataset divided 2D.

Figure 70:
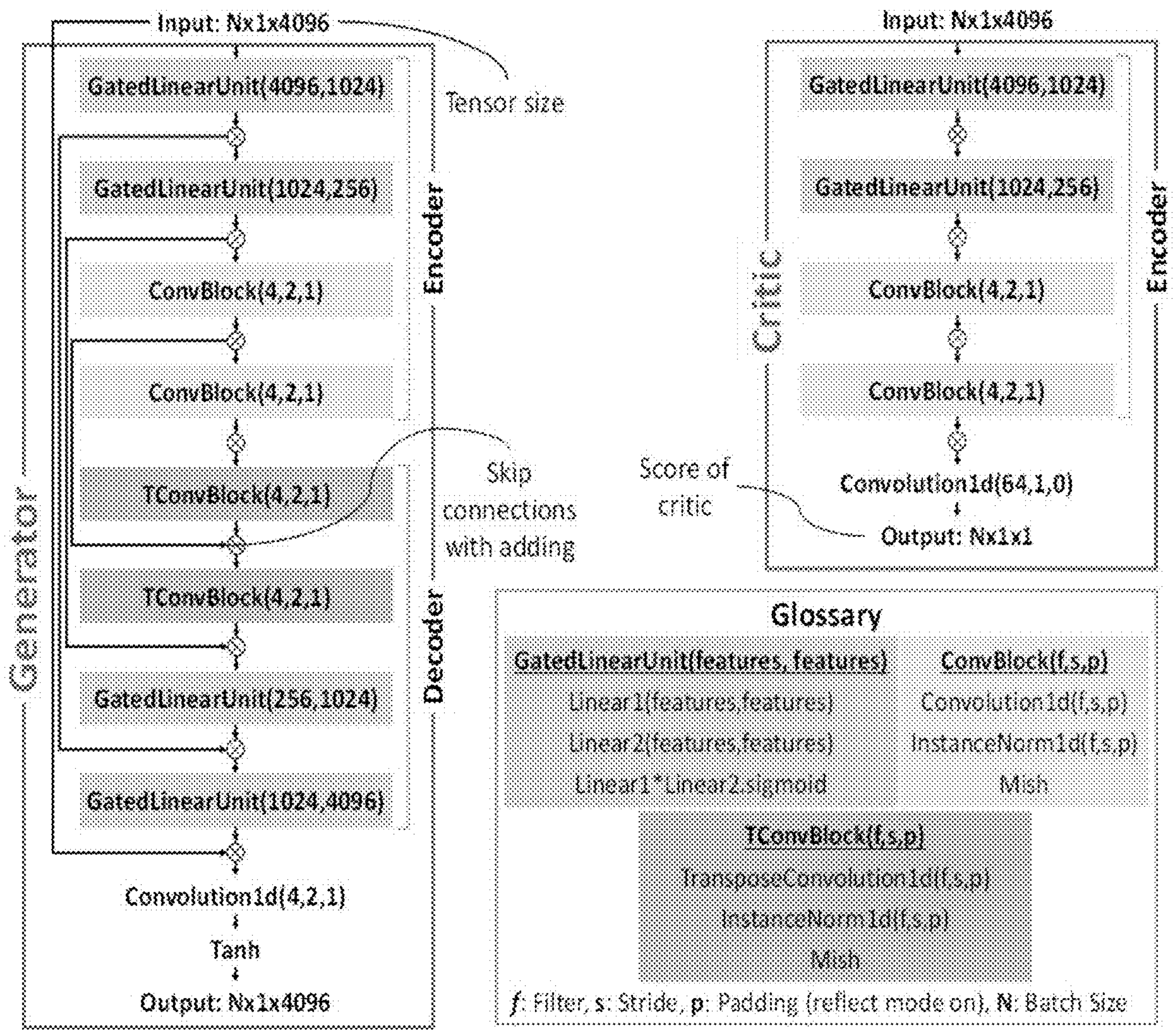
FIG. 70 is an exemplary diagram illustrating a single model architecture of the Domain-Generalized Cycle-Generative model, according to an embodiment of the present disclosure.

In the Training step, the DGCG model is trained on the Dataset divided 1H and Dataset divided 1D. In other words, the model is trained with 960 tensors from State-Hof Deck #1 and 960 tensors from State-D of Deck #1, where 960 comes from the multiplication of 64 amount of 16-second tensors and the total number of sensor channels, which is 15. As such, the number of learnable model parameters is reduced from 80 million to 53.7 million (e.g., fewer parameters, less training time). Separating the mapping networks and positioning them both in the encoders and decoders helped to accomplish this efficiency rather than only using it in the encoders. Also, the residual blocks are removed in the latent space, which is observed to improve the model's learning process. The single DGCG model architecture is shown in FIG. 70, as there are two of the same models due to the cycle-consistent adversarial training nature. Lastly, the model hyperparameters used are presented in TABLE 9.

As known in the prior art, the training of the model is achieved in an unsupervised setting, using a cycle-consistent adversarial technique, where the model is iteratively trained on two datasets (e.g., Dataset 1H divided, Dataset 1D divided) to decrease the discrepancy in the representations between domains in a particular feature space to be domain-invariant across different domains. This allows the learned model to be generalizable and to transfer its knowledge to the other unseen target domains. In addition, as known in the prior art, it is also important to note that the model is trained without leveraging any information from the target domain in one way or another, as Domain Generalization requires learning without having access to the test data.

To monitor the learning performance of the model during the training of DGCG, some indices are used, such as Fréchet Inception Distance (hereinafter "FID") and Mean Magnitude-Squared Coherence (hereinafter "MMSC") along with a total generator and critic losses. At the end of the training, while the generator and critic losses and FID values are approached near 0, the MMSC values are stabilized around 0.99, which indicates that the translated 16-second tensors are almost identical to the original 16-second tensors as MMSC being 1 suggests a complete similarity between the tensor pairs. It is concluded from the training results that the DGCG model learned the one-to-one mapping between the healthy and damaged domains (State-H and State-D).

Figure 71:
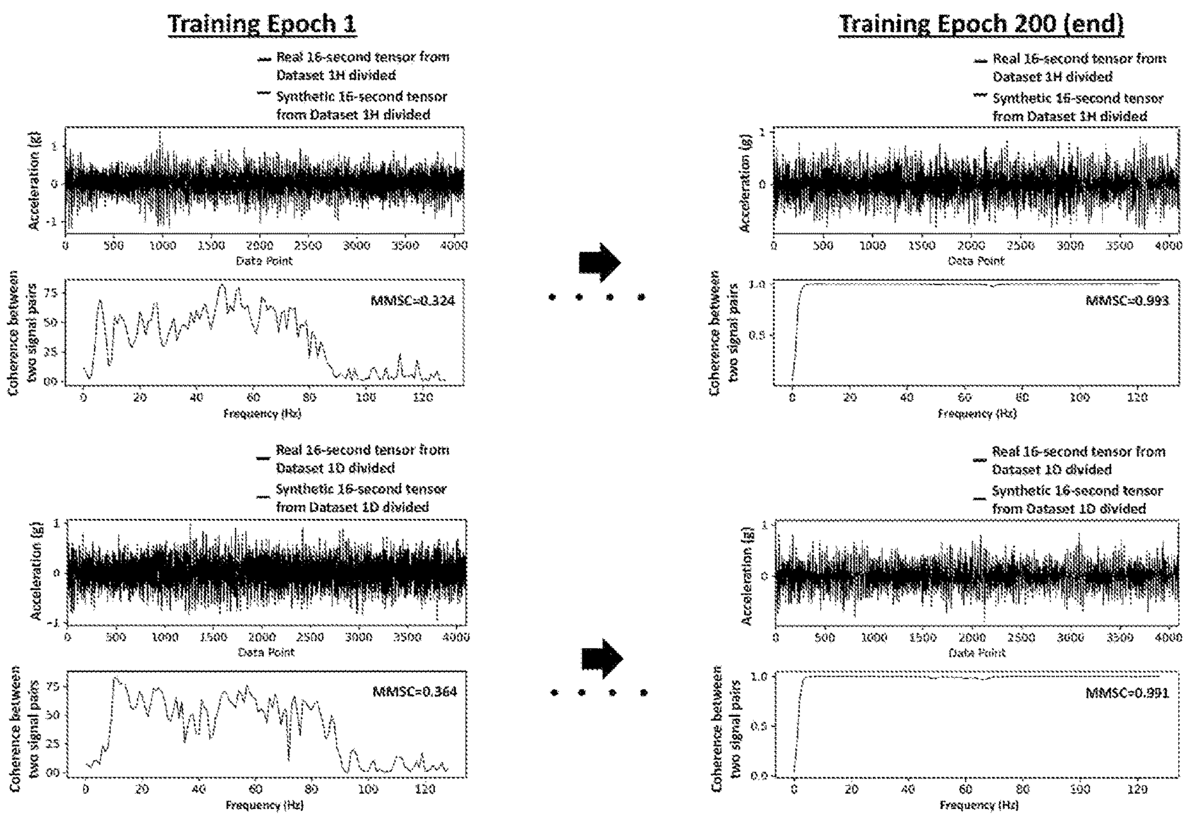
FIG. 71 is a plot illustrating the actual and translated (e.g., synthetic) 16-second tensors in the time domain and their coherences for both Dataset 1H divided and Dataset 1D divided at training epochs 1 and 200 (e.g., end of the training), according to an embodiment of the present disclosure.

In FIG. 71, the illustration of the 16-second tensors from Dataset 1H divided, and Dataset 1D divided are shown during the training for Epoch 1 and Epoch 200 (e.g., at Epoch 200, the training is ended). In the figure, the original tensors from Dataset 1H divided and Dataset 1D divided, and the translated versions of those tensors (denoted as synthetic) during the training are shown in the time domain. In addition, the coherence of the translated and the original tensors is taken and plotted respectively in the figure. The MMSC values in each coherence plot are also presented. MMSC simply takes the mean of all the segments of the coherence estimates of the 16-second tensor pairs. FIG. 72 reveals that, after the training, the DGCG model can translate the domains of 16-second tensors from State-D to State-H and State-H to State-D since MMSC gets close to 1, and the signals look-alike in the time domain. But this can only be said about Deck #1 as it is not known how the model will perform for the datasets of Deck #2.

After training DGCG, in the Translation phase, a typical domain-translation procedure known in the art is implemented. For that, the 16-second tensors in each sensor channel in Dataset 2H divided, and Dataset 2D divided are fed into trained DGCG to be domain-translated, as shown in the Translation part in FIG. 69. As such, the domains of the tensors are translated from State-H to State-D and State-D to State-H.

Subsequently, in the Postprocessing phase, the reverse process of Preprocessing is implemented. The translated (i.e., generated and/or synthetic) 16-second tensors in each sensor channel in Synthetic Dataset 2D divided and Synthetic Dataset 2H divided are concatenated back to re-form the 1024-second signals. As a result, the final form of the datasets, Synthetic Dataset 2H and Synthetic Dataset 2D, now consist of domain-translated 1024-second response signals, as shown in the Postprocessing part in FIG. 69.

Feeding the 16-second tensors from each sensor channel in the "trained" DGCG model to translate the domain of those tensors and then concatenating the translated 16-second tensors randomly to re-form the 1024-second signals disrupts the characteristics of the signals, causing the modal identifiers to be different. Thus, the concatenation of the 16-second tensors has to be made in order, e.g., translating the first 16-second tensor of a 1024-second tensor, then translating the second one, then the third, until sixty-fourth, then concatenating them in order to form the full 1024-second signal. However, performing the training procedure in a shuffle mode is essential as it increases the model's generalization ability.

The modal parameters of the translated states of Deck #2 (e.g., Synthetic Dataset 2D and Synthetic Dataset 2H) are compared with the modal parameters of the original states of Deck #2 (e.g., Dataset 2D and Dataset 2H), also given in FIG. 67. The modal identification procedure for the synthetic datasets is carried out in the same way as implemented for the actual datasets. FIGS. 72-73 presents the modal parameters and mode shapes of Synthetic Dataset 2H and Synthetic Dataset 2D, as well as their percentage differences between the modal parameters of the actual datasets (e.g., Dataset 2H and Dataset 2D). In that regard, the Difference in Natural Frequency (%), Difference in Damping Ratio (%), and Modal Assurance Criterion (hereinafter "MAC") are presented in the figures. The Average MMSC values are also provided, which takes the average of all the MMSC values of the 1024-second signal pairs from synthetic and actual datasets (the MMSC is also found actually useful and intuitive during and after the training, as it shows the average similarity between the translated signals to the original ones).

FIGS. 72-73 show that the modal parameters of the translated deck states (e.g., Synthetic Dataset 2H and Synthetic Dataset 2D) are significantly similar to the actual deck states (e.g., Dataset 2H and Dataset 2D). As such, the modes of the translated and actual deck states are similar, up to 0.07% in natural frequencies, 0.28% in damping ratios, 1.00 in MAC values, and 0.957 in Average MMSC values. On the other hand, the highest difference in natural frequency is 1.12%, the highest difference in damping ratio is 23.19%, the lowest MAC is 0.923, the lowest Average MMSC is 0.957, and lastly, the complexity values are observed to be very minimal with highest 9.949%, making the modal identification results more dependable. Overall, it can be said that the modal parameters obtained from the synthetic datasets show significant similarity to the ones obtained from the actual datasets, with some minimal variations.

In this embodiment, using the SST methodology requires an acceptable error margin because there will be no information about the ground truth in an actual-world scenario, (e.g., comparing the Synthetic Dataset 2D with the actual dataset, Dataset 2D). It is known that when damage exists in the structure, its natural frequencies decrease, which can also be seen in FIG. 67 for the modal parameters of the actual datasets. Although the natural frequencies of the synthetic datasets are very close to the natural frequencies of the actual datasets, the frequency of Mode 2 in Synthetic Dataset 2D (e.g., 41.759 Hz) should have been lower than Mode 2 in Synthetic Dataset 2H (e.g., 41.688 Hz) as Synthetic Dataset 2D is the damaged and Synthetic Dataset 2H is the healthy case. Thus, establishing an acceptable error margin is essential for effectively implementing the SST.

Learning the domain-invariant feature representations in the source domain(s) and then making accurate inference on the target domains that are OOD is the primary objective of the OOD generalization strategy. Transfer Learning, Domain Adaptation, Zero-Shot Learning, Meta-Learning, or Domain Generalization approaches could be employed to tackle the OOD challenge. As mentioned previously, Domain Generalization is preferred as it delivers more realistic scenarios for ML applications. Different techniques could be utilized in Domain Generalization, such as domain alignment, data augmentation, learning disentangled representations, etc.

In this embodiment, the SST methodology uses domain-adversarial learning to align the source domains. The learner, DGCG, minimizes discrepancies among the source domains to learn domain-invariant representations and then attempts to generalize on the target domains that are under covariate and/or semantic shifts (e.g., OOD). Note that since DGCG is trained unsupervised (i.e., no labels), covariate shift is the main reason for OOD. While learning the domain-invariant representations in the source domains and being able to generalize them to the target domains that are OOD is intuitive, knowing the existence, degree, and types of invariant representations across domains remains an open question and active research area.

It has been theoretically shown and proved in the prior art that the feature representations invariant to source domains are general and transferable to other related target domains. This raises the question of whether a representation learned to be invariant to source domain shift is guaranteed to be able to generalize to the shifts in any target domain. Another concern is the extent of the relatedness of the target domain to the source domain for a successful generalization. Although the notion of learning invariant representations is intuitively reasonable, the theoretical understanding of existence, degree, and kinds of invariance can assure OOD generalization is extremely limited. In this regard, defining the theoretical characterization of the learnability of a problem is a simple question in ML problems, and most of the efforts have been put up in the i.i.d. setting. However, defining such theoretical characterization of the learnability of a problem to generalize to the OOD domains remains vague in the literature. It is because identifying the learnability of the domains that are OOD is extremely difficult to define since it is almost impossible to enable learners to generalize to arbitrary and unknown distributions. For that, developing new theories to reveal how minimizing the discrepancies in the source domains improves generalization in the OOD domains is very important. Additionally, understanding what type of distributional shifts should be taken into account is critical for the analysis of learnability. Very few works presented vital details on this subject, which is expected to receive more attention in the theoretical understanding of OOD generalization.

In light of the discussion presented above, the prior art shows that SST is possible between dissimilar (e.g., to some degree) civil structures. Nevertheless, as the literature lacks theoretical understanding of generalization to the OOD domains, since it was initially assumed that the domain-invariant representations in the response datasets of the deck structures exist, are learnable, and the learner can generalize its knowledge to the target domains that are OOD to some extent. However, these representations may not exist; if they exist, when can the learner learn and when cannot, and if the learner had learned them, under what degree and type of distributional shifts in the target domain can the learner generalize well?

The other unknown factor here is the "degree of dissimilarity" between two bridge decks (e.g., Deck #1 and Deck #2) and to what extent this "degree of dissimilarity" affects the distributional characteristics of the response datasets collected from Deck #2. Deck #1 and Deck #2 are assumed to be dissimilar based on the different modal parameters obtained from both structures. As a result, this assumption leads the response data collected from Deck #2 to be OOD compared to Deck #1. But does it actually lead to OOD?

The OOD problems are generally studied in the computer vision field, which works on pixel intensity values, changing between 0 to 256 for different channels. The distributional change in the pixel values of images can be measured through a visual understanding of the images or simple statistical meanings. For instance, the learner trained with many images of cats is asked to predict the image of a camel. Here, the camel pictures are obviously OOD. The distributions of the images can also be compared, for example, using FID or Structural Similarity Index Measure (hereinafter "SSIM"); however, these indices are ineffective when comparing the acceleration signals collected from structures. They account for the mean and variations of the data samples. Yet, the mean and variation of acceleration signals are nearly the same, around zero. Examining the response signals in their frequency domains is a more effective way to compare them in the SHM context. For that, observing distinctions in the frequency domains of two acceleration signals can indicate that their distributional characteristics are different. On this basis, if the modal parameters of two datasets that consist of acceleration response signals differ, this implies that the structures are different, resulting from the distributional differences of the signals in those two datasets. Though, the degree of the dissimilarity in the structures remains a big question.

Although a successful SST methodology between two dissimilar bridge decks has been demonstrated, the theoretical understanding of OOD generalization problems is limited and mainly on an intuition basis. For instance, it is intuitive to think that domain invariance should exist between two prestressed (e.g., similar but dissimilar to a "degree") deck structures. Yet, it is hard to grasp the notion of implementing SST or any other data-driven knowledge transfer techniques between different types of civil structures, e.g., prestressed concrete and steel truss bridges or steel towers and residential timber structures. Additionally, while the "degree" of dissimilarity between civil structures directly relates to the OOD generalization, the understanding of this "degree" remains underexplored in the literature.

In view of the discussion presented above, the overarching question remains to be answered: To what degree of dissimilarity should exist between the civil structures so that SST between structures could be actualized?

Civil structures need to be monitored due to growing concerns about their safety and operation. The prior art has demonstrated that employing SHM systems on civil structures can be very valuable in tracking their conditions. Though, data collection procedures with extensive sensing layouts can be expensive and impractical, which leads to the data scarcity phenomenon in the SHM field. This phenomenon becomes more critical as the SHM applications are centered on data-driven techniques. To tackle this challenge, Population-Based SHM (PBSHM) is introduced. It aims to increase the availability of physics- and data-based knowledge on one set of civil structures based on the knowledge of other populations of structures.

The SST is applied on two dissimilar numeric prestressed concrete bridge deck models, Deck #1 and Deck #2. The goal is to translate the state of Deck #2 to a new state based on the knowledge obtained from Deck #1. In this regard, DGCG is trained on the two different data domains acquired from Deck #1, State-H and State-D, in an unsupervised setting with a cycle-consistent adversarial technique using the Domain Generalization learning approach. Then, DGCG is used to generalize and transfer its knowledge to Deck #2. In doing so, DGCG translates the condition (i.e., state) of Deck #2 to the condition that the model learned after the training. As a result, in one scenario, Deck #2's State-H is translated to State-D, and in another scenario, Deck #2's State-D is translated to State-H.

The evaluation of the translated states is carried out by comparing the modal parameters of Deck #2's translated states to the actual states. As such, the modal parameters of the translated State-D (e.g., translated from State-H) are compared with the modal parameters of State-D. In a similar fashion, the modal parameters of the translated State-H (e.g., translated from State-D) are compared with the modal parameters of State-H. In addition, the Average MMSC values are also calculated to evaluate the average similarity between the signals in the translated states and the actual states. The comparison results showed that the translated deck states are significantly similar to the actual states. As a result, the modes of the translated and actual deck states are similar, up to 0.07% in their natural frequencies, 0.28% in damping ratios, 1.00 in MAC values, and 0.957 in Average MMSC values.

Although the results can be concluded as successful, a couple of concerns need to be addressed about the generalization in SST of civil structures, as discussed in Section 5. In tackling the OOD problems, it is shown that feature representations that are invariant across source domains are also invariant to the related target domains, but this does not mean that the representations learned to be invariant to source domain shift are guaranteed to be able to generalize to the shifts in any target domain. Another concern is the degree of relatedness of the target domain to the source domain for good generalization. Though the idea of learning invariant representations is intuitive, theoretical knowledge of the existence, degree, and types of invariance that might guarantee OOD generalization is rather restricted and remains vague in the literature. For that, it is essential to develop theoretical insight that reveals how reducing the discrepancies in the source domains enhances generalization in the OOD domains. In addition, understanding what type of distributional shifts should be taken into account is critical for the analysis of learnability.

Learning domain-invariant representations are linked with the "degree of dissimilarity" between civil structures, as the degree of dissimilarity affects the distributional characteristics of the response datasets collected from them. Hence, it was initially assumed that the domain-invariant representations in the response datasets of the deck structures exist, are learnable, and the learner can generalize its knowledge to the target domains that are OOD to some extent. However, these representations may not exist; if they exist, when can the learner learn and when cannot, and if the learner had learned them, under what degree of distributional shifts in the target domain can the learner generalize well?

It is intuitive to assume that domain invariancy should exist between two prestressed deck structures, which are dissimilar to a degree. Yet, the notion of using SST or any other data-driven knowledge transfer techniques between different civil structures, such as prestressed concrete and steel truss bridges or steel towers and residential timber structures, is difficult to grasp. In addition, while the "degree" of dissimilarity between civil structures relates to the OOD generalization, the understanding of this "degree" is poorly addressed in the literature.

TABLE 9

| Model Parameter | Description |
|---|---|
| Batch Size (N) | 4 |
| Epoch | 200 |
| Learning Rate | $2 \times 10^{-4}$ |
| Critic Iteration per Epoch | 5 |
| $\lambda_{Id}$ (Identity Loss) | 10 |
| $\lambda_{Cyc}$ (Cycle Loss) | 10 |
| $\lambda_{GP}$ (Gradient Penalty) | 10 |
| Optimizer | AdamW |

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

INCORPORATION BY REFERENCE

Albuquerque I, Monteiro J, Darvishi M, et al (2019) Generalizing to unseen domains via distribution matching.

Avci O, Abdeljaber O, Kiranyaz S, Inman D (2017) Structural Damage Detection in Actual Time: Implementation of 1D Convolutional Neural Networks for SHM Applications.

Abdeljaber O, Avci O, Kiranyaz M S, Boashash B, Sodano H, Inman D J (2018) 1-D CNNs for structural damage detection: Verification on a structural health monitoring benchmark data. Neurocomputing.

Catbas F N, Luleci F, Zakaria M, et al (2022) Extended Actuality (XR) for Condition Assessment of Civil Engineering Structures: A Literature Review. Sensors 22:9560. https://doi.org/10.3390/s22239560.

de Bézenac E, Ayed I, Gallinari P (2019) Optimal Unsupervised Domain Translation Delo G, Bunce A, Cross E J, et al (2023) When is a Bridge Not an Aeroplane? Part II: A Population of Actual Structures. pp 965-974.

Deshmukh A A, Lei Y, Sharma S, et al (2019) A Generalization Error Bound for Multi-class Domain Generalization.

Dong C, Bas S, Debees M, et al (2020) Bridge Load Testing for Identifying Live Load Distribution, Load Rating, Serviceability and Dynamic Response. Front Built Environ 6: https://doi.org/10.3389/fbuil.2020.00046.

G. Blanchard, G. Lee, C. Scott (2011) Generalizing from several related classification tasks to a new unlabeled sample. in NeurIPS.

Goodfellow I J, Pouget-Abadie J, Mirza M, Xu B, Warde-Farley D, Ozair S, Courville A, Bengio Y (2014) Generative Adversarial Networks.

Gosliga J, Gardner P A, Bull L A, et al (2021) Foundations of Population-based SHM, Part II: Heterogeneous populations—Graphs, networks, and communities. Mech Syst Signal Process 148:107144. https://doi.org/10.1016/j.ymssp.2020.107144.

Gosliga J, Hester D, Worden K, Bunce A (2022) On Population-based structural health monitoring for bridges. Mech Syst Signal Process 173:108919. https://doi.org/10.1016/j.ymssp.2022.108919.

Heusel M, Ramsauer H, Unterthiner T, et al (2017) GANs Trained by a Two Time-Scale Update Rule Converge to a Local Nash Equilibrium.

Hu W, Li M, Ju X (2021) Improved CycleGAN for Image-to-Image Translation.

K. Muandet, D. Balduzzi, B. Scholkopf (2013) Domain generalization via invariant feature representation. in ICML.

Li Y, Gong M, Tian X, et al (2018) Domain Generalization via Conditional Invariant Representation.

Lu W, Wang J, Li H, et al (2022) Domain-invariant Feature Exploration for Domain Generalization.

Luleci F, AlGadi A, Debees M, et al (2022a) Investigation of comparative analysis of a multi-span prestressed concrete highway bridge. In: Bridge Safety, Maintenance, Management, Life-Cycle, Resilience and Sustainability. CRC Press, London, pp 1433-1437.

Luleci F, Catbas F N (2022) Structural State Translation: Condition Transfer between Civil Structures Using Domain-Generalization for Structural Health Monitoring Luleci F, Catbas F N, Avci O (2022b) A literature review: Generative adversarial networks for civil structural health monitoring. Front Built Environ 8: https://doi.org/10.3389/fbuil.2022.1027379

Luleci F, Catbas F N, Avci O (2021) Generative Adversarial Networks for Labeled Acceleration Data Augmentation for Structural Damage Detection. J Civ Struct Health Monit. https://doi.org/doi.org/10.1007/s13349-022-00627-8

Luleci F, Catbas F N, Avci O (2022c) CycleGAN for Undamaged-to-Damaged Domain Translation for Structural Health Monitoring and Damage Detection. https://arxiv.org/abs/220207831

Radford A, Metz L, Chintala S (2015) Unsupervised Representation Learning with Deep Convolutional Generative Adversarial Networks.

Arjovsky M, Chintala S, Bottou L (2017) Wasserstein GAN.

Gulrajani I, Ahmed F, Arjovsky M, Dumoulin V, Courville A (2017) Improved Training of Wasserstein GANs.

Zhu, J.-Y., Park, T., Isola, P., & Efros, A. A. (2017). Unpaired Image-to-Image Translation using Cycle-Consistent Adversarial Networks.

Hu, W., Li, M., & Ju, X. (2021). Improved CycleGAN for Image-to-Image Translation.

Heusel M, Ramsauer H, Unterthiner T, Nessler B, Hochreiter S (2017) GANs Trained by a Two Time-Scale Update Rule Converge to a Local Nash Equilibrium.

Guan S, Loew M (2019) Evaluation of Generative Adversarial Network Performance Based on Direct Analysis of Generated Images. In: 2019 IEEE Applied Imagery Pattern Recognition Workshop (AIPR). IEEE, pp 1-5.

Guan S, Loew M (2020) A Novel Measure to Evaluate Generative Adversarial Networks Based on Direct Analysis of Generated Images.

S. Ben-David, J. Blitzer, K. Crammer, F. Pereira (2007) Analysis of representations for domain adaptation. in NIPS 19.
Shen Z, Liu J, He Y, et al (2021) Towards Out-Of-Distribution Generalization: A Survey.
van Overschee P, de Moor B (1993) Subspace algorithms for the stochastic identification problem. Automatica 29:649-660. https://doi.org/10.1016/0005-1098(93)90061-W.
Wickramarachchi C T, Poole J, Cross E J, Worden K (2022) On Aspects of Geometry in SHM and Population-Based SHM. pp 67-77.
Worden K, Bull L A, Gardner P, et al (2020) A Brief Introduction to Recent Developments in Population-Based Structural Health Monitoring. Front Built Environ 6: https://doi.org/10.3389/fbuil.2020.0014.
Yang J, Zhou K, Li Y, Liu Z (2021a) Generalized Out-of-Distribution Detection: A Survey.
Yang K D, Belyaeva A, Venkatachalapathy S, et al (2021b) Multi-domain translation between single-cell imaging and sequencing data using autoencoders. Nat Commun 12:31. https://doi.org/10.1038/s41467-020-20249-2.
Ye H, Xie C, Cai T, et al (2021) Towards a Theoretical Framework of Out-of-Distribution Generalization.
Zhou K, Liu Z, Qiao Y, et al (2021) Domain Generalization: A Survey. https://doi.org/10.1109/TPAMI.2022.3195549.
Zhu J-Y, Park T, Isola P, Efros A A (2017) Unpaired Image-to-Image Translation using Cycle-Consistent Adversarial Networks.
Zhuang Y, Qin J, Chen B, et al (2022) Data Loss Reconstruction Method for a Bridge Weigh-in-Motion System Using Generative Adversarial Networks. Sensors 22:858. https://doi.org/10.3390/s22030858.
Wang Z, Bovik A C, Sheikh H R, Simoncelli E P (2004) Image Quality Assessment: From Error Visibility to Structural Similarity. IEEE Transactions on Image Processing.

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

It is also to be understood that the following claims are intended to cover all of the generic and specific features of the invention herein described, and all statements of the scope of the invention which, as a matter of language, might be said to fall therebetween.

What is claimed is:

1. A method for automatically diagnosing a condition of at least one civil structure, the method comprising the steps of:

receiving, via at least one sensor communicatively coupled to a computing device, at least one actual sensor response from at least one civil structure, wherein the at least one sensor is in mechanical communication with the at least one civil structure, whereby the at least one actual sensor response comprises at least one actual damaged scenario, at least one actual undamaged scenario, or both;

augmenting, via at least one generative adversarial network (GAN) architecture of the processor, the at least one actual sensor response with at least one synthetic sensor response, wherein the at least one GAN architecture comprises a Wasserstein Deep Convolutional Generative Adversarial Network with Gradient Penalty (WDCGAN-GP) architecture, a Cycle-Consistent Wasserstein Deep Convolutional Generative Adversarial Network with Gradient Penalty (CycleWDCGAN-GP), or both, wherein the at least one synthetic sensor response comprises at least one synthetic damaged scenario, at least one synthetic undamaged scenario, or both, whereby the at least one actual sensor response, at least one synthetic sensor response, or both are compiled into at least one augmented sensorial dataset;

training, via at least one Deep-Learning-based Structural Damage Diagnostics (DL-based SDD) architecture of the processor, at least one prediction dataset based on the at least one augmented sensorial dataset;

comparing, via the processor of the computing device, the at least one trained prediction dataset with at least one unseen sensor response from the at least one civil structure; and automatically predicting, via the processor of the computing device, the condition of the at least one civil structure on a display device associated with the computing device by:

based on determination that the at least one unseen sensor response from the at least one sensor matches the at least one actual damaged scenario, at least one synthetic damaged scenario, or both of the at least one trained prediction dataset, transmitting a notification indicative of a damaged condition; and based on determination that the at least one unseen sensor response from the at least one sensor matches the at least one actual undamaged scenario, at least one synthetic undamaged scenario, or both of the at least one trained prediction dataset, transmitting a notification indicative of an undamaged condition.

2. The method of claim 1, wherein the at least one GAN architecture is configured to output at least one datapoint within the at least one augmented sensorial dataset in one-dimension (1D).

3. The method of claim 1, wherein the at least one GAN architecture may further comprise an algorithm selected from a group consisting of a Gated Linear Unit (GLU), at least one skip-connection, the Mish activation function, and a combination of thereof.

4. The method of claim 1, wherein the at least one DL-based SDD architecture comprises at least one deep convolutional neural networks (DCNN) architecture.

5. The method of claim 4, wherein the at least one DL-based SDD architecture is configured to output at least one datapoint within the at least one trained prediction dataset in 1D.

6. The method of claim 1, wherein the processor of the computing device further comprises a Domain-Generalized Cycle-Generative (DGCG) architecture.

7. The method of claim 6, further comprising the step of, after training the at least one prediction dataset, learning, via the DGCG architecture of the processor, at least one domain-invariant representation of at least one domain of the at least one civil structure, wherein the at least one domain comprises the at least one scenario of the at least one actual sensor response, at least one synthetic response, or both of the at least one civil structure, whereby the at least one scenario comprises at least one actual, synthetic, or both damaged scenario, at least one actual, synthetic, or both undamaged scenario, or both.

8. The method of claim 7, further comprising the step of, after learning the domain-invariant representation, applying, via the processor of the computing device, the domain-invariant representation to at least one alternative civil structure.

9. The method of claim 8, further comprising the step of, after applying the domain-invariant representation to at least one alternative civil structure, automatically predicting, via the processor of the computing device, a condition of the at least one alternative civil structure on a display device associated with the computing device by:

based on determination that at least one alternative domain source of the alternative civil structure matches the at least one domain source comprising at least one damaged scenario of the at least one civil structure, transmitting a notification indicative of a damaged condition; and based on determination that at least one alternative domain source of the alternative civil structure does not match the at least one domain source comprising at least one damaged scenario of the at least one civil structure, transmitting a notification indicative of an undamaged condition.

10. A structure diagnosis optimization system for automatically predicting a condition of at least one civil structure, the structure diagnosis optimization system comprising:

a computing device having a processor; and a non-transitory computer-readable medium operably coupled to the processor, the computer-readable medium having computer-readable instructions stored thereon that, when executed by the processor, cause the structure diagnosis optimization system to automatically predict the condition of the at least one civil structure by executing instructions comprising:

receiving, via at least one sensor communicatively coupled to a computing device, at least one actual sensor response from at least one civil structure, wherein the at least one sensor is in mechanical communication with the at least one civil structure, whereby the at least one actual sensor response comprises at least one actual damaged scenario, at least one actual undamaged scenario, or both;

augmenting, via at least one generative adversarial network (GAN) architecture of the processor, the at least one actual sensor response with at least one synthetic sensor response, wherein the at least one GAN architecture comprises a Wasserstein Deep Convolutional Generative Adversarial Network with Gradient Penalty (WDCGAN-GP) architecture, a Cycle-Consistent Wasserstein Deep Convolutional Generative Adversarial Network with Gradient Penalty (CycleWDCGAN-GP), or both, wherein the at least one synthetic sensor response comprises at least one synthetic damaged scenario, at least one synthetic undamaged scenario, or both, whereby the at least one actual sensor response, at least one synthetic sensor response, or both are compiled into at least one augmented sensorial dataset;

training, via at least one Deep-Learning-based Structural Damage Diagnostics (DL-based SDD) architecture of the processor, at least one prediction dataset based on the at least one augmented sensorial dataset;

comparing, via the processor of the computing device, the at least one trained prediction dataset with at least one unseen sensor response from the at least one civil structure; and automatically predicting, via the processor of the computing device, the condition of the at least one civil structure on a display device associated with the computing device by:

based on determination that the at least one unseen sensor response from the at least one sensor matches the at least one actual damaged scenario, at least one synthetic damaged scenario, or both of the at least one trained prediction dataset, transmitting a notification indicative of a damaged condition; and based on determination that the at least one unseen sensor response from the at least one sensor matches the at least one actual undamaged scenario, at least one synthetic undamaged scenario, or both of the at least one trained prediction dataset, transmitting a notification indicative of an undamaged condition.

11. The structure diagnosis optimization system of claim 10, wherein the at least one GAN architecture is configured to output at least one datapoint within the at least one augmented sensorial dataset in one-dimension (1D).

12. The structure diagnosis optimization system of claim 10, wherein the at least one DL-based SDD architecture comprises at least one Deep Convolutional Neural Networks (DCNN) architecture.

13. The structure diagnosis optimization system of claim 12, wherein the at least one DL-based SDD architecture is configured to output at least one datapoint within the at least one trained prediction dataset in 1D.

14. The structure diagnosis optimization system of claim 10, wherein the processor of the computing device further comprises a Domain-Generalized Cycle-Generative (DGCG) architecture.

15. The structure diagnosis optimization system of claim 14, wherein the executed instructions further comprise the step of, after training the at least one prediction dataset, learning, via the DGCG architecture of the processor, at least one domain-invariant representation of at least one domain of the at least one civil structure, wherein the at least one domain comprises the at least one scenario of the at least one actual sensor response, at least one synthetic response, or both of the at least one civil structure, whereby the at least one scenario comprises at least one actual, synthetic, or both damaged scenario, at least one actual, synthetic, or both undamaged scenario, or both.

16. The structure diagnosis optimization system of claim 15, wherein the executed instructions further comprise the step of, after learning the domain-invariant representation, applying, via the processor of the computing device, the domain-invariant representation to at least one alternative civil structure.

17. The structure diagnosis optimization system of claim 16, wherein the executed instructions further comprise the step of, after applying the domain-invariant representation to at least one alternative civil structure, automatically predicting, via the processor of the computing device, a condition of the at least one alternative civil structure on a display device associated with the computing device by:

based on determination that at least one alternative domain source of the alternative civil structure matches the at least one domain source comprising at least one damaged scenario of the at least one civil structure, transmitting a notification indicative of a damaged condition; and based on determination that at least one alternative domain source of the alternative civil structure does not match the at least one domain source comprising at least one damaged scenario of the at least one civil structure, transmitting a notification indicative of an undamaged condition.

18. A method for automatically diagnosing a condition of at least one alternative civil structure, the method comprising the steps of:

receiving, via at least one sensor communicatively coupled to a computing device, at least one actual sensor response from at least one civil structure, wherein the at least one sensor is in mechanical communication with the at least one civil structure, whereby the at least one sensor response comprises at least one actual damaged scenario, at least one actual undamaged scenario, or both;

augmenting, via at least one generative adversarial network (GAN) architecture of the processor, the at least one actual sensor response with at least one synthetic sensor response, wherein the at least one GAN architecture comprises a Wasserstein Deep Convolutional Generative Adversarial Network with Gradient Penalty (WDCGAN-GP architecture, a Cycle-Consistent Wasserstein Deep Convolutional Generative Adversarial Network with Gradient Penalty (CycleWDCGAN-GP), or both, wherein the at least one synthetic sensor response comprises at least one synthetic damaged scenario, at least one synthetic undamaged scenario, or both, whereby the at least one actual sensor response, at least one synthetic sensor response, or both are compiled into at least one augmented sensorial dataset;

training, via at least one Deep-Learning-based Structural Damage Diagnostics (DL-based SDD) architecture of the processor, at least one prediction dataset based on the at least one augmented sensorial dataset;

learning, via the Domain-Generalized Cycle-Generative (DGCG) architecture of the processor, at least one domain-invariant representation of at least one domain of the at least one civil structure, wherein the at least one domain comprises the at least one scenario of the at least one actual sensor response, at least one synthetic response, or both of the at least one civil structure, whereby the at least one scenario comprises at least one actual, synthetic, or both damaged scenario, at least one actual, synthetic, or both undamaged scenario, or both;

applying, via the processor of the computing device, the domain-invariant representation to the at least one alternative civil structure; and automatically predicting, via the processor of the computing device, a condition of the at least one alternative civil structure on a display device associated with the computing device by:

based on determination that at least one alternative domain source of the alternative civil structure matches the at least one domain source comprising at least one damaged scenario of the at least one civil structure, transmitting a notification indicative of a damaged condition; and based on determination that at least one alternative domain source of the alternative civil structure matches the at least one domain source comprising at least one undamaged scenario of the at least one civil structure, transmitting a notification indicative of an undamaged condition.

* * * * *